US012652166B2

(12) United States Patent
Burns et al.

(10) Patent No.: US 12,652,166 B2
(45) Date of Patent: Jun. 9, 2026

(54) QUANTUM-SECURE DIGITAL CURRENCY

(71) Applicant: Arqit Limited, London (GB)

(72) Inventors: Daryl Burns, Gloucestershire (GB); Barry Childe, Sussex (GB); David Williams, Surrey (GB)

(73) Assignee: Arqit Limited, London (GB)

( * ) Notice: Subject to any disclaimer, the term of this patent is extended or adjusted under 35 U.S.C. 154(b) by 3 days.

(21) Appl. No.: 18/726,038

(22) PCT Filed: Jan. 5, 2023

(86) PCT No.: PCT/GB2023/050014

§ 371 (c)(1),
(2) Date: Jul. 1, 2024

(87) PCT Pub. No.: WO2023/144503

PCT Pub. Date: Aug. 3, 2023

(65) Prior Publication Data

US 2025/0088353 A1     Mar. 13, 2025

(30) Foreign Application Priority Data

Jan. 27, 2022     (GB) ..................................... 2201079

(51) Int. Cl.
*G06F 21/62*     (2013.01)
*H04L 9/08*     (2006.01)
*H04L 9/32*     (2006.01)

(52) U.S. Cl.
CPC .......... *H04L 9/0852* (2013.01); *H04L 9/0825* (2013.01); *H04L 9/083* (2013.01); *H04L 9/3247* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 10,055,714 | B2 * | 8/2018 | Zhou | ..................... G06Q 20/36 |
| 10,262,321 | B1 * | 4/2019 | Ramanathan | ...... G06Q 20/3829 |

(Continued)

FOREIGN PATENT DOCUMENTS

| | | |
|---|---|---|
| CN | 106960343 | 7/2017 |
| CN | 108694580 | 10/2018 |

(Continued)

OTHER PUBLICATIONS

Search Report GB Application No. 2201079.7 dated Jun. 26, 2023.

(Continued)

*Primary Examiner* — William J. Goodchild
(74) *Attorney, Agent, or Firm* — Dentons US LLP

(57)     ABSTRACT

A computer-implemented method of quantum-secure minting and issuing a digital coin by a central bank (CB) using a quantum cloud (QC) platform operable to facilitate an issuing authority (IA), the method includes issuing a command from the CB to the IA to mint a new digital coin, and the command includes: data indicative of a predetermined value of the coin, a unique identifier associated with the coin, and an identifier indicating which endpoint user of the QC platform is to be designated as the owner; in response to receiving the command, signing, by the IA, the coin with an ownership encryption key, wherein the ownership encryption key is known only to the QC platform and the owner; subsequent to signing the coin with the ownership encryption key, signing, by the IA, the coin with an authorising encryption key that is known only to the QC platform and the CB.

10 Claims, 41 Drawing Sheets

(56) References Cited

U.S. PATENT DOCUMENTS

| | | | | |
|---|---|---|---|---|
| 11,714,983 B1 * | 8/2023 | Imboden | ............ | G06K 19/0723 |
| | | | | 235/492 |
| 2020/0151682 A1 | 5/2020 | Hurry et al. | | |

FOREIGN PATENT DOCUMENTS

| | | |
|---|---|---|
| CN | 113516462 | 10/2021 |
| GB | 2599066 | 3/2022 |

OTHER PUBLICATIONS

Geoff Goodell, et al., "A Scalable Architecture for Electronics Payments," Arxiv.org, Cornell University Library, 201 Olin Library Cornell University, Ithaca, NY, Jan. 14, 2022, XP091127619, section 3.

Burdges Jefferey et al, "Enabling Secure Web Payments with GNU Taler," Nov. 18, 2016, SAT 2015, 18th International Conference, Austin, TX, USA, Sep. 24-27, 2015, pp. 251-270, XP047364621, section 3.

* cited by examiner

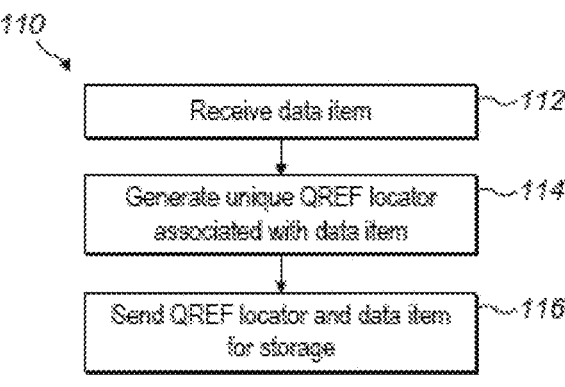

*110*

Receive data item ~112

Generate unique QREF locator associated with data item ~114

Send QREF locator and data item for storage ~116

FIG. 1b

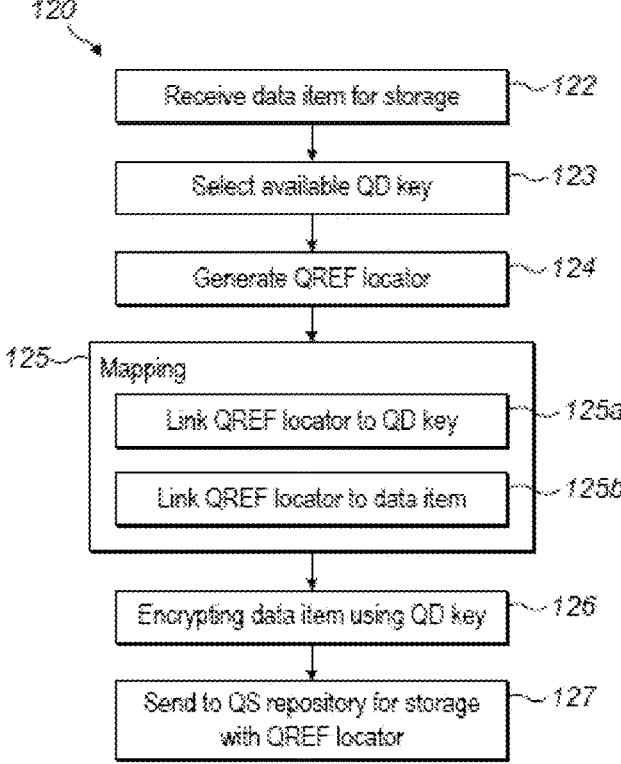

*120*

Receive data item for storage ~122

Select available QD key ~123

Generate QREF locator ~124

125~ Mapping

Link QREF locator to QD key ~125a

Link QREF locator to data item ~125b

Encrypting data item using QD key ~126

Send to QS repository for storage with QREF locator ~127

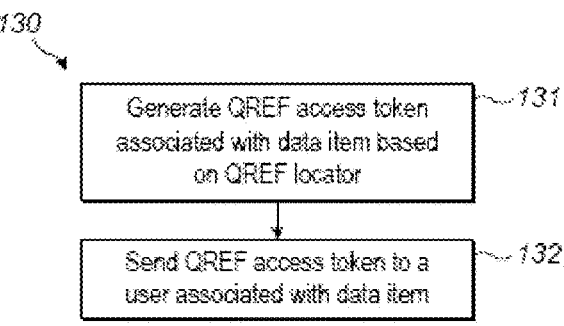

131 — Generate QREF access token associated with data item based on QREF locator 132 — Send QREF access token to a user associated with data item

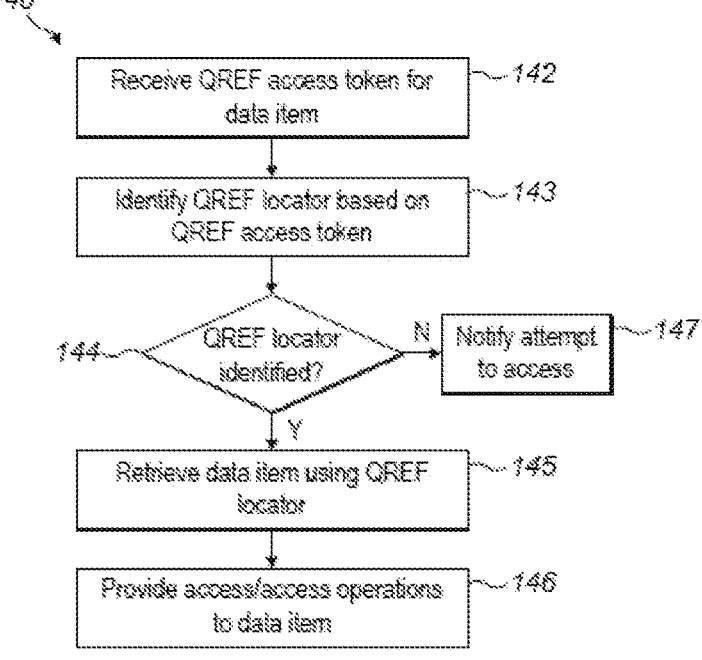

142 — Receive QREF access token for data item

143 — Identify QREF locator based on QREF access token

144 — QREF locator identified?

N → 147 — Notify attempt to access

Y

145 — Retrieve data item using QREF locator

146 — Provide access/access operations to data item

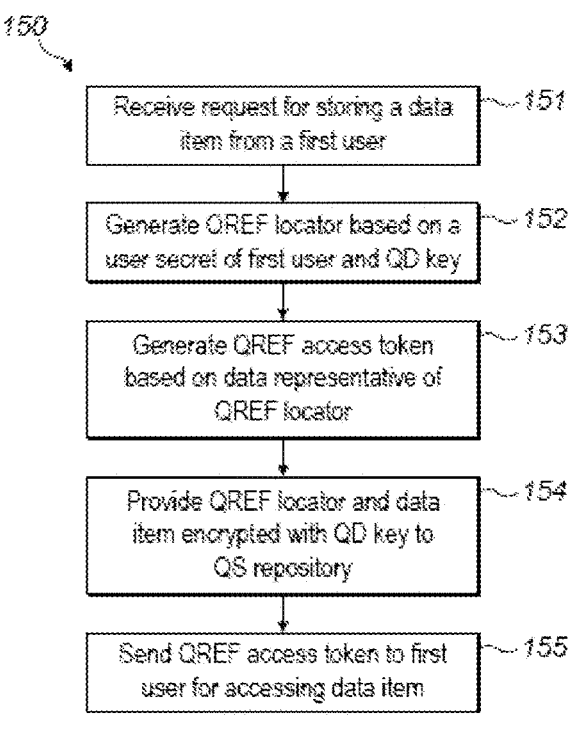

Receive request for storing a data
item from a first user ~151

Generate QREF locator based on a
user secret of first user and QD key ~152

Generate QREF access token
based on data representative of
QREF locator ~153

Provide QREF locator and data
item encrypted with QD key to
QS repository ~154

Send QREF access token to first
user for accessing data item ~155

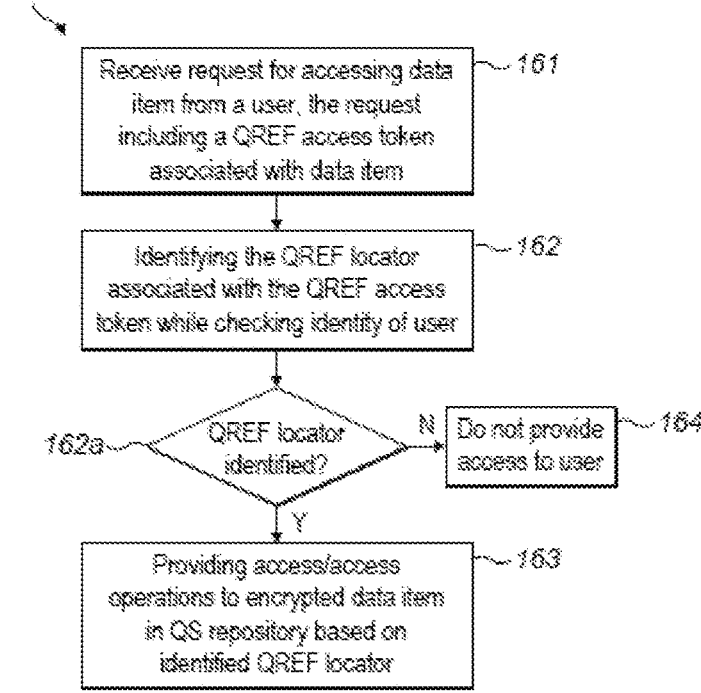

Receive request for accessing data
item from a user, the request
including a QREF access token
associated with data item ~161

Identifying the QREF locator
associated with the QREF access
token while checking identity of user ~162

162a~ QREF locator
identified?    N → Do not provide
access to user ~164

Y

Providing access/access
operations to encrypted data item
in QS repository based on
identified QREF locator ~163

*FIG. 1g*

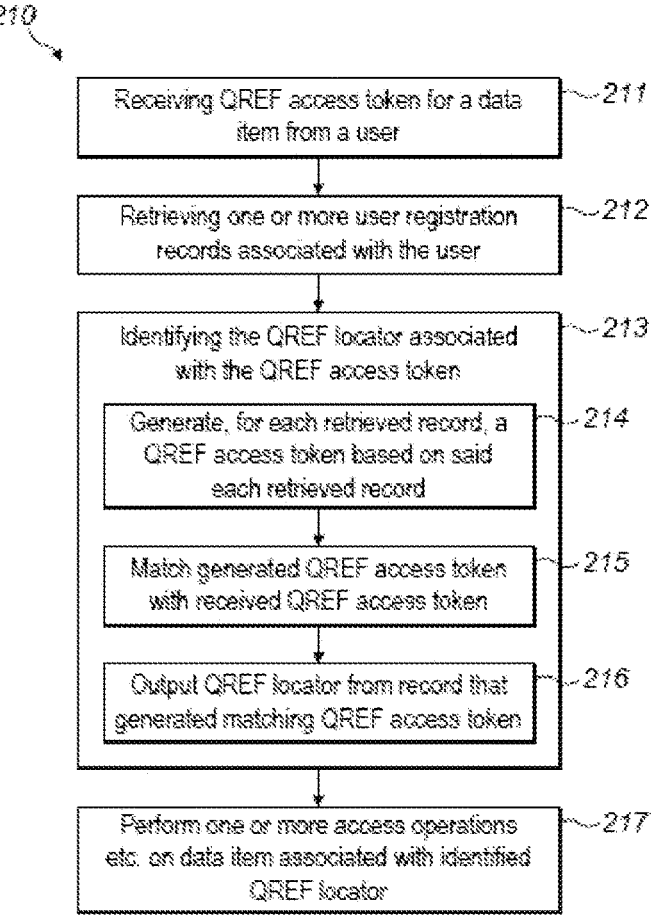

*210*

Receiving QREF access token for a data item from a user ~211

Retrieving one or more user registration records associated with the user ~212

Identifying the QREF locator associated with the QREF access token ~213

Generate, for each retrieved record, a QREF access token based on said each retrieved record ~214

Match generated QREF access token with received QREF access token ~215

Output QREF locator from record that generated matching QREF access token ~216

Perform one or more access operations etc. on data item associated with identified QREF locator ~217

User if QS device connects to QS
server of QS network — 301

User provide private key — 302

QS server retrieve available QD key
and generate QREF locator and
QREF access token — 303

Store data item of user in QS DLT
with QREF locator — 304

Generate QREF access token based
on QREF locator — 305

Send QREF access token to user — 306

*320*

User register KYC details with QS server providing KYC servie ~*321*

Generate QREF locator, associate QREF locator with KYC data item, store QREF locator and KYC data item in QS DLT ~*322*

Generate KYC access token based on QREF locator and KYC details, send KYC access token to user for use with KYC source ~*323*

510

Connect with device    ~511

Select available QD key    ~512

Upload QD key to secure processor/memory unit on device    ~513

Register association between device and QD key    ~514

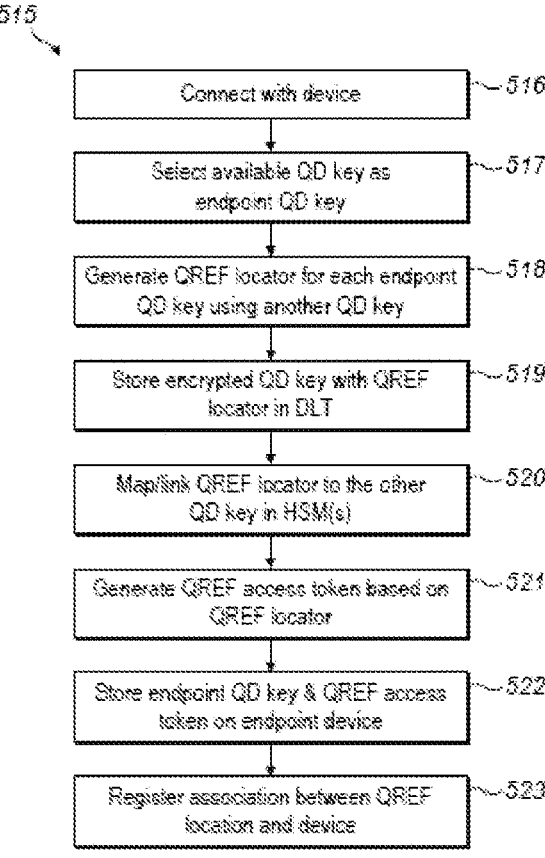

515

Connect with device — 516

Select available QD key as endpoint QD key — 517

Generate QREF locator for each endpoint QD key using another QD key — 518

Store encrypted QD key with QREF locator in DLT — 519

Map/link QREF locator to the other QD key in HSM(s) — 520

Generate QREF access token based on QREF locator — 521

Store endpoint QD key & QREF access token on endpoint device — 522

Register association between QREF location and device — 523

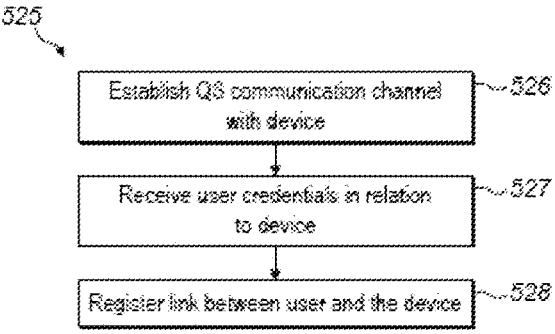

Establish QS communication channel with device — 526

Receive user credentials in relation to device — 527

Register link between user and the device — 528

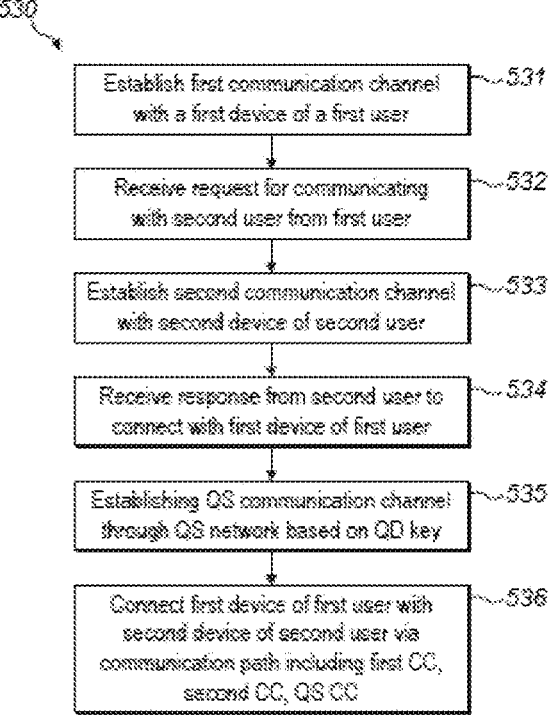

Establish first communication channel with a first device of a first user — 531

Receive request for communicating with second user from first user — 532

Establish second communication channel with second device of second user — 533

Receive response from second user to connect with first device of first user — 534

Establishing QS communication channel through QS network based on QD key — 535

Connect first device of first user with second device of second user via communication path including first CC, second CC, QS CC — 536

*FIG. 5e*

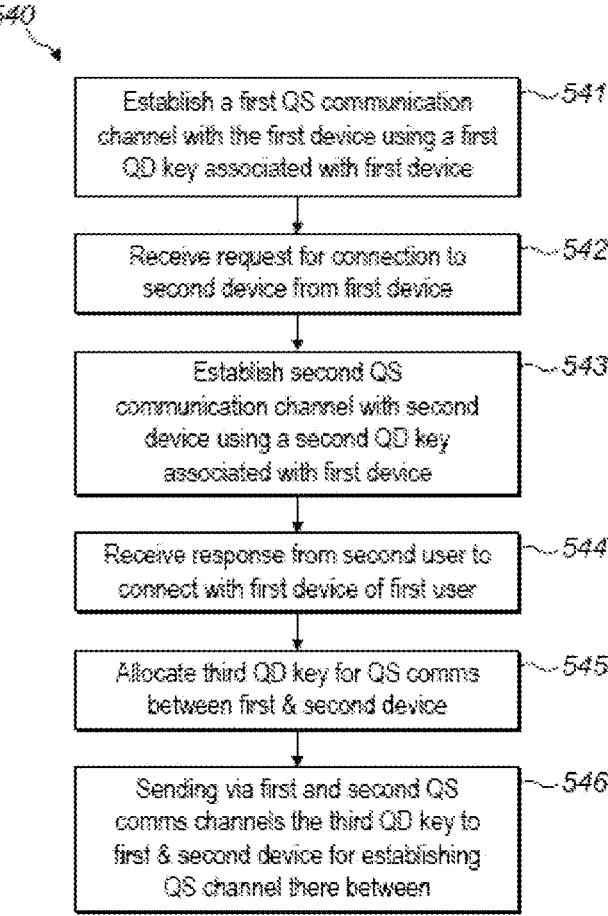

*540*

Establish a first QS communication channel with the first device using a first QD key associated with first device ~*541*

Receive request for connection to second device from first device ~*542*

Establish second QS communication channel with second device using a second QD key associated with first device ~*543*

Receive response from second user to connect with first device of first user ~*544*

Allocate third QD key for QS comms between first & second device ~*545*

Sending via first and second QS comms channels the third QD key to first & second device for establishing QS channel there between ~*546*

FIG. 5f

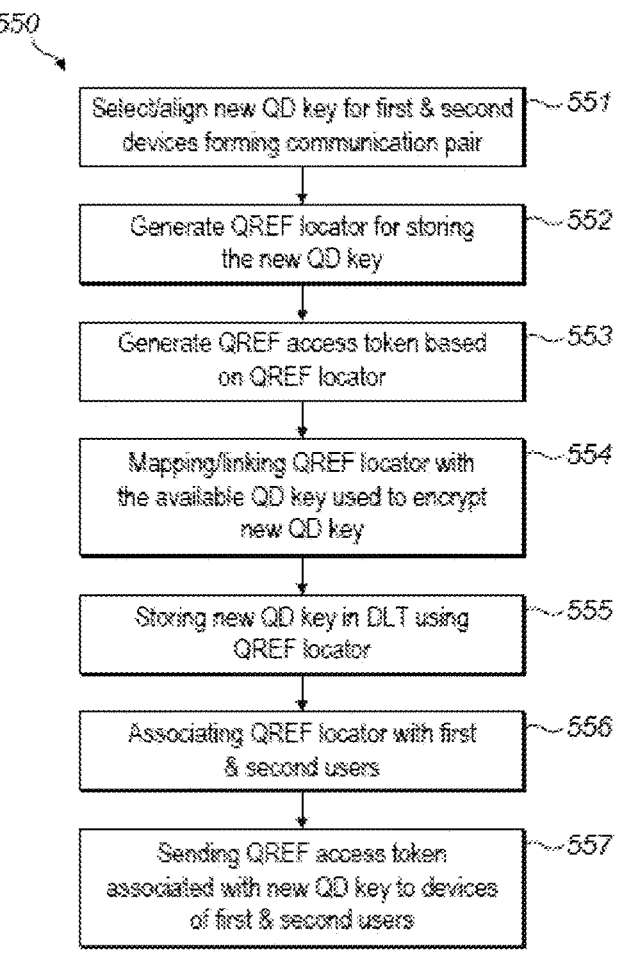

*550*

Select/align new QD key for first & second devices forming communication pair　～551

Generate QREF locator for storing the new QD key　～552

Generate QREF access token based on QREF locator　～553

Mapping/linking QREF locator with the available QD key used to encrypt new QD key　～554

Storing new QD key in DLT using QREF locator　～555

Associating QREF locator with first & second users　～556

Sending QREF access token associated with new QD key to devices of first & second users　～557

*FIG. 5g*

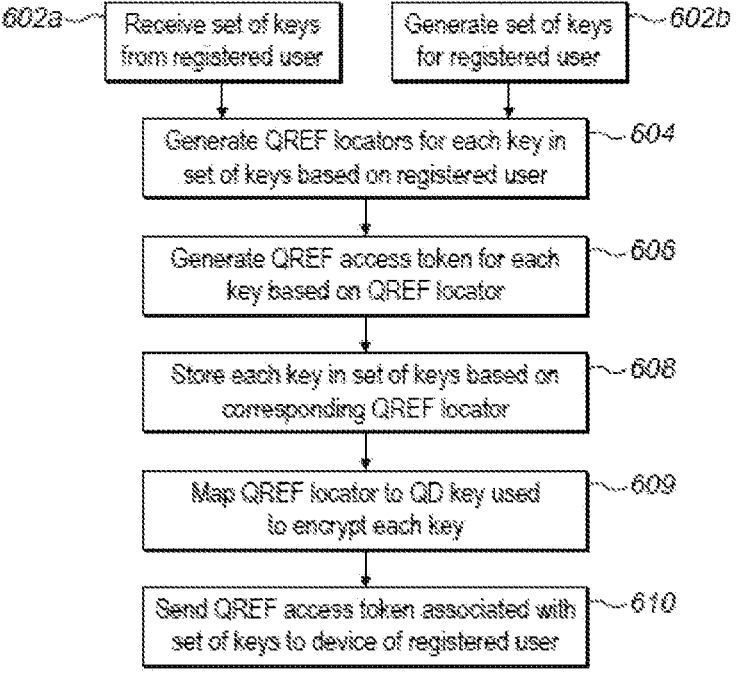

*602a*— Receive set of keys from registered user

Generate set of keys for registered user —*602b*

Generate QREF locators for each key in set of keys based on registered user ~*604*

Generate QREF access token for each key based on QREF locator ~*606*

Store each key in set of keys based on corresponding QREF locator ~*608*

Map QREF locator to QD key used to encrypt each key ~*609*

Send QREF access token associated with set of keys to device of registered user ~*610*

*FIG. 6a*

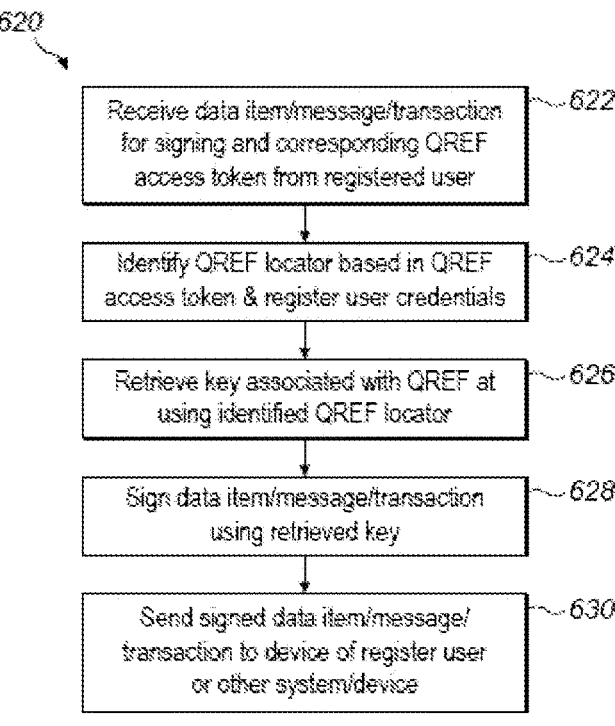

*620*

622 — Receive data item/message/transaction for signing and corresponding QREF access token from registered user 624 — Identify QREF locator based in QREF access token & register user credentials 626 — Retrieve key associated with QREF at using identified QREF locator 628 — Sign data item/message/transaction using retrieved key 630 — Send signed data item/message/transaction to device of register user or other system/device

*FIG. 6b*

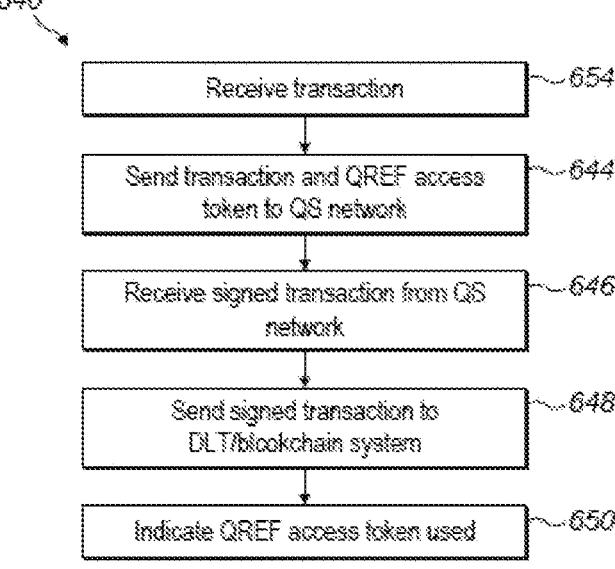

*640*

654 — Receive transaction

644 — Send transaction and QREF access token to QS network

646 — Receive signed transaction from QS network

648 — Send signed transaction to DLT/blockchain system

650 — Indicate QREF access token used

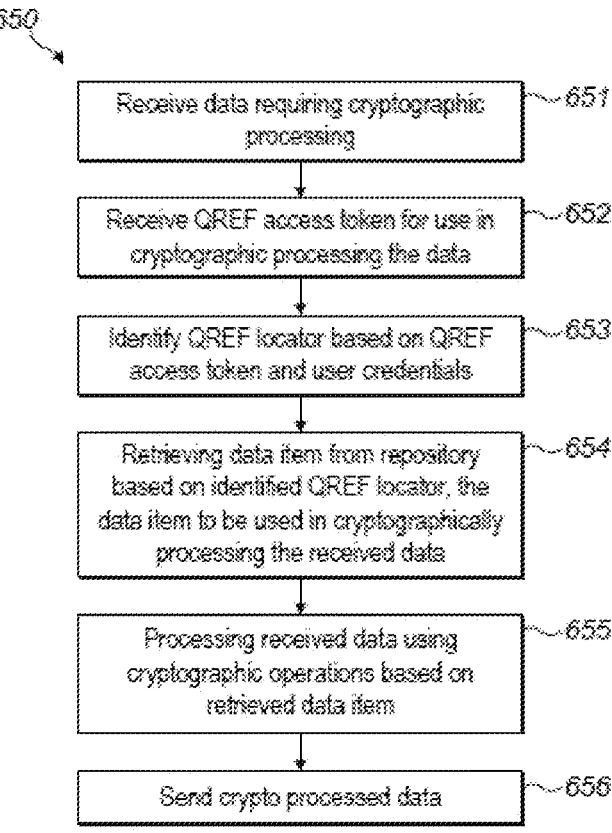

651 — Receive data requiring cryptographic processing

652 — Receive QREF access token for use in cryptographic processing the data

653 — Identify QREF locator based on QREF access token and user credentials

654 — Retrieving data item from repository based on identified QREF locator, the data item to be used in cryptographically processing the received data 655 — Processing received data using cryptographic operations based on retrieved data item 656 — Send crypto processed data

762 — User purchase from vendor (other user)

764 — KYC/AML check of user/vendor

766 — Calculate number of QM tokens to equal fiat currency balance of user based on current QM value 768 — Adjust E-wallet of user with correct number of QM tokens 770 — Calc QM tokens representing purchase value 772 — Transfer QM tokens of purchase value from QM account of user to QM account of vendor (other user)

800

810

Network
(eg. QS network or
non-QS network)

802

804 — μP(s)          CI — 806

808

OS          DS

820

SQKD — 822

QS network — 824

QS DLT — 826

QREF — 828

Access token — 830

QUANTUM-SECURE DIGITAL CURRENCY

This application is the National Stage filing under 35 U.S.C. 371 of International Application No. PCT/GB2023/050014, filed Jan. 5, 2023, claims the benefit of GB Application No. 2201079.7, filed Jan. 27, 2022, the contents of which are all hereby incorporated by reference herein in their entirety.

The present application relates to an apparatus, system(s) and method(s) of operating and using a quantum-safe payment system and applications thereto.

BACKGROUND

Cryptography is used to protect billions of transactions every day from, without limitation, for example Transport Layer Security (TLS) security for online shopping and banking to ultra-secure government communications. These transactions rely on reliable and secure means for at least two or more transacting parties to share a secret key, enabling encryption of data by one party and subsequent decryption by the other party(ies). When commercially usable universal quantum computers become available, a variety of these types of transactions, tasks and applications including, without limitation, for example digital banking, web certification, Know Your own Client (KYC), digital asset transfer, and authentication will be vulnerable, and some are already vulnerable to conventional cyber attacks. These transactions, tasks and applications are currently provided using software systems that typically use conventional cryptography and/or encryption techniques and protocols that are not sufficiently resilient enough to withstand an attack from such quantum computers (QCs) or other advanced cyber attack methods.

QCs can potentially crack many classical cryptography codes almost effortlessly. There has also been a ground swell in interest in quantum computing within the last year as a result of the success of D-Wave in selling commercial systems. Furthermore, a number of breakthroughs by technology companies such as, without limitation, for example Microsoft (RTM), IBM (RTM), Intel (RTM), Google (RTM) and others in QC techniques promise to make a universal QC viable in the near future (e.g. five to ten years time). QCs have already become a threat to current, in 2016 NIST reported the impact of QCs on common cryptographic algorithms in a report by L. Chen, S Jordan, Y Liu, D Moody, R Peralta, Ray Perlner, D Smith-Tone, "Report on Post-Quantum Cryptography", NISTIR 8105, 2016 (https://nvlpubs.nist.gov/nistpubs/ir/2016/NIST.IR.8105.pdf). For example, NIST determined, without limitation, for example that the following public key cryptographic algorithms used for digital signatures and/or key exchange are no longer secure including, without limitation, for example Finite Field Cryptography such as, without limitation, for example Digital Signature Algorithm (DSA); Elliptic Curve Cryptography such as, without limitation, for example ECDSA and ECDH, Elliptic curve Diffie Hellman ephemeral-Rivest/Shamir/Adelman (ECDHE-RSA), ECDHE-ECDSA; Rivest/Shamir/Adelman (RSA); and other crypto. NIST also determined that the following hash-functions will require large output or key sizes, without limitation, for example: Secure Hash Algorithm (SHA)-2 (384 bit) and SHA-3. NIST also determined that the following cryptographic algorithms may require larger key sizes, without limitation, for example Advanced Encryption Standard (AES) (256-bit) Galois Counter Mode (GCM) when used for encryption.

This means that cryptographic protocols using these cryptographic algorithms will be vulnerable and no longer secure. For example, such cryptographic protocols include, without limitation, for example, Transport Layer Security (TLS), https, Secure Sockets Layer (SSL), Secure Shell (SSH) used in, without limitation, for example searches, certification and/or banking applications and the like. For example, TLS using ECDHE-RSA, AES (128-bit) GCM and SHA256 for searches/search engines will be broken or weakened. For example, TLS using ECDHE-RSA with AES (256-bit) GCM and SHA (384-bit) for banking applications and the like will be broken or weakened. It is estimated that server certificates, client certificates, and public key cryptography will be broken and insecure.

For example, current methods to exchange cryptographic keys between two parties are vulnerable to QC attack. If the cryptographic primitives involved in the key-exchange protocol can be broken, the exchanged key is compromised and the encrypted data is revealed to the attacker. Classical key-exchange protocols are based on the hardness of integer factorization (e.g. Diffie-Hellman (DH)) or the discrete logarithm problem (e.g. Elliptic-Curve DH (ECDH)). Neither of these problems is guaranteed to be hard and both problems can be broken by a QC in polynomial time. This is of particular concern to both large and small organisations, corporations and also to individual users of public and private networks (e.g. Internet or corporate Intranets). If one is unable to reliably perform key exchange, then all current transactions, tasks and applications are vulnerable to attack by a QC.

The field of "Quantum Cryptography" aims to address these risks by developing both quantum secure cryptographic algorithms (so-called quantum-safe algorithms) and Quantum Key Distribution (QKD) techniques. Whilst the combination of both provides the ultimate solution, QKD as a stand-alone technique still has much to offer and is not in itself reliant on the development of quantum-safe algorithms to become widely adopted. However, even reliably performing QKD at scale for a wide range of users from small to large corporations and/or individuals is still a costly and time consuming exercise.

However, the promised power of QCs could result in a systemic failure of the current financial services approach to security and privacy. For example, the recent spate of security breaches and data leaks emphasise just how vulnerable businesses and individuals are if they are unable to maintain the trust of their customers/vendors and the market. Current QC techniques are particularly good at solving certain types of mathematical problems—these typically involve searching for prime factors and unstructured data searching. Although it may be a while before QC can be applied to more general problems, it is still very important to focus on areas where it is likely to demonstrate material benefit compared to classical computing techniques. The simple hard fact that RSA/PKI/Diffie-Helman ciphers are compromised by QCs (NIST 2016), requires the financial services industry to replace these with new QS cryptography solutions.

A significant threat to the integrity of financial data in the cloud is the technique of harvest and decrypt, which is already being deployed by cybercriminals. This technique sees sensitive files, which could include information such as account holders' addresses and names, scraped and stored by malicious parties until they have the capability in the future to decipher the contents with quantum computers (the power of which vastly outstrips that of classical computers). Even currently secure data is, therefore, already vulnerable to the hackers of the future.

There is a desire for a robust, secure and cost effective approach for providing quantum-safe solutions for at least the financial industry, payment systems, money transfer systems, communications, storage and/or access of data items, digital banking, web certification, Know Your own Client (KYC), digital asset transfer, and authentication, and/or any other application, transaction, and/or task vulnerable to a QC attack. In particular, there is a desire for a robust, secure and cost effective approach for operating a secure payment system. Such a solution should also provide protection against advanced non-quantum cyberattacks.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

In a first aspect, there is provided A computer-implemented method of quantum-secure (QS) minting and issuing of a digital coin by a central bank using a quantum cloud platform operable to facilitate an issuing authority, the method comprising: issuing a command, from the central bank to the issuing authority, to mint a new digital coin, wherein the command comprises: data indicative of a predetermined value of the digital coin, a unique identifier to be associated with the digital coin, and an identifier indicating which endpoint user of the quantum cloud platform, amongst a plurality of endpoint users, is to be designated as the owner of the digital coin; in response to receiving the command, signing, by the issuing authority, the digital coin with an ownership encryption key, wherein the ownership encryption key is a private key known only to the quantum cloud platform and the owner; subsequent to signing the digital coin with the ownership encryption key, signing, by the issuing authority, the digital coin with an authorising encryption key, wherein the authorising encryption key is a private key known only to the quantum cloud platform and the central bank.

As an option, the computer-implemented method may further comprise: storing, by the issuing authority, data regarding the twice signed digital coin in a database of coins, wherein the coin is identifiable.

As an option, the computer-implemented method may further comprise: requesting, by a first endpoint user to the central bank, the issuance of a coin of the predetermined value to initiate the issuing of the command by the central bank, wherein the first endpoint user is the endpoint user of the quantum cloud platform designated in the command as the owner of the digital coin.

As an option, the computer-implemented method may further comprise: sending, from the issuing authority to the owner, the twice signed digital coin.

In a second aspect, there is provided a computer-implemented method of quantum-secure (QS) transfer of a digital coin, using a quantum cloud platform operable to facilitate an issuing authority, between two or more endpoint users of the quantum cloud platform, the method comprising: sending, from a first endpoint user to a second endpoint user, a digital coin, wherein the digital coin is a twice signed digital coin comprising a first ownership encryption key associated with the first endpoint user and an authorising encryption key associated with a central bank by which the digital coin was minted, wherein the first ownership encryption key is a private key known only to the quantum cloud platform and the first endpoint user, and wherein the authorising encryption key is a private key known only to the quantum cloud platform and the central bank; verifying, between the second endpoint user and the issuing authority, that the ownership encryption key corresponds to a public encryption key associated with the first endpoint user; and verifying, between the second endpoint user and the issuing authority, that the authorising encryption key corresponds to an authorising encryption key stored by the issuing authority on behalf of the central bank; and following successful verifications between the second endpoint user and the issuing authority, signing, by the issuing authority, the digital coin with a second ownership encryption key associated with the second endpoint user, wherein the second ownership encryption key is a private key known only to the quantum cloud platform and the second endpoint user; and subsequent to signing the digital coin with the second ownership encryption key, signing, by the issuing authority, the digital coin with an authorising encryption key to produce a newly twice signed digital coin, wherein the authorising encryption key is a private key known only to the quantum cloud platform and the central bank.

As an option, signing, by the issuing authority, may comprise overwriting encryption key associated with the first endpoint user with the ownership encryption key associated with the second endpoint user.

As an option, the computer-implemented may further comprise: before verifying the ownership encryption key and authorising encryption key associated with the digital coin, verifying the first endpoint user, by the second endpoint user, by initiating a challenge-response protocol; using, by the first endpoint user, a private encryption key of the first endpoint user to respond to the challenge-response protocol; and after successful verification of the first endpoint user by the second endpoint user, proceeding to verify the ownership encryption key and authorising encryption key associated with the digital coin.

As an option, the computer-implemented method may further comprise: following the successful verifications between the second endpoint user and the issuing authority, and before the signing by the issuing authority, signing, by the second endpoint user the received digital coin with the second ownership encryption key to generate a transaction data precursor; sending the transaction data precursor from the second endpoint user to the first endpoint user; signing, by the first endpoint user, the transaction data precursor with the first ownership encryption key to generate a transaction data item; sending, from the first endpoint user to the issuing authority, the transaction data item; verifying, by the issuing authority, that the first ownership encryption key is the correct ownership encryption key for the digital coin, wherein the correct ownership encryption key is stored in a database, to prompt the signing, by the issuing authority of the digital coin, if the verification is successful; and after the signing of the digital coin by the issuing authority, updating the database, by the issuing authority, by replacing the copy of the digital coin stored in the database before the transfer of the digital coin with a copy of the newly authorised and signed digital coin.

As an option, the computer-implemented method may further comprise: after signing the digital coin with the authorising encryption key, sending, from the issuing authority to the first endpoint user, a copy of the newly twice signed digital coin; and receiving, at the second endpoint user, a further copy of the newly twice signed digital coin.

As an option, the computer-implemented method may further comprise: after receiving, by each of the first and second endpoint users, respective copies of the newly twice signed digital coin: sending, from each of the first and second endpoint users to the issuing authority, a respective acknowledgement that the respective copy of the authorised and signed digital coin has been successfully received in order to prompt the issuing authority to update the database.

As an option, the computer-implemented method may further comprise: temporarily publishing the contents of the database, after updating the database, to the first and second endpoint users to facilitate verification that the transfer of the digital coin has been successfully recorded.

As an option, the digital coin transferred in the second aspect may have been minted and issued according to the methods described herein.

As an option, each of the ownership encryption keys may be a quantum-secure key distributed to the associated endpoint user by the quantum cloud platform.

As an option, each of the ownership encryption keys may be a public encryption key that is part of a quantum-secure (QS) asymmetric key pair issued by the quantum cloud platform to the owner, wherein the QS asymmetric key pair comprises the respective ownership key and a respective private owner key.

As an option, the authorising encryption key may be a private quantum-secure key stored by the issuing authority.

As an option, signing the digital coin, by any of the endpoint users or issuing authority, may comprise concatenating the respective ownership encryption key to a data item defining the digital coin.

As an option, signing the signed digital coin, by the issuing authority may comprise concatenating the authorising encryption key to a data item defining the signed digital coin.

As an option, the quantum cloud platform may be the issuing authority.

In another aspect, there is provided a data processing system comprising one or more processors configured to carry out the methods described herein.

In another aspect, there is provided a computer-readable medium comprising instructions which, when execute by a computer or computer system, cause the computer or computer system to carry out the methods described herein.

In another aspect, there is provided a computer program comprising logic which, when executed by a computer or computer system, causes the computer or computer system to carry out the methods described herein.

In another aspect, there is provided a computer-implemented method of performing a quantum-secure (QS) transaction involving a digital coin, wherein a quantum-secure network comprising a plurality of quantum-secure servers maintains a coin database within the quantum secure network, said coin database recording ownership data of individual coins and historical records thereof, each said digital coin comprising (a) data indicative of a value of the digital coin; (b) a unique identifier of the digital coin distinguishing the digital coin from all other coins; and wherein a controller of the coin database updates a coin database entry to record a change of ownership of a coin, a quantum key being associated with said coin or said entry and said key being added to the digital coin, such that said key serves as a pointer to the database entry recording the ownership data of the digital coin.

In another aspect, there is provided a computer implemented method of verifying a secure transaction involving a digital coin, the digital coin comprising a key pointing to a database entry residing within a quantum secure network and said database entry recording ownership data of the coin, the method comprising: a coin associated with a wallet of a first endpoint user being presented as part of said transaction; said coin being received in a wallet associated with a second endpoint user; and a controller in direct or indirect communication with one or more of said wallets accessing said database entry to verify ownership at a point in time before said transaction vests with said first endpoint user.

As an option said controller may update said database entry based on said transaction to record the transfer of ownership to said second endpoint user.

In another aspect, there is provided a computer implemented method wherein a controller residing in a quantum secure network uses a key comprised in a digital coin to access a quantum secure database recording ownership data for the digital and like digital coins, to determine an aggregate value of digital coin(s) held by the owner of said digital coin.

In another aspect, there is provided a network apparatus for performing any method described herein.

The present disclosure provides systems, apparatus, mechanisms, methods and process(es) for combining a security layer via a QKD network with a data distribution layer for registering, storing and distributing digital data and/or data items via a repository or storage management system based on distributed ledger technology, shared ledger technology, cloud storage technologies, and/or centralised storage technologies for providing a quantum-safe or quantum resistant set of services, applications and use cases for a plurality of different types of users (e.g. customers, consumers, large organisations or corporation) in relation to quantum-safe payment services, digital banking, verification, authenticity, authentication, value transfer, privacy, secure storage and/or secure communication capabilities and any other service or application vulnerable to QC attack.

In an example, there is provided a computer-implemented method of secure quantum safe (QS) payments using a quantum cloud payment platform and two or more endpoint devices, the method, performed by the quantum cloud payment platform, comprising: receiving one or more quantum safe deposit payment transactions from one or more endpoint devices of one or more registered users, each QS deposit payment transaction of a user comprising data representative of a deposit value which is a fiat cash value or digital currency cash value; transferring each of the deposit values from a bank account associated with a user and linked to the QS payment account of the user to a quantum cloud account for pooling each of the deposit values; for each deposit value transferred in relation to a user of an endpoint device, performing: converting said each deposit fiat cash value to a corresponding number of quantum money tokens; linking said number of quantum money tokens to the QS payment account of the user; and sending said number of quantum money tokens to the endpoint device of the user for updating an electronic wallet of said user.

In an example, there is provided a computer-implemented method of secure quantum safe (QS) payments using a quantum cloud platform and two or more endpoint devices, the method, performed by the quantum cloud payment platform, comprising: receiving one or more quantum safe withdrawal payment transactions from one or more endpoint devices of one or more registered users, each QS withdrawal payment transaction of a user comprising data representative of a withdrawal value which is a fiat cash value or digital currency cash value; transferring each of the withdrawal values from a quantum cloud account for pooling each of the withdrawal values to a bank account associated with a user and linked to the QS payment account of the user, wherein for each withdrawal value transferred in relation to a user of an endpoint device, performing: converting said each withdrawal value to a corresponding number of quantum money tokens; determining whether QS payment account of said user has enough quantum money tokens in relation to the number of quantum money tokens of said each withdrawal value; removing said number of quantum money tokens to the QS payment account of the user, when said QS payment account has enough quantum money tokens; and sending an indication of the number of quantum money tokens withdrawn from the QS payment account of the user to the endpoint device of the user for updating an electronic wallet of said user.

In an example, there is provided a computer-implemented method of secure quantum safe (QS) payments using a quantum cloud platform and two or more endpoint devices, the method, performed by the quantum cloud payment platform, comprising: receiving one or more quantum safe payment transactions from one or more endpoint devices of one or more registered users, each QS payment transaction of a user comprising data representative of a payment value which is a fiat cash value or digital currency cash value for transferring to another user of an endpoint device; converting each of the payment values into a corresponding number of quantum money tokens; transferring each of the number of quantum money tokens corresponding to a payment value from the QS payment account of the user to the QS payment account of the other user, wherein for each of the number of quantum money tokens corresponding to the payment value transferred in relation to a user of an endpoint device, performing: determining whether the QS payment account of said user has enough quantum money tokens in relation to the number of quantum money tokens of said each payment value; removing said number of quantum money tokens from the QS payment account of the user, when said QS payment account has enough quantum money tokens; transferring said number of quantum money tokens from the QS payment account of the user to the QS payment account of the other user; and sending an indication of the number of quantum money tokens withdrawn from the QS payment account of the user to the endpoint device of the user for updating an electronic wallet of said user.

In an example, there is provided a computer-implemented method of secure quantum safe (QS) payments using a quantum cloud payment platform and two or more endpoint devices, the method, performed by one of the endpoint devices, comprising: in response to a deposit instruction from the user of the endpoint device: transmitting a quantum safe deposit payment transaction to the quantum cloud payment platform, the QS deposit payment transaction comprising data representative of a deposit value which is a fiat cash value or digital currency cash value; receiving data representative of said number of quantum money tokens corresponding to the deposit value; updating an electronic wallet of said user based on the received number of quantum money tokens.

In an example, there is provided a computer-implemented method of secure quantum safe (QS) payments using a quantum cloud payment platform and two or more endpoint devices, the method, performed by one of the endpoint devices, comprising: in response to a withdrawal instruction from the user of the endpoint device: transmitting a quantum safe withdrawal payment transaction to the quantum cloud payment platform, the QS withdrawal payment transaction comprising data representative of a withdrawal value which is a fiat cash value or digital currency cash value; receiving an indication of the number of quantum money tokens withdrawn from the QS payment account of the user; and updating an electronic wallet of said user based on said indication.

In an example, there is provided a computer-implemented method of secure quantum safe (QS) payments using a quantum cloud payment platform and two or more endpoint devices, the method, performed by one of the endpoint devices, comprising: in response to a payment instruction from the user of the endpoint device: transmitting a quantum safe payment transaction to the quantum cloud platform, the QS payment transaction of a user comprising data representative of a payment value which is a fiat cash value or a digital currency value for transferring to another user of an endpoint device; receiving an indication of the number of quantum money tokens withdrawn from the QS payment account of the user of the endpoint device; and updating an electronic wallet of said user based on the indication.

In an example, there is provided an apparatus comprising a processor unit, a memory unit, and a communication interface, the processor unit connected to the memory unit and the communication interface, wherein the processor unit, memory unit and communication interface are adapted to implement the computer-implemented method as claimed in any of the first to third aspects.

In an example, there is provided an apparatus comprising a processor unit, a memory unit, and a communication interface, the processor unit connected to the memory unit and the communication interface, wherein the processor unit, memory unit and communication interface are adapted to implement the computer-implemented method as claimed in any of the fourth to sixth aspects.

In an example, there is provided a system comprising: a quantum cloud platform including an apparatus according to the seventh aspect; a plurality of endpoint devices comprising an apparatus according to the eighth aspect; wherein the quantum cloud computing platform uses quantum safe communications with each of the plurality of endpoint devices.

In an example, there is provided a computer-readable medium comprising computer code or instructions stored thereon, which when executed on a processor, causes the processor to perform the computer implemented method according to any of the first to third aspects.

In an example, there is provided a computer-readable medium comprising computer code or instructions stored thereon, which when executed on a processor, causes the processor to perform the computer implemented method according to any of the fourth to sixth aspects.

In an example, there is provided a computer-implemented method of secure quantum safe (QS) payments using a quantum cloud platform, the quantum cloud platform comprising a quantum-safe network, the QS network comprising one or more QS server(s) and a distributed ledger technology (DLT) repository for registering, recording and tracking a plurality of QS payment transactions between two or more endpoint devices, each QS server comprising a hardware security module (HSM) for storing an identical set of quantum distributed (QD) keys or quantum safe keys, said identical set of QD keys having been distributed to each of said QS server(s) in a quantum-safe manner, and said QS server(s) configured to communicate securely with each other and the repository using one or more available QD keys from the identical set of QD keys, and one or more further available QD keys from the set of QD keys being distributed as quantum safe keys to each of the endpoint devices registered with the quantum cloud payment platform, wherein each of the users of the endpoint devices are registered with a QS payment account in the quantum cloud payment platform, the method, performed by the quantum cloud payment platform, comprising: receiving one or more quantum safe deposit payment transactions from one or more endpoint devices of one or more registered users, each QS deposit payment transaction of a user comprising data representative of a deposit fiat cash value; transferring each of the deposit fiat cash values from a bank account associated with a user and linked to the QS payment account of the user to a quantum cloud account for pooling each of the deposit fiat cash values; for each deposit fiat cash value transferred in relation to a user of an endpoint device, performing: converting said each deposit fiat cash value to a corresponding number of quantum money tokens; linking said number of quantum money tokens to the QS payment account of the user; and sending said number of quantum money tokens to the endpoint device of the user for updating an electronic wallet of said user; receiving one or more quantum safe withdrawal payment transactions from one or more endpoint devices of one or more registered users, each QS withdrawal payment transaction of a user comprising data representative of a withdrawal fiat cash value; transferring each of the withdrawal fiat cash values from the quantum cloud account for pooling each of the withdrawal fiat cash values to a bank account associated with a user and linked to the QS payment account of the user, wherein for each withdrawal fiat cash value transferred in relation to a user of an endpoint device, performing: converting said each withdrawal fiat cash value to a corresponding number of quantum money tokens; determining whether QS payment account of said user has enough quantum money tokens in relation to the number of quantum money tokens of said each withdrawal fiat cash value; removing said number of quantum money tokens to the QS payment account of the user, when said QS payment account has enough quantum money tokens; and sending an indication of the number of quantum money tokens withdrawn from the QS payment account of the user to the endpoint device of the user for updating an electronic wallet of said user; receiving one or more quantum safe payment transactions from one or more endpoint devices of one or more registered users, each QS payment transaction of a user comprising data representative of a payment fiat cash value for transferring to another user of an endpoint device; converting each of the payment fiat cash values into a corresponding number of quantum money tokens; transferring each of the number of quantum money tokens corresponding to a payment fiat cash values from the QS payment account of the user to the QS payment account of the other user, wherein for each of the number of quantum money tokens corresponding to the payment fiat cash value transferred in relation to a user of an endpoint device, performing: determining whether the QS payment account of said user has enough quantum money tokens in relation to the number of quantum money tokens of said each payment fiat cash value; removing said number of quantum money tokens from the QS payment account of the user, when said QS payment account has enough quantum money tokens; transferring said number of quantum money tokens from the QS payment account of the user to the QS payment account of the other user; and sending an indication of the number of quantum money tokens withdrawn from the QS payment account of the user to the endpoint device of the user for updating an electronic wallet of said user.

As an option, the method further comprising: receiving a request from an endpoint device for creating a QS payment account; performing know your own client and anti-money laundering checks on the user of the endpoint device; in response to a positive KYC and AML checks, creating a QS payment account for the user and associating the QS payment account with the endpoint device of the user.

In an example, there is provided a computer-implemented method of secure quantum safe (QS) payments using a quantum cloud platform, the quantum cloud platform comprising a quantum-safe network, the QS network comprising one or more QS server(s) and a distributed ledger technology (DLT) repository for registering, recording and tracking a plurality of QS payment transactions between two or more endpoint devices, each QS server comprising a hardware security module (HSM) for storing an identical set of quantum distributed (QD) keys or quantum safe keys, said identical set of QD keys having been distributed to each of said QS server(s) in a quantum-safe manner, and said QS server(s) configured to communicate securely with each other and the repository using one or more available QD keys from the identical set of QD keys, and one or more further available QD keys from the set of QD keys being distributed as quantum safe keys to each of the endpoint devices registered with the quantum cloud payment platform, wherein each of the users of the endpoint devices are registered with a QS payment account in the quantum cloud payment platform, the method, performed by one of the endpoint devices, comprising: in response to a deposit instruction from the user of the endpoint device, transmitting a quantum safe deposit payment transaction to the quantum cloud platform, the QS deposit payment transaction comprising data representative of a deposit fiat cash value; receiving data representative of said number of quantum money tokens corresponding to the deposit fiat cash value; updating an electronic wallet of said user based on the received number of quantum money tokens; in response to a withdrawal instruction from the user of the endpoint device, transmitting a quantum safe withdrawal payment transaction to the quantum cloud platform, the QS withdrawal payment transaction comprising data representative of a withdrawal fiat cash value; receiving an indication of the number of quantum money tokens withdrawn from the QS payment account of the user; and updating an electronic wallet of said user based on said indication; in response to a payment instruction from the user of the endpoint device, transmitting a quantum safe payment transaction to the quantum cloud platform, the QS payment transaction of a user comprising data representative of a payment fiat cash value for transferring to another user of an endpoint device; receiving an indication of the number of quantum money tokens withdrawn from the QS payment account of the user of the endpoint device; and updating an electronic wallet of said user based on the indication.

As an option, the method further comprising: transmitting a request to the quantum cloud platform a request for creating a QS payment account; transmitting data representative of know your own client and anti-money laundering data in relation to the user of the endpoint device to the quantum cloud platform; receiving confirmation of the QS payment account created for the user; and updating an electronic wallet on the endpoint device associated with the QS payment account.

In an example, there is provided an apparatus comprising a processor unit, a memory unit, and a communication interface, the processor unit connected to the memory unit and the communication interface, wherein the processor unit, memory unit and communication interface are adapted to implement the computer-implemented method as claimed in the twelfth aspect.

In an example, there is provided an apparatus comprising a processor unit, a memory unit, and a communication interface, the processor unit connected to the memory unit and the communication interface, wherein the processor unit, memory unit and communication interface are adapted to implement the computer-implemented method as claimed in the thirteenth aspect.

In an example, there is provided a system comprising: an quantum cloud platform including an apparatus according to the fourteenth aspect; a plurality of endpoint devices comprising an apparatus according to the fifteenth aspect; wherein the quantum cloud computing platform uses quantum safe communications with each of the plurality of endpoint devices.

In an example, there is provided a computer-readable medium comprising computer code or instructions stored thereon, which when executed on a processor, causes the processor to perform the computer implemented method according to the twelfth aspect.

In an example, there is provided a computer-readable medium comprising computer code or instructions stored thereon, which when executed on a processor, causes the processor to perform the computer implemented method according to the thirteenth aspect.

In the above aspects and examples, the computer-readable medium may be a tangible computer-readable medium.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 1b is a flow diagram illustrating an example process of storing data items in a QS system.

FIG. 1c is a flow diagram illustrating another example process of storing data items in a QS system.

FIG. 1d is a flow diagram illustrating an example process of accessing data items stored in a QS system.

FIG. 1e is a flow diagram illustrating another example process of accessing data items in a QS system.

FIG. 1f is a flow diagram illustrating an example process of storing data items using the QS system of FIG. 1a.

FIG. 1g is a flow diagram illustrating an example process of accessing data items using the QS system of FIG. 1a.

FIG. 1l is a further schematic diagram illustrating an example preferred QS system using terrestrial quantum key distribution.

FIG. 2c is a flow diagram illustrating a process for accessing a data item using QREF access token in QS system(s) illustrated in FIGS. 1a-1l.

FIG. 5c is a flow diagram illustrating an example end-point registration process for QS communication using the QS system.

FIG. 5d is a flow diagram illustrating an example user registration process for QS communication using the QS system based on a registered end-point.

FIG. 5e is a flow diagram illustrating an example QS communication set-up process between at least two devices using the QS system.

FIG. 5f is a flow diagram illustrating another example QS communication set-up process between at least two devices using the QS system.

FIG. 5g is a flow diagram illustrating an example QS key assignment process 550 for use in setting up a QS communication channel between at least two end-point devices.

FIG. 6a is a flow diagram illustrating an example QS key sharing/transaction signing process using a QS system.

FIG. 6b is another flow diagram illustrating another example QS key sharing/transaction signing process using a QS system.

FIG. 6c is a further flow diagram illustrating a further example QS key sharing/transaction signing DLT process using a QS system.

FIG. 6d is a flow diagram illustrating an example QS cryptographic process for performing QS cryptographic processing of a data item.

Figure 1A:
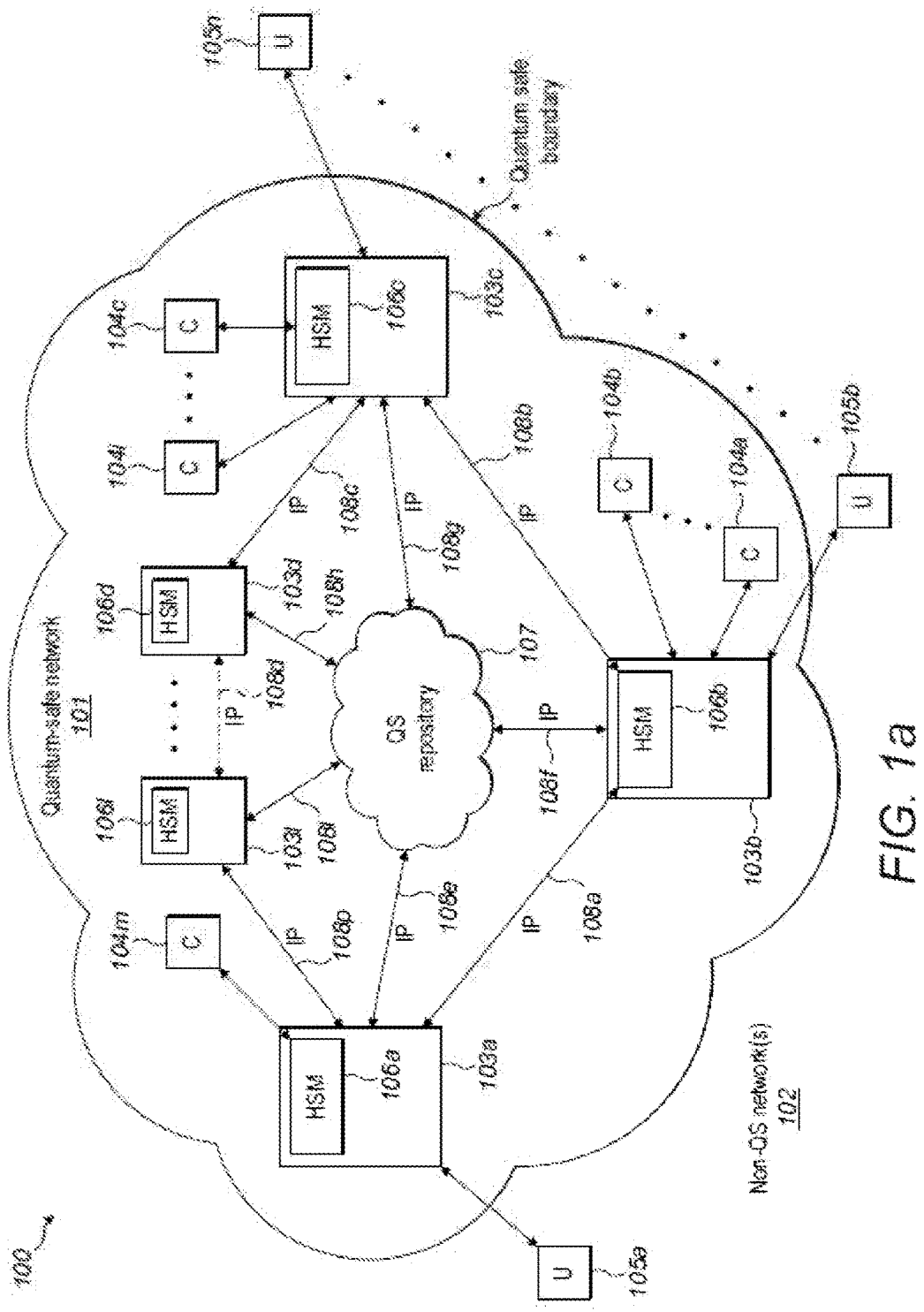
FIG. 1a is a schematic diagram illustrating an example quantum-safe (QS) system.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) for quantum-safe (QS) payments, storage, retrieval, access, use or application of data items or data and QS and/or quantum-resistant communications using a QS system comprising a quantum key distribution layer and a transaction layer, wherein the transaction layer is separated from the key distribution layer. The transaction layer including a QS network formed by a plurality of QS server(s)/node(s) and one or more repository(ies) and/or ledger(s) and the like for storing, managing, retrieving and/or using the data items, and/or setting up one or more QS communication channels and the like, the QS server(s)/node(s) (herein referred to as QS server(s)) communicate with each other in a quantum-safe manner. Each QS server includes an identical set of quantum distributed (QD) keys securely stored thereon, which are used by the QS servers to communicate with each other, and also the repository(ies) and/or ledger(s) and the like in a quantum-safe manner. The key distribution layer includes a plurality of quantum key distribution (QKD) sources, where each QKD source distributes an identical set of QD key(s) to each of the QS server(s) using a group quantum key distribution (QKD) or multi-casting QKD protocol in a quantum-safe manner. A QD key or quantum key may comprise or represent data representative of a key and/or cryptographic key that has been distributed from a QKD source using a QKD protocol in a quantum-safe manner. A quantum-safe (QS) communication channel or QS channel may comprise or represent an encrypted communication channel that is encrypted by one or more QD key(s) such that the encrypted communication channel is quantum-safe.

One or more of the QS server(s) include components that are configured to perform and/or control the registration of users, storage, retrieval, access and/or use or application of data items, and/or QS communications between, without limitation, for example devices, servers, or end-points of the users and/or customers and the like. Users of end-point devices, servers, communication devices may connect and/or register with the QS system via one or more QS server(s) for registering, storing, retrieving, accessing, using applications associated with data items stored within the repository(ies) and/or ledger(s) and the like and/or for establishing QS communications channels with the QS network and/or other devices of users registered in the QS network and the like and/or as the application demands. Additionally or alternatively, without limitation, for example end-point devices, servers, communication devices may be configured to connect and/or register with the QS system via one or more QS server(s) for registering, storing, retrieving, accessing, using applications associated with data items stored within the repository(ies) and/or ledger(s) and the like and/or for establishing QS communications channels with the QS network and/or other devices registered in the QS network and the like and/or as the application demands.

A repository or repositories or repository storage systems may comprise or represent any type of storage system or platform for storing data items and/or accessing data items stored thereon. The storage system or platform may be based on, without limitation, for example distributed storage technologies, centralised storage technologies and/or both as the application demands. Examples of a repository, storage system and/or platform as described herein according to the invention may include, without limitation, for example one or more storage systems or platforms based on one or more from the group of: distributed ledger technologies and/or network(s); shared ledger technologies and/or network(s); block-chain technologies and/or network(s); cloud storage technologies and/or platform(s); distributed storage server(s); centralised storage server(s); content delivery network; geographically distributed network of servers and/or data centers; PUSH technology (RTM)-style digital repository/cloud technologies; Mesh HSM or HSM Mesh (Clustered multiple Hardware Security Modules with embedded Quantum Random Number Generator) or clustered HSMs; publish/subscribe, request/response and/or real-time based digital storage and/or data access platforms, cloud/repository platforms and/or systems; publish/subscribe, request/response and/or real-time based digital distributed storage and/or data access platforms; database management systems; secure cloud storage systems; secure storage system or platforms; secure database management system; and/or any other system for storing and accessing data items and the like and/or as the application demands.

A quantum channel or quantum communication channel(s) may comprise or represent a communication channel capable of transmitting and/or receiving at least quantum information. Examples of a quantum channel or quantum communication channel or quantum channel that may be used according to the invention may include or be based on, without limitation, for example on one or more types of quantum communication channels associated with the group of: optical quantum communications; free-space optical quantum communications; optical fibre quantum communications; optical laser quantum communications; communications using electromagnetic waves such as, without limitation, for example radio, microwave, infra-red, gigahertz, terahertz and/or any other type of electromagnetic wave communications; communications based on electron spin and the like; any other type of quantum communications for transmitting and receiving data over a quantum communication channel between devices. It is noted that one or more types of quantum communication channel(s) may be capable of transmitting and/or receiving non-quantum or classical information.

A communication channel or standard, classical or non-quantum communication channel(s) may comprise or represent any communication channel between two devices that at least is capable of transmitting and/or receiving non-quantum information. Examples of a communication channel, and/or standard, classical and/or non-quantum communication channels according to the invention may include or be based on, without limitation, for example on one or more types of communication channels from the group of: any one or more physical communication channel(s); optical communication channel; free-space optical communication channel; wireless communication channel; wired communication channel; radio communication channel; microwave communication channel; satellite communication channel; terrestrial communication channel; optical fibre communication channel; optical laser communication channel; telecommunications channels; 2G to 6G and beyond telecommunications channels; logical channels such as, without limitation, for example Internet Protocol (IP) channels; any other type of logical channel being provided over any standard, classical or non-quantum physical communication channel; one or more other physical communications or carriers of data such as, without limitation, for example avian carriers, paper, sealed briefcases, courier or other delivery service and the like; any other type of one or more optical, wireless and/or wired communication channel(s) for transmitting data between devices; and/or two or more optical, wireless and/or wired communication channel(s)

that form a composite communication channel for transmitting data between devices; and/or any combination of two or more standard, classical or non-quantum communication channel(s) that form a composite communication channel for transmitting and/or carrying data between devices; combinations thereof, modifications thereto, and/or as described herein and the like and/or as the application demands. It is noted that one or more types of communication channels, standard, classical or non-quantum communication channel(s) may be capable of transmitting and/or receiving quantum information. As described, a quantum-safe (QS) communication channel comprises or represents a communication channel that is encrypted using a quantum safe key or a quantum-distributed (QD) cryptographic key or QD key.

The QS servers, the identical sets of QD keys and the repository/ledger are combined and configured in a manner that enables for, without limitation, for example secure collection, secure storage, transmission of data items, secure communications, and also interaction with those data items by its users. For example, for each data item to be stored, a QS server may be configured to generate a unique quantum reference (QREF) locator, which may be based on input data associated with the data item, and assign an available or useable QD key from the set of QD keys for encrypting said data item. The encrypted data item is stored in the repository/ledger of the QS system with the QREF locator. Each assigned QD key is mapped to the corresponding QREF locator. A QREF access token may be generated based on the QREF locator and/or the input data using an irreversible or one-way function, operation and/or process. The QREF access token may be distributed to allow users access to the data item in some manner. Submission of the QREF access token along with identifying/authentication data from the user may enable the QS system to identify the QREF locator and allow the user to access and/or perform access operations in some manner depending on the QREF access token, the data item. The QS system according to the invention enables a host of applications to be deployed to users from QS certificates, QS KYC, QS-depository through to quantum-resistant and/or QS end-to-end communications between end-point devices of users registered with the QS system.

For example, accessing a data item in some manner may include, without limitation, for example allowing users via their user devices to perform one or more access operations associated with accessing the data item which may include, without limitation, for example direct access operations on the data item, read access operations on the data item, write access operations on the data item, indirect access operations on the data item e.g. query access operations in which the data item is only allowed to be queried by the user using the QREF access token rather than directly accessed by the user (e.g. avoiding transmission of the data item over unsafe networks). User's access to the data item may be based on the QREF access token. The QREF access token may be further used to define and/or provide access permissions to the user in relation to the data item, the access permissions may include, without limitation, for example include, without limitation, for example read access, write access, query access, one or more geolocation access permissions that are compliant with geolocation rules associated with the data item ensuring the data item is only, without limitation, for example accessible and/or viewable in certain geolocations/geographies and the like and/or as the application demands.

The QS system is configured for receiving an identical set of QD keys at each QS server that are distributed from a QKD source in a quantum-safe manner. For example, for QS servers located or positioned in a large geographic region (e.g. one or more of a plurality of QS servers are located in numerous geographic regions/countries/jurisdictions around the world to form a world-wide QS network), the QKD source may use Satellite Quantum Key Distribution for distributing an identical set of QD keys to each of the plurality of QS server(s) and/or one or more subsets of the plurality of QS server(s) using a group and/or multi-cast QKD protocol. Furthermore, the QS system may use a repository/ledger that is configured for storing and/or retrieving one or more data item(s) using distributed ledger technology (e.g. shared ledger software technology), in which multiple QS server(s) of the plurality of QS server(s) include DLT node functionality and form a DLT repository/ledger within the QS system/network for providing a Quantum Safe, or "Provably Secure" method for the secure storage, collection, retrieval, transmission of data items, and/or providing applications associated with the data items stored in the QS network and interaction with that data/data item(s) by its users. Use cases of the QS system range from quantum-resistant to quantum-safe communications between end-point devices, messaging to web certification, authentication to digital asset custody and/or trading, data or document repository, DLT signature and verification to digital wallets for DLT/blockchain system and many others.

For example, an advantage of the configuration of the QS system according to the present invention is that it enables two users to quickly and remotely establish a quantum-safe communication channel and/or at least a quantum-resistant communication channel between them using any communication device, end-point device or computing device such as, without limitation, for example a laptop, desktop computer, personal computer, mobile phone, smart-phone, or Internet of Things (IoT) device, user server, and/or any other computing or communication device. For example, two counterparties or users that are previously unknown to each other and have no prior connection may use the QS system to quickly and remotely establish a quantum safe communication channel between them using any end point device. In another example, two counterparties or users that are previously known to each other and have a prior connection may use the QS system to also quickly and remotely establish a quantum safe communication channel between them using their end point devices. In another example, at least two different IoT devices that are previously unknown to each other and have no prior connection may use the QS system to quickly and remotely establish a quantum safe communication channel therebetween (e.g. a quantum safe communication between a first IoT device and a second IoT device, server and/or any other device). In another example, at least two IoT devices that are previously known to each other and have a prior connection may use the QS system to also quickly and remotely establish a quantum safe communication channel therebetween. The IoT devices may be associated with defined control systems or reporting systems in cloud computing, FOG computing architectures and/or FOG networking architectures and the like and/or as the application demands, and/or any other system using IoT devices that require quantum-safe communications therebetween. Although the user end point devices and/or computing/communication devices with users are described, this is for simplicity and by way of example only and the invention is not so limited, it is to be appreciated by the skilled person that user end point device or communication devices with users are only example devices that may operate with the QS system enabling QS communications and/or other use cases as described herein, and the skilled person would appreciate that any the user end point device and examples thereof are applicable to any other device with or without a user or operator/control system that is capable of communicating over a communication channel with one or more other devices such as, without limitation, for example IoT devices, sensor devices, robotics devices, smart devices, laptop, desktop computer, personal computer, mobile phone and/or any other computing or communication device and the like as the application demands.

In another example, an advantage of the configuration of the QS system according to the invention is that it enables the deposit, storage and/or retrieval/access to data items and/or use of data items and/or application of data items in a quantum-safe manner. For example, registered users of the QS system such as, without limitation, for example customers, individual users, and/or corporate users of the QS system can deposit and store data items/data (e.g. identity records, documents, and/or any data and/or information of value to a user) within the QS network of the QS system in a manner which is quantum-safe (QS). Once stored in the QS network (e.g. within a repository/ledger of the QS network), these data items/data may be queried, retrieved, accessed and/or used in applications by the users and/or third parties in a QS manner. For example, counterparties can instruct, execute and settle the transfer of digital assets in an entirely QS manner.

In another example, one or more QS server(s) of the QS system may include a QS DLT signing/verification mechanism/application that uses QD keys from the identical set of QD keys distributed using QKD and stored in a QS manner by the QS server(s) (e.g. unbreakable QD keys) such that, without limitation, for example user transactions can be submitted to the QS system for QS DLT signing prior to submission to the counterparty to the transaction and/or prior to submission into, for example, an external DLT and/or blockchain systems. The QS system eliminates the need or requirement for users to have their private/public keys for signing/verifying blockchain/DLT transactions stored on their end-point device, but rather enables the user to have their private/public keys and/or even a set of private/public QD keys assigned from the set of QD keys on a QS server to be securely stored and accessible in a QS manner. This enables QS signing/verification of blockchain/DLT transactions, which substantially mitigates malevolent actors or hackers misuse/stealing transactions or digital assets or submitting false transactions from private/public keys stolen from a user's end-point device or conventional digital wallet. The QS safe system, or Quantum Cloud, use of Shared Ledger technology provides the capability to use a Symmetric Key algorithm instead of an asymmetric key algorithm interchangeably for signing of blockchain transactions and communications between nodes, dependent on deployment requirements.

An example QS system according to the invention is now briefly described. Although some specific components, devices, mechanisms, apparatus, system(s) and/or elements are described in the following example QS system, this is by way of example only and the invention is not so limited, the skilled person in the art would understand that the following example QS system may include other elements, components and the like and/or be combined, merged, and/or modified with the other example QS systems, use cases and the like as described with reference to the figures and/or as described herein. An example of the QS system according to the invention may include, without limitation, for example the following components and/or elements. The example QS system includes a QS network formed by a plurality of QS server(s) and/or QS repository/ledgers storage system that communicate with each over communication channels using the same set of QD keys in a quantum-safe manner.

For example, the QS system may store data items/data in a disaggregated manner in the repository/ledger storage system using such as, without limitation, for example a Redundant Array of Inexpensive/Independent Disks or Drives (RAID) system coupled with distributed ledger of geographically dispersed QS servers that have DLT node functionality. Further, in systems using a meshed HSM and/or clustered hardware security modules some data items/data may be stored in a disaggregated manner in the meshed HSM, HSM mesh and/or clustered HSMs. Each QS server of the QS network may include a QKD communication system that is configured to enable distribution of the same set of quantum distributed (QD) keys, or a so-called identical set of QD keys from a QKD source using quantum channels and the like. For example, each QS server of the QS network may include an Satellite QKD (SQKD) communication system (e.g. an On-Ground Communication Satellite Receiver) that connects to a satellite network that enables via a QKD multi-cast or group mode (or protocol) the QKD communication system to receive from a satellite of the satellite network the same set of quantumly generated random number encryption keys, a so-called identical set of QD keys, as the other QS servers. The QD keys may be distributed using QKD via a satellite quantum optical channel from the satellite. In another example, each QS server of the QS network may include a terrestrial QKD communication system (e.g. an optical fibre communication receiver) connected to a QS optical fibre network that is configured to enable reception from a QKD source connected to the optical fibre network of a set of quantumly generated random number encryption keys, so-called QD keys, from the QKD source over the optical fibre network via a fibre optical quantum channel. Although SQKD and terrestrial QKD has been described, by way of example only and not limited to, as described herein, it is to be appreciated by the skilled person that the QKD source may be any other type of QKD source or source(s) configured for distributing the same or similar sets of QD keys to each of the QS servers of the QS network and/or as the application demands.

The QD keys may be paired with a quantum-safe and/or symmetrical algorithm such as, without limitation, for example One Time Pad (OTP), Bit-Flipping Key Encapsulation (BIKE) and variants thereof and the like, AES 256, AES 512 and the like, other provably secure cryptographic algorithms from National Institute of Standards and Technology (NIST) and/or any other similar cryptographic standards bodies, and/or any other provably secure cryptographic algorithm in a post-quantum world, that can guarantee that the set-up of quantum-safe communication channels (even communication channels over standard telecommunication links) between the QS server(s) of the QS network that are provably secure and, may be configured, to be quantum-safe. It is to be appreciated by the person skilled in the art that the cryptographic algorithm used with the QD keys (also referred to as quantum keys) to form the QS communications channels may be any suitable cryptographic algorithm that is provably secure and/or quantum-safe. In the QS system, the plurality or a majority or subset of the QS server(s) of the QS network may form a private or intranet-type QS network and is configured not to be directly Internet accessible or publicly accessible. That is, a QS server of the private QS network may only communicate with other QS server(s) over a QKD connected private circuit in meshed configuration, and that communication only happens over quantum-safe communication channels (or QS channels), which are telecommunications or communications channels of a communication network encrypted using one or more provably secure cryptographic algorithms with one or more of the available or usable QD keys (or quantum keys) from the set of QD keys distributed from the QKD source to each QS server of the QS network. The "private" QS network creates a "Quantum Safe Boundary" within which data items are stored and accessible in a quantum-safe manner. In order to enable users and/or customers to store and/or access data items within the QS network, one or more of the QS servers may act as or include the functionality of at least a QS registration server. The QS registration server may be connected over quantum-safe channels to one or more registration nodes, which a user or customer may connect to for registering with the QS system, storing and/or depositing data into the QS system. The QS registration server may be coupled to one or more registration nodes (or registration computing devices) over quantum-safe channels. Each registration node may be allocated or assigned an available QD key from the set of QD keys for establishing a QS communication channel in a quantum-safe manner with the corresponding QS registration server. Alternatively or additionally, each QS server/node may include the functionality of a QS registration server and also gateway functionality, where the QS registration server is connected via the gateway functionality to one nor more registration nodes and the like. The gateway functionality providing a secure interface between the QS registration server and the one or more registration nodes and the like.

Registration nodes may be accessible to users of the QS system either via communication channels over the Internet and/or public network or via visiting a registration node in person. For example, a user may be required to visit a registration node to, without limitation, for example securely register themselves as a user of the QS system, securely receive one or more QS system applications or software for operating their end-point device in a QS manner with the QS system, securely receive one or more assigned QD Keys from the set of QD keys for storage in a secure enclave on their end-point device for use in quantum-safe communications with the QS system over the public network, and/or for securely submitting data items/digital data via a direct secure physical link with the registration node.

As mentioned, the repository/ledger storage system that may be implemented using the QS servers and/or by separate QS storage servers may use, without limitation, for example a RAID format or variant thereof for storing data items, which identifiable by a unique address or locator value, a so-called QREF locator, which is generated or created by an algorithm using input data associated with the data item and/or user and a QD key assigned for encrypting the data item. The assigned QD key is extracted from the available QD keys of the set of QD keys securely stored on a QS server, without limitation, for example in a hardware security module (HSM). Each QS server has an identical set of QD keys stored on a corresponding HSM, in which the QS network forms a Meshed HSM or HSM Mesh or clustered HSM. As an example, an SQKD system may distribute an identical set of QD keys to each QS server for storage in a corresponding HSM of the QS server. This may be achieved by a group or multi-cast QKD protocol by the satellite, which stores the identical set of QD keys and uni-casts the data representative of the identical set of QD keys to each QS server as it passes over. Once all the required QS servers have received data representative of an identical set of QD keys, the satellite removes or deletes said data representative of the identical set of QD keys. This may be repeated for updating each QS server with further identical sets of QKD keys as and when required.

For example, the input data may include, without limitation, for example the user's private key or user secret and the assigned QD key extracted from the Meshed HSM of the QS network and are combined using the QREF algorithm to generate a unique QREF locator for storing the encrypted data item (encrypted with the assigned QD key) in the repository/ledger system of the QS network. A linking or mapping of the QREF locator to the QD key assigned to the data item is stored each HSM of the QS network, i.e. in the Meshed HSM. The mapping between the assigned QD key and QREF locator stored in the Meshed HSM and the storage of the encrypted data item within the QS repository/ledger system of the QS system using the QREF locator creates a QS "Locker" or storage location for the data item. The encrypted data item is stored in the QS system in such a manner that it can only be retrieved, accessed, decrypted and/or used and the like with knowledge of the QREF locator used to store it. The QS "Locker" or storage location of the data item can only be accessed with the corresponding QREF locator. Given this, the QS system only stores data representative of the QREF locator linked with the assigned QD key within the HSM of the QS servers of the QS network. Thus, the QREF locator is securely stored in the HSM of the QS servers of the QS network and is not distributed or accessible otherwise. That is, the QREF locator is inaccessible to users of the QS system and is not distributed outside the Meshed HSM of the QS system or even the QS boundary of the QS network.

An HSM of a QS server may comprise or represent a physical computing device, component or apparatus that is configured to safeguard and manage, without limitation, for example cryptographic or QD keys, and provide, without limitation, for example secure execution of core modules/components such as, without limitation, for example critical instructions, code, computer-implemented methods/process(es) and the like implementing core functionality of a QS server associated with generation of QREF locators, QREF access tokens, identification of QREF locators from QREF access tokens, encryption/decryption operations and/or secure storage of one or more sets of QD keys, and data items. The HSM includes anti-tampering technology that may, without limitation, for example wipe secrets/QD keys and the like in case of physical and/or software breach and the like.

A user or customer end-point device or device may comprise or represent any device, computing device and/or communications device capable of communicating over a communication network, where the device/computing device and/or communication device is associated with the user or customer. Examples of end-point devices and/or devices may include, without limitation, for example a laptop, desktop computer, personal computer, mobile phone, smart-phone, or Internet of Things (IoT) device and the like, user server, customer server(s), and/or any other computing or communication device. Users and/or customer end-point devices and/or communications devices may establish a quantum-safe communication channel with the QS system, within the QS system and/or end-to-end quantum-safe communication channel with other user and/or customer end-point devices. This may be achieved through the end-point device connecting to a QS server and/or a corporate network hosting a QS server that includes, without limitation, for example an SKQD system and so has a set of QD keys, one or more of which may be assigned to the end-point device of the user and stored in a secure enclave or secure memory on the end-point device. The end-point device may use the one or more assigned QD keys to establish a QS channel with the QS system, and hence, may establish a QS channel to other one or more similarly configured end-point device(s) and the like.

Alternatively or additionally, one or more end-point devices may be registered with the QS system through a registration process (e.g. a QREF Device Registration Process) in which one or more QD keys from the set of QD keys may be assigned and/or installed in a secure memory/enclave of the end-point devices. The QD keys assigned to the end-point device may be stored as one or more data items in the QS repository of the QS system along with a corresponding QREF locator for each data item. When a user receives the end-point device with a QD key installed thereon, the user may register via a QS registration server of the QS system (e.g. via a web portal and/or web interface) or directly at a registration node in which the QS system updates the registry in relation to the end-point device as being associated with the registered user. The user of the end-point device may then use a QREF application to establish a quantum-safe communication channel between the end-point device and the QS system using the previously assigned QD keys stored in the secure enclave of the end-point device. Each user, once signed into the QS system, via their end-point devices and having established a QS channel may then request a call or connection with one or more other users of the QS system, in which their end-point devices also establish a quantum-safe communication channel with the QS system, and so the QS system may facilitate the establishment of a quantum-safe communication pipe (series of channels) through he QS network to each end-point device in relation to the requested call or connection. The QS system may thus build up a user directory or registry and, over time, establish the user connection or contact lists for each user allowing said each user to contact other users in a quantum-safe manner.

Another aspect of the QS system includes generating a QREF access token when a QREF locator is generated during storage of a data item in the QS repository/ledger of the QS network/system. The QREF locator may be linked in the HSM to those users given permission to access the data item in some manner. When a QREF locator is generated in relation to a data item that is to be accessed or used by one or more users, a QREF access token is generated based on the QREF locator using an irreversible or one-way function, operation and/or process (e.g. a hash of the QREF access token). The QREF access token may be distributed to users of the QS system and enables those users with permissions to access to the data item in some manner to do so by presenting the QREF access token to the QS system. On presenting the QREF access token to the QS system (e.g. a QS registration server and/or registration nodes), a user is required to register (if not already registered with the QS system) and/or login to the QS system which requires user credentials/authentication data/passwords and/or other input data that may be associated with generating the QREF locator and/or associated with those users with permissions to access the data item in some manner. Thus, with the submission of the QREF access token along with identifying/authentication data from the user, a QS server may use a QREF identification algorithm, which is securely executed, to identify the QREF locator associated with the QREF access token, whilst also checking that the user is who they say they are and are allowed or have permissions to access the data item corresponding to the identified QREF locator. Once this is confirmed, the user is allowed to access, in some manner depending on the QREF access token and permissions given to the user, the data item corresponding to the identified QREF locator. For example, the QREF identification algorithm may be configured to identify the user submitting the QREF access token by requesting the user credentials of the user.

Although the QREF access token may be sent over a quantum-safe channel to the user of an end-point device that is already registered with the QS system as outlined above, there are also various applications in which a QREF access token may simply be sent over a non-quantum-safe channel to the user of an end-point device. That is, the QREF access token is designed such that it cannot be used by anyone other than users with permissions to use the QREF access token. Furthermore, although the QREF access token is derived from the QREF locator, the QREF access token is created or generated in such a way that the QREF locator cannot be determined from the QREF access token. Thus, the QREF access token may be sent to third parties or other users over traditional communications networks, in which these users may have limited access or permissions to use or query the corresponding data item stored in the QS system. Optionally, the QS system may be arranged to use a quantum notary check on the QREF access token to check for any man in the middle attack on the traditional communications networks, and to ensure the transaction has not been modified.

When the user or customer of the QS system wishes to access the data item in future, or grant third party access to the data item or perform some transaction on the data item, it can only do so if that user, customer and/or third party has a QREF access token associated with the data item. This may be generated by the QS system as described above, or on request by the user and/or customer of the QS system that submitted the original data item for QS storage and access in the QS system. At a later stage or time, the user, customer and/or third party may then deliver their QREF access token to the QS system, e.g. via one or more QS registration servers or nodes, along with its private key and authentication. The QS system uses a QREF identification algorithm that then deduces from the QREF access token (e.g. a one-way hash of the QREF locator) the QREF locator (or address) and thus recovering the QD key from the QS server's HSM used to encrypt the data item. This enables the QS system to refer to the data item stored in the QS repository/ledger system using the identified QREF locator and access it for the requested purpose (e.g. returning a required answer to a query on the data item, and/or any other access operation that the original user set).

In some applications the QREF access token is presented to all QS servers operating Nodes in the distributed ledger network of the QS system, which all have access to the same QD Keys (e.g. same Quantum Keys), where each node is configured to operate to deduce the QREF locator from the QREF access token, where the Nodes form a consensus by performing the same operations on the QREF access token to confirm that the resulting QREF locator is correct and the request is valid. In some applications the Hash is presented to all Nodes in the distributed ledger network of the QS system, which all have access to the same Quantum Keys, and Nodes form a consensus by performing the same operation on the Hash to confirm that the request is valid. This approach for what is already a quantum safe operation provides operational and network reliability advantages.

The QS system according to the invention enables a host of applications to be deployed to users from QS certificates, QS KYC, QS-depository through to quantum-resistant and/ or QS end-to-end communications between end-point devices of users registered with the QS system.

FIG. 1a is a schematic diagram illustrating another example quantum-safe (QS) system 100 and QS network 101 according to the invention. It is to be appreciated by the skilled person that QS system 100 can be adapted, modified and/or combined with one or more other QS systems described herein with reference to the figures and/or as described herein. Referring to FIG. 1a, the QS system includes a QS network 101 and a non-QS network 102. The QS network 101 is formed by a plurality of quantum-safe (QS) servers 103a-103l and a QS repository 107 for storing and accessing data items in relation to a first plurality of users 104a-104m and a second plurality of users 105a-105n. The QS network 101 requires that each of the QS servers 103a-103l includes a hardware security module (HSM) of a plurality of HSMs 106a-106l in which each HSM of the plurality of HSMs 106a-106l includes at least a set of quantum distributed (QD) keys (also referred to as quantum keys) stored thereon that enable the QS servers to communicate securely in a quantum-safe manner with each other, the QS repository 107 and/or one or more user devices using one or more available QD key(s) from the identical set of QD keys stored on each HSM 106a-106l.

As described, each of the QS servers 103a-103l has an HSM 106a-106l that includes a set of QD keys stored thereon. The set of QD keys stored on each of the HSMs 106a-106l may be an identical set of QD keys stored thereon, which enables the QS server(s) 103c-103l to communicate with each other over quantum-safe (QS) communication channels 108a-108p (e.g. using symmetric encryption). For example, each of the QS servers 103a-103l uses a QD key from the set of QD keys to form a QS communication channel with one or more of the other QS servers 103a-103l and the QS repository 107 by encrypting a communication channel (e.g. IP channel) of a communication network (e.g. the Internet or any other communication network) using said QD key. Thus, the QS servers 103a-103l and QS repository 107 when connected and/or in communication with each other via QS channels forms the QS network 101. Alternatively or additionally, each of the HSMs 106a-106l may have a set of QD keys stored thereon in which a subset of the set of QD keys are identical with a corresponding set of QD keys of one or more of the other HSMs 106a-106l, where the identical QD keys of the subset may be used for quantum-safe communications over the communications network using QS channels 108a-108p. In any event, each of the HSMs 106a-106l includes an identical set of QD keys or an identical subset of QD keys stored thereon that enable the QS servers 103a-103l to communicate securely over one or more QS channels 108a-108p in a quantum-safe manner with each other, the QS repository 107, and/or one or more user devices using one or more available QD keys from the identical set/subset of QD keys. The QS server(s) 103a-103l when communicating over quantum-safe communication channel(s) form the QS network 101 with a quantum safe boundary within which quantum-safe communications occurs between the QS server(s) 103a-103l, repository 107 and/or one or more user QS servers, devices and the like within the QS network 101. Furthermore, each of the QS servers or devices of the first plurality of users 104a-104m may also have a hardware security module (HSM) that also includes an identical set/subset of QD keys stored thereon enabling these user QS servers or devices to communicate securely in a quantum-safe manner with the QS servers 103a-103l of the QS network 101 and/or the QS repository 107 using one or more available QD keys from the set/subset of QD keys.

Alternatively or additionally, each HSM 106a-106l may receive a set of QD keys based on a quantum key distribution (QKD) protocol/process and the like, where each set of QD keys includes at least an identical subset of QD keys to one or more other sets of QD keys received by one or more other HSMs. Each HSM may file or submit their set of QD keys for storage in the QS repository 107. Each unique QD key is stored in the QS repository 107 may be assigned a corresponding unique quantum key identifier (e.g. QKID). When a set of QD keys are submitted or filed, they may be compared with previously submitted sets of QD keys so duplicate QD keys are discarded and only unique QD keys are stored against a unique quantum key identifier in the QS repository 107. The unique quantum key identifier may be used or sent to one or more QS servers requiring a quantum-safe communication channel with each other or other devices over a communication network. The QS servers use the unique quantum key identifier to retrieve the corresponding QD key from the QS repository 107 and/or corresponding HSM 106a-106l for setting up a quantum-safe communication channel.

A quantum-safe (QS) device/node or server 103a-103l may comprise or represent any computing device, node, apparatus, hardware or server with a set of QD keys (or set of quantum keys) stored thereon and configured with the capability of performing quantum-safe (QS) communications with each other and/or with one or more user device(s) over a communication network, and/or configured with the capability of receiving one or more sets of QD keys from a QKD source using QKD, quantum channels (e.g. channels that transmit quantum information) and the like. For example, a QS server may be configured to, by way of example only but is not limited to, serve and/or distribute QD keys to one or more user device(s) via quantum-safe communications channels (e.g. a communication channel encrypted by a QD key) over a communication network enabling such user device(s) to communicate in a quantum-safe manner; serve and/or process one or more user requests associated with registration, storing and/or accessing data items within the QS network; serve and/or process one or more user requests for quantum-safe communication between user device(s) of users of the QS network and/or QS servers and the like; receiver and/or process data representative of one or more QD keys (or QD keys) distributed in a quantum-safe manner form a QKD source using a QKD protocol and/or quantum channels and the like.

Each of the HSMs 106a-106l may be configured to securely manage and/or store cryptographic keys such as, but not limited to, for example QD keys or a set of QD keys such that any unauthorised attempts to extract the QD keys are blocked and/or detected. An HSM may include one or more tamper-resistance and/or tamper-detection sensors such as, by way of example only but not limited to, wire cages surrounding encapsulated memory modules, detection of over- or under-voltages and/or temperatures, or any other sensor or software for detecting tampering and/or unauthorized access of a QD key etc. An HSM may also be configured to provide restricted and authenticated communications interfaces to the cryptographic systems of end users such as QS server(s) of the QS network. In essence, an HSM 106a-106l comprises or represents a computing device or apparatus configured for at least securely storing one or more cryptographic or digital keys for use in, for example, authentication and/or cryptographic operations/processing and the like. Examples of HSM(s) that may be used by the invention as described herein may include or be based on, by way of example only but is not limited to, any apparatus, hardware, cryptographic module, memory unit, platform, device and/or processor configured to at least securely store, manage and/or protect cryptographic and/or digital keys and the like; dedicated cryptographic hardware comprising one or more processor(s), processing unit(s), chip(s), module(s) and/or memory with tamper resistant, tamper evidence or tamper responsive functionality and/or packaging for securely storing cryptographic and/or digital keys; apparatus or hardware comprising one or more secure cryptoprocessor chips configured to prevent tampering and/or probing whilst storing, protecting and/or managing one or more cryptographic keys stored thereon; apparatus or hardware including a one or more processor(s) or processor units (e.g. microprocessor(s) and the like) in a module that is protected by the tamper evident, tamper resistant, or tamper responsive packaging; any other hardware or apparatus configured for at least securely storing, managing, and/or protecting cryptographic and/or digital keys and the like that are compliant or internationally certified with one or more computer security standards such as, by way of example only but not limited to, Common Criteria for Information Technology Security Evaluation (e.g. Common Criteria) or FIPS 140; and/or one or more modifications thereof, one or more combinations thereof and the like, and/or as the application demands.

The QS network 101 may further include a QD key or quantum key assignment mechanism, component and/or controller (not shown) configured and/or operable to ensure each of the QS servers 103a-103l requesting one or more available QD keys from the identical set of QD keys stored in the corresponding HSM(s) 106a-106l and/or in the QS repository 107 are not already in use. For example, each QD key in the identical set of QD keys stored on each HSM 106a-106l and/or QS repository 107 may be assigned a unique quantum key identifier (e.g. QKID), where the QD key assignment mechanism/controller manages the assignment of the QD keys from the set of QD keys based on the quantum key identifiers in response to a request for one or more available QD keys. A QS server 103a-103l may thus request one or more available QD key(s) and the QD key assignment mechanism/controller allocates one or more quantum key identifiers of available QD keys that the QS server can use. The HSM 106a-106l of the QS server 103a-103l may provide access to the QD keys corresponding to the allocated quantum key identifiers.

For example, the QS servers 103a-103l can use the identical sets of QD keys stored in the corresponding HSMs 106a-106l or QS repository 107 to set up quantum safe communication channels with each other and with the QS repository 107 using quantum encryption based on one or more available QD keys from the set of QD keys. The set of QD keys are distributed to each of the QS servers 103a-103l in a quantum-safe manner, by way of example only but not limited to, satellite quantum key distribution, optical quantum key distribution, fibre optic quantum key distribution, and/or any other quantum key distribution scheme capable of delivering a set of QD keys to a plurality of QS servers 103a-103l in a quantum-safe manner. Whatever QKD scheme is used, updated sets of QD keys may be delivered when required and/or according to a schedule and the like, and/or as the application demands.

Each of the first plurality of users 104a-104m have, without limitation, a QS server and/or QS device that is part of the QS network 101. The QS server and/or devices of the first plurality of users 104a-104m may include a HSM with a set of QD keys (or a set of quantum keys) stored thereon, which have been distributed to these devices using QKD scheme used to deliver the set of QD keys to the QS servers 103a-103l of the QS network 101. For example, the QS servers and/or QS devices of each of the first plurality of users 104a-104m may communicate securely in a quantum-safe manner with the QS servers 103a-103l and/or the QS repository 107 using one or more available QD keys from the set of QD keys.

Each of the second plurality of users 105a-105m have, without limitation, a user server, user device, end-point device and/or communication device that is part of the non-QS network 102. The non-QS network 102 includes, by way of example only but is not limited to, any communication network that is outside the QS network 101 such as, without limitation, the Internet, public networks, telecommunications network, conventional private network(s) and the like, which typically use conventional cryptography techniques for securing communications. The user devices of the second plurality of users 105a-105m may communicate with each other over the non-QS network 102. The user devices of the second plurality of users 105a-105m may also communicate and/or transact with one or more QS servers 103a-103l that are on the edge or boundary of the QS network 101 in relation to data items stored in the QS repository 107. These one or more QS servers 103a-103l form a QS boundary or region.

The QS system 100 is configured for enabling the secure storage, access and/or retrieval of data items by one or more of the plurality of users 104a-104m and/or 105a-105n in a manner that prevents any non-QS user from directly accessing the data items stored in the QS repository 107. Data items are stored in the QS repository 107 using an available QD key from the set of QD keys to encrypt each data item. Since the QS repository 107 is stored on a QS network 101 with QS servers 103a-103l that are connected exclusively by quantum safe communications channels, the data items held in the QS repository are not publicly accessible over the non-QS network 102 such as, without limitation, for example the Internet or other public network. The QS system 100 thus manages, via the QS network 101, secure storage and access and/or retrieval of data items stored in the QS repository 107 whilst ensuring the data items remain quantum safe.

In particular, the QS system 100 manages storage of data items to the QS repository 107 using so-called a unique quantum reference (QREF) locator for each data item. A unique QREF locator is generated for each data item using one or more cryptographic primitives and/or operations on at least in part data representative of the available QD key used to encrypt the data item for storage in the QS repository 107 and a user secret of the user requesting storage of the data item. The QREF locator is used as an address for storing the data item within the QS repository 107 and is also used to the identify the user associated with the data item and/or the identities of users provided permission to access the data item and the like. The QREF locator is stored in a QS manner in the QS network 101 on one or more of the QS servers 103a-103l of the QS network 101. The QS system 100 also manages access, access operations and/or retrieval to one or more data items stored in the QS repository 107 using so-called access tokens associated with each data item stored in the QS repository 107. The access token(s) for a data item are generated based on the QREF locator used to store the data item in the QS repository 107. The access token(s) are unique and generated in a one-way manner in which data representative of the QREF locator cannot be derived or determined. The access tokens may be provided to the user of the data item and/or other users of the first and/or second plurality of users 104a-104m and/or 105a-105n to enable these users to, without limitation, access or perform access operations, and/or retrieve the data items from the QS repository 107.

FIG. 1b is a flow diagram illustrating an example QS storage process 110 of storing data items in the QS system 100 using the QS network 101 of FIG. 1a according to the invention. The QS network 101 including a plurality of QS servers 103a-103l and a QS repository 107 is used for storing data items of one or more of the plurality of users 104a-104m and 105a-105n in a quantum-safe manner. Each of the QS servers 103a-103l may include an secure memory (not shown) (e.g. a hardware security module) for storing an identical set of quantum distributed (QD) keys, said identical set of QD keys having been distributed to each of said QS server(s) in a quantum-safe manner, and said QS server(s) 103a-103l configured to communicate securely with each other via one or more QS channels and the QS repository 107 using one or more available QD keys from the identical set of QD keys.

The QS storage process 110, which may be performed by one or more of the QS servers 103a-103l and the like, may include one or more of the following steps of: In step 112, receiving a data item for storage in the QS repository. In step 114, generating a quantum reference (QREF) locator item based on input data associated with the data item for storage and an available QD key selected from the set of QD keys. The QREF locator is a unique identifier that may be used as a logical address for storing the data item in the QS repository. In step 116, sending the QREF locator along with the data item encrypted with the available QD key to the QS repository using said one or more QS channels.

FIG. 1c is another flow diagram illustrating another example QS storage process 120 of storing data items in the QS system 100 using the QS network 101 of FIG. 1a according to the invention. The QS network 101 including a plurality of QS servers 103a-103l and a QS repository 107 is used for storing data items of one or more of the plurality of users 104a-104m and 105a-105n in a quantum-safe manner. Each of the QS servers 103a-103l may include a secure memory (not shown) (e.g. a hardware security module or secure processor enclave such as Intel Software Guard Extensions on Intel x86 Processors and the like) for storing an identical set of quantum distributed (QD) keys, said identical set of QD keys having been distributed to each of said QS server(s) in a quantum-safe manner, and said QS server(s) 103a-103l configured to communicate securely with each other via one or more QS channels and the QS repository 107 using one or more available QD keys from the identical set of QD keys.

The QS storage process 120, which may be performed by one or more of the QS servers 103a-103l and the like, may include one or more of the following steps of: In step 122, receiving a data item for storage in the QS repository. The data item may be associated with a user and/or the QS server on behalf of a user, and/or one or more components of a QS server and the like. In step 123, selecting an available QD key from the set of QD keys for encrypting the data item. In step 124, generating a quantum reference (QREF) locator item based on input data associated with the data item for storage and an available QD key selected from the set of QD keys. The QREF locator is a unique identifier that may be used as a logical address for storing the data item in the QS repository.

In step 125, the QREF locator is mapped to the QD key and also the QREF locator is mapped to the data item when encrypted with the selected QD key and stored in the QS repository. This enables the encrypted data item to be located based on the QREF locator and for the encrypted data item to be decrypted.

In step 125*a*, linking the QREF locator to the available QD key of the set of QD keys. This may involve mapping the QREF locator to the QD key from the set of QD keys. For example, this may be performed by having a QREF-QD key data structure, schema, table or list that includes a plurality of records in which each record includes, without limitation, for example a QREF locator field and a QD key identifier field. A QREF locator may be mapped to a QD key by populating a record by inserting the QREF locator into the QREF locator field and inserting the QD key identifier of the selected QD key from the set of QD keys. Thus, a QREF locator may be mapped to a selected QD key. The QREF-QD key data structure may be stored in the secure memory along with the set of QD keys in each of the QS servers 103*a*-103*l*.

In step 125*b*, linking the QREF locator to the encrypted data item when stored in the QS repository, which may include a QREF-Data Item data structure, schema, list or table stored by the QS repository, in which the QREF locator is mapped to the data item. For example, the QREF locator may be mapped to the physical address of where the data item is being stored in the QS repository.

In step 126, encrypting the data item using the selected QD key and, in step 127, sending the QREF locator and encrypted data item via one or more QS channels to the QS repository for storage, where the encrypted data item is linked/mapped to the QREF locator when stored.

FIG. 1*d* is a flow diagram illustrating an example process 130 of accessing data items stored in a QS system using process 110 according to the invention. It is assumed that a QREF locator has already been generated in relation to a data item as described, without limitation, for example, in process(es) 110 and 120. The process 130 for enabling a data item to be accessed when stored in the QS repository with a QS locator may include following steps of: In step 132, generating a QREF access token for accessing the data item based on the QREF locator using an irreversible function, process or operation. The QREF access token is a unique number from which the QREF locator cannot be derived. In step 134, sending the generated QREF access token to a device of a user for enabling the user to access said data item. The user may submit the QREF access token to the QS system, which may identify the QREF locator that corresponds to the QREF access token based on user verification and/or authentication and the like. The QS system may then retrieve or provide access operations to the user in relation to the data item associated with the identified QREF locator.

FIG. 1*e* is a flow diagram illustrating another example process 140 of accessing data items in a QS system in relation to process(es) 110 and/or 120 according to the invention. It is assumed that a QREF locator has already been generated in relation to storing a data item as described, without limitation, for example, in process(es) 110 and 120. It is also assumed that a QREF access token has been generated and delivered to a user as described, without limitation, for example in process 130. The process 140 for retrieving or accessing a data item when stored in the QS repository with a QREF locator may include following steps of: In step 142, receiving, from a device of a user, a QREF access token requesting access to a data item stored in the repository. In step 143, identifying a QREF locator based on the QREF access token and input data from the user. This may include, without limitation, for example, identifying set of QREF locators that may be associated with the user. For each QREF locator in the set of QREF locators, a temporary QREF access token may be generated using said each QREF locator in the same process used to create the received access token. Each temporary QREF access token is compared with the received QREF access token and the QREF locator corresponding to the temporary QREF access token that matches the received QREF access token is the identified QREF locator. In step 144, is it determined whether a QREF locator has been identified in relation to the QREF access token. In response to identifying the QREF locator, (e.g. Y), proceeding to step 145. In response to not identifying the QREF locator, (e.g. N), proceeding to step 147. In step 145, retrieving the encrypted data item from the QS repository, where the data item is decrypted using the QD key corresponding to the QREF locator. The data item may be decrypted in the secure memory of a QS server to prevent the data item from being revealed or exposed to insecure memory and/or other processes and the like. In step 146, providing access operations to the user in relation to the decrypted data item. For example, the access operations may include, without limitation, for example simply confirming that the data item exists; providing an answer to a query associated with the data item; where the query may be submitted with the QREF access token, or as part of the QREF access token, or submitted separately and the like; retrieving and sending the data item to the user (e.g. using QS communications or quantum resistant communications); any other processing operation performed on the data item that provides an output to the user; any other processing operation performed on the data item that provides an output to the user without revealing the data item. In step 147, the QREF locator is not identified from the access token, which may mean that the user was unable to verify and/or authenticate themselves, and hence may have been a malicious actor. In which case, a notification is issued in relation the attempted access to a data item associated with the QREF access token. This may involve sending a notification to one or more users associated with the QREF access token.

FIG. 1*f* is a flow diagram illustrating another example QS storage process 150 of storing data items in the QS system 100 using the QS network 101 of FIG. 1*a* according to the invention. The QS network 101 including a plurality of QS servers 103*a*-103*l* and a QS repository 107 is used for storing data items of one or more of the plurality of users 104*a*-104*m* and 105*a*-105*n* in a quantum-safe manner. The QS storage process 150 may include one or more of the following steps of:

In step 151, receiving a request for storing a data item by a first user of the plurality of users 104*a*-104*m* and/or 105*a*-105*m*.

In step 152, in response to receiving a request for storing a data item by the first user, generating a QREF locator based on a user secret of the first user and an available QD key selected from the set of QD keys. The first user may be a corporate user and/or a public user such as, by way of example only but not limited to, Internet users and the like. For example, a corporate user may have access to QS servers and/or QS devices that directly connect to within the QS network. For example, a public user may have access to computing devices and/or endpoints that may connect over a public communications network to a QS server(s) of the QS network. The QREF locator indicates at least data representative of the location of the data item encrypted with the selected QD key in the QS repository 107 and an identity of the first user. The first user may be a corporate user using a QS server within the QS network 101, and/or may be a user using a computing device over the non-QS network 102.

Registration data of the first user may include, without limitation, for example the QREF locator, identifier of the first user and/or customer number, user secret of the first user, identifier of the data item, access control data such as, without limitation, for example allowed access operations and/or access permissions including identifiers of one or more other users allowed to access the data item and the like, and/or any other data associated with the user and/or data item excluding the data item itself that may be stored in a user record associated with the first user in a user registry or database in the QS repository 107 and/or one or more QS servers 103a-103l of the QS network 101. The user registry or database is only accessible by the QS servers 103a-103l of the QS network 101 and are used to identify the QREF locator associated with the data item based on the QREF access token that is used to access the data item in a quantum safe manner.

In step 153, generating an QREF access token based on the QREF locator, where the QREF access token enables access operations to be performed on the data item stored in the QS repository 107. An access operation may include, without limitation, for example queries in relation to the data item, updates in relation to the data item, retrieving information associated with the data item, answers to questions in relation to the data item and/or any other type of access operation associated with the data item.

For example, an QREF access token may be provided by a user to the QS network 101 via a QS server 103a. Registration user data may be used to identify the QREF locator corresponding to the access token. For example, if the user is the first user, then the QS server 103a may retrieve and/or search the registration data of the first user to identify a set of one or more registration records associated with the first user. Each registration record in the set includes a QREF locator corresponding to a data item the first user has stored or has been provided permission to access in the QS repository 107. The set of one or more registration records may also be linked to one or more other users that also have access permissions to access the data items pointed to by the corresponding QREF locators therein. Each registration record in the set of registration records associated with the first user is used to generate an access token, and the registration record that generates an QREF access token that matches the received QREF access token is used to identify the QREF locator and hence the encrypted data item stored in the QS repository 107 that is associated with the received access token. At the same time, the registration record is used to check whether the user presenting the QREF access token is allowed to access the data item in some manner.

In step 154, providing the QREF locator and encrypted data item to the QS repository 107 for storing with the encrypted data item in the QS repository 107. The one or more QS servers 103a-103l of the QS network 101 may use the user registry or database when an QREF access token associated with a data item is received to determine the QREF locator corresponding to the data item and so the location of where the data item is stored in the QS repository 107 and/or whether the user providing the QREF access token is allowed to, without limitation, for example access, retrieve and/or perform access operations on the corresponding data item and the like or as the application demands.

In step 155, the generated QREF access token associated with the data item is sent to the device of the first user. The first user may use the QREF access token to access the data item in the QS repository 107 and/or provide the QREF access token to one or more other users of the plurality of users 104a-104m or 105a-105n for accessing or having access operations performed on the data item and the like. In which case, the first user may have granted on registration or updated their registration in relation to the data item with access controls in relation to one or more other users they have or will provide the QREF access token to. This enables the QS system 100 and QS network 101 to determine whether the user is allowed to use the QREF access token in relation to the data item that is stored in a QS manner on the QS repository 107.

FIG. 1g is a flow diagram illustrating an example QS access process 160 of accessing data items in the QS system 100 using the QS network 101 of FIG. 1a according to the invention. The QS network 101 including a plurality of QS servers 103a-103l and a QS repository 107 is used for storing and enabling access of the data items of one or more of the plurality of users 104a-104m and 105a-105n in a quantum-safe manner. The QS access process 160 may include one or more of the following steps of:

In step 161, receiving a request for accessing a data item stored in the QS repository 107 based on QS storage process(es) 110, 120 and/or 150 by a second user of the plurality of users 104a-104m and 105a-105m. The request may include an QREF access token associated with a data item that has been stored in the QS repository 107 based on QS storage process(es) 110, 120, and/or 150. The second user may be the same as the first user as described in QS storage process(es) 120 and/or 150. Alternatively or additionally, the second user may be a different user to that of the first user as described in the QS storage process 120 and/or 150. For example, the first user of the QS storage process 110 may be a corporation or corporate user that is storing a data item in the QS repository 107 in a QS manner. The first user may then provide a QREF access token to those other users (e.g. employees or other users) that the first user wishes to have access or a form of access/access operations with the encrypted data item in QS repository in a QS manner. Thus, the QREF access token may have been distributed by the first user to one or more other users of the QS system 100. In any event, a QS server 103a of the QS network 101 receives the QREF access token from the second user corresponding to a data item stored in the QS repository 107.

In step 162, the QS server 103a is configured for identifying the QREF locator based on the received QREF access token and the identity of the second user. The user that stored the data item in the QS repository 107 has a user registration record or data stored in the QS network 101 or QS repository 107, which may include data representative of, without limitation, for example the QREF locator, identifier of the first user or customer number, user secret of the first user, identifier of the data item, access control data such as allowed access operations and/or access permissions and the like including identifiers of one or more other users allowed to access the data item, and/or any other data associated with the user and/or data item excluding the data item itself may be stored in a user record associated with the first user in a user registry or database in the QS repository 107 and/or one or more QS servers 103a-103l of the QS network 101. The QS server 103a may retrieve all the user registration records associated with the second user and use this information to determine the QREF locator associated with the received QREF access token and whether the second user has permission to access the data item stored in the QS repository 107 and/or permissions associated with using the data item such as, without limitation, for example permissions to read, write, update, delete, query, retrieve and/or any other type of access permissions or use permissions associated with the data item and/or as the application demands.

For example, an QREF access token may be provided by the second user to the QS network 101 via QS server 103*a*. Given that registration user data is stored each time a user submits or requests storage of a data item in the QS repository 107 and associated access permissions, then the registration user data may be used to identify the QREF locator corresponding to the access token. For example, if the second user is the first user, then the QS server 103*a* may retrieve and/or search the registration data of the first user to identify a set of one or more registration records associated with the first user. If the second user is another user other than the first user, the QS server 103*a* may retrieve a set of registration user records associated with the second user. Each registration record in the set of registration records includes a QREF locator corresponding to a data item the first user has stored in the QS repository 107 and provided the second user with access permissions to access the data item, or a QREF locator corresponding to a data item that the second user has stored in the QS repository 107 and has permission to access. One or more registration records may also be linked to one or more other users that also have access permissions to access the data items pointed to by the corresponding QREF locators therein. In any event, each registration record in the retrieved set of registration records associated with the second user is used to generate an QREF access token, and the registration record that generates an QREF access token that matches the received QREF access token is used to identify the QREF locator and hence the encrypted data item stored in the QS repository 107 that is associated with the received access token. At the same time, the registration record is used to check whether the second user presenting the QREF access token is allowed to access the data item in some manner.

In step 162*a*, it is determined whether a QREF locator is identified that is associated with the QREF access token and whether the user has permission to access the encrypted data item stored in the QS repository 107. If the QREF locator corresponding to the QREF access token is identified and the user has permission to access the encrypted data item (e.g. Y) then the process 120 proceeds to step 123. On the other hand, if the QREF locator corresponding to the QREF access token is not identified or the user does not have permission to access the encrypted data item (e.g. N) then the process 120 proceeds to step 124.

In step 163, access/access operations may be provided in some manner to the encrypted data item in the repository to the second user in response to identifying the QREF locator. For example, the encrypted data item is decrypted using the associated QD key and access and/or access operations may be permitted by the user on the decrypted data item.

In step 164, as the QREF locator is not identified or the user does not have permission to access the encrypted data item associated with the QREF locator and access token, then access is not provided to the user. An error message may be sent to the device of the user to inform them that access will not be provided. Alternatively, or additionally, a notification to the user associated with the data item may be generated to notify them of who tried to access the data item and/or give them an opportunity to give permission to allow the user access to the data item. Alternatively, or additionally, a notification may be sent to the owner and/or user of the data item that an invalid attempt was made to access the data item.

Figure 1H:
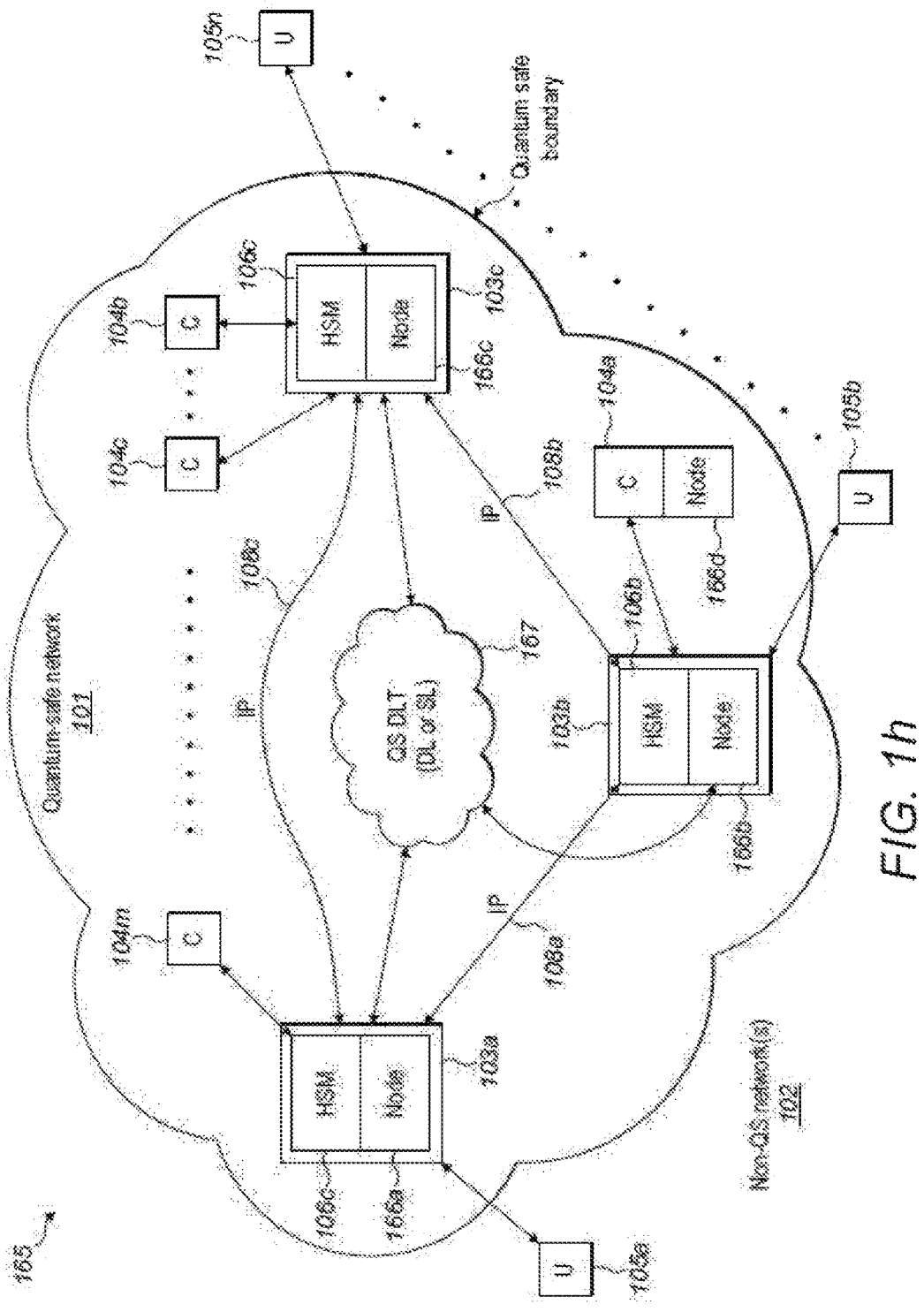
FIG. 1h is another schematic diagram illustrating another example QS system.

FIG. 1*h* is a schematic diagram illustrating another example QS system 165 including a QS network 101 for use with the QS storage process 110, 120, and/or 150 of FIGS. 1*b*, 1*c* and/or 1*f* and/or QS access process 130, 140 and/or 160 of FIGS. 1*d*, 1*e* and/or 1*f* according to the invention. For simplicity, reference numerals as used in FIG. 1*a* for similar or the same features, components or items will be re-used in FIG. 1*h*. The QS network 101 is formed using at least QS channels 108*a*-108*c* between a plurality of quantum-safe (QS) servers 103*a*-103*c* in which the QS repository 107 of FIG. 1*a* has been replaced with QS Distributed Ledger Technology network (DLT) 167 (or distributed ledger network and/or shared ledger network) for storing and accessing data items in relation to a first plurality of users 104*a*-104*m* and a second plurality of users 105*a*-105*n*. In this example, a plurality of the QS server(s) 103*a*-103*c* includes a plurality of DLT nodes 166*a*-166*c* and/or user server of user 104*a* includes DLT node 166*d*, where the DLT nodes 166*a*-166*d* operate to form the QS DLT network 167 (referred to as QS DLT) for storing and/or accessing data items and the like. The QS DLT 167 may be based on at least one or more DLTs from, without limitation, for example the group of: a distributed ledger; a shared ledger; a blockchain; publish/subscribe and/or response/request management system or platform; and/or any other secure distributed database management system and the like; and/or as the application demands. In this example, the QS DLT 167 may include a distributed ledger and/or a shared ledger for storing, by way of example only but is not limited to, the data items of the plurality of users 104*a*-104*m* and/or 105*a*-105*n* and the like; data items associated with the plurality of users 104*a*-104*m* and/or 105*a*-105*n*; registration data items associated with the plurality of users 104*a*-104*m* and/or 105*a*-105*n*; any other data items associated with the plurality of users 104*a*-104*m*, 105*a*-105*n*, and/or the QS server(s) 103*a*-103*c* for maintaining and/or operating the QS system 130 and the like. In essence, a distributed ledger creates an identical copy of a ledger of every node 166*a*-166*d* in the system by the operation of consensus amongst nodes 166*a*-166*d* (or a subset of the nodes 166*a*-166*d*) to agree that newly created data or data item(s) are always approved and stored identically. All nodes 166*a*-166*d* can see all data and/or data items. A shared ledger broadcasts a copy of data or data items to only those nodes of the plurality of nodes 166*a*-166*d* involved in the transaction plus any required notary nodes, where different nodes of the plurality of nodes 166*a*-166*d* can see different subsets of the data/data items through, by way of example only but not limited to, a permissions engine or other type of permissions system and the like.

An advantage of using a DLT network based on QS DLT 167 (referred to as QS DLT) rather than a centralised QS repository is that the QS system 100 and the QS network may be easily scaled up with an increasing number of users 104*a*-104, 105*a*-105*n* and/or QS server(s) 103*a*-103*c* storing data items and accessing data items stored in the QS DLT 167. QS DLT 167 also adds an extra layer of security when storing and/or accessing data items to/from the QS DLT 167, which requires consensus typically from a majority of the plurality of DLT nodes 166*a*-166*d* and/or from a majority of a set of jury or notary nodes of the plurality of DLT nodes 166*a*-166*d* and the like, which enhances data integrity, security and authorised access. Jury nodes and/or notary nodes may be a trusted subset of DLT nodes 166*a*-166*d* with the functionality of forming a consensus in relation to storing one or more data items and/or accessing one or more data items and the like. Further advantages of the use of DLT include, without limitation, for example, 1) enabling an added layer of security to the registration and data retrieval process through the operation of a consensus system whereby a majority of nodes must simultaneously agree upon or approve of a transaction, which is extremely difficult to spoof in real time; 2) enabling multiple parties to come together to operate an application of the QS storage/access process of the QS system 130 according to the invention (e.g. also known as the QRef application) where the parties do not wish the QRef application and/or QS system 130 to be under the control of a single central actor, as may be the case in some collaborative cross-industry system; and/or 3) efficiency where the plurality of nodes 166a-166d can be used to host multiple different instantiations and/or applications of the QS system and/or QRef application(s) by multiple DLT Node infrastructure operators and the like.

Referring to FIG. 1d, in this regard, each QS server 103a of the plurality of QS servers 103a-103c of the QS network 101 includes a hardware security module (HSM) 106a with an identical set of QD keys stored thereon and each QS server 103a of the plurality of QS servers 103a-103c includes distributed ledger technology (DLT) node 166a or functionality for operating the QS DLT 167, e.g. for operating the distributed ledger and/or shared ledger for storing and/or accessing the encrypted data items. In essence, the DLT nodes 166a-166b of the plurality of QS servers 103a-103c form a QS DLT network 167 configured for, without limitation, for example providing secure storage and access to one or more data item(s) stored on the distributed and/or shared ledger(s). The process 150 of FIG. 1f in step 154 of providing the QREF locator may be further modified to include receiving a QREF locator for storing the encrypted data item in the distributed and/or shared ledger(s) of the QS DLT 167, and storing the encrypted data item in the distributed and/or shared ledger(s) using the QREF locator as an address for the location of the encrypted data item in the distributed and/or shared ledger(s). Furthermore, the process 160 of FIG. 1g in steps 161-162 may be further modified to include receiving an QREF access token from the second user for accessing an encrypted data item stored in the distributed and/or shared ledger(s) of the QS DLT 167, identifying a QREF locator corresponding to the QREF access token and second user, and accessing the encrypted data item in the distributed and/or shared ledger(s) of the QS DLT 167 using the identified QREF locator associated with the QREF access token.

The QS network 101 requires that the hardware security modules (HSMs) 106a-106c of each of the QS servers 103a-103c includes at least an identical subset of QD keys or an identical set of QD keys stored thereon enabling the QS servers to communicate securely in a quantum-safe manner with each other and the QS DLT 167 using one or more available QD keys from the set of QD keys. For example, the QS servers 103a-103c can use the identical subsets of QD keys to set up quantum safe communication channels (e.g. using symmetric encryption) with each other and with the QS DLT 167 using quantum encryption based on one or more available QD keys from the subsets of QD keys. An identical set of QD keys or at least an identical subset of QD keys are distributed to each of the QS servers 103a-103c in a quantum-safe manner using quantum key distribution (QKD) based on, by way of example only but not limited to, satellite quantum key distribution (SQKD), optical quantum key distribution, fibre optic quantum key distribution, and/or any other quantum key distribution scheme capable of delivering an identical set or subset of QD keys to a plurality of QS servers 103a-103c in a secure and/or quantum-safe manner. Whatever QKD scheme is used, updated sets or subsets of QD keys may be delivered to each of the QS server(s) 103a-103c and/or users 104a-104m when required and/or according to a schedule and the like, and/or as the application demands.

Furthermore, each of a first set of the plurality of users 104a-104m may also have, without limitation, a QS server and/or QS device that is part of the QS network 101. The QS server and/or QS device of each of the first set of the plurality of users 104a-104m may include functionality of a QS registration server/node. The QS server and/or QS device of each of the first set of the plurality of users 104a-104m may include functionality associated with QKD schemes for receiving a set of QD keys from a QKD source over a quantum channel and the like. The QS server and/or devices of the first set of users 104a-104m may include a HSM with a set of QD keys stored thereon, which have been distributed to these devices using QKD scheme used to deliver the set of QD keys to the QS servers 103a-103c of the QS network 101. For example, the QS servers and/or QS devices of each of the first set of users 104a-104m may communicate securely in a quantum-safe manner with the QS servers 103a-103c. One or more of the first set of users 104a-104m may also include a DLT node 166d and form part of the DLT network 167, which may operate with DLT node functionality when encrypted data items are stored and/or access from the QS DLT 167.

Although QS system 165 includes a QS DLT 167, where the QS servers 103a-103c are configures to operates, without limitation, for example, a distributed and/or shared ledger network and the like, it is to be appreciated by the skilled person that other distributed and/or cloud based technologies may be used for storing and/or accessing data items as described with reference to FIG. 1h and/or as described herein with reference to one or more of FIG. 1a to 7b. For example, the QS DLT 167 may be, without limitation, for example a repository system and/or storage system based on a digital storage platform using publish/subscribe, request/response and/or real-time based messaging (e.g. PUSH Technologies (RTM) Diffusion Platform (RTM) with Diffusion platform messaging) for storing and accessing data items. The QS network 101 further including the plurality of QS servers 103a-103c, where each QS server 103a-103c includes an HSM with an identical set of QD keys stored thereon. In this example, each QS server of the plurality of QS servers 103a-103c may include a digital storage platform node for operating/communicating digital storage platform messaging between corresponding nodes for storing/accessing data items. The digital storage platform nodes of the plurality of QS servers 103a-103c actually form the digital storage platform, which is distributed and since QS communication channels are used between the QS servers 103a-103c, this forms a QS distributed storage network (e.g. a QS Diffusion powered network) configured for providing storage and access to one or more data item(s) based on the digital storage platform messaging.

Thus, storing a data item in the QS distributed storage network of the distributed storage platform may include: receiving, a node, a QREF locator for storing the encrypted data item in the distributed storage platform; and storing the encrypted data item in the shared ledger using the QREF locator as an address for the location of the encrypted data item in the distributed storage platform. Accessing a data item in the QS distributed storage network of the distributed storage platform may include: receiving a QREF access token from a second user for accessing an encrypted data item stored in the distributed storage platform, identifying a QREF locator corresponding to the QREF access token and second user; and accessing the encrypted data item in the distributed storage platform using the identified QREF locator based on the access token.

Figure 1I:
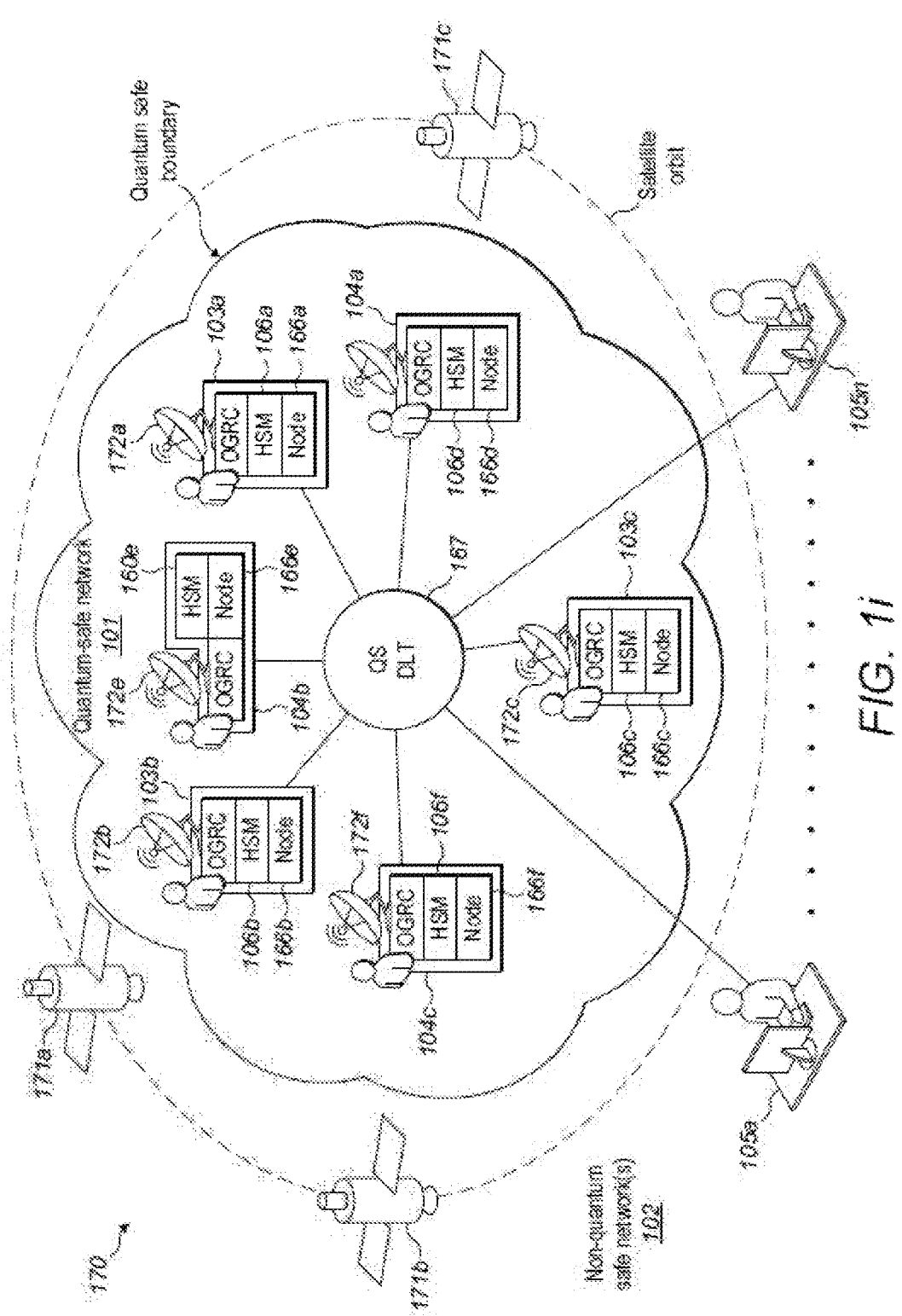
FIG. 1i is another schematic diagram illustrating a preferred example QS system using satellite quantum key distribution (SQKD).

FIG. 1*i* is another schematic diagram illustrating a preferred example QS system 165 and QS network 101 for use with the QS storage process 110, 120, 150 of FIGS. 1*b*, 1*c*, and 1*f* and/or QS access process 130, 140, 160 of FIGS. 1*d*, 1*e* and 1*g* according to the invention. For simplicity, reference numerals as used in FIGS. 1*a*-1*h* for similar or the same features, components or items will be re-used in FIG. 1*i*. In this example, the QS system 170 uses both a QS DLT 167 for storing and/or accessing encrypted data items and also satellite quantum key distribution (SQKD) using a plurality of QS satellites 171*a*-171*c* configured for generating and distributing one or more sets of QD keys to QS servers 103*a*-103*c* and/or QS servers and/or devices of the first plurality of users 104*a*-104*c* of the QS network 101. Each of the QS servers 103*a*-103*c* and QS servers or devices of the first plurality of users 104*a*-104*c* further include one of the plurality of QS ground satellite receivers or QS on-ground receiver complexes (OGRCs) 172*a*-172*f* for receiving the sets of QD keys distributed from one or more of the QS satellites 171*a*-171*c* to the QS servers 103*a*-103*c* and QS servers or devices of the first plurality of users 104*a*-104*c*. For example, QS server 103*a* includes an HSM 106*a*, a DLT node 166*a*, and an OGRC 172*a* coupled together.

Each of the QS servers 103*a*-103*c* has a hardware security module (HSM) 106*a*-106*c* that includes a set of QD keys stored thereon. Each of the HSMs 106*a*-106*c* may have an identical set of QD keys stored thereon. Alternatively or additionally, each of the HSMs 106*a*-106*c* may have a set of QD keys stored thereon in which a subset of the set of QD keys are identical with a corresponding set of QD keys of one or more of the other HSMs 106*a*-106*c*. In any event, each of the HSMs 106*a*-106*c* includes an identical set of QD keys or an identical subset of QD keys stored thereon that enable the QS servers 103*a*-103*c* to communicate securely in a quantum-safe manner with each other and the QS DLT 167 using one or more available QD keys from the identical set/subset of QD keys to form the QS network 101 with a quantum safe boundary within which quantum-safe communications occurs between the QS server(s) 103*a*-103*c*, QS DLT 167 and the like. Furthermore, each of the QS servers or devices of the first plurality of users 104*a*-104*c* also has a hardware security module (HSM) 106*d*-106*f* that also includes an identical set/subset of QD keys stored thereon enabling these QS servers or devices to communicate securely in a quantum-safe manner with the QS servers 103*a*-103*c* of the QS network 101 and/or the QS DLT 167 using one or more available QD keys from the set/subset of QD keys. For example, the QS servers 103*a*-103*c* can use the identical sets/subsets of QD keys to set up quantum safe communication channels with each other and with the QS DLT 167 using quantum encryption (e.g. symmetric encryption) based on one or more available QD keys from the set of QD keys. The identical sets of QD keys are generated and distributed from one or more of the QS satellites 171*a*-171*c* using, without limitation, for example a group QKD protocol in which at least the QS servers 103*a*-103*c* of the QS network 101 have delivered to them an identical set or subset of QD keys. The sets of QD keys are removed from the QS satellites 171*a*-171*c* once they have been distributed to all of the required QS servers 103*a*-103*c* of the QS system 170.

For example, the SQKD technology includes one or more QS satellites 171*a*-171*c*, which may be low orbit satellites that pass over geographical locations in which the QS servers 103*a*-103*c* and/or QS servers and/or devices of the users 104*a*-104*c* of the QS system 140 are located. QS satellite 171*a* generates one or more sets of QD keys for distribution to each of the required QS server(s) 103*a*-103*c* and/or 104*a*-104*c* and the like. As the QS satellite 171*a* passes over each QS server 103*a*-103*c* and/or 104*a*-104*c*, the QS satellite 171*a* may distribute an identical set of QD keys (or subset of QD keys) to each of the HSMs 106*a*-106*f* of the QS servers 103*a*-103*c* and/or 104*a*-104*c* via the on-ground receiver complexes (OGRCs) 172*a*-172*f*. Each of the QS servers 103*a*-103*c* may include, for example, an one of the OGRCs 172*a*-172*c*, an HSM 106*a*-106*c*, and a DLT Node 166*a*-166*c*, and one or more QS applications capable of at least storing and/or accessing data items in relation to the plurality of users 104*a*-104*c* and 105*a*-105*n*. Each of the OGRCs 172*a*-172*c* also includes, without limitation, for example on-ground receiver (OGR) and/or photon controller for communicating with one of the satellites 171*a*-171*c* when performing, without limitation, for example a QKD protocol for receiving QD keys. The QS application(s) may act as an interface between the users 104*a*-104*c* and 105*a*-105*n* and the QS DLT 167 network of the QS network 101. The QS servers 103*a*-103*c* form the backbone of the QS network 101 and may be operated by a QS network provider. Each of the OGRCs 172*d*-172*f* of the QS servers/devices of the first plurality of users 104*a*-104*c* may also include an OGR, photon controller for communicating with one of the satellites 171*a*-171*c* when performing, without limitation, for example a QKD protocol for receiving QD keys. Each of the QS servers/devices of the first plurality of users 104*a*-104*c* includes one of the OGRCs 172*d*-172*f*, an HSM 106*d*-106*e*, and DLT node 166*d*-166*f* coupled together.

The SQKD for the QS system 170 uses a group quantum key distribution (GQKD) protocol (also called a multi-cast protocol) that enables a single QD key, an identical set of QD keys, and/or an identical subset of QD keys to be delivered in a quantum safe manner QS servers 103*a*-103*c* and/or QS servers or QS devices of users 104*a*-104*c* are situated in many individual/different geographical locations or sites. In particular, the purpose of the GQKD protocol may be for key sharing such as, without limitation, for example sharing an identical set of QD keys or an plurality of QD keys with two or more or a multiple of QS servers 103*a*-103*c* and/or 104*a*-104*c* and/or QS enabled devices and the like. The GQKD protocol is achieved by the QS system 170 in which a QS satellite 171*a* generates and establishes one or more QD keys or an identical set of QD keys between the QS satellite 171*a* and one or more QS servers 103*a*-103*c* or QS servers of users 104*a*-104*c*. For example, the QS satellite 171*a* stores a digital copy of the QD key(s) and then distributes, in a quantum safe manner, the QD key(s) or set of QD key(s) to a first QS server 103*a*, and then distributes and shares the same QD key(s) or identical set of QD key(s) that it distributed to the first QS server 103*a* with one or more subsequent QS servers 103*b*-103*c* and/or QS servers of one or more users 104*a*-104*c* when the QS satellite 171*a* passes over or comes in range of these said subsequent QS servers 103*b*-103*c* and/or QS servers of one or more users 104*a*-104*c*. The QD key(s), or set of QD keys stored in the QS satellite 171*a* are deleted once all intended QS servers 103*a*-103*c* and/or QS servers/device of users 104*a*-104*c* have received them.

The QS network 101 is formed by the plurality of QS servers 103*a*-103*c*, QS servers and/or devices of the first plurality of users 104*a*-104*c*, and the QS Distributed Ledger Technology (DLT) 167 for storing and accessing data items in relation to a first plurality of users 104*a*-104*c* and a second plurality of users 105*a*-105*n*. The QS network 101 requires that the hardware security modules (HSMs) 106a-106e of each of the QS servers 103a-103c and/or QS servers and/or devices of the first plurality of users 104a-104c includes a set of QD keys stored thereon in which at least an subset of the QD keys are identical with a corresponding subset of QD keys on other HSMs. This enables the QS servers/devices to communicate securely in a quantum-safe manner (e.g. using symmetric quantum-safe encryption) with each other and with the QS DLT 167 using one or more available QD keys from the set of QD keys. For example, the QS servers 103a-103c can use the identical sets of QD keys, each QD key being associated with a unique QD key identifier that is the same for each HSM, to set up quantum safe communication channels with each other and with the QS DLT 167 using quantum encryption algorithms and/or cryptographic algorithms based on one or more available QD keys from the set of QD keys.

The QS DLT 167 may be, without limitation, for example a distributed ledger and/or a shared ledger for storing the data items of the plurality of users 104a-104c and/or 105a-105n and the like. Each QS server 103a of the plurality of QS servers 103a-103c of the QS network 101 includes a hardware security module (HSM) 106a with an identical set of QD keys (or an identical subset of QD keys) stored thereon and each QS server 103a of the plurality of QS servers 103a-103c includes distributed ledger technology (DLT) node 166a or functionality for operating the QS DLT 167 when storing and/or accessing the encrypted data items stored thereon. In this example, in addition to the QS servers 103a-103c including a DLT node 166a-166c or DLT node functionality for operating the QS DLT 167, each of a first set of the plurality of users 104a-104c may also have, without limitation, a QS server and/or QS device that is part of the QS network 101. The QS server and/or devices of the first set of users 104a-104c may include a HSM 106d-106e with a set of QD keys stored thereon, and a DLT node 166d-166e. Thus, the QS servers 103a-103c including a DLT node 166a-166c or DLT node functionality for operating the QS DLT 167 and each of the first set of the plurality of users 104a-104c including a DLT node 166d-166f or DLT node functionality for operating the QS DLT 167 and so form a QS DLT network. In essence, the DLT nodes 166a-166f of the plurality of QS servers 103a-103c and 104a-104c form a QS DLT network 167 configured for providing secure storage and access to one or more data item(s) stored on the distributed and/or shared ledger(s).

As an example, the distributed ledger (DLT) nodes 166a-166f are configured to form the QS DLT 167 of the QS network 101 of the QS system 140 and the corresponding QS servers 103a-103c and 104a-104c form QS network 101 because they are connected via QS communications channels using satellite quantum key distributed (SQKD) keys (e.g. QSD keys) and create QS communications channels for the DLT nodes 166a-166f to communicate over etc. Thus, the QS servers 103a-103c and 104a-104c may communicate with each other via these QS communications channels forming the QS network 101. The QS DLT 167 is secured using SQKD allowing the QS servers 103a-103c and/or 104a-104c of the DLT nodes 166a-166f to operate QS dynamic communication channels. All of the QS servers 103a-103c and 104a-104c form the QS network 101 in which any communications between the QS servers 103a-103c, 104a-104c is secured by a QS communication channel, which means any data in transit within the QS network 101 or in storage within the QS DLT 167 (essentially stored in a distributed/shared ledger on the DLT nodes 166a-166e) is protected and quantum-safe.

The second plurality of users 105a-105n may be subscribers to one or more of the QS application(s) provided by the QS servers 103a-103c that use the QS DLT 167 for storage and retrieval and/or access to data items stored thereon. The devices and/or servers used by the second plurality of users 105a-105n are not QS because these devices typically are not capable of QKD, in particular SQKD using the QS satellites 171a-171c. Thus, the devices/servers of the plurality of users 105a-105n operate in the non-QS network 102 (e.g. Internet, public network(s) with unencrypted traffic and/or using non-QS encrypted traffic etc.) and may interface with the QS network 101 via the QS application(s) operating on one or more of the QS servers 103a-103c of the QS network. The QS servers 103a-103c that interface, e.g. via QS applications, with the devices of one or more of the users 105a-105n may are considered to be on the "Quantum Safe Boundary" of the QS network 101.

The QS system 170 provides the advantage of mitigating the risk of a Denial of Service attack on the individual QS server(s) and/or the individual quantum receivers (e.g. OGRs) on the ground since there are many QS servers 103a-103c and/or QS servers of users 104a-104c with identical SQKD infrastructure, which renders a simultaneous attack on the QS system 170 and/or QS network 101 impractical for most if not all adversaries. Furthermore, Denial of Service attack is only really possible by physically obscuring the ground receivers (e.g. OGRs) of the QS server(s) 103a-103c and/or QS server(s) of users 104a-104c and their ability to see the QS satellites 171a-171c. However, even though the OGRs may be obscured, this is immediately obvious to the QS provider of the QS network 101, which can be further mitigated through the use of camera and tamper switches built into each OGR, and/or manual human or drone access control and inspections of the OGRs of each QS server 103a-103c and/or QS server(s) of users 104a-104c. Furthermore, given most if not all QS servers 103a-103c have a DLT node 166a-166c this creates a large scale duplication of the DLT records and/or data items stored in the QS DLT 167 through many DLT nodes 166a-166c. This also makes a simultaneous universal DoS attack impractical.

The QS systems 100, 165 and 170 may be further modified in which each QREF locator is divided or broken up into multiple atomic units in which each atomic unit of the QREF locator is stored on a different QS server 103a-103c of the QS network 101. For example, the QREF locator may be broken into three atomic units and, the QS DLT 167 is configured to operate such that each atomic unit of the QREF locator is stored on a different subset of DLT nodes 166a-166f of QS server 103a-103c or 104a-104e of the QS DLT 167. For example, for a QREF locator that is divided into atomic units A, B and C, the atomisation is replicated such that, by way of example only but is not limited to, the QS DLT 167 may include a DLT Node network of, without limitation, for example 99 nodes, and operates in a manner in which, without limitation, for example 33 of the DLT nodes store unit atomic A, 33 of the DLT nodes store atomic unit C and 33 of the DLT nodes store atomic unit C. Thus, in the style of a RAID5 (RTM) concept, the QS DLT 167 is configured to store with each one third atomic unit (A, B or C) a hash of one of the other atomic units (A, B, or C), where each atomic unit requires its own unique QKD code or QD key. Although the dividing the QREF locator into atomic units is described, this is by way of example only but the invention is not so limited, and it is to be appreciated by the skilled person that securely storing and/or accessing a QREF locator as atomic units may be implemented in various ways and/or based on RAID concepts (e.g. RAID 0-6), parity function(s) and/or methods thereto, single parity system(s) and/or general parity system(s) and/or methods thereto, methods for distributing, replicating and securely storing data as chunks, combinations thereof, modifications thereof, and the like and/or as described herein and/or as the application demands.

Figure 1J:
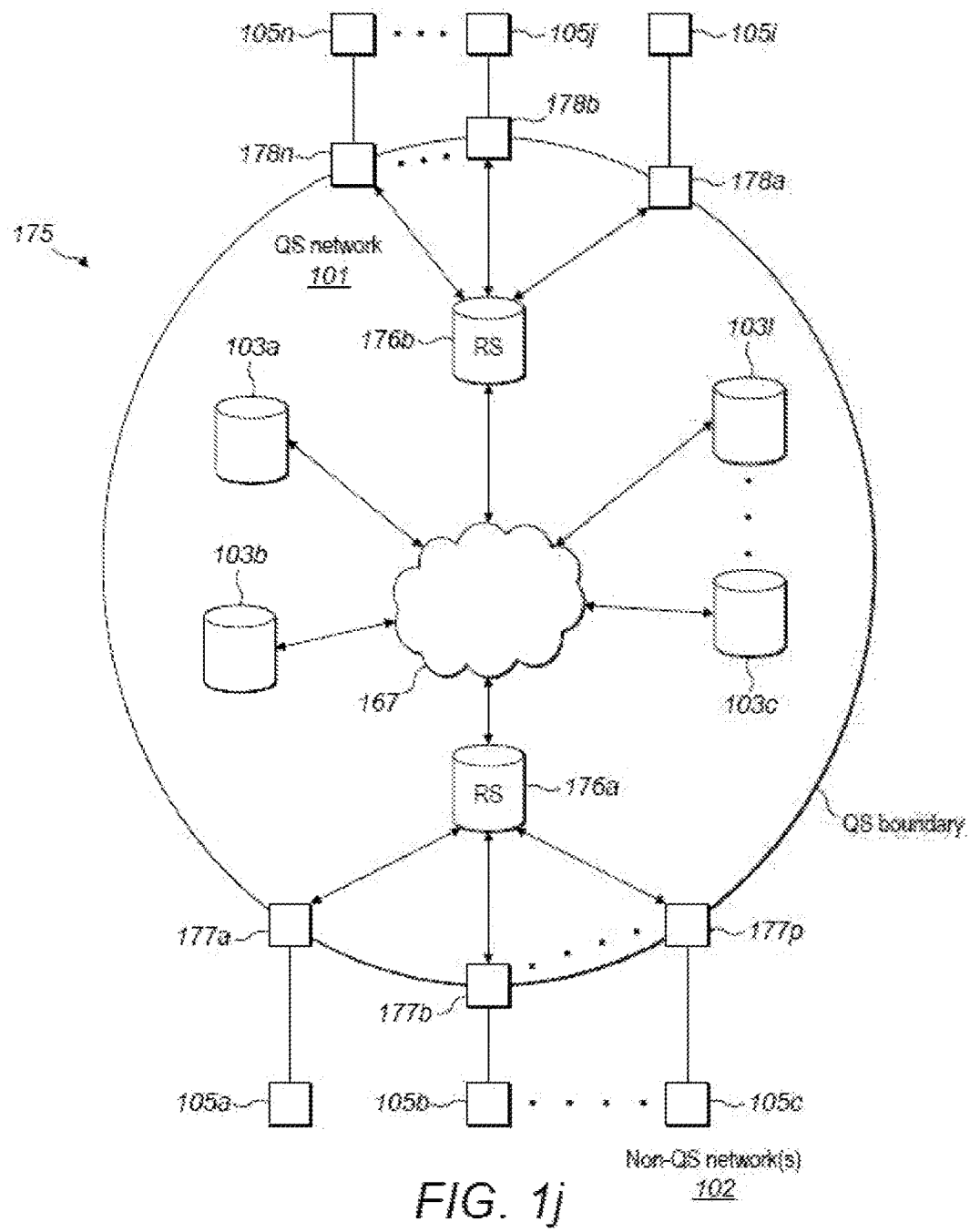
FIG. 1j is another schematic diagram illustrating an example QS system of FIG. 1a to 1i using SQKD and configured with registration servers and nodes.

FIG. 1*j* is another schematic diagram illustrating an example QS system 175 of FIGS. 1*a* to 1*i* using SQKD and configured with registration servers and nodes according to the invention. The QS system 175 and QS network 101 may be configured for use with the QS storage process(es) 110, 120, 150 of FIGS. 1*b*, 1*c*, and 1*f* and/or QS access process(es) 130, 140, 160 of FIGS. 1*d*, 1*e* and 1*g* according to the invention. For simplicity, reference numerals as used in FIG. 1*a*-1*i* for similar or the same features, components or items will be re-used in FIG. 1*j*. In this example, the QS system 175 uses both a QS DLT 167 for storing and/or accessing encrypted data items and also satellite quantum key distribution (SQKD) using a plurality of QS satellites (not shown) configured for generating and distributing one or more sets of QD keys to a plurality of QS servers 103a-103c and 176a-176b of the QS network 101. Each of the QS servers 103a-103c and 176a-176b further include, without limitation, for example one of the plurality of QS ground satellite receivers (not shown) for receiving the sets of identical QD keys distributed from one or more of the QS satellites to the QS servers 103a-103c and 176a-176b.

In this example, some of the QS servers 103a-103c and 176a-176b are configured to be registration servers, which may be a QS server with an HSM and also a registration module/storage and/or application. For example, QS servers 176a and 176b are configured to be registration servers 176a-176b that handle, without limitation, for example registration, maintenance, verification and authentication of registered users 105a-105n and their corresponding user accounts within the QS system 175. The registration server 176a is communicatively coupled to a plurality of registration nodes 177a-177p, and the registration server 176b is communicatively coupled to a plurality of registration node 178a-178r. The registration nodes 177a-177p and 178a-178r and registration servers 176a and 176b are configured to, without limitation, for example at least handle set up of the user account and registration of the user with the QS system 175. As well, when a data item associated with a user is stored in the QS DLT 167, the corresponding QREF locator associated with the data item is linked or issued against the users account. Thus, each time a user submits a data item for storage, or if someone else gives the user permissions for accessing a data item in some manner, the corresponding QREF locators associated with those data items are linked to the users account. That is, the user is issued a QREF locator against their registered account. This enables a QS server or a registration server to identify all of the QREF locators associated with a user and thus, to perform, using a secure memory or hardware security module QREF locator identification as described with reference to access process(es) 130, 140, 150, 160 with reference to FIGS. 1*d* to 1*g*. Essentially, each of the registration servers 176a-176b provides a first point of contact or communication point for each of the one or more registered users of the plurality of users 105a-105n external to the QS system 175 and QS network 101.

In addition to issuing or linking QREF locators to a user account or linking QREF locators to a user account in relation to data items associated with the registered user stored in the QS DLT 167, the registration nodes 177a-177p and/or 178a-178r and registration servers 176a-176b are used to identify the registered user with their account in the QS system and subsequently issue a data item in relation to that registered user, if they have permissions to do so. For example, when a user submits one or more QREF access tokens for accessing data items from the QS DLT 167 requested by a user, the registration server 176a of the QS system 175 is configured to perform authentication and/or verification of the user submitting the QREF access token, which may include two-factor authentication and the like. This is to firstly to securely identify the user and their account and ensure the user is a registered user with the QS system 175, and secondly to identify a set of one or more QREF locators issued against the registered user. This set of one or more QREF locators may be used to identify the QREF locator that generates the submitted QREF access token as described herein. The data item corresponding to the QREF locator may be retrieved and/or accessed, and the user issued with access to the data item in relation to their registration.

Thus, the QS network 101 is formed by the plurality of QS servers 103a-103c, registration servers 176a-176b, registration nodes 177a-177p and 178a-178r, and the QS Distributed Ledger Technology (DLT) 167 for storing and accessing data items in relation to a first plurality of users (not shown) and the second plurality of users 105a-105n. The QS network 101 requires that the hardware security modules (HSMs) of each of the QS servers 103a-103c and/or registration servers 176a-176b includes a set of QD keys stored thereon in which at least an subset of the QD keys are identical with a corresponding subset of QD keys on other HSMs. This enables the QS servers/registration servers and registration nodes to communicate securely in a quantum-safe manner (e.g. using symmetric quantum-safe encryption) with each other. It is noted that the registration servers 176a-176b act as a secure gateway between the QS DLT 167 and the plurality of registration nodes 177a-177p and 178a-178r. Thus, only QS servers 103a-103l and registration servers 176a-176b may directly connect to the QS DLT 167 using one or more available QD keys from the set of QD keys. For example, the QS servers 103a-103l can use the identical sets of QD keys, each QD key being associated with a unique quantum key identifier that is the same for each HSM, to set up quantum safe communication channels with each other and with the QS DLT 167 using quantum encryption based on one or more available QD keys from the set of QD keys. Similarly, the registration servers 176a-176b can use the identical sets of QD keys to those used by QS servers 103a-103l, each QD key being associated with a unique quantum key identifier that is the same for each HSM, to set up quantum safe communication channels with each other and with the QS DLT 167 and also with one or more QS servers 103a-103l using quantum encryption based on one or more available QD keys from the set of QD keys.

Furthermore, the registration servers 176a-176b each connect to a plurality of registration nodes 177a-177p and 178a-178r, respectively. The registration nodes 177a-177p are connected via QS channels to the registration server 176a. The registration server 176a uses its HSM to provide an available QD Key form the set of QD keys to each of the registration nodes 177a-177p. Thus, each registration node 177a-177p, when deployed, can form a QS communication channel to the corresponding registration server 176a. Similarly, the registration server 176b each connects to the plurality of registration nodes 178a-178r. The registration nodes 178a-178r are connected via QS channels to the registration server 176b. The registration server 176b may use its HSM to provide an available QD Key form the set of QD keys to each of the registration nodes 178a-178r. Thus, each registration node 178a-178r, when deployed, can form a QS communication channel to the corresponding registration server 176b. The registration nodes 177a-177p and 178a-178r may form part of the QS boundary that separates the users 105a-105n from the QS network 101 and QS system. Alternatively or additionally, prior to deployment, one or more of the registration nodes 177a-178r may be directly connected to a QS server 103a-103l and/or the registration server 176a or 176b for configuration and upload of one or more available QD keys from the identical set of QD keys stored in the HSM of each of the QS servers 103a-103l and/or registration servers 176a-176b. Thus, when the registration nodes 177a-177p and/or 178a-178r are deployed, they can connect over the public telecommunications network and form QS channels using the QD keys provided during configuration.

Each of the registration nodes 177a-177p or 178a-178r may be located in a different place, for example, a shop and/or a building in which users may connect to in a myriad of ways. For example, registration nodes may be used to perform a registration process to register devices with the QS system 175 prior to deployment of the devices to corresponding users. Additionally, the registration nodes 177a-177p or 178a-178r, as part of the registration process, may be configured to physically connect to a device and upload one or more QD keys from the set of QD keys onto a secure memory area (e.g. a secure enclave) on the device, where the one or more QD keys are registered against the device identifier. Thus, the device may be able to set up a QS communication channel with a registration node and/or registration server after it is delivered to a user. This may ensure QS communications can be achieved for the user of the device and the user may use the QS system 175 as described herein in a QS manner.

The registration process may be carried out either at the point of shipment of the devices such as, without limitation, for example at the manufacturer, which may have a QS server and/or registration node capable of registering the devices prior to shipment. Alternatively or additionally, the registration process may be carried out at the point of sale, or prior to deployment, such as, without limitation, for example, a retail shop with a QS server and/or a registration node. In any event, these locations (e.g. manufacturer and/or retail ship) may be referred to as registration locations, each registration location (e.g. registration node) is required to have access to a set of QD keys. In this case, either the registration nodes have the capability of a QS server 103a-103l, effectively making them a registration server, or the registration nodes are deployed with a set of QD keys to enable them to communicate via a QS channel with a registration server and/or QS servers and so may have a set of QD keys delivered at regular intervals or a schedule and the like. During the registration process, the device is connected to a registration node 177a or registration server 176a via a physical connection that allows the registration node 177a or server 176a to deposit (or upload) one or more QD keys into the secure memory (e.g. a secure enclave of the device) of the device. At this point, the registration node 177a or server 176a may also upload or preload a QS or QREF application that configures the device to use the one or more QD keys stored in the secure memory to establish a QS communication channel with the QS system via one or more registration nodes 177a-177p or 178a-178r, registration servers 176a-176b and/or QS servers 103a-103l. The QREF application may enable a user of the device to establish QS communication channels and store, access data items in the QS system 175.

Once the device is received by a user 105i, the user 105i can use the device to establish a QS connection using a previously uploaded QD key with the QS system via registration node 177p. Once connected the user can register themselves and obtain a QREF account that is set-up by the registration server 176a. The QREF account may be associated with the device via the device identifier, such that the QD keys on the device are registered with the user's QREF account. Alternatively or additionally, the QREF account may be associated with the loaded QREF application on the device. Once the user has registered and has a QREF account on the QS system 175, they can use the QREF application and retrieve QD Keys stored in the secure memory of the device to establish a QS communication channel with the QS system 175 and use its QD Key along with a symmetrical algorithm hosted within the QREF Application to establish a quantum safe communication channel with the QS system 175. The established quantum safe channel can be used by the user to engage in any use case and/or application (e.g. access data items, store data items, KCY, QREF certificates, depositories, quantum safe communications with registered users of the QS system) and the like in relation to the QS system In another example, one or more registration nodes 177a-177p and/or registration server 176a may be configured to configure a device of a user (e.g. mobile phone user) retro-actively to be able to install a QREF application or firmware modifications that enable a user to operate the device to establish a QS communication connection with the QS system 175 and/or QS network 101 accessing and/or using the QS system 175 in a quantum-safe manner, or at the very least in a quantum-resistant manner.

In another example, in order for a user 105a to register with the QS system and/or receive a device that is capable of establishing a QS connection with the QS system over the public network, the user 105a may need to visit a shop or retail outlet with a registration node 177a (e.g. a QREF enabled shop). The registration node may be a secure single purpose device that includes an HSM with a single physical output connection (e.g. a single USB port out (OUT ONLY)) with a simple user interface screen. In some embodiments, the registration node may be configured to only allow an operator to press a button to export a numbered QD Key from a set of QD keys on the HSM via the physical output connection to a user device. In this manner, the device may be pre-loaded with a finite number of pre-agreed QD keys. This enables a user 105a to buy and receive a device from the shop with the registration node 177a in which the device is pre-loaded with QD Keys so that they can use the device to set up a generic QS channel in which they can then register with the QS system and establish a QREF account associated with the user. Alternatively or additionally, a user may take their device into the shop with the registration node 176a, where a number of one or more QD Keys may be uploaded to the device via the physical output connection of the registration node 177a. The user of the device may then operate the device to use the uploaded one or more QD Keys to establish a quantum safe channel inside of which the user 105 sets up a QREF account associated with the user 105a in the QS system 175. The user may then use the QS channel to retrieve further personalised QD keys and the like.

In another example, rather than the user 105a being required to visit a retail outlet or shop with a registration server 177a, a secure storage medium with one or more QD keys stored thereon may be sent to the user. The secure storage medium may be sent via, without limitation, for example the postal system, post, courier and/or delivery service, secure data delivery service, and/or any other suitable secure data delivery, transportation and/or logistical support infrastructure for delivering sensitive and/or confidential materials, data, and the like. For example, the secure storage medium may be, without limitation, for example a single use dongle, a Secure Digital (SD) card and the like, a secured USB stick, a mobile telephony SIM card, a password encrypted flash drive, portable HSM and/or tamper-proof/resistant hard drive, and/or any other suitable secure storage medium and/or storage medium that may be secured and made tamper-proof and/or tamper-proof or resistant storage medium and the like and/or as the application demands. In any event, the user 105a receives the secure storage medium with one or more QD keys stored thereon.

The secure storage medium may be configured for a single use with a one-time generic QD key stored thereon. This will enable the user 105a to connect the secure storage medium to their device and configure their device to set up a quantum safe channel using the one-time generic QD key and/or with various two-factor-authentication and/or other authentication mechanisms for use in, without limitation, for example registering a user account for the user 105a, registering the device of the user 105a, and/or uploading/downloading a QREF application for the device and further set of one or more QD keys assigned by registration server 176a and sent to the device of the user 105a via registration node 177a over the QS channel.

In a further example, the device of a user 105b may be registered with the QS system using a quantum-resistant pathway based on using 2 factor authentication and/or any other secure, multiple path and/or encrypted authentication protocol/mechanism. In this case, the QS system 175 via one or more components or modules in the QS server(s) 103a-103l and/or registration servers 176a-176b may have a random number generator such as, without limitation, for example a quantum random number generator, a Cryptographically Secure Pseudo Random Number Generator (CSPRNG), a CSPRNG called NIST Light (RTM), any other suitable CSPRNG and the like and/or as the application demands. Furthermore, a client QS application software (e.g. a QREF Application) may be installed a device of the user 105b to enable the user 105b to establish a QS channel with the QS system 175 via registration nodes 177b and/or registration servers 176a-176b and the like. The client QS application software may include further functionality such as, without limitation, a random number generator suitable for the device such as, without limitation, for example a client CSPRNG and/or a CSPRNG called NIST Light, and/or any other suitable CSPRNG for use on a device of the user 105b.

When the QREF Application is installed, the CSPRNG of the device of the user 105b may have a corresponding CSPRNG operating within the QS system 175. In particular, the QREF application may include an application programming interface (API) that enables the CSRNG functionality to be installed on a secure memory/processing unit of the device of the user 105b. For example, the API may make use of, without limitation, for example Software Guard Extension(s) (SGX) (RTM) and/or other client HSM type solution suitable for the device of the user 105b, which enables the API to embed a CSRNG functionality into the secure memory/processing unit of the device. For example, the QREF application maybe configured to embed, when installed on the device of the user 105b, without limitation, for example the CSRNG NIST Lite random number generator into the secure memory/processing unit such as a secure chipset or secure enclave of the chipset of the device of the user 105b (e.g. an Intel Chipset with Intel Software Guard Extensions (SGX) is regarded by security/cryptographers as being very secure). Intel (RTM) SGX includes a set of instructions or code for increasing security of application software and data providing increased protection against disclosure, modification, and/or tampering etc. Sensitive information may be partitioned into one or more enclaves, which are designated areas of execution in memory with more security protection. Although a secure memory/processing unit may include a secure enclave or secure chipset such as the Intel Chipset with SGX as described herein, this is by way of example only and the invention is not so limited, it is to be appreciated by the skilled person that the secure memory/processing unit may be implemented using any other suitable type of secure chipset/memory/system/enclave/HSM/components and the like and/or as the application demands.

The registration process may include the following steps of: the user 105a may use the device to browse the public Internet and access a secure website and/or secure webserver operating with a registration node 177b and/or registration server 176a to register an account with the QS system 175 and to also configure and/or set-up their device for QS communications, QS storage and access, and/or any other use cases suitable for operating with the QS system 175. During registration via the webserver, the user simultaneously communicates over another second one or more transmission pathway(s) (e.g. makes a cell-phone call from the device or another device of the user, e.g. a mobile phone or landline phone) with the QS system and delivers two-factor authentication of or from the user to the QS system 175 during registration of the user and set up of the user account on the QS system 175. The device of the user 105b is registered with the user account. The two factor authentication may be delivered by the user using voice commands during the communication over the second one or more transmission pathways.

The registration node 177b or registration server 176a may be configured to process the 2FA elements from the user 105b to display a number displayed on the website on the screen of the device of the user 105b. This may be used to verify that the user 105b is who they say they are and to arrange for the device to receive a QREF application that enables the user 105b to use the device to establish a QS communication channel with the QS system 175. The registration server 176a or a QS server 103a-103l may assign a QD key to the user 105a for use with their device. The assigned QD key is embedded into the QREF application for the device, and/or delivered with the download of the QREF application to the device of user 105b. When the device receives the QREF application download from the webserver and/or registration node 177b or registration server 176a, the QREF application operates to install or embed the CSPRNG (e.g. CSPRNG NIST Lite) into the secure memory of the device. For example, the QREF application inserts the CSPRNG NISL Lite (RTM) into the Software Guard extension of the device, if the device has a suitable Intel (RTM) Chip. The QREF application is then configured to insert or input the QD Key into the CSPRNG embedded in the secure memory/processor of the device.

The QS system 175 also sends a QR Code or image to the device of the user 105a and/or to another device of the user 105a for display on the screen of the device. The QR Code or image represents the user's two-factor authentication. The user inputs data representative of the QR code or image into the CSRNG embedded in the secure memory/processor. The CSRNG processes the input QD Key and also the input data representative of the QR Code or image. For example, the user $105b$ may view a QR Code on the screen of their device representing their 2FA. The user $105b$ may, without limitation, for example photograph the QR Code displayed on the screen, take a screenshot or produce an image of the QR Code displayed on the screen in a suitable manner. The user $105b$ inputs the photograph of the QR Code into the QREF application, which inserts the QR Code and the QD Key into the CSRNG of the secure memory (e.g. secure enclave). The CSRNG outputs a new QREF key or number. At the same time or in a similar manner, a QS server $103a$-$103l$, a registration server $176a$-$176b$ and/or a registration node $177a$-$177p$ and/or $178a$-$178r$, may be configured to input the data representative of the 2FA of the user $105b$ and the QD Key assigned to the QREF application for the device of the user $105b$ into a corresponding CSRNG to output a new QREF key or number, which is associated with the user account of the user $105b$.

The CSRNG embedded on the device and the corresponding CSRNG of the QS system 175 both produce the same QREF key or number. Given this, the QREF application is configured to use the output QREF key or number to establish a quantum-safe communication channel with the QS system 175. This is performed by the QREF application logging the user $105b$ into the QS system 175 via a registration node $177b$, by logging into the QS system 175, the registration node $177b$ may retrieve the user account details and the associated QREF key or number that the QS System 175 computed previously, which is the same as the QREF key or number computed by the CSRNG embedded on the device of the user $105b$. This then allows the registration node $177b$ and the device of the user $105b$ to establish the QS communication channel with both sides using the same QREF key or number. The channel may be encrypted using symmetric encryption with the QREF key or number.

Once the QS channel has been established between the device and the registration node $177b$ of the QS system 175, one or more new dedicated QD Key for the device of the user $105b$, or even a set of dedicated QD key(s) for the device of the user $105b$, is created and/or assigned from the set of QD keys in the HSM mesh of the QS server(s) $1034a$-$103l$. The one or more new dedicated QD Keys may be assigned or mapped to the user account or associated with the user $105b$ for use in current/future QS communications between the device and the QS system 175. The one or more new dedicated QD Key(s) and/or set of dedicated QD keys, are transmitted over the established QS communication channel to the QREF application executing on the device of the user $105b$. The QREF application is configured to receive the one or more new dedicated QD Key(s) and deposit them into the secure memory/processor (or secure enclave etc.) of the device of the user $105b$. For example, the QS system $1765$ may send the one or more new dedicated QD keys inside the QS communication channel to the device of the user $105b$ and deposits them into the Software Guard extension, when the device has an Intel Chipset. The QREF application may be configured to use the one or more new dedicated QD keys to establish further secure QS communications channels with the QS system 175 (e.g. via registration nodes $177a$-$177p$ or $178a$-$178r$).

FIG. $1k$ is another schematic diagram illustrating another preferred example QS system 180 according to the invention based on the QS systems of FIGS. $1a$ to $1j$ in which SQKD is used and where the QS system 180 is configured to include a QS security gateway/registration server 182 and registration nodes $184a$-$184p$. In this example, the QS system 180 includes a plurality of QS servers $103a$-$103l$ associated with the QS system 180, a plurality of QS servers operated by users $104a$-$104c$ (corporations, customers that require a QS server and the like), a QS security gateway/registration server 182, and a distributed ledger 167, and a plurality of satellites $171a$-$172c$ comprising, without limitation, for example a low orbit satellite constellation. These are connected together over QS channels to create, over public communications infrastructure or other networks and/or dark fibre and the like, the QS network 101. The QS network 101 is considered a QS domain. Each QS server $103a$ of the plurality of QS servers $103a$-$103l$ and/or QS servers operated by users $104a$-$104c$ may comprise a DLT node $166a$-$1661$, one or more registration applications, and an SQKD on ground receiver or ~OGRC $172a$-$1721$ and HSM (not shown). As described with reference to FIG. $1i$, this enables the QS servers $103a$-$103l$ and QS servers operated by users $104a$-$104c$ to receive one or more identical sets of QD keys that are multicast from one of the satellites $171a$ of the satellite constellation to the corresponding OGRs $172a$-$1721$ as the satellite $171a$ passes over said OGRC $172a$-$1721$ of each QS server $103a$-$103l$.

A plurality of users $105a$-$105n$ may operate devices over a public network 102 (e.g. Internet, and/or any other type of communication network) or non-QS network/domain 102. The plurality of users $105a$-$105n$ may be registered with the QS system 180 via registration nodes $184a$-$184p$ and security gateway/registration servers 182. The security gateway/registration server 182 is configured to provide the necessary network security (e.g. user authentication, verification, 2FA and the like) to ensure only those users $105a$-$1051$ that are registered users of the QS system 180 have access to the services and/or applications of the QS system 180, but that any other user is blocked from accessing the QS system 180 and/or the services/applications. Such users will need to register for a user account on the QS system 180 via registration nodes $184a$-$184p$. Once registered, each user $105a$ of the plurality of users $105a$-$105n$ and/or one or more devices of said each user $105a$ may be associated with a user account stored in the DLT 167 of the QS system 180. A user $105a$ may use a registered device to enter their credentials into a QS website or QS webserver operated by one or more registration nodes $184a$-$184p$ associated with In a similar manner, the QS system 180 may be operated and/or used as described with reference to FIG. $1a$ to $1j$ and/or as described herein.

There are different types of users that may use the QS system 180. For example, users $104a$-$104c$ may operate QS servers/devices that include an OGRC $172m$-$172o$ installed at their end-point and so receive sets of QD keys and operate via QS channels within the QS network 101 of the QS system 180. These may be large scale customers such as organisations, corporations and the like that can operate the necessary technology and equipment required to be part of the QS network 101. These users $104a$-$104c$ that host an OGRC $172m$-$172o$ and/or HSM (not shown) can use this for registration and QD key delivery via the satellites $171a$-$172c$ and/or via the QS servers $103a$-$103l$ of the QS network 101. The end-points/servers of users $104a$-$104c$ may also include DLT nodes $166m$-$166o$ and may assist in operating/forming the QS DLT 167.

Users $105a$-$105n$ may operate with in a public network 102 outside the QS network 101 or QS domain. Such users $105a$-$105n$ may use user or customer end-point devices such as, without limitation, for example, mobile phones, smartphones, laptops, server(s), IoT devices, and/or computing/communication equipment and/or devices, and the like, but which do not have the capabilities or equipment required for operating an OGRC and/or HSM and the like and so rely on registration nodes 184a-184p for registering and delivery of dedicated QD keys for establishing a QS communication channel with the QS system 180 and/or QS network 101. By contrast, the users 104a-104c are essentially guaranteed (because they can form QS channels) that their devices/servers and the like may make use of QS communications, QS storage and/or access to data items using QREF locators and access tokens, and/or other QREF locator/access token use cases as described herein, combinations thereof, modifications thereto and/or as described herein. However, users 105a-105n and/or their corresponding devices need to be registered with the QS system 180 and also get access, in a quantum safe manner, to corresponding QD keys and the like before being able to make use of, without limitation, QS communications and the like.

As previously described with reference to FIG. 1j, for users 105a-105n there are several options for registering with the QS system 180 and QS network 101 and ensuring their devices have the capability of QS communications, QS storage and/or access to data items using QREF locators and access tokens, and/or other QREF locator/access token use cases as described herein, combinations thereof, modifications thereto and/or as described herein. One option is to receive a device or end-point device shipped from a manufacturer or retail outlet that has been pre-loaded with a QREF application and/or one or more QD Keys from the set of QD keys for establishing QS communications with the QS system. Another option is for the device of a user 105b (or end-point device) to download the QREF application and/or software, which is configured to, without limitation, for example register the user 105b and/or establish QS communication with QS system. A further option may be that, without limitation, for example a retail shop or other service/outlet hosts an HSM which is used to inject or pre-load QREF application and/or one or more QD keys into the user device or user end-point device through a hard wired connection. This may be achieved using a retail shop device in which the user device is connected by a hard wired connection to the retail shop device. The retail shop device may be a tamper-proof and/or temper resistant device and may include, without limitation, an operator button (e.g. a simple push button) that the retail shop operator or the user presses/pushes, causing the retail shop device to perform only one task, which is the injection of one or more QD keys and/or QREF application into the secure storage/processing unit (e.g. secure enclave or Intel SGX (RTM)) of the user device and/or end-point device. The one task button and the retail device are designed to prevent an operator or other malevolent actor from accessing or attempting to access the QD keys and/or QREF application when they are injected/downloaded into the user device or endpoint device.

For example, as previously described with reference to FIG. 1j, as an option, a device of a user 105a of the plurality of users 105a-105n may be shipped new from the manufacturer with a QREF Application pre-loaded onto the Operating System of the device. The device may be configured to have a secure enclave with a QD key stored thereon, which the QREF application may use within the secure enclave top establish a QS communication channel with a registration node 184a of the QS system 180. Thus, the device is configured, once shipped to a user 105a to operate the QREF Application via the secure enclave on the device and use the QD key and the like for establishing an anonymised preliminary QS communication channel between the device of the user and a registration node 184a. This QS communication channel allows the user 105a of the device to register and/or set up a QS user account in the QS system 180 using the preliminary QS safe channel. From this, the user 105a may be assigned QD keys and the like, which are associated with their user account in the QS system 180, and downloaded via the preliminary QS channel to the secure enclave on the device. This allows the user 105a to establish QS channels with the QS system enabling them to use their devices in, without limitation, for example, QS communications, QS storage and/or access to data items using QREF locators and access tokens, and/or other QREF locator/access token use cases according to the invention and/or as described with reference to FIGS. 1a-7c, combinations thereof, modifications thereto and/or as described herein.

Furthermore, as previously described with reference to FIG. 1j, in the other option the registration process may involve, without limitation, for example a device of a user 105b downloading a QREF application or software, which is configured to establish a QS channel between the device of the user 105b and the QS system 180 and register the user 105b with the QS system 180. The device of a user 105b may connect to a registration node 184a and download a QREF Application for registering and establishing a QS connection with the QS system 180. When the device of a user 105b downloads the QREF Application, the device of the user 105b is configured to combine the use of a quantum safe channel created with the QREF Application and a set of 2-factor authentication (2FA) challenges to create a new quantum safe channel. Given that the download of the QREF Application is typically not quantum-safe, the establishment of a new quantum safe channel is quantum-safe because it uses a combination of 2FA (e.g. via voice commands) and transient user registration data provided by the user 105b during registration and in the 2FA set-up and authentication process. The QREF application and the 2FA challenges may be used to create a symmetrical QREF key at the device and also the same QREF key at the QS system 180 such that symmetrical encryption using the same QREF key may be used to establish the QS channel between the device of the user 105b and the QS network via a registration node 184a and the security gateway/registration server 182 and the like. This allows the user 105a to use an existing device with a secure enclave and/or secure memory/processor to establish QS channels with the QS system enabling them to use their devices in, without limitation, for example, QS communications, QS storage and/or access to data items using QREF locators and access tokens, and/or other QREF locator/access token use cases according to the invention and/or as described with reference to FIG. 1a-7c, combinations thereof, modifications thereto and/or as described herein.

FIG. 1l is a further schematic diagram illustrating an example QS system 190 using terrestrial quantum key distribution according to the invention. The QS system 190 includes a plurality of QS servers 103a-103c, a QS DLT repository 167, one or more security gateways/registration servers 182a-182m, and a plurality of registration nodes 184a-184m that are connected together via QS channels established using a plurality of QD keys from a set of QD Keys stored in one or more HSMs (not shown) within one or more QS servers 103a-103c and/or one or more security gateways/registration servers 182a-182m and the like. The QS network 101 with QS channels formed between the plurality of QS servers 103a-103c, the QS DLT repository 167, the one or more security gateways/registration servers 182*a*-182*m* and a plurality of registration nodes 184*a*-184*m* forms a QS boundary within which QS communications occurs between at least the plurality of QS servers 103*a*-103*c* and the QS DLT repository. The plurality of registration nodes 184*a*-184*m* form the edges of the QS network 101 and are the point of contact for a plurality of users 105*a*-105*n* operating devices within public telecommunication infrastructure, so-called non-quantum safe network 102, such as, without limitation, for example the public Internet, telecommunications networks, public service telecommunication network(s) and the like.

Figure 1K:
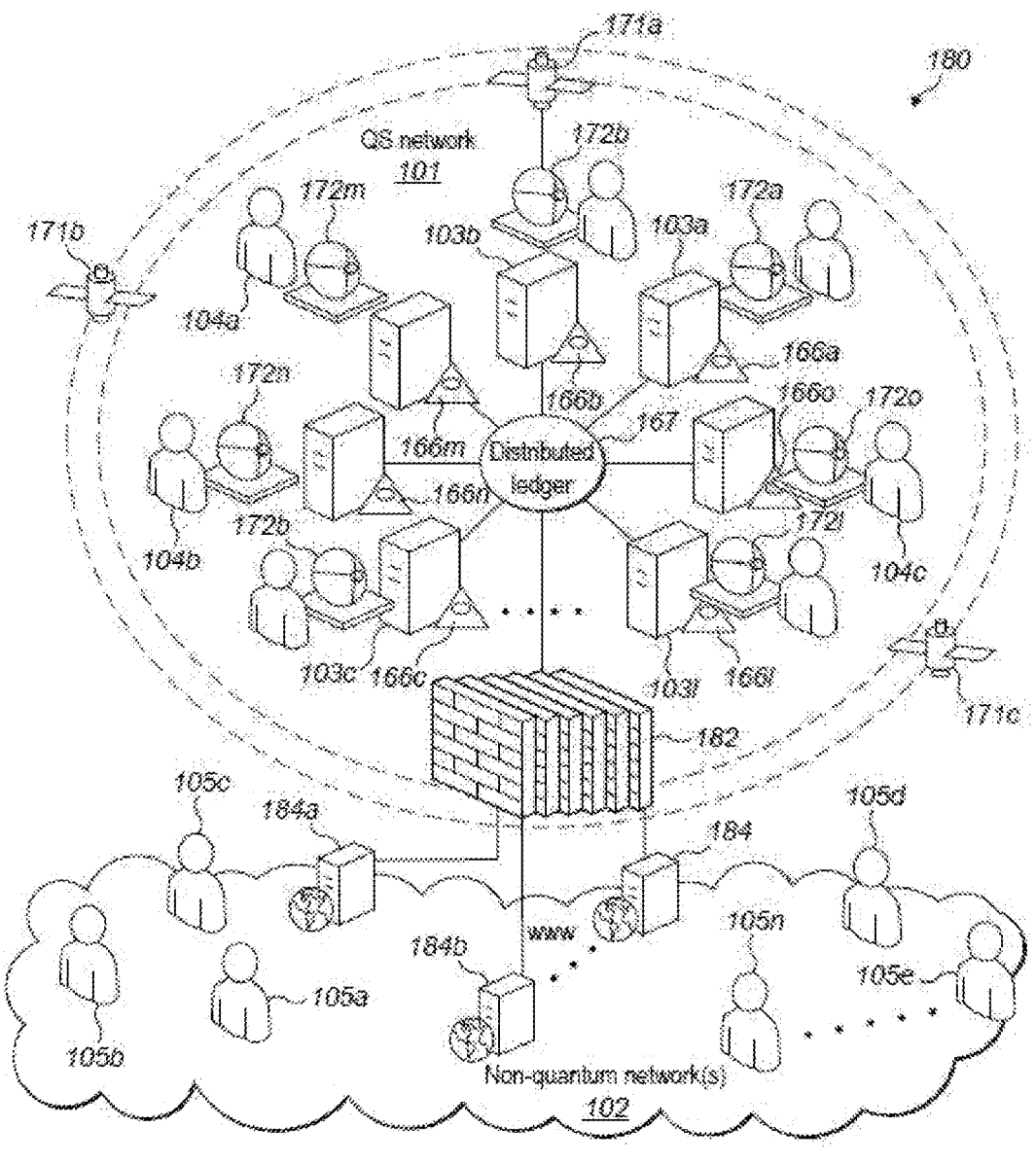
FIG. 1k is another schematic diagram illustrating another preferred example QS system of FIGS. 1a to 1j using SQKD and configured with registration servers and nodes.
Figure 1I:
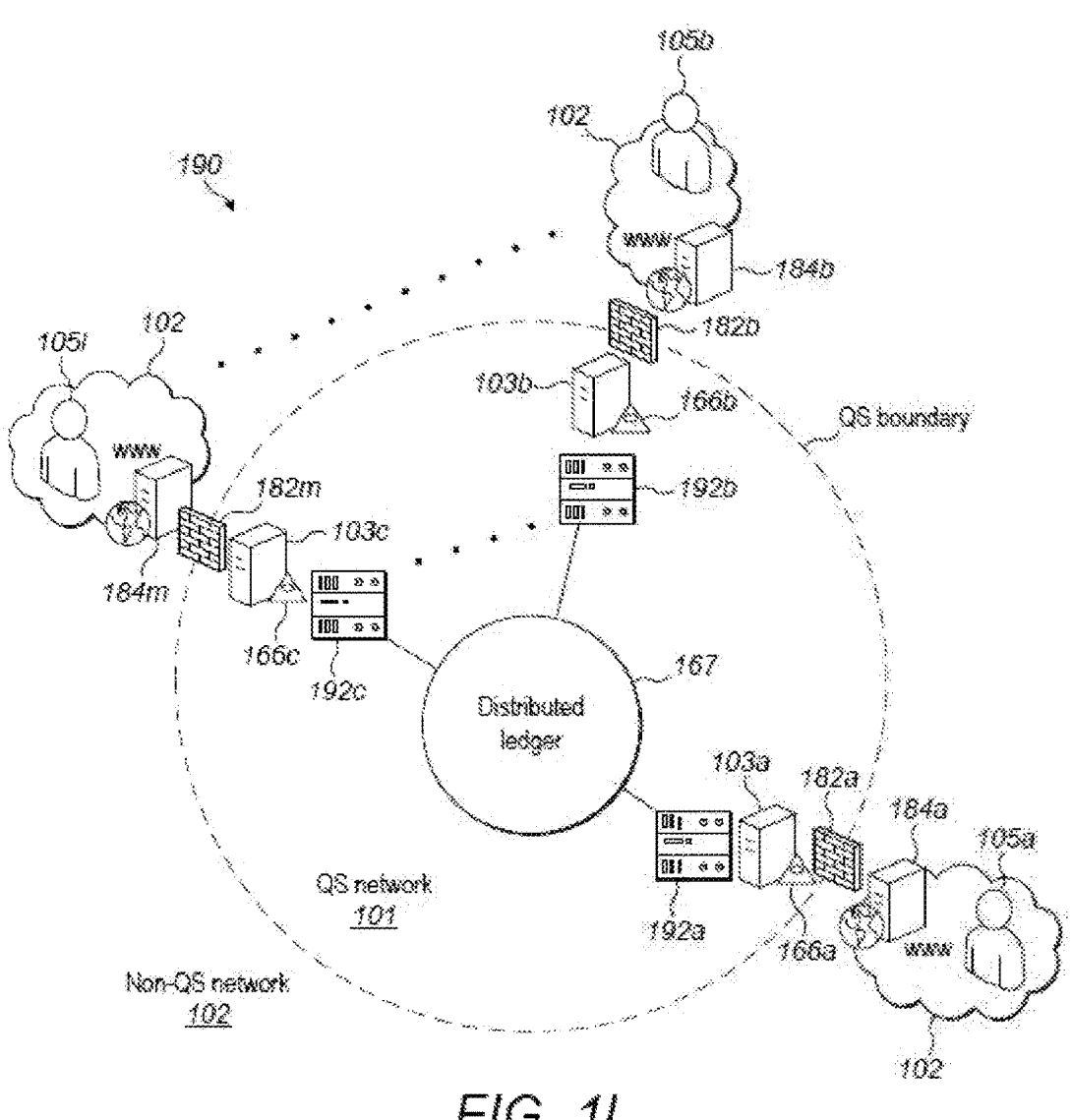

Rather than having a satellite constellation with a plurality of satellites 171*a*-171*c* as described with reference to FIGS. 1*i* to 1*k*, the QS system 190 forms a QS network 101 based on at least the plurality of QS servers 103*a*-103*c* in which each QS server 103*a* of the plurality of QS servers 103*a*-103*c* includes a terrestrial QKD transceiver 193*a*-193*c* for creating and distributing one or more sets of QD keys to the HSMs (not shown) of each QS server 103*a*-103*c* across QS channels over the public infrastructure, without limitation, for example the Internet and/or dark fibre networks and the like. It is preferred to use dark fibre for communicating between QS servers 103*a*-103*c* and/or QS DLT repository 167. This reuses fibre optic resources that have already been deployed but not in use, but also allows the use of quantum key exchange using optical photons and the like and the generation of sets of QD Keys for use by the QS system 190. Although the terrestrial QS system 190 uses terrestrial QKD transceivers 192*a*-192*c* across dark fibre, this can limit the transmission distance of the dark fibre between datacentres of the QS network 101 and the like. Thus, the terrestrial QS system 190 may be deployed in metropolitan areas and/or city centres and the like until future improved dark fibre enables longer or larger transmission distances, and/or secure repeaters/routers can be used to extend to larger areas/regions and the like. Alternatively or additionally, although the terrestrial QS system 190 is described with reference to using terrestrial QKD transceivers and establishing QS channels over dark fibre communication infrastructure, this is by way of example only and the invention is not so limited, it is to be appreciated by the skilled person that the terrestrial QS system 190 may be combined and/or modified to use one or more features of one or more other QS systems 100, 165, 170, 175, 180 as described with reference to FIG. 1*a* to 1*k*, and/or as the application demands.

Users 105*a*-1051 may register and/or use the QS system 190 in a similar or the same manner as described with reference to FIG. 1*a* to 1*k* by connecting to one or more registration nodes 184*a*-184*m*, or when allowed with one or more registration servers and/or QS servers, which may include registration node and/or registration server applications and the like for establishing a connection with the devices of said one or more users 105*a*-1051. Preferably, user devices or end-point devices of users 105*a*-1051 may connect to the QS system by connecting to a registration node of the plurality of registration nodes 184*a*-184*m* for performing without limitation, for example QS communications, QS storage and/or access to data items using QREF access tokens as described herein, and/or other QREF access token use cases according to the invention and/or as described with reference to FIGS. 1*a*-7*c*, combinations thereof, modifications thereto and/or as described herein. The registration nodes 184*a*-184*m* connect and communicate over QS communication channels with a registration server, where the registration server communicates with a DLT node and/or HSM of a QS server for storing and/or accessing data items stored in the DLT network/distributed ledger and/or for performing, without limitation, for example QS communications, QS storage and/or access to data items using QREF locators and access tokens as described herein, and/or other QREF locator/access token use cases according to the invention and/or as described with reference to FIGS. 1*a*-7*c*, combinations thereof, modifications thereto and/or as described herein.

Thus, as described with reference to FIGS. 1*a* to 1*k*, a user 105*a* of a plurality of users 105*a*-1051 may use a device or end-point device with a secure enclave and/or secure memory/processor to, without limitation, for example establish QS communication channels with the QS system, and perform, without limitation, for example QS communications, QS storage and/or access to data items using QREF locators and access tokens as described herein, and/or other QREF locator/access token use cases according to the invention and/or as described with reference to FIG. 1*a*-7*c*, combinations thereof, modifications thereto and/or as described herein.

Figures 2A, 2B:
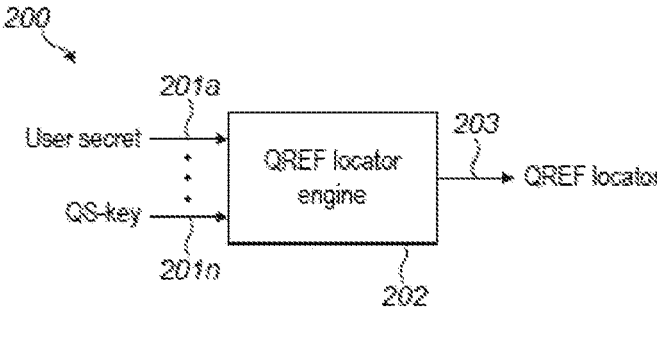
FIG. 2a is a schematic diagram illustrating a quantum reference locator engine for use in the QS system(s) illustrated in FIGS. 1a-1l.
FIG. 2b is a schematic diagram illustrating a QREF access token engine for use in the QS system(s) illustrated in FIGS. 1a-1l.

FIGS. 2*a* and 2*b* are schematic diagrams illustrating an example QREF locator system 200 and QREF access token system 205 for generating a QREF locator and access token, respectively, for storing and accessing, in some manner, a data item according to the invention. For simplicity, reference numerals of FIGS. 1*a*-1*l* may be referenced, used for similar or the same components, and/or used for illustrative purposes in FIGS. 2*a* and 2*b*.

Referring to FIG. 2*a*, the QREF locator system 200 generates the QREF locator 203 by receiving, without limitation, for example, at least data representative of: the user secret 201*a* from a device of a user that is submitting a data item for storage in, without limitation, for example the QS repository 107 of the QS network 101; and an available QD key selected from the set of QD keys from one of the QS server(s) 103*a*-103*l* of the QS system. A QREF locator engine 202 is configured to generate a unique QREF locator 203 based on one or more of a first set of cryptographic or mathematical operations performed on the data representative of at least the received user secret 201*a* and the received QD key 201*n* (e.g. QS_KEY). Although a user secret 201*a* and QD key 201*n* (e.g. QS_KEY) are described, this is for simplicity and by way of example only and the invention is not so limited, it is to be appreciated by the skilled person that any other information may be input to the QREF locator engine 202 as the application demands such as, without limitation, for example a user secret, a customer number allocated to the user, a data item reference identifier allocated to the data item that will be associated with the generated QREF locator 203, the received QD key, a QD key identifier of the received QD key, a user identifier, and/or an access control list to the data item, and/or any other information useful or suitable for generating the QREF locator. Although several examples of the cryptographic or mathematical operations of QREF locator engine 202 are provided, these are by way of example only and the invention is not so limited, it will be appreciated by the skilled person that the cryptographic or mathematical operations of the QREF locator engine 202 may be changed depending on the use case and/or service/application process that uses the QS system according to the invention. For example, the QREF locator engine 202 may be a plug-in module or software that may be selected from a set of QREF locator engines depending on use case. Each QREF engine 202 from the set of QREF locator engines may have a different set of cryptographic of mathematical operations and/or different input data depending on use case for generating a QREF locator in relation to that use case.

The QREF locator engine 202 is configured to generate the QREF locator 203 based on the first set of cryptographic or mathematical operations on QREF locator input data representative of, without limitation, for example at least data representative of the received user secret 201*a* and the received QD key 201*n*, or any other input data associated with the user, data item and/or QD key such as, by way of example only but not limited to, data representative of user secret, customer number, user identifier, data item reference, quantum key identifier, QD key and the like or as the application demands. The QREF locator engine 202 processes the input data using any one or more cryptographic operations, mathematical operations and/or functions and/or combinations thereof, without limitation, for example, one or more cryptographic operations, mathematical operations and/or functions and/or combination thereof from the group of: one or more one-way functions; one or more hash functions; one or more hash-based message authentication code functions; one or more key derivation functions; one or more of multiplication, subtraction, addition, division, factorisation and/or any other mathematical operation; any other one or more cryptographic functions, mathematical operations, and/or combinations thereof that are operable to generate, from the input data, data representative of a QREF locator 203 that is unique, obfuscates the received QD key 201*n* and/or the received user secret 201*a* and/or other input data, and is capable of providing an address for locating the associated data item for storing in, without limitation, for example a QS repository 107 and/or QS DLT 167 and the like. As an example, the QREF locator engine 202 may perform a one way hash on the input data such as, without limitation, for example at least data representative of the received user secret 201*a* and the received QD key 201*n*. In another example, the QREF locator engine 202 may perform a one way hash on input data such as, without limitation, for example at least data representative of the received user secret 201*a* and the received QD key 201*n*. In another example, the QREF locator engine 202 may perform a one way hash on the received input data such as, without limitation, for example, data representative of a customer number (or user identifier), customer data item reference (e.g. reference or name of data item for storage), and a quantum key identifier of the received QD key 201*n*.

Referring to FIG. 2*b*, the QREF access token system 205 is configured to generate a unique QREF access token 207 by receiving a QREF locator 203. A QREF access token engine 206 is configured to generate the unique QREF access token 207 based on a second set of cryptographic or mathematical operations performed on the received QREF locator 203. The QREF access token engine 206 that is configured to generate the QREF access token 207 based on the second set of cryptographic and/or mathematical operations may further include generating the QREF access token 207 from data representative of the QREF locator 203 based on any one or more cryptographic, mathematical operations, functions and/or combinations thereof from the group of: one or more one-way functions; one or more hash functions; one or more one-way forward hash functions; one or more hash-based message authentication code functions; one or more key derivation functions; one or more of multiplication, subtraction, addition, division, factorization and/or any other mathematical operation; any one or more crypto-graphic functions, mathematical operations, functions, and/or combinations thereof that are operable to generate data representative of an QREF access token 207 that is unique, obfuscates the data representative of the QREF locator 203, and capable of being used by a QS server 103*a*-103*l* to identify the QREF locator 203 for providing an address for locating the associated data item stored in, without limitation, for example a QS repository 107 or QS DLT 167. Preferably, the second set of cryptographic operations and/or mathematical operations used to generate the QREF access token 207 from the QREF locator 203 is an irreversible process such that the QREF locator 203 cannot be derived from the data representative of the QREF access token 207. In a preferred example, the QREF access token is calculated using a one-way hash of the QREF locator.

Although a hash function is described herein for calculating a QREF locator from input data and/or an QREF access token from the QREF locator, this is by way of example only but the invention is not so limited, it is to be appreciated by the skilled person that there any variation of or one or more cryptographic operations or algorithms, mathematical operations or algorithm, functions and/or combinations thereof may be used to generate a QREF locator and/or QREF access token with the above-mentioned properties as described above, and/or herein as the application demands. For example, there are a number of operations and/or algorithms that can be used to calculate a QREF locator and/or an QREF access token, in which the input data may be used as a seed, without limitation, for example using one or more cryptography operations or algorithms from the group of: lattice-based cryptography, multivariate cryptography, code-based cryptography, supersingular elliptic curve isogeny cryptography, and the like.

FIG. 2*c* is a flow diagram illustrating an example QS access process 210 for a user requesting access to a data item using a QREF access token generated in FIG. 2*b*. For simplicity, reference numerals of FIGS. 1*a*-1*l* may be referenced, used for similar or the same components, and/or used for illustrative purposes in FIG. 2*c*. During storage of a data item in the QS repository 107 or DLT 131, the QS server 103*a* may generate a registration record of the user storing the data item in the QS repository 107 or QS DLT 167. Each user registration record may include, without limitation, for example data representative of: a user identity of said user; a user secret of said user; the quantum reference (QREF) locator 203 associated with the data item; a data item reference identifier associated with the data item; a quantum key identifier associated with the QD key used to encrypt the data item; and an access control list associated with the data item, which may include user identities of the users given access to the data item, and/or any other data. The QS access process 210 may include the following steps of: In step 211, receiving a QREF access token associated with a data item from a device of a user. The user may not be the same use that stored the data item in the QS repository 107 or QS DLT 167. In step 212, retrieving one or more registration records associated with the user.

In step 213, identifying the QREF locator associated with the QREF access token by performing the following steps of: In step 214, generating, for each retrieved registration record, an QREF access token based on the data of said each retrieved registration record. In step 215, determining, for each retrieved registration record, whether the generated QREF access token matches with the received access token. In step 216, identifying the QREF locator from the retrieved registration record corresponding with the generated QREF access token that matches the received access token. In step 216, outputting the QREF locator from the retrieved record that generated the matching access token.

In step 217, in response to identifying the QREF locator, performing one or more access operations or actions and the like in relation to the data item corresponding to the identified QREF locator stored in the repository and the access token. The access operations or actions are use case dependent.

Figure 3A:
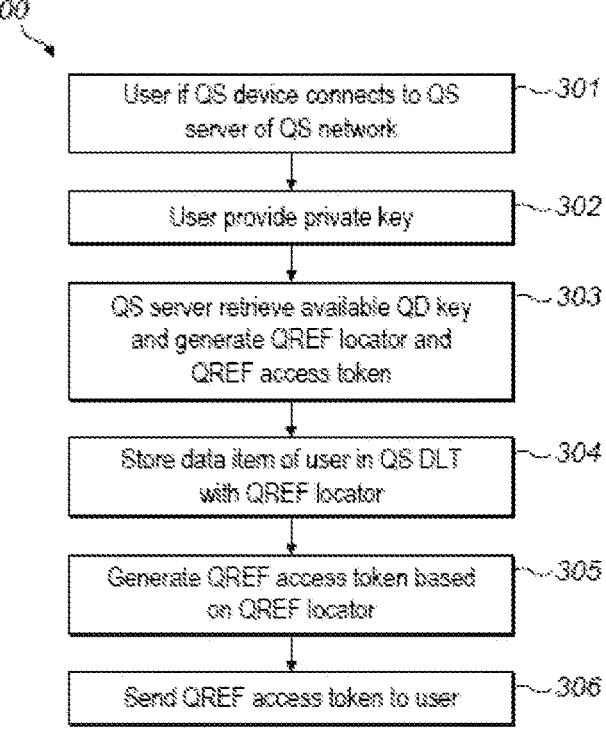
FIG. 3a is a flow diagram illustrating a process of storing and retrieving data items using an example QS system as illustrated in FIGS. 1a-1l when configured with distributed ledger technology (DLT).

FIG. 3a is a flow diagram illustrating an example service/application process 300 for storing and/or accessing data items in, without limitation, for example an QKD system such as, without limitation, for example QS systems 165, 170, 175 and 180 as described with reference to FIGS. 1j to 1k. For simplicity, reference numerals of FIGS. 1j to 1k may be used for the same or similar components. The QS systems 165, 170, 175 and 180 combines QKD or SQKD with QS DLT 167 to enable quantum-safe (QS) storage and retrieval of publicly accessible data in a manner that is regarded as quantum safe. As described, the QS systems 170, 175 and 180 uses, without limitation, for example: 1) quantum safe keys or QD keys delivered to HSMs 106a-106c by a QS Satellite system including a plurality of QS satellites 171a-171c; 2) a user's/customer's public key or shared secret; to create through the operation of an QREF locator algorithm a unique QREF number or locator. The QREF locator is used as a locator to the location of a data item (or DLT data record or data locker) stored on the QS DLT 167, which may be a distributed ledger and/or shared ledger. The QS DLT 167 is stored on the QS network 101 using DLT nodes 166a-166d, which are connected exclusively by quantum safe communications channels, in which the DLT nodes 166a-166d may use QD keys from the set of quantum safe keys stored in each HSM 106a-106c of a QS server 103a-103c. The QS DLT 167 is not publicly accessible over the non-quantum safe network 102 (e.g. a public network or the Internet). When DLT nodes 166a-166d exchange information to store information in the QS DLT 167, raise queries or updates or retrieve information or answers to questions, such information stored in the QS DLT 167 is always quantum safe.

In this example, one of the users 104a-104c are customers of the QS provider of QS systems 165, 170, 175, 180 and may use the QS system 165, 170, 175, 180 for a variety of applications and/or use cases. As described, the user 104a has an QS server that may be configured for use with an SQKD system by including, without limitation, for example, OGRC 172d, HSM 106d and/or DLT node functionality 166d. The QS server of the user 104a connects within the QS network 101 using quantum safe channels to QS server(s) 103a-103c and/or QS DLT 167. The user 104a may store their data items in a QS manner via a DLT record (or "Locker") on a distributed ledger and/or shared ledger operated by QS DLT 167 and DLT nodes 166a-166f using service/application process 300 based on the following steps of:

In step 301, the user 104a using their QS server/device connects to one of the QS server(s) 103a-103c with DLT Nodes 166a-166c using a QS communication channel initiated using a QD key set up with the relevant QS server 103a with DLT Node 166a.

In step 302, the user 104a may provide (as dictated by the service) their public/private key (e.g. user secret or customer secret) to the QS server 103a-103c.

In step 303, the QS server 103a retrieves an available QD key from the set of QD keys (e.g. a quantum key) stored in the HSM 106a of QS server 103a, and injects the retrieved QD key along with the user secret or user's private key along with Customer's private key into a QREF locator generation engine (e.g. QREF locator engine 202 of FIG. 2a) for generating a QREF locator associated with a data item the user 104a requires stored on the QS DLT 167. The QREF locator generation engine produces a "Locator" or a unique reference number that indicates the location or address of a DLT record (or "Locker") in which the data item will be stored at on the distributed or shared ledger(s) of QS DLT 167.

In step 304, the data item of user 104a is stored in the DLT record (or "Locker") including data representative of the data item and also the QREF locator. The QREF locator may be, without limitation, for example used as an index or location of the data item stored in the QS DLT.

In step 305, the QS server 103a also generates an QREF access token (e.g. QREF access token engine 206 of FIG. 2a) for the user 104a. This enables whoever has the QREF access token to access the data item stored in the QS DLT 167. For example, the QREF access token engine 205 may be a simple hash function in which the QREF access token is a hash of the QREF locator corresponding to the data item.

In step 306, the user 104a receives the QREF access token corresponding to the data item stored by the QS DLT 167. The user 104a may use the QREF access token in public and also direct other users 104b-105n to the data item using the access token.

Thus, with the data item safely stored in the QS DLT 167 in a QS manner, the user 104a is able to share information relating to the QREF locator with one or more users 104b-105n for any given application by providing the QREF access token hash of the Locator, which combines the reference number to the HSM QKD key used plus his private key. This can be delivered in the or of a certificate or token Given a QS DLT 167 is used, all the QS servers 103a-103c with DLT nodes 166a-166c of the QS systems 165, 170, 175, or 180 will be updated as necessary as to the location of the data item and the QREF locator of the user 104a. Thus, any request for access to the data item based on the QREF access token that is received by any QS server 103a-103c can use the QREF access token to locate the data item. The QS system 165, 179, 175 or 180 may be interrogated to produce a summary of the data item, partial records associated with the data item, or a Boolean to a query associated with the data item, and/or any of a variety of results produces as required by the given application in relation to the data item.

It is apparent that the QS system provides various advantages including handling of data items in a quantum safe manner since all communications between QS servers 103a-103c and/or QS servers of users 104a-104c are quantum safe based on, without limitation, for example SQKD. Another advantage is that a user of the plurality of users 105a-105n with devices operating in the non-quantum safe network 102 outside the quantum safe boundary of QS network 101 is not required to perform any authentication in the applications under consideration, and so no quantum safety is required from them. These users are not party to any secrets or QD keys of the QS system, and so cannot compromise the data items held in the QS DLT 167. For example, depending on the application and use of the access token(s) and permissions thereto associated with one or more data items held in the QS DLT 167, a user 105a-105n outside the quantum safe boundary of the QS network 101 may only be able to use the QREF access token to get Boolean answers or partial data strings in relation to data items held in the QS DLT 167 and so is not able to compromise the data items held in the ledger of the QS DLT 167. In addition, all QS servers 103a-103c with DLT nodes 166a-166c that operate the QS DLT 167 are quantum safe, even though information passes between them in IP over the public internet as raw encrypted data that is encrypted using the QD keys of the set of QD keys distributed to each QS server 103*a*-103*c* via QSKD and/or any other suitable QKD technique. Such encrypted data is only capable of being read by the intended recipient QS server 103*a*-103*c* with the relevant QD key.

Figure 3B:
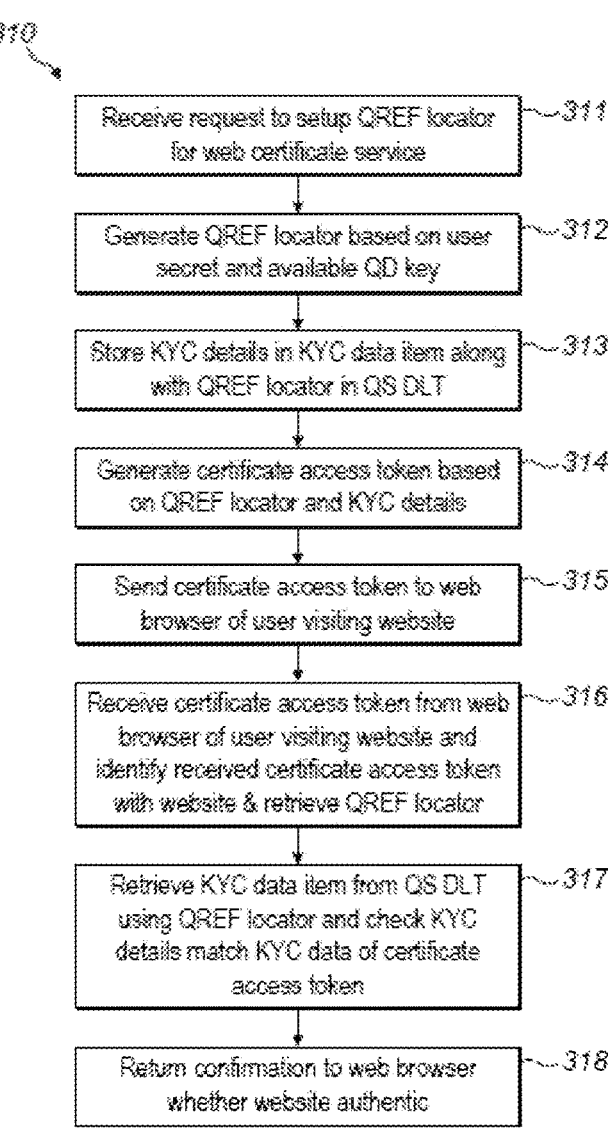
FIG. 3b is a flow diagram illustrating a process for a web certification service using a preferred example QS system of FIG. 1e.

FIG. 3*b* is a flow diagram illustrating another example service/application process 310 for performing web certification with certificate data items that are stored and accessed using, without limitation, for example an SQKD system such as, without limitation, for example QS systems 170, 175, or 180 as described with reference to FIGS. 1*i* to 1 *k*. For simplicity, reference numerals of FIGS. 1*i* to 1*k* may be used for the same or similar components. As described with reference to FIG. 1*a* to 3*a*, the QS system 170, 175, or 180 combines SQKD with QS DLT 167 to enable quantum-safe (QS) storage and retrieval of publicly accessible data in a manner that is regarded as quantum safe. The QREF locator may be used to provide a QS web certification service in which a user 104*a* with a QS server hosting a website can use for authenticating their website to users 105*a*-105*n* and the like. The service/application process 310 may include the following steps of:

In step 311, receiving a request from the user 104*a* of the QS server hosting the website to set up a QREF locator using a QS server 103*a* configured for providing a web certification service. This includes, without limitation, for example, the user 104*a* of the QS server hosting the website providing their Know Your own Client or Know Your Client or Know Your Customer (KYC) details or KYC data (e.g. corporate details of the corporation's website) for forming and/or storing a KYC data item.

In step 312, a QREF locator is created/generated based on a user secret associated with the user 104*a* and an available QD key provided by an HSM 106*a* of QS server 103*a*.

In step 313, the user KYC data/details are stored as a KYC data item along with the QREF locator in a DLT record (or "Locker") of the QS DLT 167, which is replicated on all QS server(s) 103*a*-103*c* with DLT node functionality 166*a*-166*c* using SQKD safe communications channels (or QS channels).

In step 314, a certificate QREF access token is generated with the hash of the QREF locator, as well, at least a portion of the user's KYC data may be included in the certificate access token.

In step 315, when a web browser of a user 105*a* in the non-QS network 102 (e.g. Internet or public network and the like) wants to verify the website of the user 104*a* is authentic, the web browser of user 105*a* receives the certificate access token from the website of user 104*a* and sends the received certificate access token to QS server 103*a* of QS system 140 for determining whether website of user 104*a* is authentic.

In step 316, the QS server 103*a* takes the certificate access token and identifies that it is associated with user 104*a* (e.g. based on identifying the QREF locator from a QREF access token as described herein with reference to FIG. 1*a* to 7*b*), and from this retrieves the QREF locator corresponding to the KYC data item.

In step 317, the QS server 103*a* retrieves the KYC data item from the QS DLT 167 using the QREF locator, and checks the KYC information from the QS DLT 167 matches the KYC data of the certificate access token.

In step 318, return confirmation whether website authentic to web browser. For example, if there is a match, then the QS server 103*a* returns a confirmation (e.g. YES) to the web browser of user 105*a* indicating that there is a match and the website the user 105*a* is visiting is authentic. If there is not a match, then the QS server 103*a* returns a negative confirmation (e.g. NO) to the web browser of user 105*a* indicating that there is not a match and the website the user 105*a* is visiting is not authentic.

Figure 3C:
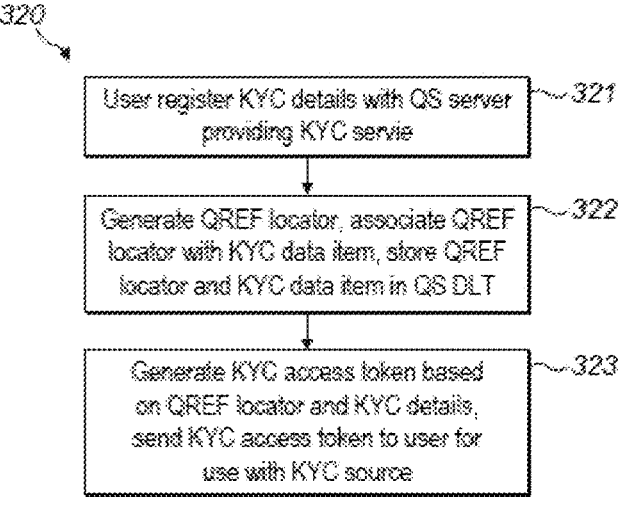
FIG. 3c is a flow diagram illustrating a process for a KYC service using a preferred example QS system of FIG. 1e.

FIG. 3*c* is a flow diagram illustrating another example KYC service/application process 320 for provision of KYC data that is stored and accessed using, without limitation, for example an SQKD system such as, without limitation, for example QS system(s) 170, 175 or 180 as described with reference to FIGS. 1*i* to 1*k*. For simplicity, reference numerals of FIGS. 1*i* to 1*k* may be used for the same or similar components. As described with reference to FIG. 1*a* to 3*a*, the QS system(s) 170, 175 or 180 combines SQKD with QS DLT 167 to enable quantum-safe (QS) storage and retrieval of publicly accessible data in a manner that is regarded as quantum safe. The QREF locator may be used to provide a QS KYC service for users 104*a*-104*c* and/or users 105*a*-105*n*. In this example, a QREF locator and KYC access token associated with a KYC data item of a user 105*a* from the plurality of users 105*a*-105*n* are used to control the provision of KYC data by user 105*a*. For example, the user 105*a* may need to provide comprehensive KYC data to a service provider, in which the user 105*a* may provide their KYC access token to the service provider and amend the access token access control list to allow the service provider access to the necessary KYC data of the user 105*a* stored in the QS DLT 167. This allows the service provider to access and use the KYC data for subscribing the user 105*a* to a service of the service provider and the like. The KYC service/application process 320 may include the following steps of:

In step 321, a user 105*a* registers their KYC information (e.g. passport, DVLC, credit card, facial recognition scan, phone, address details, biometrics, and/or any other KYC data of the user 105*a*) with a KYC depositary operated by a QS server 103*a*, which may be configured to provide a KYC service that allows users 105*a*-105*n* to store their KYC information in a KYC DLT record (or "Locker") in the QS DLT 167 of QS network 101. This will allow the user 105*a* to, in future, prove his identity by providing a KYC access token to a service provider and avoid having to go through the conventional laborious KYC process with every new contract or service.

In step 322, the QS server 103*a* generates a QREF locator as described herein, in which the QREF locator is associated with the KYC data item of the user 105*a*. The KYC data item and the QREF locator are stored in a KYC DLT record in the QS DLT 167 of the QS network 101.

In step 323, the QS server 103*a* is also configured to generate a KYC access token based on the hash of the QREF locator corresponding to the KYC data item and to provide the KYC access token is provided to the user 105*a* (e.g. the QS server 103*a* may deliver the KYC access token into a QS wallet of the user 105*a* and the like).

The KYC data item stored in the QS DLT 167 may include full address and biographical data in standard Field Forms that can easily be migrated into standard Service provider applications forms (e.g. credit card applications). The KYC access token may serve as a locator, such that when in future the user 105*a* wishes to provide KYC data to a new service provider, the user 105*a* provides the KYC access token to the service provider, enabling the service provider to access the KYC data item of the user 105*a* stored in the QS DLT 167.

In order to verify that the user 105*a* is genuine and has not been spoofed, the QS server 103*a* hosting the QS KYC service may provide challenge questions to the user 105*a* such as, without limitation, for example, challenge questions requiring an answer based on data known to the user 105a, where data known to the user 105a including, without limitation, for example data associated with a word or sentence known to the user 105a and/or data associated with words, numbers, sentences, symbols known to the user 105a such as, without limitation, for example data known to the user based on, without limitation, for example a Mother's maiden name, any other name, town, city of birth, favourite pizza, favourite number, a string of numbers, an important date, favourite place or any other favourite thing or item known to the user 105a, any words or sentences made up by the user 105a or known to the user 105a, any words, sentences, numbers, symbols etc. associated with other personal data or experiences known to user 105a and the like and/or as the application demands; Take a photo of your face now and input it here; Thumb print your phone now, and/or any other type of challenge questions. For example, challenge questions associated with data known to the user 105a may include, without limitation, for example requesting the user 105a for a random set of letters, symbols or numbers. For example, asking for a random set of letters from a Mother's maiden name or any other data known to the user. For example, asking for the first and last letter of the Mother's maiden name or other data known by the user, or the $2^{nd}$ and $3^{rd}$ characters of the Maiden name or other data known by the user. Similarly, the QS server 103a may also request the service provider register with the QS system and provide challenge questions to prove the service provider is who they say they are. Furthermore, the user 105a may provide the KYC DLT record with data representative of an access control list and corresponding permissions/level of access to the asset, where the access control list that includes or lists, without limitation, for example data representative of those service providers allowed to access the KYC data item and/or any other users allowed to access the KYC data item; and the permissions/level of access to the asset (KYC data item) may include, without limitation, for example read access, write access, create access, update access and/or any other type of level of access etc. Each service provider or user allowed to access the KYC data item may be assigned a particular set of permissions/levels of access to the asset (KYC data item). Thus, when the service provider provides the KYC access token of user 105a to the QS server 103a hosting the QS KYC service, the QS server 103a may firstly challenge the service provider to ensure they are who they say they are and then, when the KYC DLT record is retrieved check whether the user 105a has given permission using the access control list information and/or the permissions/level of access information of the KYC DLT record to determine whether the service provider is allowed to access the KYC data. Thus, having passed the service provider challenge and also being on the access control list and having the required permissions/access level, the consumers KYC data may be provided to the service provider with appropriate access rights to the consumers KYC data (or document) as dictated by the consumer (or owner of the document) when access is granted.

The QS system(s) 170, 175 or 180 may request periodic updates to KYC data from users 105a-105n such as utility bills that are less than three months old etc. Alternatively, or additionally, the provision of this KYC data could be automated directly with the service providers (e.g. from a utility provider such as BT (RTM)). This could also be based on open banking protocols etc.

Although several QS applications and/or use cases have been described, this is for simplicity and by way of example only, and it is to be appreciated by the skilled person that many other QS applications and/or use cases using the QS systems 100, 165, 170, 175, 180, and/or 190, QREF locator and access tokens as described with reference to FIG. 1a-3d and/or as described herein are applicable as the application demands. Such QS applications and/or user cases, may include, without limitation, for example a quantum-safe (QS) web certification service for confirming in a QS manner the authenticity of a website's certificate; QS global distribution of digital assets; QS distribution of facts; QS authentication credentials; QS document storage and retrieval; QS data queries; and any other variety of applications and/or use cases as the application demands.

An example schema is now described in relation to, or for use with, without limitation, for example the QS systems 100, 165, 170, 175, 180, and/or 190 as described with reference to FIGS. 1a-1i. Each HSM 106a-106c of the QS servers 103a-103c may store the set of QD keys based on, without limitation, for example data representative of a one-to-one mapping of a set of quantum key identifiers (e.g. QSKD_KEY IDs) mapped to the set of QD keys (e.g. QSKD_KEY) distributed from, without limitation, for example the one or more QKD source(s) and/or QS satellites 171a-171c. This may be stored in each of the HSMs 106a-106c as a quantum key record that may include, without limitation, for example an quantum key identifier (e.g. HSM Keystore key number, or any other unique identifier allocated to the QD key) and the QD key (e.g. the SQKD generated key). For example, an example quantum key record schema for each QD key of the set of QD keys stored in an HSM 106a may be based on:

| Fieldname | Type | Value |
|---|---|---|
| QSKD_KEY_ID | Number | HSM Keystore key number |
| QSKD_KEY | KEY | 'SQKD generated key' |

Each DLT node 166a-166f of the QS servers 103a-103c and/or QS servers of users 104a-104c may store and/or access an encrypted data item in a QS DLT record that is addressed using the QREF locator generated by a QS server 103a-103c during when the data item is stored in the QS DLT 167. The DLT record for storing a data item in the QS DLT 167 may include, without limitation, for example data representative of: QREF locator (e.g. QREF) generated for the data item; the data item (e.g. DATA_ITEM) or encrypted data item that is encrypted with an available QD key (e.g. QSKD_KEY) from the set of QD keys; access permissions such as create, read, write, modify and any other permission type (e.g. ACL_ROLE_ID); access control data (e.g. ACL_ID) such as, for example, user identifiers of the users (e.g. USER_ID or CUSTNUM) with permissions for accessing, in some manner, the data item; and/or any other data required for storing the data item in the QS DLT 167.

For example, an example DLT record schema for each data item and corresponding QREF locator stored in the QS DLT 167 may be based on, without limitation, for example:

| Fieldname | Type | Value |
|---|---|---|
| QREF | KEY | 'CUSTNUM + CUSTDATA_ITEM_REF + QSKD_KEY_ID' |
| DATA_ITEM | BLOB | 'Uploaded Document/Data encrypted using QSK_KEY with QSKD_KEY_ID' |

| Fieldname | Type | Value |
|---|---|---|
| ACL_ID | TEXT | 'Email Addresses of Users allowed to Access the Data Item' |
| ACL_ROLE_ID | TEXT | 'Either Create, Modify, Read' |

Although the QS DLT record schema for each record of the QS DLT 167 is described, by way of example only but it is not limited to, QS DLT 167, it is to be appreciated by the skilled person that the DLT record schema may be used, without limitation, for example by any type of repository such as, without limitation, repository 107 as described herein with reference to FIG. 1*a* and QS system 100 and/or as the application demands.

In addition, the QS servers 103*a*-103*c* and/or registration servers 176*a*-176*b*, 182 or 182*a*-182*m* may operate a QS registry stored in the QS DLT 167 for registering users 104*a*-104*c* and/or 105*a*-105*n* (or customers of the QS system 140) and their association with one or more data items stored in the QS DLT 167. The QS registry includes a plurality of QS registration records in which each record may include, without limitation, for example one or more data fields and values representative of: a user identity (e.g. Customer Number/CUSTNUM or USER_ID) of said each user; a user secret associated with each user; a QREF locator (e.g. QREF or QREF_VALUE) associated with a data item stored by the user if any, or a QREF locator (e.g. QREF) associated with a data item the user is allowed to access in some manner; a data item reference identifier associated with the data item; a quantum key identifier (e.g. QSKD_KEY_ID) associated with the QD key (e.g. QSKD_KEY) available for use in encrypting the data item prior to storage/decrypting the encrypted data item during access; and an access control list (e.g. ACL) associated with the data item, which may include, by way of example only but is not limited to, identifiers of the users (e.g. CUSTNUM) that the user has given permission for accessing, in some manner, the data item. It is to be noted that CUSTNUM OR USER_ID may be a customer/user counter that provides a unique number (e.g. 12 digit number or more) for each customer/user of the QS system (e.g. QS system(s) 100, 165, 170, 175, 180 or 190). A different customer/user number is assigned to each new customer/user of the QS system (e.g. QS systems 100, 165, 170, 175, 180 or 190), which allows a single customer/user to have a number of data items stored/accessible on the QS system (e.g. QS systems 100, 165, 170, 175, 180 or 190). The QS DLT user registry record schema for each data item of a user/customer stored in the QS DLT 167 may be based on, without limitation, for example:

| Fieldname | Type | Value |
|---|---|---|
| CUSTNUM/USER_ID | Number | 000000000001 |
| QREF | KEY | 'CUSTNUM + CUSTDATA_ITEM REF + QSKD_KEY_ID' |
| CUSTDATA_ITEM_REF | Number | 000000000001 |
| QSKD_KEY_ID | Number | HSM Keystore key number or quantum key identifier |
| ACL_LIST | TEXT LIST | 'List of CUSTNUM/USER_IDs and/or Email Addresses of Users allowed to Access the Data Item' |

| Fieldname | Type | Value |
|---|---|---|
| USER_SECRET | Number/TEXT/ Image | 'User Secret' |

In addition to the QD keys from the identical sets of QD keys stored by the HSMs 106*a*-106*c* of the QS servers 103*a*-103*c* for storing the data items and/or for creating the QS dynamic communication channels of the QS network 101, the QS devices of the QS system 140 may also be further protected using a QS provider/operator hidden secret or key (e.g. QS_PROVIDER_SECRET). The QS provider hidden secret or key is only known by the QS provider and only used within the QS network 101 or QS network domain. This secret is not shared with anyone else other than QS servers 103*a*-103*c* and/or other devices of the QS provider for providing the QS network 101 and/or QS DLT 167 and the like.

In addition to the data items of each user being encrypted with an available QD key from the set of QD keys stored in an HSM 106*a*-106*c*, the data item of a user 104*a*-104*c* and/or 105*a*-105*n* may be further protected using a user secret, or corporate secret (CORPORATE_SECRET) if the user is a corporate user (e.g. users 104*a*-104*c*), USER SECRET or CORPORATE_SECRET. The user secret or corporate secret may be used by, without limitation, for example one of the users 104*a*-104*c* with an OGR and HSM for receiving sets of QD keys, and/or simple one of the users 105*a*-105*n* with a user secret. The user or corporate secret is injected into the data item by the user or corporate user for additional security so that the QS provider, or anyone else for that matter, does not have the ability to decrypt and access the user's or corporate user's data item stored in the QS DLT 167.

Although the above schema has been described with reference to QS DLT 167 of QS systems 165, 170, 175, 180 or 190 with reference to FIGS. 1*h* to 1*k*, this by way of example only but it is not limited to, only these QS systems, it is to be appreciated by the skilled person that the schema may be used, without limitation, for example by any type of QS system such as, without limitation, QS system 100 as described herein with reference to FIG. 1*a* and/or as the application demands.

Figure 4A:
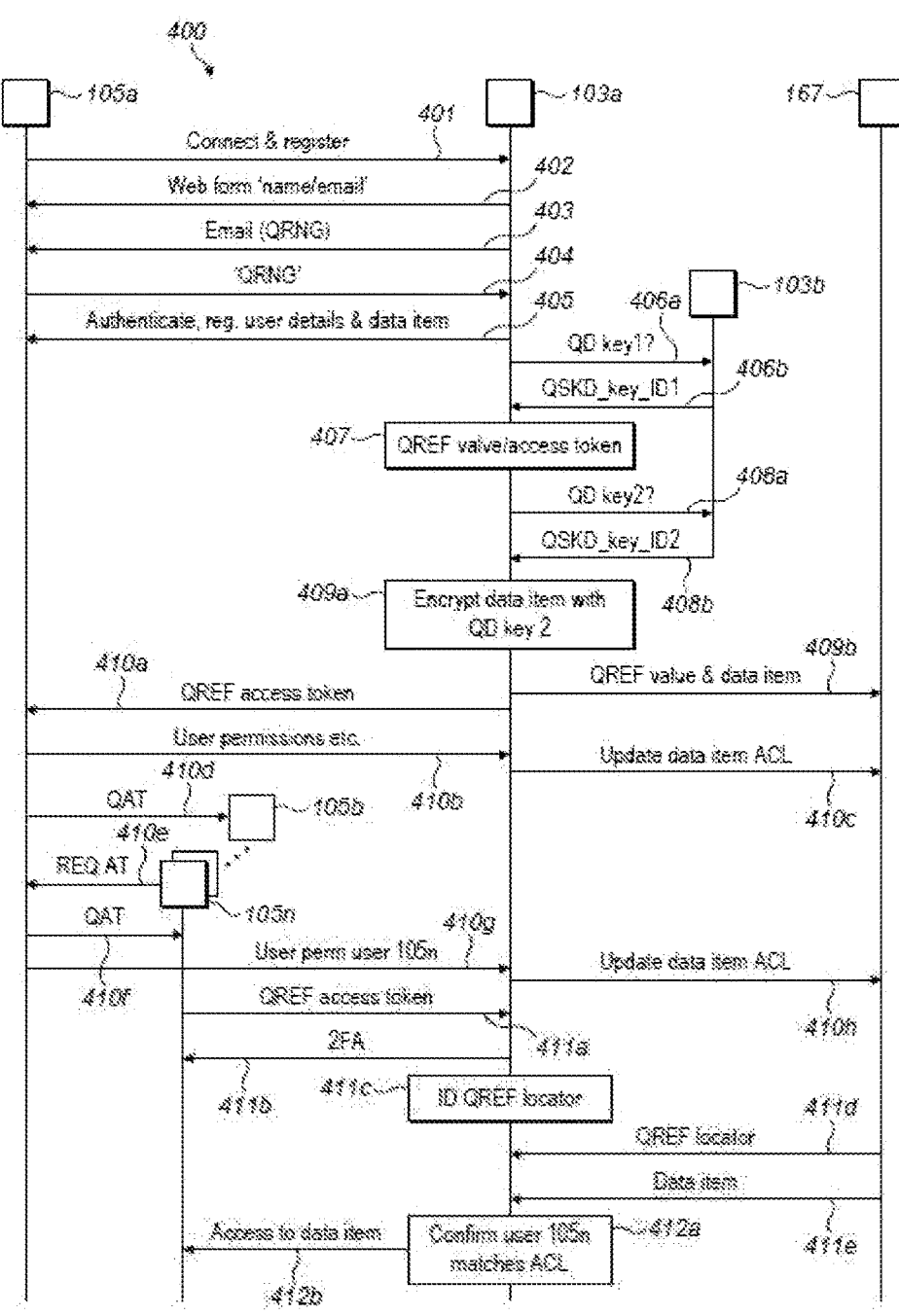
FIG. 4a is a flow diagram illustrating a process for another example data storage and retrieval service using a preferred example QS system of FIG. 1e.

FIG. 4*a* is a flow diagram illustrating an example QS Data Storage and Access service/application or use case 400 for users 104*a*-105*n* using, without limitation, for example a QS system 170, 175, or 180 according to the invention. For simplicity, reference numerals of FIG. 1*a*-1*k* will be used for similar or the same components as used in FIG. 4*a*. In this example, a QS DLT 167 is used as the repository and it is assumed that the above schema is used for the QS DLT user registration records, QS DLT records, HSM quantum key records and that the QS system 170, 175, or 180 uses SQKD for generating and distributing one or more sets of QD keys to the QS servers 103*a*-103*c* of the QS network 101. For example, there is a QS satellite network of a plurality of QS satellites 171*a*-171*c*, and the OGRCs 172*a*-172*c* for at least each QS server 103*a*-103*c* have been deployed and the corresponding QS DLT network 167 is in operation with QS dynamic communications channels between the DLT Nodes 166*a*-166*f* of the QS servers 103*a*-103*c* and/or QS servers/devices of users 104*a*-104*c* are established using the distributed sets of QD keys stored in each HSM 106*a*-106*f*. The flow diagram for the QS Data Storage and Access service/ application or use case 400 is based on the following steps of:

In step 401, a user of the plurality of users 105a-105n uses their device to connect to a QS server 103a of the QS system 140 of the QS provider/operation. The QS server 103a may be an interface between QS network 101 and the non-QS network 102. For example, the device of the user may connect to the QS provider's Registration site, in which the user 105a selects the "Register" button on the site for registering with the QS network 101.

In step 402, the user 105a may be presented with a "Name and Email" web form for entering and completing their user details, which may include fields based on, without limitation, for example data representative of user secret, user email, user name and the like.

Although several user details are described, this is by way of example only but the invention is not so limited, it is to be appreciated by the skilled person in the art that any other details may be required by the service, for example, the service may dictates the required details for a user to use the service and/or what other details the user is required to input for using the service, the details may include, by way of example only but is not limited to, user secret, user emails, user name, user identifier, customer identifier, additional security information and questions, biometric data, service confirmation facts, information the user or customer dictates for releasing the data item names, conditions for use, and/or locations, and/or any other details, user details, data item details and the like that may be required by the service.

In step 403, the QS server 103a hosting the QS provider registration site may transmit an email to the users email address with a Quantum Random Number Generated (QRNG) code (e.g. "601453"). On the device of the user 105a, a code challenge screen may be displayed or presented to the user 105a asking for the QRNG code to be entered for sending to the QS server 103a.

In step 404, the user 105a enters the QRNG code from the email into the code challenge screen prompted by the QS provider registration site hosted by QS server 103a (e.g. "601453" should be entered).

In step 405, the QS provider registration site authenticates the entered code, and if accepted, a web form for the user 105a to register their details. These details may include, without limitation, for example the user's 'CUSTNUM' or 'USER_ID' if they are an existing customer/user, otherwise a 'CUSTNUM' or USER_ID may be generated; a 'CUSTDATA_ITEM_REF' (or data item identifier) for the data item (e.g. Annual Report); and data representative of the data item for uploading to the QS network 101 and stored in the QS DLT 167. However, if authentication fails then the registration process is suspended pending input of a valid QRNG code and/or terminated.

In step 406a, the QS server 103a hosting the QS provider registration site requests the next available quantum safe key from the set of QD keys stored in the HSM 106a. For example, this may involve a 'Next Available Key' application programming interface (API) call to a controlling HSM 106b of QS server 103b that controls how each of the QD keys in the set of QD keys are allocated/distributed. The following quantum key schema may be used for storing the QD keys and one or more fields associated with the allocated QD key (e.g. QSKD_KEY1) may be provided.

| Fieldname | Type | Value |
|---|---|---|
| QSKD_KEY_ID | Number | HSM Keystore key number (e.g. quantum key identifier) |
| QSKD_KEY | KEY | 'SQKD Generated Key' (e.g. QD Key) |

In step 406b, data representative of an allocated QD Key (e.g. QSKD_KEY1) and/or the quantum key identifier (e.g. QSKD_KEY_ID1) of the allocated QD key may be provided to the QS server 103a. Each QS server 103a-103c includes an HSM 106a-106c, in which an identical set of QD keys are stored in each of the HSMs 106a-106c. Each QD key in the set of QD keys is allocated a unique quantum key identifier (e.g. QSKD_KEY_ID), which each of the HSMs 106a-106c can use to retrieve the corresponding QD Key (e.g. QSKD_KEY). In this example, in step 406b the quantum key identifier (e.g. QSKD_KEY_ID1) of the allocated QD key may be sent to the QS server 103a in response to the 'Next Available Key' API call. This can be used by the QS server 103a to retrieve from its HSM 106a the QD key corresponding to the quantum key identifier (e.g. QSKD_KEY_ID1).

In step 407, the QREF locator (e.g. QREF Value) is created by a QREF engine or generator (e.g. QREF locator engine 202 of FIG. 2a) on the QS server 103a hosting the QS provider registration site. For example, QREF Value=QREF_ENGINE(CUSTNUM, CUSTDATA_ITEM_REF, QSKD_KEY_ID1), which generates a QREF_Value, also referred to as a QREF locator. In another example, QREF Value=QREF_ENGINE(CUSTNUM, CUSTDATA_ITEM_REF, QSKD_KEY1), which generates the QREF_Value, also referred to as a QREF locator. Although several QREF_ENGINE functions are described, by way of example only but not limited to, these examples, it is to be appreciated by the skilled person that any suitable QREF_ENGINE function may be used based on any suitable type of input including, without limitation, for example CUSTNUM, CUSTDATA_ITEM_REF, QSKD_KEY, QSKD_KEY_ID, DATA_ITEM, ACL_ID, ACL_ROLE_ID and/or any other information associated with the user, data item, customer, user secret, etc. and the like, and/or as the application demands as long as a unique QREF locator/ QREF_VALUE is generated.

The QREF access token or link is also created based on the QREF locator (QREF_Value) by an QREF access token engine or generator (e.g. QREF access token engine 206 of FIG. 2b) on the QS server 103a hosting the QS provider registration site. For example, ACCESS TOKEN/ LINK=ACCESS_TOKEN_ENGINE(CUSTNUM, CUSTDATA_ITEM_REF, QSKD_KEY_ID). In another example, ACCESS TOKEN/LINK=ACCESS_TOKEN_ENGINE (QREF_VALUE). In another example, ACCESS_TOKEN/ LINK=HASH (QREF Value), where the ACCESS_TOKEN_ENGINE is a one-way HASH function. Although several ACCESS_TOKEN_ENGINE functions are described, by way of example only but not limited to, these examples, it is to be appreciated by the skilled person that any suitable ACCESS_TOKEN_ENGINE function may be used based on any suitable type of input including, without limitation, for example CUSTNUM, CUSTDATA_ITEM_REF, QSKD_KEY, QSKD_KEY_ID, DATA_ITEM, ACL_ID, ACL_ROLE_ID and/or any other information associated with the user, data item, customer, user secret, etc. and the like, and/or as the application demands as long as a unique QREF access token/ACCESS TOKEN/LINK is generated.

In step 408a the QS server 103a hosting the registration site requests the next available quantum safe key or QD key from the set of QD keys stored in the HSM 106a. For example, this may involve another 'Next Available Key' application programming interface (API) call to the controlling HSM 106b of QS server 103b that controls how each of the QD keys in the set of QD keys are allocated/distributed.

In step 408b, data representative of another allocated QD Key (e.g. QSKD_KEY2) and/or the quantum key identifier (e.g. QSKD_KEY_ID2) of the allocated QD key may be provided to the QS server 103a. In this example, in step 408b the quantum key identifier (e.g. QSKD_KEY_ID2) of the allocated QD key may be sent to the QS server 103a in response to the 'Next Available Key' API call. This can be used by the QS server 103a to retrieve from its HSM 106a the QD key corresponding to the quantum key identifier (e.g. QSKD_KEY_ID2).

In step 409a, the uploaded data item is encrypted using the allocated QD Key (e.g. QSKD_KEY with QSKD_KEY_ID2) as part of the write/storage process of storing data item in QS DLT 167. In step 409b, at least the data representative of, without limitation for example, the QREF locator (e.g. QREF Value) and the encrypted data item (e.g. DATA_ITEM) of the DLT data record schema are written to or stored in the QS DLT 167 by the QS server 103a hosting the QS provider registration site. As an option or additionally, the QREF locator is mapped to/stored in the HSM record associated with the other allocated QD Key (e.g. QSKD_KEY2) and/or quantum key identifier (e.g. QSKD_KEY_ID2) of the other allocated QD Key in the HSMs.

| Fieldname | Type | Value |
|---|---|---|
| QREF | KEY | QREF_ENGINE(CUSTNUM, CUSTDATA_ITEM_REF, QSKD_KEY_ID) |
| DATA_ITEM | BLOB | 'Uploaded Document/Data' |

In step 410a, the QREF access token or link corresponding to the stored data item is sent to the user 105a. For example, the stored data item's access link may be displayed on screen of the device of user 105a with a confirmation email sent to the user 105a. As the user is still in a two-factor authentication session with the QS server 103a, the user 105a can use this QREF access token to provide access to the QS data item held in the QS DLT 167 for inspection. For example, in steps 410b and 410c another input screen may be displayed on the device of user 105a to provide user permissions and/or user identifiers, customer numbers and/or email addresses of those other users 105b-105n that the user 105a wants to have authorised access to the data item. In step 410c, the QS server 103a may then update ACL data associated with the data item by writing further ACL data associated with other users that user 105a authorised access to the data item into the DLT data record corresponding to the data item. For example, the DLT data record schema for the data item may now include:

| Fieldname | Type | Value |
|---|---|---|
| QREF | KEY | e.g. QREF_ENGINE(CUSTNUM, CUSTDATA_ITEM_REF, QSKD_KEY_ID) |

-continued

| Fieldname | Type | Value |
|---|---|---|
| DATA_ITEM | BLOB | 'Uploaded Document/Data' |
| ACL_ID | TEXT | 'Email Addresses of Users allowed to Access the Data Item' |
| ACL_ROLE_ID | TEXT | 'Either Create, Modify, Read etc.' |

In step 410d, the user 105a (e.g. the OWNER) may then distribute the QREF access token (e.g. QAT) to those users 105b-105n that have permission to access the data item. Alternatively or additionally, in step 410e, a new user 105n may want access to the data item such that they request user 105a (e.g. the OWNER) for the QREF access token and to add their email to the authorised list of users for the data item. In step 410f, the user 105a may send the QREF access token (e.g. QAT) to the new user 105n. In addition, in step 410g, the user 105a (e.g. the OWNER) may update the authorised list of users using an input screen to provide further email addresses of those new users 105n to QS server 103a that are now authorised to access the data item. In step 410h, the QS server 103a may then update ACL data associated with the data item by writing further ACL data associated with the users 105n that user 105a authorised access to the data item into the DLT data record corresponding to the data item.

In step 411a, a user 105n from the plurality of users 105b-105n may connect with the QS server 103a for accessing the data item. The QS server 103 provides or displays an input screen for the user 105n to enter the access link/token corresponding to the data item and also their email details etc. In step 411b, the user 105n is then sent a two-factor authentication email confirmation code to confirm they are who they say they are. In step 411c, the QS server 103a also identifies the QREF locator associated with the access token/link (e.g. identifying the QREF locator from an QREF access token as described with reference to FIG. 1a to 3c). In step 411d, the QS server 103a is thus able to, if the QREF locator is identified, use the identified QREF locator to request the data item indexed by the QREF locator in the DLT 167 be retrieved using the QREF locator. In step 411e, the QREF locator is used to retrieve the DLT record associated with the data item and QREF locator from the QS DLT 167. The QREF locator is also used to retrieve the other allocated QD key (e.g. QSKD_KEY2) used to encrypt the retrieved data item, so that the retrieved data item in the retrieved DLT record is decrypted when fetched.

QREF—EXCLUSIVE XOR (TOKEN, QSKD_KEY)—
OTP RETURN TO CUSTOMER
QSKD_ITEM_ID is fetched from the HSM, this is used
to decrypt the QREF One Time Pad, inputs to hash.

In step 412a, confirmation whether ID of user 105n matches ACL data of the retrieved DLT record. For example, if the two-factor authentication email confirmation code is confirmed and the email of user 105n matches one of the emails in the ACL_ID of the DLT data record corresponding to the retrieved data item, then, in step 412b, the user 105n is provided access to the retrieved data item and may, without limitation, for example, Create, Modify, Update etc. the data item.

Figure 4B:
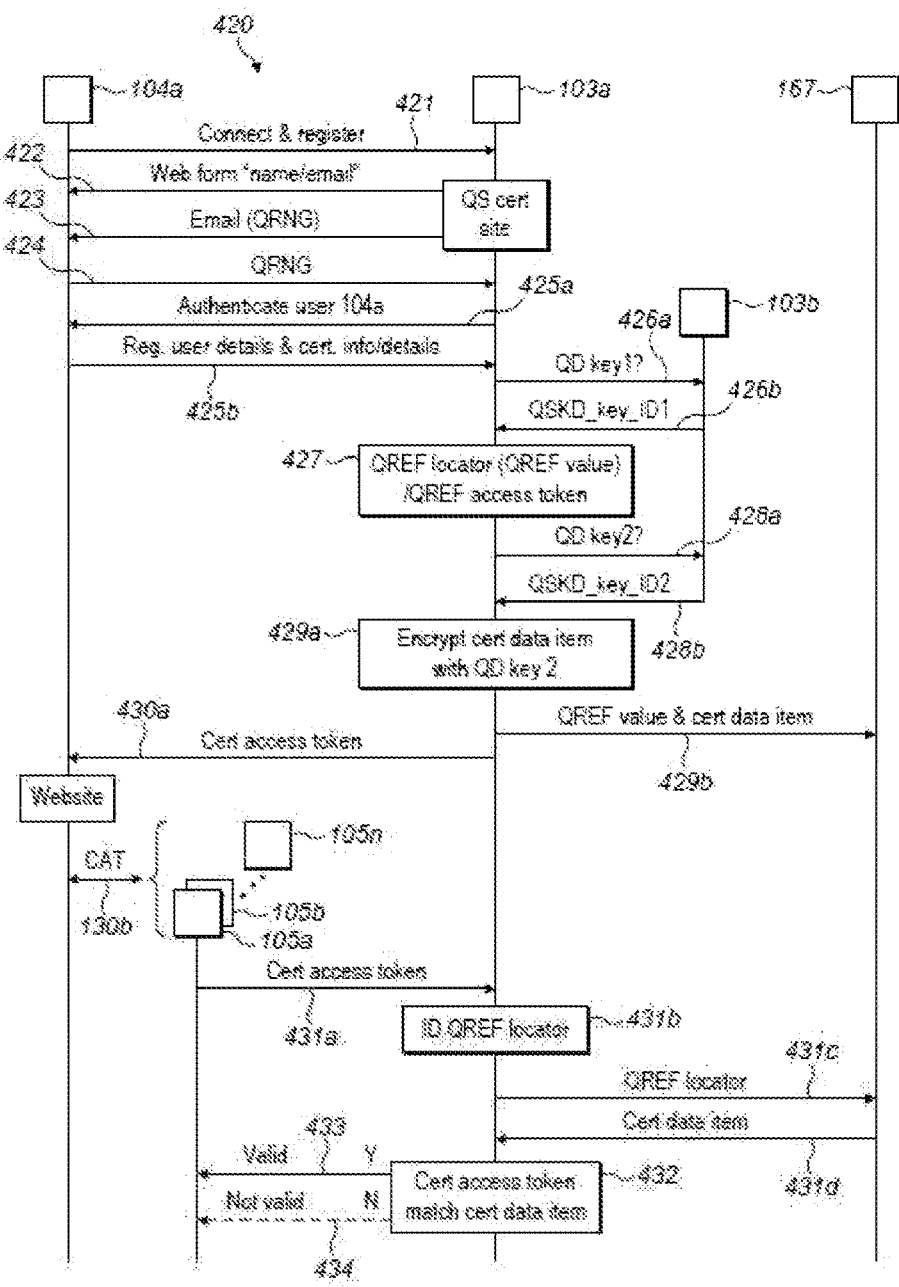
FIG. 4b is a flow diagram illustrating a process for another example web certification service using a preferred example QS system of FIG. 1e.

FIG. 4b is a flow diagram illustrating an example QS web certification application or use case 420 for users 104a-105n using, without limitation, for example a QS system 170, 175 or 180 according to the invention. For simplicity, reference numerals of FIGS. 1a-1k will be referred to for similar or the same components as used or described in FIG. 4a. In this example, it is assumed that the above schema is used for the QS DLT user registration records, QS DLT records, HSM quantum key records and that the QS system 170, 175 or 180 uses SQKD for generating and distributing one or more sets of QD keys to the QS servers 103a-103c of the QS network 101. For example, there is a QS satellite network of a plurality of QS satellites 171a-171c, and the OGRCs 172a-172c for at least each QS server 103a-103c have been deployed and the corresponding QS DLT network 167 is in operation with QS dynamic communications channels between the DLT Nodes 166a-166f of the QS servers 103a-103c and/or QS servers/devices of users 104a-104c are established using the distributed sets of QD keys stored in each HSM 106a-106f.

With the arrival and availability of quantum computers, there is a significant risk to a number of common cryptographic techniques such as, without limitation, for example the use of PKI X.509 certificates (e.g. Rivest-Shamir-Adleman (RSA), Elliptic Curve Digital Signature Algorithm (ECDSA)) that are commonly used for authentication over public networks such as, without limitation, for example the Internet. The QS system 170, 175 or 180 provides a suitable platform that may be leveraged to overcome the upcoming challenges for authentication by combining, without limitation, a QS network 101 with QREF locator and QREF access token generation, SQKD technologies, and QS DLT to enable safe registration, issuance, storage and verification of certificates by Internet users, in a manner that can be regarded as quantum safe for a post-quantum digital world.

The following is an example scenario for performing a QS Web Certification Service that may support current web certification formats such as, without limitation, for example X.509 certificate format in which users can confirm via quantum safe technology according to the invention the authenticity of a website's certificate. Although the QS systems 170, 175 or 180 (or even QS systems 100 and 165 of FIGS. 1a and 1h) are able to support the existing X.509 certificate formats, it is able to provide additional authentication and authenticity checks to users beyond what the X.509 standard can provide whilst being quantum safe.

In this example, one of the users 104a-104c may be or represent a corporation that wishes to register a web certificate with the QS system 170, 175 or 180 for authenticating their corporate website using quantum safe web certification for the one or more of the plurality of users 105a-105n visiting their corporate website. The corporate website may be hosted on the QS server/device of the user 104a. The flow diagram for the example QS web certification application/service or use case 420 is based on the following steps of:

In step 421, a user 104a from the plurality of users 104a-104c (e.g. a corporate user wanting to certify with corporate website) uses their QS server/device to connect to a QS server 103a of the QS system 170, 175 or 180 of the QS provider/operation. The QS server 103a is configured to be an interface between QS network 101 and the non-QS network 102 and act as a QS provider certificate registration site. For example, the QS server/device of the user 104a may connect to the QS provider's certificate registration site, in which the user 104a selects the "Register" button on the site for registering their web certificate with the QS network 101.

In step 422, the user 104a may be presented with a "Name and Email" web form for entering and completing their user details, which may include fields based on, without limitation, for example data representative of user secret (or corporate secret), user email, user name and the like. Other details may be captured dependent on use case and service.

In step 423, the QS server 103a hosting the QS provider certificate registration site may transmit an email to the users email address with a Quantum Random Number Generated (QRNG) code (e.g. "601453" or other QRNG code). On the QS server/device of the user 104a, a code challenge screen may be displayed or presented to the user 104a asking for the QRNG code to be entered for sending to the QS server 103a.

In step 424, the user 104a enters the QRNG code from the email into the code challenge screen prompted by the QS provider certificate registration site hosted by QS server 103a (e.g. "601453" should be entered).

In step 425a, the QS provider certificate registration site authenticates the entered code, and if accepted, in step 425b, a web form is provided for the user 104a to register their details such as, without limitation, for example their web certificate and other authentication details required to form the certificate. These details may include, without limitation, for example the user's 'CUSTNUM' or 'USER_ID' if they are an existing customer/user, otherwise a 'CUSTNUM' or USER_ID may be generated; a 'CERTDATA_ITEM_REF' (or certificate data item identifier) for the certificate data item (e.g. website certificate); and data representative of the certificate data item for uploading to the QS network 101 and stored in the QS DLT 167.

The X.509 certificate format may require authentication and user details depending on the version (e.g. version 1, 2, 3 or beyond) such as, without limitation, for example certificate serial number, signature algorithm identifiers (e.g. algorithm identifier, parameters, etc.), Issuer Name, Period of validity (e.g. not before, not after, etc.), subject name, subject's public key information (e.g. algorithms, parameters, key etc.), issuer unique identifier, subject unique identifier, extensions, signature (e.g. algorithms, parameters, encryption etc.), and/or any other required parameters to form an X.509 compliant web certificate. The user 104a may enter the required details to form an X.509 compliant web certificate, in which the QS server 103a may be configured to generate a certificate data item comprising data representative of, without limitation, for example a X.509 compliant web certificate for the website of user 104a. Alternatively, or additionally, the user 104a may simply provide a certificate data item, which may be, without limitation, for example a X.509 compliant web certificate generated by another authority and the like.

However, if authentication fails then the certificate registration process is suspended pending input of a valid QRNG code and other authenticating details and/or terminated.

In step 426a, the QS server 103a hosting the QS provider certificate registration site requests the next available quantum safe key from the set of QD keys stored in the HSM 106a. For example, this may involve 'Next Available Key' application programming interface (API) call to a controlling HSM 106b of QS server 103b that controls how each of the QD keys in the set of QD keys are allocated/distributed. The following quantum key schema may be used for storing the QD keys and one or more fields associated with the allocated QD key (e.g. QSKD_KEY1) may be provided.

| Fieldname | Type | Value |
|---|---|---|
| QSKD_KEY_ID | Number | HSM Keystore key number |
| QSKD_KEY | KEY | 'SQKD Generated Key' |

In step 426*b*, data representative of an allocated QD Key (e.g. QSKD_KEY1) and/or the quantum key identifier (e.g. QSKD_KEY_ID1) of the allocated QD key may be provided to the QS server 103*a*. Each QS server 103*a*-103*c* includes an HSM 106*a*-106*c*, in which an identical set of QD keys are stored in each of the HSMs 106*a*-106*c*. Each QD key in the set of QD keys is allocated a unique quantum key identifier (e.g. QSKD_KEY_ID), which each of the HSMs 106*a*-106*c* can use to retrieve the corresponding QD Key (e.g. QSKD_KEY). In this example, in step 426*b* the quantum key identifier (e.g. QSKD_KEY_ID1) of the allocated QD key may be sent to the QS server 103*a* in response to the 'Next Available Key' API call. This can be used by the QS server 103*a* to retrieve from its HSM 106*a* the QD key corresponding to the quantum key identifier (e.g. QSKD_KEY_ID1).

In step 427, the QREF locator (e.g. QREF Value) in relation to the certificate data item of user 104*a* (e.g. X.509 compliant web certificate) is created by a QREF engine or generator (e.g. QREF locator engine 202 of FIG. 2*a*) on the QS server 103*a* hosting the QS provider certificate registration site. For example, QREF Value=QREF_ENGINE (CUSTNUM, CERTDATA_ITEM_REF, QSKD_KEY_ID1), which generates a QREF_Value, also referred to as a QREF locator. In another example, QREF Value=QREF_ENGINE(CUSTNUM, CERTDATA_ITEM_REF, QSKD_KEY1), which generates the QREF_Value, also referred to as a QREF locator. Although several QREF_ENGINE functions are described, by way of example only but not limited to, these examples, it is to be appreciated by the skilled person that any suitable QREF_ENGINE function may be used based on any suitable type of input including, without limitation, for example CUSTNUM, CERTDATA_ITEM_REF, QSKD_KEY, QSKD_KEY_ID, CERT_DATA_ITEM, ACL_ID, ACL_ROLE_ID and/or any other information associated with the user, certificate data item, customer, user secret, etc. and the like, and/or as the application demands as long as a unique QREF locator/ QREF_VALUE is generated. The certificate access token or link is also created based on the QREF locator (QREF_Value) by an QREF access token engine or generator (e.g. QREF access token engine 206 of FIG. 2*b*) on the QS server 103*a* hosting the QS provider certificate registration site. For example, ACCESS TOKEN/ LINK=ACCESS_TOKEN_ENGINE(CUSTNUM, CERT-DATA_ITEM_REF, QSKD_KEY_ID). In another example, ACCESS TOKEN/LINK=ACCESS_TOKEN_ENGINE (QREF_VALUE). In another example, ACCESS_TOKEN/ LINK=HASH (QREF Value), where the ACCESS_TO-KEN_ENGINE is a one-way HASH function. Although several ACCESS_TOKEN_ENGINE functions are described, by way of example only but not limited to, these examples, it is to be appreciated by the skilled person that any suitable ACCESS_TOKEN_ENGINE function may be used based on any suitable type of input including, without limitation, for example CUSTNUM, CERTDATA_ITEM_ REF, QSKD_KEY, QSKD_KEY_ID, CERT_DATA_ ITEM, ACL_ID, ACL_ROLE_ID and/or any other information associated with the user, certificate data item, customer, user secret, etc. and the like, and/or as the application demands as long as a unique QREF access token/ACCESS TOKEN/LINK is generated.

Additionally or optionally, the QREF access token is also supplemented with data representative of the certificate details or certificate data item. Thus, when the certificate access token is sent to a user accessing the website of the user 104*a*, they receive as the certificate access token the generated QREF access token portion and some information associated with the certificate data item. When this is sent to the QS server 103*a*, the QS server 103*a* may use the generated QREF access token portion to deduce the QREF locator, and then use the certificate details in the certificate access token for matching with the certificate data item associated with the deduced QREF locator. Should a malevolent actor modify the certificate access token or the certificate data therein, then this will be detected by the QS server 103*a* as an invalid access token and/or mismatching certificate details.

In step 428*a* the QS server 103*a* hosting the registration site requests the next available quantum safe key or QD key from the set of QD keys stored in the HSM 106*a*. For example, this may involve another 'Next Available Key' application programming interface (API) call to the controlling HSM 106*b* of QS server 103*b* that controls how each of the QD keys in the set of QD keys are allocated/distributed. In step 408*b*, data representative of another allocated QD Key (e.g. QSKD_KEY2) and/or the quantum key identifier (e.g. QSKD_KEY_ID2) of the allocated QD key may be provided to the QS server 103*a*. In this example, in step 428*b* the quantum key identifier (e.g. QSKD_KEY_ID2) of the allocated QD key may be sent to the QS server 103*a* in response to the 'Next Available Key' API call. This can be used by the QS server 103*a* to retrieve from its HSM 106*a* the QD key corresponding to the quantum key identifier (e.g. QSKD_KEY_ID2).

In step 429*a*, the uploaded certificate data item is encrypted using the allocated QD Key (e.g. QSKD_KEY2 with QSKD_KEY_ID2) as part of the write/storage process of storing certificate data item in QS DLT 167. In step 429*b*, the QS server 103*a* hosting the QS provider certificate registration site may send the certificate data item of user 104*a* over QS communication channel of the QS network 101 for writing to or storing in the QS DLT 167. The certificate data item is encrypted with the allocated QD key (e.g. QSKD_KEY2) during the writing/storing procedure. For example, at least the data representative of, without limitation for example, the QREF locator (e.g. QREF Value) and the certificate data item (e.g. DATA_ITEM) of the DLT data record schema are written to or stored in the QS DLT 167 by the QS server 103*a* hosting the QS provider certificate registration site. The uploaded data item is encrypted during the write/storage process using the allocated next available QD key (e.g. QSKD_KEY2) that was used to generate the QREF locator (e.g. QREF VALUE). As an option or additionally, the QREF locator is mapped to/stored in the HSM record associated with the other allocated QD Key (e.g. QSKD_KEY2) and/or quantum key identifier (e.g. QSKD_KEY_ID2) of the other allocated QD Key in the HSMs.

| Fieldname | Type | Value |
|---|---|---|
| QREF | KEY | 'CUSTNUM + CERTDATA_ITEM_REF + QSKD_KEY_ID' |
| DATA_ITEM | BLOB | 'Certificate' |

In step 430*a*, the QREF access token or link corresponding to the stored certificate data item (or CERT ACCESS TOKEN) in relation to the user's website certificate is sent to the QS server of the user 104*a* that may be hosting the user's website. In step 430*b*, the website of the user 104*a* may then be configured to send the QREF access token/link associated with the certificate (e.g. CAT) to any web browser of one or more users from the plurality of users 105a-105n that may visit the web site of user 104a. For example, in step 430b, the QS server hosting the website of user 104a may receive a request for a certificate from a web browser of a user 105a from the non-quantum safe network 102. In response, the QS server hosting the website of user 104a may then send the certificate access token/link (e.g. CAT) to the web browser of user 105a.

In step 431a, the QS server 103a is configured to receive certificate access token/links from the devices of users 105a-105n. On receipt of a certificate access token/link from the web browser of user 105a, in step 431b, the QS server 103a of the QS system 140 is configured to identify the QREF locator associated with the certificate access token (e.g. identifying the QREF locator from an QREF access token as described with reference to FIG. 1a to 3c). In step 431c, the QREF locator is used to retrieve the DLT record associated with the certificate data item corresponding to the QREF locator from the QS DLT 167. In step 431d, the QS DLT 167 retrieves the DLT record associated with the QREF locator and sends it to the QS server 103a. The QREF locator is also used to retrieve the other allocated QD key (e.g. QSKD_KEY2) used to encrypt the retrieved data item, so that the retrieved data item in the retrieved DLT record is decrypted when fetched. In step 432, the QS server 103a confirms whether the received certificate access token is authentic based comparing the certificate data within the received certificate access token with that of the retrieved certificate data item of the retrieved DLT record. If there is a match, then, in step 433, the QS server 103a sends a valid notification to the device or web browser of user 105a confirming that the web site of user 104a is authentic and hence that the web site of user 104a hosted by their QS server is the correct website of user 104a. If there is not a match, then in step 434, the QS server 103a sends a not valid notification to the device or web browser of the user 105a confirming that the web site of the user 104a is not authentic.

For example, when a web browser of a user 105a wants to verify the web certificate (e.g. to be certain they are browsing the right website of user 104a and not being spoofed), the web browser of the user 105a sends the received certificate access link/token to the QS server 103a of QS system 170, 175, or 180. The QS server 103a is configured to deduce the QREF locator corresponding to the received certificate access token, and then checks the certificate data item information in the location pointed to by the QREF locator with the received certificate access token. The QS server 103a returns a notification indicating the received certificate access token is valid to the web browser of user 105a when the certificate access token matches the certificate data item information stored in the QS DLT 167.

Figure 5A:
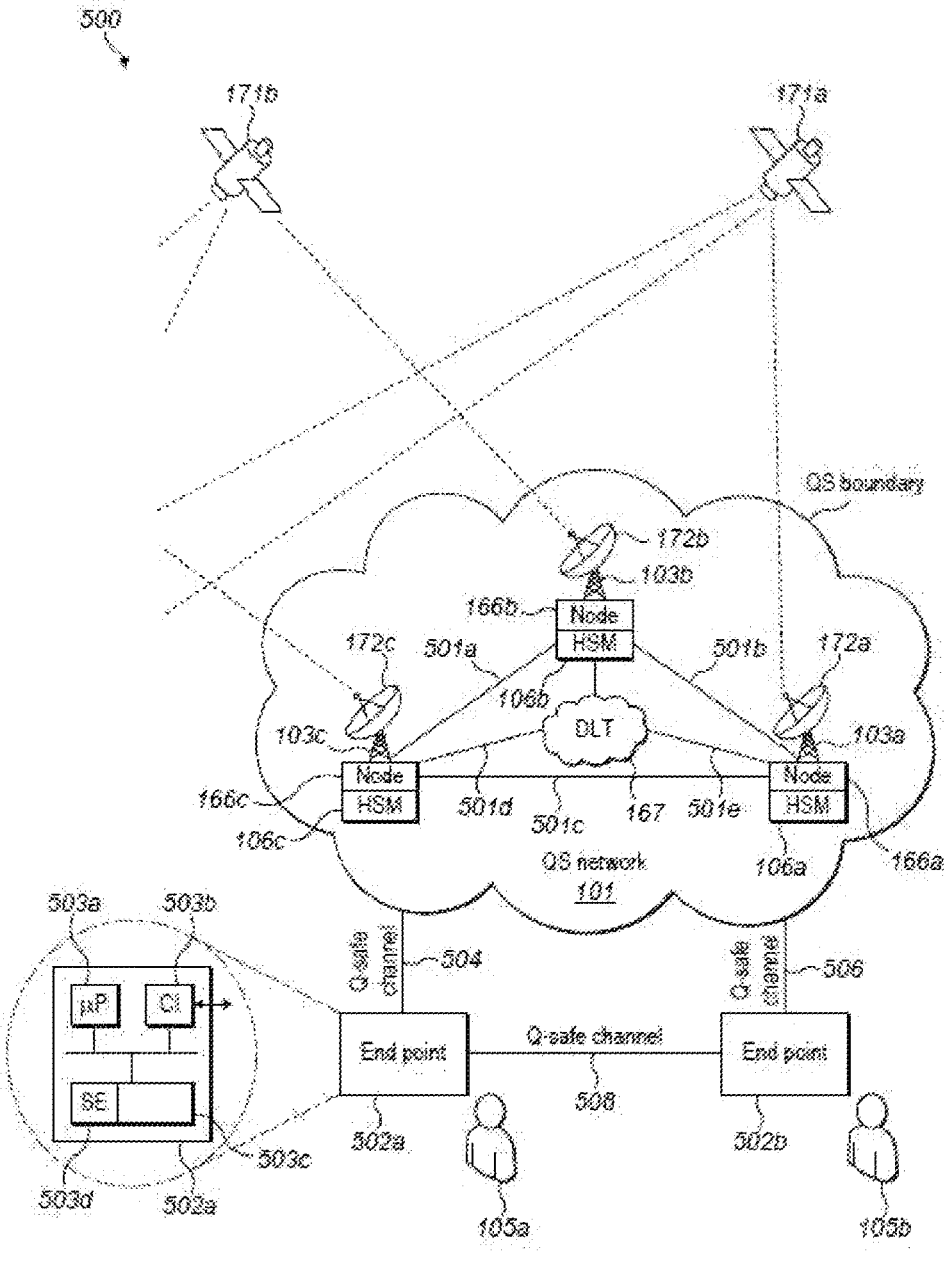
FIG. 5a is a schematic diagram illustrating an example of quantum-safe end-point communications using a QS system.

FIG. 5a is a schematic diagram illustrating an example of quantum-safe end-point communications using a QS system 500 according to the invention. For simplicity, reference numerals of FIGS. 1a-1l will be used for similar or the same components as used in FIG. 5a. In this example, it is assumed that the QS system 500 uses SQKD for generating and distributing one or more sets of QD keys from satellites 171a-171b to the QS servers 103a-103c of the QS network 101. For example, there is a QS satellite network of a plurality of QS satellites 171a-171c, and the OGRs 172a-172c for at least each QS server 103a-103c have been deployed to receive one or more sets of quantum distributed (QD) keys from satellites 171a-171b in a group protocol or multicast protocol, where a satellite 171a is configured to distribute an identical set of QD keys to each QS server 103a-103c before removing the set of QD keys from the satellites memory. As well, the corresponding QS DLT network 167 comprising DLT Nodes 166a-166c of the QS servers is in operation using a plurality of QS dynamic communications channels 501a-501e between the DLT Nodes 166a-166c of the QS servers 103a-103c creating QS DLT network 167. The QS dynamic communications channels are established using the distributed sets of QD keys stored in each of the HSMs 106a-106c of each of the QS servers 103a-103c. For example, each QS dynamic communications channel may be set up to use, without limitation for example symmetric encryption using QD keys from the set of QD keys over dark fibre and/or any other network infrastructure.

The QS network 101 is formed using the QS dynamic communications channels 501a-501e between QS servers 103a-103c that form DLT network 167. This forms a quantum safe boundary within which all communications between entities of the QS network is performed over QS dynamic communication channels 501a-501e. Non quantum-safe networks such as, without limitation, for example public networks, public switch telecommunications networks, Internet infrastructure, telecommunications networks, Wi-Fi networks and the like reside outside the QS boundary of the QS network 101. The QS system 500 may include a plurality of end-point devices 502a-502b operated by a plurality of users 105a-105b. In this example, FIG. 5a illustrates a first end-point device 502a of a first user 105a (e.g. the first user is authorised to use or operate the first end-point device 502a) and a second end-point device 502b of a second user 105b (e.g. the second user is authorised to use or operate the second end-point device 502b). In this case, the end-point devices 502a-502b of the plurality of users 105a-105b are located outside the quantum boundary, without limitation, using public networks and/or telecommunication networks for communications and the like.

End point devices 502a or 502b may comprise or represent any computing or communication device, without limitation, for example personal computers, laptops, portable communications devices, mobile phones, smart phones, IoT devices, and/or any other computing communications devices, and/or communication devices and the like. Each end-point device 502a may include, without limitation, for example a processing unit 503a, a communications interface 503b, a memory unit 503c in which the processing unit 503a is connected to the communications interface and the memory 503c. The communications interface 502b may include a transceiver, receiver and/or transmitter, and/or one or more input/output ports and the like for wireless and/or wired communication with a network and/or another computing device, end-point and the like.

In this example, the end-point device includes, without limitation, for example a secure processor/memory 503d. The secure processor/memory 503d may comprise or represent a secure tamper-resistant/tamper-proof processing unit that includes a secure processor and secure memory and is isolated from the processing unit 503a and memory 503c. Examples of a secure processor/memory 503d that may be used by the invention include, without limitation, for example a secure enclave or secure enclave processor (SEP) (RTM), TrustZone (RTM), SecurCore (RTM), Trusted Platform Module (RTM), Intel Security Essentials (RTM), Intel SGX and the like and/or as the application demands. The secure processor/memory 503d may be used, without limitation, for example data protection; performing Touch ID; performing Face ID; hardware based key manager; cryptographic key creation/generation/storage and processing;

secure storage of cryptographic keys; performing crypto-graphic operations using the cryptographic keys and the like; trusted execution of trusted software/applications and code and the like; and/or other processing operations when executing software and/or applications where security is desired during execution of the software and/or application and the like.

Using the QS system 500 and QS network infrastructure 101 according to the invention, end point devices 502a and 502b may be configured to set-up and register with the QS system 500 and request the set-up of QS communication channels 504 or 506 between end point devices 502a and 502b and the QS network 101, which enable quantum-safe communications between end point devices 502a and 502b via the QS network 101. Additionally, end point devices 502a and 502b may be configured to register, set-up with QS system 500 and/or request the set-up of QS communication channel 508 directly between end-point devices 502a and 502b. Examples of various applications and use cases of the QS system 500 according to the invention have been described with reference to FIG. 1a to 4b and the skilled person would appreciate that the same or similar principles, methods, process(es), apparatus, systems and servers may be used and applied in QS system 500 to enable QS commu-nications between end point devices 502a and 502b and QS network 101 and/or enable QS communications directly between end point devices 502a and 502b in accordance with the invention.

In order to set-up QS communication channels 504, 506, and 508 with QS system, the end-point devices 502a and 502b need to have one or more QD keys from the set of QD keys stored in the HSMs 106a-106c of QS servers 103a-103c that have been distributed in a quantum-safe manner (e.g. SQKD). This enables, without limitation, for example a QS communication channel 504 to be established between an endpoint device 502a and the QS network 101 based on symmetric encryption using a QD Key. Symmetric encryp-tion requires the same cryptographic key is used at both ends of a QS communication channel, thus each of the end-points 502a and 502b are supplied with at least one QD key from the set of QD keys stored in the HSMs 106a-106c of the QS servers 103a-103c. The challenge is how to ensure each end-point 502a and 502b may receive at least one QD key from the set of QD keys in a quantum-safe manner. Failing to distribute the QD keys to the end-points in a quantum-safe manner can result in non-quantum safe communications, or at best quantum-resistant communications. There are vari-ous options for ensuring end-point devices 502a and 502b are distributed in a quantum-safe manner with a QD key from the set of QD keys stored in the HSM mesh 106a-106c stored on the QS servers 103a-103c. These options are described in more detail with reference to FIGS. 5b to 5x.

For example, either at the point of shipment of the end-point devices 502a-502b such as, without limitation, for example at the manufacturer, which may have a QS server and/or registration node and capable of registering the devices prior to shipment, where QD keys from the set of QD keys may be installed on each end-point device. Alter-natively or additionally, the registration process may be carried out at the point of sale, or prior to deployment, such as, without limitation, for example, a retail shop with a QS server and/or a registration node with QS communication channel to a QS server/registration server and the like. In any event, these locations (e.g. manufacturer and/or retail ship) may be referred to as registration locations, each registration location (e.g. registration node) is required to have access to a set of QD keys for distribution in a QS manner to end-point devices. In this case, either the regis-tration nodes have the capability of a QS server 103a-103l, effectively making them a registration server, or the regis-tration nodes are deployed with a set of QD keys to enable them to communicate via a QS channel with a registration server and/or QS servers and so may have a set of QD keys for assigning to end-point devices 502a-502b delivered at regular intervals or a schedule and the like.

Figure 5B:
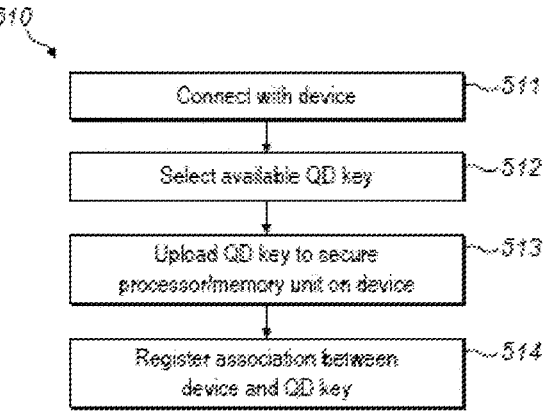
FIG. 5b is a flow diagram illustrating an example end-point registration process for QS communication using the QS system.

FIG. 5b is a flow diagram illustrating an example end-point device registration process 510 for use in establishing QS communication using the QS system 500 of FIG. 5a according to the invention. This end-point device registra-tion may be performed at the point of manufacture, shipment or deployment to a user of the device. The reference numer-als of corresponding features and/or devices, servers, com-ponents/elements, networks of FIG. 5a will be referred when describing end-point device registration process 510. The end-point device registration process 510 includes one or more of the following steps of:

In step 511, connecting the end-point device 502a directly to a QS server or registration node of the QS system. For example, an end-point device 502a may be physically con-nected to a QS server 103a-103c and/or an HSM 106a-106b of the QS system 500. Alternatively or additionally, the end-point device 502a may be physically connected to a registration node and/or registration server of the QS system 500 and/or of QS server 103a-103c and/or an HSM 106a-106b of the QS system 500.

In step 512, one or more available QD keys from a set of QD keys are selected for the end-point device. For example, one or more QD keys from the set of QD keys stored in an HSM 106a-106c may be assigned to the end-point device 502a. These assigned QD keys are end-point QD keys.

In step 513, the end-point QD keys are uploaded or installed into the secure processor/memory 503d of the end-point device 502a via the physical connection, which is quantum-safe.

In step 514, the end-point device is registered with the QS system. This may include registering an association between the end-point device and the assigned QD keys and/or assigned QD key identifiers. This enables the QS system to identify which QD keys were assigned to the end-point device and assists in establishing a QS communication channel 504 with the end-point device 502a. For example, the device identifier and other attributes of the end-point device 502a may be registered and stored in an "end-point device" account in the DLT 167 of the QS system 500. The assigned QD keys (end-point QD keys) or identifiers thereof may be stored in the end-point device account. This enables the QS system 500 to identify the end-point device 502a in future and retrieve the appropriate QD key or QD Key identifier from the device account that was assigned to the end-point device 502a to establish a QS communication channel therebetween.

FIG. 5c is a flow diagram illustrating another example end-point registration process 515 for enabling QS commu-nication using the QS system 500 of FIG. 5a according to the invention. The reference numerals of corresponding features and/or devices, servers, components/elements, networks of FIG. 5a will be referred when describing end-point device registration process 515. This end-point device registration may be also be performed at the point of manufacture, shipment or deployment to a user of the device. Rather than storing the assigned QD keys in the end-point device account in the DLT 167, each of the assigned QD keys may be stored in the DLT 167 as an encrypted data item and mapped to a QREF locator as described with reference to FIG. 1a-4b. For example, a QREF locator may be generated for each of the one or more QD keys assigned to an end-point device 502a, so-called end-point QD key(s). A QREF access token for each end-point QD key is generated based on the corresponding QREF locator. The end-point device registration process 515 includes one or more of the following steps of:

In step 516, connecting the end-point device 502a directly to a QS server or registration node of the QS system. For example, an end-point device 502a may be physically connected to a QS server 103a-103c and/or an HSM 106a-106b of the QS system 500. Alternatively or additionally, the end-point device 502a may be physically connected to a registration node and/or registration server of the QS system 500 and/or of QS server 103a-103c and/or an HSM 106a-106b of the QS system 500.

In step 517, one or more available QD keys from a set of QD keys are selected for the end-point device. For example, one or more QD keys from the set of QD keys stored in an HSM 106a-106c may be assigned to the end-point device 502a. These assigned QD keys are end-point QD keys.

In step 518, generating, for each end-point QD key of the one or more end-point QD key(s), generating a QREF locator for said each end-point QD key and a device identifier. In this case, the end-point QD key is a data item to be stored in the DLT 167. The QREF locator may be generated based on the data item, device identifier, and another available QD key from the set of QD keys for encrypting the data item when stored in the DLT 167. The QREF locator is a unique number that may be used as a link to or logical address of location of the encrypted data item comprising an end-point QD key stored in the DLT. FIGS. 1a-4b describe further example implementation details for generating and using QREF locators and the like.

In step 519, storing each of the end-point QD keys of end-point device 502a in an encrypted form in the DLT 167. For example, each end-point QD key may be stored in an encrypted data container/item in the DLT 167. The data item comprising the end-point QD key is encrypted using the said another available QD key from the set of QD keys, which was used to generate the QREF locator. The encrypted data item representing the end-point QD key is stored in the DLT 167 with the QREF locator, which provides a link to the location of the encrypted data item.

In step 520, mapping/linking the QREF locator of an end-point QD key to the QD Key identifier available QD key used to encrypt the end-point QD key data item. The HSMs 106a-106c may record the mapping between the QREF locator and the corresponding available QD key used to encrypt the end-point QD key data item. This allows the HSM 106a-106c to determine, using the QREF locator, which QD key can be used to decrypt the encrypted data item stored in the DLT 167 and addressed by the corresponding QREF locator.

In step 521, generating, for each end-point QD key of the one or more end-point QD key(s), a QREF access token based on the corresponding QREF locator. The QREF access token is generated using an irreversible or one-way function or operation based on the QREF locator. For example, the QREF access token may be a one-way hash of the QREF locator. The QREF access token is also a unique number or value that is different to the QREF locator. The irreversible or one-way function is designed or determined so that the QREF locator cannot be derived from the QREF access token. FIGS. 1a-4b describe further example implementation details for generating and using QREF access tokens and the like.

In step 523, the QREF access token(s) associated with the end-point QD keys and the end-point QD keys are uploaded/installed into the secure processor/memory 503d of the end-point device 502a via the physical channel in a QS manner. In addition, a QREF application or software may also be uploaded/installed on the secure processor/memory 503d of the end-point device 502a. The QREF application may include computer code or instructions, which when executed on the secure processor/memory 503d, cause the secure processor/memory 503d to connect, when instructed to do so by the user of the end-point device 502a, to the QS network 101 and establish a QS communication channel using an end-point QD key and the QREF access token. For example, the QREF application may be configured to send the QREF access token corresponding to an end-point QD key and the device identifier/credentials to the QS network 101, which will enable the QS network 101 to locate the device account and also to identify the QREF locator from the QREF access token and use the correct QD Key for establishing the QS communication channel with the end-point device, which uses the end-point QD key. The end-point QD key is the same as the QD key used by the QS network 101.

In step 523, registering an association between the QREF locator and the end-point device and/or device identifier in a device account of the QS system 500. For example, the QREF locator may be stored in the end-point device account of the end-point device 502a. When an end-point device connects to the QS network 101, it may first provide, e.g. via the QREF application, the QREF access token corresponding to the end-point QD key of the end-point device 502a the end-point device identifier of the end-point device 502a. This enables the QS network to identify the device account of the end-point device 502a and the QREF locator corresponding to the QREF access token. This enables the QS network 101 to locate the device account and also to identify the QREF locator from the QREF access token and use the correct QD Key for establishing the QS communication channel with the end-point device, which uses the end-point QD key. The end-point QD key is the same as the QD key used by the QS network 101.

FIG. 5d is a flow diagram illustrating an example user registration process 525 for QS communication using the QS system 500 of FIG. 5a based on a registered end-point device 502a according to the invention. The reference numerals of corresponding features and/or devices, servers, components/elements, networks of FIG. 5a will be referred when describing user registration process 525. A user may receive an end-point device 502a that may have been pre-registered with the QS system 500 based on end-point registration process(es) 510 and 515, and so the end-point device 502a is pre-installed in the secure processor/memory 503d with end-point QD key(s) and/or QREF access token(s), if any, corresponding to each end-point QD key(s). The device 502a may also be configured with a QREF application that may operate to establish a QS communication channel using the end-point QD keys, device identifier and/or QREF access token, if any and the like. The QREF application may also, without limitation, for example enable a user of the end-point device to register with the QS network 101, establish QS communication channels and store, access data items, and/or provide services/use cases in relation to the QS system 500 and the like and, the QREF application may include the functionality or one or more features of the QREF application described with reference to FIGS. 1i to 1k and/or 5a to 7b, and/or corresponding end-point functionality to implement the use cases as described with reference to FIG. 1a to 7b, combinations thereto, modifications thereof, and/or as described herein and/or as the application demands. The user registration process 525 includes one or more of the following steps of:

In step 526, establishing a QS communication channel with the QS network (e.g. with a QS server 103a-103c that may include registration node functionality and the like) using an end-point QD key, the device identifier/credentials and/or an QREF access token if any. For example, the end-point device 502a may send the QREF access token corresponding to an end-point QD key and the device identifier/credentials to the QS network 101 over a public network or via a website/webserver and the like. This will enable the QS network 101 to locate the device account and also to identify the QREF locator from the QREF access token and retrieve the correct QD Key for establishing the QS communication channel with the end-point device, which uses the corresponding end-point QD key. The end-point QD key is the same as the QD key used by the QS network 101. Even though the QREF access token may be transmitted over a public network to the QS network, no-one can possibly derive the QREF locator from the QREF access token, nor can anyone access the QS network 101 to retrieve the QD key. Furthermore, no keys are transmitted over a public network, so a QS communication channel can be established.

In step 527, the user 105a of the end-point device 502a registers with the QS network 101 and supplies user registration details, two-factor authentication challenges and responses, and other user credentials and the like. Once connected the user 105a can register themselves and obtain a QREF user account that is set-up by the QS network (e.g. via a QS server and/or via a registration node or registration server).

In step 528, registering the links between the registered user 105a and the registered endpoint device 502a. For example, the QREF user account may be associated with the end-point device 502a using the device identifier, such that the QD keys on the device may be registered with the user's QREF user account. Alternatively, or additionally, the QREF user account may be associated with the loaded QREF application on the end-point device 502a.

Once the user 105a has registered and has a QREF account on the QS system 500, they can use the QREF application and retrieve QD Keys stored in the secure processor/memory 503d of the end-point device 502a to establish a QS communication channel 504 with the QS network 101 of QS system 500 and use its QD Key along with a symmetrical algorithm hosted within the QREF Application to establish a quantum safe communication channel with the QS network 101 of the QS system 500. The established quantum safe channel can be used by the user to engage in any use case and/or application (e.g. access data items, store data items, KCY, QREF certificates, depositories, quantum safe communications with registered users of the QS system) and the like in relation to the QS system 500 and/or as described with reference to FIG. 1a to 7c, combinations thereof, modifications thereto and/or as described herein and the like.

In another example, in order for a user 105a to register with the QS system 500 and/or receive an end-point device 502a that is capable of establishing a QS connection with the QS system 500 over the public network, the user 105a may need to visit a shop or retail outlet with a registration node (e.g. a QREF enabled shop) that has a secure QS communication channel to the QS network 101. The registration node may be a secure single purpose device that includes an HSM with a single physical output connection (e.g. a single USB port out (OUT ONLY)) with a simple user interface screen. In some embodiments, the registration node may be configured to only allow an operator to press a button to export a numbered QD Key from a set of QD keys on the HSM via the physical output connection to an end-point device 502a of the user 105a. In this manner, the end-point device 502a may be pre-loaded with a finite number of pre-agreed QD keys. This enables a user 105a to buy and receive an end-point device 502a from the shop with the registration node in which the device is pre-loaded with QD Keys so that they can use the end-point device 502a to set up a generic QS channel in which they can then register with the QS system 500 and establish a QREF user account associated with the user 105a. Alternatively, or additionally, a user 105a may take their end-point device 502a into the shop with the registration node, where a number of one or more QD Keys may be uploaded to the end-point device 502a via the physical output connection of the registration node. The user 105a of the end-point device 502a may then operate the end-point device 502a to use the uploaded one or more QD Keys to establish a quantum safe channel 504 inside of which the user 105a sets up a QREF user account associated with the user 105a in the QS system 500. The user may then use the QS channel 504 to retrieve further personalized QD keys and the like for establishing further QS communication channels when required. This prevents overuse of QD keys.

In another example, rather than the user 105a being required to visit a retail outlet or shop with a registration server, a secure storage medium with one or more QD keys stored thereon may be sent to the user 105a. The secure storage medium may be sent via, without limitation, for example the postal system, post, courier and/or delivery service, secure data delivery service, and/or any other suitable secure data delivery, transportation and/or logistical support infrastructure for delivering sensitive and/or confidential materials, data, and the like. For example, the secure storage medium may be, without limitation, for example a single use dongle, a password encrypted flash drive, portable HSM and/or tamper-proof/resistant hard drive, and/or any other suitable secure storage medium and/or tamper-proof or resistant storage medium. In any event, the user 105a receives the secure storage medium with one or more QD keys stored thereon.

The secure storage medium may be configured for a single or one-time use with a one-time generic QD key stored thereon. This will enable the user 105a to connect the secure storage medium to their end-point device 502a and configure their end-point device 502a to set up a quantum safe channel 504 using the one-time generic QD key and/or with various two-factor-authentication and/or other authentication mechanisms for use in, without limitation, for example registering a QREF user account for the user 105a, registering the end-point device 502a of the user 105a, and/or uploading/downloading a QREF application for the end-point device 502a and further set of one or more QD keys assigned by QS system 500 (e.g. via QS server and/or registration server/node) and sent to the device of the user 105a via the QS channel 504.

Alternatively or additionally, the end-point device 502a may be configured to be a specific piece of equipment that is configured to receive the secure storage medium. The secure storage medium may be configured for a single use with a one-time generic QD key stored thereon in relation to the specific piece of equipment, end-user equipment and/or device 502a already supplied to the user or customer. The secure storage medium may be configured to be tied to the specific piece of equipment based on, without limitation, for example data representative of an identity number or MAC number of the equipment and the like, and so only operate if used with that specific piece of equipment (or end-point device 502*a*). For example, the specific piece of equipment may be a router, and the secure storage medium is tied to the identity number (e.g. id) of the router, which when inserted or connected to the router enables the QD key to be used by the router as described herein. In another example, the secure storage medium may be an SD card with a one-time QD key thereon that may be inserted into a router/QREF node/server physical device and operate only with that router/QREF node/server physical device. This will enable the secure storage medium to be connected to the specific device/equipment 502*a* and thus configure the specific device/equipment 502*a* to set up a quantum safe channel 504 using the one-time generic QD key and/or with various two-factor-authentication and/or other authentication mechanisms for use in, without limitation, for example registering a QREF user account for the user 105*a*, registering the specific device 502*a*, and/or uploading/downloading a QREF application for the specific device 502*a* and further set of one or more QD keys assigned by QS system 500 (e.g. via QS server and/or registration server/node) and sent to the specific device via the QS channel 504.

FIG. 5*e* is a flow diagram illustrating an example QS communication set-up process 530 between at least two end-point devices 502*a* and 502*b* using the QS system 500 of FIG. 5*a* according to the invention. The reference numerals of corresponding features and/or devices, servers, components/elements, networks of FIG. 5*a* will be referred when describing QS communication set-up process 530. A QS communication channel may be set-up between a first end-point device 502*a* and a second end-point device 502*b* using a communication path through the QS network 101. The QS network 101 includes at least two QS servers 103*a* and 103*c* that include DLT nodes 166*a* and 166*c* that are part of a DLT network 167 forming a repository for storing and accessing data items associated with users of the first and second end-point devices 502*a* and 502*b*. Each QS server 103*a* or 103*c* includes an HSM 106*a* or 106*c* with an identical set of QD keys stored thereon, which have been distributed to the HSMs 106*a*-106*c* using SQKD via satellites 171*a* and 171*b*. The QS servers 103*a*-103*c* communicate securely with each other and the repository formed by the DLT network 167 using quantum encryption based on one or more available QD keys from the set of QD keys. The QS communication set-up process 530 includes one or more of the following steps of:

In step 531, establishing a first communication channel 504 with a first end-point device 502*a* of a first user 105*a*. As described with reference to registration processes 510 and 515, the first end-point device 502*a* may already have a first QD key from the set of QD keys stored thereon from a previous device registration at point of manufacture, shipment or point of sale for QS communications with the QS network 101 or a QS server 103*c* of the QS network 101.

In a first example scenario, the user 105*a* of the first end-point device 502*a* may be a first time user and may not be registered with the QS network 101, in which case the first device establishes a first standard communication channel with the QS network 101 to register the user 105*a* as described with reference to registration process(es) 510 and 515 with reference to FIGS. 5*a*-5*c* and/or as described with reference to FIG. 1*i* or 1*j* and/or FIGS. 3*a*-4*b* and the like. After the registration process for the user 105*a* is completed and the end-point device 502*a* is associated with the registration of the user 105*a*, the first device 502*a* may establish a QS communication channel 504 with the QS network 101 using one or more QD keys already stored in the secure processor/memory 503*d*. The registration process is required so that the QS network 101 can associate the first device 502*a* with a first user 105*a* and thus identify the correct QD key, which is stored in the DLT 167 and HSM 106*a*-106*c* of the QS servers 103*a*-103*c*.

In a second example scenario, the user 105*a* of the first end-point device 502*a* may have already registered with the QS network 101 as described with reference to registration process(es) 510 and 515 with reference to FIGS. 5*a*-5*c* and/or as described with reference to FIG. 1*i* or 1*j* and/or FIGS. 3*a*-4*b* and the like. In this case, the user 105*a* may sign in to the QS network 101 via a webserver and/or website (e.g. operated on a QS server, registration server or the like) or via a QREF application installed on the first device 502*a* with their user credentials. The QS network 101 may then retrieve the corresponding QREF user account of the user 105*a* and subsequently identify the assigned endpoint QD key that may be used for QS communications between the first end-point device 502*a* and the QS network 101. Thus, a first QS communication channel 504 is established using a QD key securely stored on the end-point device 502*a* (e.g. provisioned either via a physical connection during the registration process 510 and/or 515) and the corresponding identical QD key identified by the QS network 101 stored in the DLT 167 and HSM 106*a*-106*c*.

Thus, without exchanging QD keys over a standard communication channel, both the end point device and the QS network 101 may establish a first QS communication channel 504 using a QD key securely stored on the end-point device 502*a* and the corresponding identical QD key identified by the QS network 101 stored in the DLT 167 and HSM 106*a*-106*c*.

In step 532, receiving, from the first end-point device 502*a*, a request for communicating with a second end-point device 502*b* of a second user 105*b* via the QS network 101. The first end-point device 502*a* may request via the first communication channel 504 (which may be a QS communication channel) to be connected to a second user 105*b*. The request may include the QREF number of the second user, an email address of the second user, or any type of data representative of an identifier of the second user 105*b* that the QS network 101 may use to identify the QREF user account associated with the second user 105*b*. The QS network 101 may retrieve the QREF user account associated with the second user 105*b* based on the request received from the first user 105*a*. If the QREF user account of the second user 105*b* does not exist, then this means the second user 105*b* has not registered with the QS network 101 or QS system 500, in which case, the QS network 101 sends a notification to the first user 105*a* of the first device 502*a*. If the QREF account of the second user 105*b* is retrieved, then the set-up process 530 proceeds to step 533.

In step 533, establishing a second communication channel 506 with the second device 502*b* of the second user 105*b*. Given that the second user 105*b* is registered with the QS system 500, the QS network 101 and the second device 502*b* may establish a second QS communication channel 506 using a QD key securely stored on the end-point device 502*b* (e.g. provisioned either via a physical connection during the registration process 510 and/or 515, or from a key update when connected via a QS channel with the QS network 101) and the corresponding identical QD key identified from the QREF user account of the second user 105*b* by the QS network 101, which is stored in the DLT 167 and HSM 106a-106c. The QS network may forward the connection request from the first user 105a to the second end-point device 502b of the second user 105b. If the second user 105b does not wish to connect with the first end-point device 502a of the first user 105a, then the QS network sends a notification to the first end-point device 502a and the process 530 terminates. Otherwise, if the second user 105b does wish to connect to the first user 105a via a QS communication channel, then the process 530 proceeds to step 534.

In step 534, receiving a response from the second end-point device 502b of the second user 105a to connect with the first end-point device 502a of the first user 105a. The QS network 101 may then notify both parties that a QS communication connection will be established. The request may include, without limitation, for example data representative of a QREF number of the second user, an email address of the second user, or any type of data representative of an identifier of the second user 105b that the QS network 101 may use to identify the QREF user account associated with the second user 105b. The QS network 101 may retrieve the QREF user account associated with the second user 105b based on the request received from the first user 105a. If the QREF user account of the second user 105b does not exist, then this means the second user 105b has not registered with the QS network 101 or QS system 500, in which case, the QS network 101 sends a notification to the first user 105a of the first device 502a. If the QREF account of the second user 105b is retrieved, then the set-up process 530 proceeds to step 533.

In step 535, establishing a QS communication channel 501c through the QS network based on an available QD Key selected from the set of QD keys.

In step 536, connecting the first end-point device 502a of the first user 105a with the second end-point device 502b of the second user 105b via a communication path that includes the first communication channel 504, the QS communication channel 501c and the second communication channel 506. As described above, at this point, the first and second communication channels 504 and 506 may be QS communication channels, which means the first and second end-point devices 502a and 502b may perform QS communications over the communication path provided by the QS network.

FIG. 5f is a flow diagram illustrating another example QS communication set-up process 540 between at least two end-point devices 502a and 502b using the QS system 500 of FIG. 5a according to the invention. The reference numerals of corresponding features and/or devices, servers, components/elements, networks of FIG. 5a will be referred when describing QS communication set-up process 540. In this example, a QS communication channel is set-up directly between a first end-point device 502a and a second end-point device 502b. The QS network 101 includes at least two QS servers 103a and 103c that include DLT nodes 166a and 166c that are part of a DLT network 167 forming a repository for storing and accessing data items associated with users of the first and second end-point devices 502a and 502b. Each QS server 103a or 103c includes an HSM 106a or 106c with an identical set of QD keys stored thereon, which have been distributed to the HSMs 106a-106c using SQKD via satellites 171a and 171b. The QS servers 103a-103c communicate securely with each other and the repository formed by the DLT network 167 using quantum encryption based on one or more available QD keys from the set of QD keys. At this stage, it is assumed that the first and second end-point devices 502a and 502b are registered with the QS network 101 and the first device has a first QD key from the set of QD keys stored thereon in its secure processor/memory 503d for QS communications with the QS network 101. It is also assumed that the second end-point device 502b has a second QD key stored thereon its secure processor/memory for QS communications with the QS network 101. The QS communication set-up process 540 includes one or more of the following steps of:

In step 541, establishing a first QS communication channel with the first end-point device 502a using the first QD key. The first end-point device 502a and the QS network 101 may establish a first QS communication channel 504 using a first QD key securely stored on the end-point device 502a and the corresponding identical first QD key identified, once the user 105a has signed in using their user credentials, i.e. after authentication of the first user 105a, by the QS network 101 stored in the DLT 167 and HSM 106a-106c.

In step 542, receiving, from the first end-point device 502a of the first user 105a, a connection request for QS communications with the second end-point device 502b of the second user 105b. The request may include the QREF number of the second user, an email address of the second user, or any type of data representative of an identifier of the second user 105b that the QS network 101 may use to identify the QREF user account associated with the second user 105b. The QS network 101 may retrieve the QREF user account associated with the second user 105b based on the request received from the first user 105a. If the QREF user account of the second user 105b does not exist, then this means the second user 105b has not registered with the QS network 101 or QS system 500, in which case, the QS network 101 sends a notification to the first user 105a of the first device 502a. If the QREF account of the second user 105b is retrieved, then the set-up process 540 proceeds to step 543.

In step 543, establishing a second QS communication channel 506 with the second end-point device 502b using the second QD key. The second end-point device 502b and the QS network 101 may establish a second QS communication channel 506 using a second QD key securely stored on the second end-point device 502b and the corresponding identical second QD key identified, once the second user 105b has signed in using their user credentials, i.e. after authentication of the second user 105b, by the QS network 101 stored in the DLT 167 and HSM 106a-106c. The QS network 101 may forward the connection request from the first user 105a to the second end-point device 502b of the second user 105b. If the second user 105b does not wish to connect with the first end-point device 502a of the first user 105a, then the QS network 101 sends a notification to the first end-point device 502a and the process 540 terminates. Otherwise, if the second user 105b does wish to connect to the first user 105a via a QS communication channel, then the process 540 proceeds to step 544.

In step 544, receiving, from the second end-point device 502b, a response to establish QS communications with the first end-point device 502b.

In step 545, a QS server 103a of the QS network 101 may allocate a third QD key from the set of QD keys in its HSM 106a for QS communications between the first and second end-point devices 502a and 502b.

In step 546, rather than setting up a QS communication channel through the QS network 101, the QS server 103a sends via the established first and second QS channels 504 and 506 data representative of a third QD key to the secure processor/memory units of the first and second end-point devices 502a and 502b, respectively, for use in QS communications therebetween. That is, on receipt of the third QD key, each of the first and second end-point devices 502*a* and 502*b* may use the third QD key to establish a third QS channel 508 directly between the first and second end-point devices 502*a* and 502*b*. Given the first and second end-point devices 502*a* and 502*b* now have the same third QD key, which has been distributed to them in a QS manner, i.e. over the first and second QS channels 504 and 506, the first and second end-point devices 502*a* and 502*b* may be configured to establish the third QS communication channel 508 directly with each other using the public telecommunication infrastructure 102 or public Internet 102 or a telecommunications network and the like. For example, each device 502*a* and 502*b* may establish a communications path and connect with each other over a telecommunications network and turn the communications path into the third QS communication channel by encrypting communications therebetween using the third QD key.

FIG. 5*g* is a flow diagram illustrating an example QS key assignment process 550 for use in setting up a QS communication channel between at least two end-point devices 502*a* and 502*b* using the QS system 500 of FIG. 5*a* according to the invention. The reference numerals of corresponding features and/or devices, servers, components/ elements, networks of FIG. 5*a* will be referred when describing QS key assignment process 550. In this example, the first and second end-point devices 502*a* and 502*b* may be registered in each QREF user account of the first and second users 105*a* and 105*b* as forming a communication pair, in which case, the QS network 101 may assign and/or store a QD Key in the DLT 167 to enable these end-point devices to receive a new QD key for direct QS communications therebetween as described, without limitation, for example with reference to FIG. 5*f*. The QREF locator and QREF access token technology as described herein may be used by the first and second users 105*a* and 105*b* for securely receiving a new QD key for setting up a QS channel therebetween using the new QD key.

The QS network 101 includes at least two QS servers 103*a* and 103*c* that include DLT nodes 166*a* and 166*c* that are part of a DLT network 167 forming a repository for storing and accessing data items associated with users of the first and second end-point devices 502*a* and 502*b*. Each QS server 103*a* or 103*c* includes an HSM 106*a* or 106*c* with an identical set of QD keys stored thereon, which have been distributed to the HSMs 106*a*-106*c* using SQKD via satellites 171*a* and 171*b*. The QS servers 103*a*-103*c* communicate securely with each other and the repository formed by the DLT network 167 using quantum encryption based on one or more available QD keys from the set of QD keys. At this stage, it is assumed that the first and second end-point devices 502*a* and 502*b* are registered with the QS network 101 and the first device has a first QD key from the set of QD keys stored thereon in its secure processor/memory 503*d* for QS communications with the QS network 101. It is also assumed that the second end-point device 502*b* has a second QD key stored thereon its secure processor/memory for QS communications with the QS network 101. The QS key assignment process 550 includes one or more of the following steps of:

In step 551, assigning, by the QS network or a QS server 103*a*, a further QD key from the set of QD keys in HSM 106*a* for use in QS communications between the first device 502*a* and the second device 502*b*, where the first and second devices 502*a* and 502*b* have been registered as forming a communication pair. The further QD key is to be stored as a QD key data item in the QS repository or DLT 167 using a QREF locator.

In step 552, generating, by the QS server 103*a*, a QREF locator corresponding to the QD key data item, where the HSM 106*a* may select another available QD key for encrypting the QD key data item. The QREF locator is generated based on the available QD Key and data representative of, without limitation, for example the QD key data item, one or more user secrets/credentials for the first or second user 105*a* or 105*b*, and/or data representative of access control list including the first and second users 105*a* and 105*b* and the like. The QREF locator may be generated in the same or similar manner as described with reference to FIG. 1*a* to 5*b*, combinations thereof, modifications thereto, and/or as described herein. The QREF locator is a unique value.

In step 553, generating, by the QS server 103*a*, a QREF access token associated with the QD key data item based on the QREF locator. The QREF access token is generated based on the QREF locator using an irreversible function and/or one-way function or operations (e.g. one-way hash function or the like). Generation may include one or more further input data such as data representative of, without limitation, for example the QD key data item identifier or descriptor, one or more user secrets/credentials for the first or second user 105*a* or 105*b*, and/or data representative of access control list including the first and second users 105*a* and 105*b* and the like. The QREF access token may be generated in the same or similar manner as described with reference to FIG. 1*a* to 5*b*, combinations thereof, modifications thereto, and/or as described herein. The QREF access token is a unique value different to the QREF locator, and is generated in such a manner that QREF locator cannot be derived from the QREF access token.

In step 554, a mapping/link is recorded in the HSMs 106*a*-106*c* between the QREF locator and the available QD key selected for use in encrypting the QD Key data item when stored in the DLT 167.

In step 555, storing the QD key data item encrypted with the available QD key in the QS repository or DLT 167 with the QREF locator. The QREF locator is used to address the QD key data item in the DLT 167.

In step 556, the QREF locator corresponding to the further QD key data item is associated with the registrations of the first user 105*a* and the second user 105*b* to form a communication pair. This means that the QREF access token associated with the further QD key can be used either the first or second user 105*a* or 105*b* to establish a QS communication channel 508 between the first and second end-point devices 502*a* and 502*b* of the first and second users 105*a* and 105*b*, respectively.

In step 557, sending the QREF access token associated with the further QD key data item to the first device 502*a* and the second devices 502*b* of the first and second users 105*a* and 105*b*, respectively, for use in QS communications therebetween. The QREF access token may be sent over a public network and/or over a QS communication channels 504 or 506 as the application demands and stored, without limitation, for example in the secure processing/memory of the respective end-point device. Given the QREF locator cannot be derived from the QREF access token and that a user has to enter their credentials when establishing a QS communication channel with the QS system 500, no-one else can use the QREF access token should it be intercepted. However, to minimise or avoid this risk, the QREF access token associated with the further QD key (QD key data item) may be sent over QS communication channels 504 and 506.

Figure 5H:
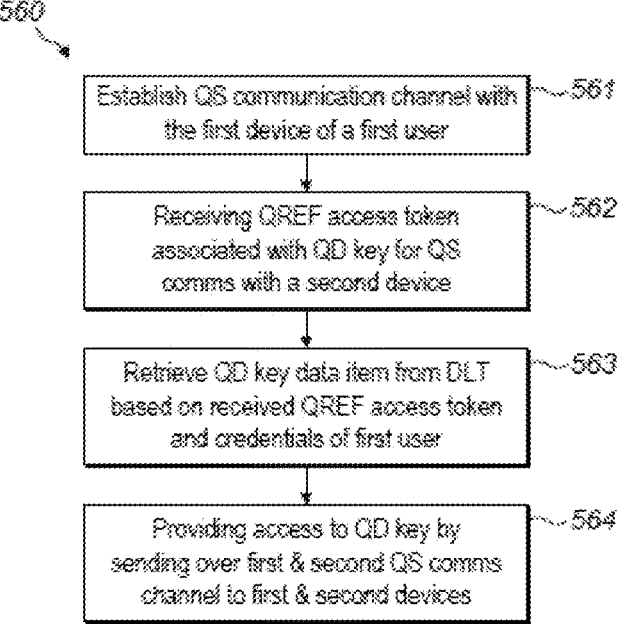
FIG. 5h is a flow diagram illustrating a QD key update process after a further QD key has been assigned during process of FIG. 5g.

FIG. 5*h* is a flow diagram illustrating an example QD key update process 560 after a further QD key has been assigned during process 550 and thus enabling at least two devices 502*a* and 502*b* to perform QS communications according to the invention. The reference numerals of corresponding features and/or devices, servers, components/elements, networks of FIG. 5*a* will be referred when describing QD key update process 560. In this example, each user 105*a* and 105*b* has stored on their end-point devices a QREF access token for accessing, when they wish to set up a QS communication channel 508 therebetween, an assigned QD Key stored in the DLT 167 of QS network 101. Each QS server 103*a* or 103*c* in QS network 101 includes an HSM 106*a* or 106*c* with an identical set of QD keys stored thereon, which have been distributed to the HSMs 106*a*-106*c* using SQKD via satellites 171*a* and 171*b*. The QS servers 103*a*-103*c* communicate securely with each other and the repository formed by the DLT network 167 using quantum encryption based on one or more available QD keys from the set of QD keys. At this stage, it is assumed that the first and second end-point devices 502*a* and 502*b* are registered with the QS network 101 and the first device has at least a first QD key from the set of QD keys stored thereon in its secure processor/memory 503*d* for QS communications with the QS network 101 as described with reference to FIGS. 5*a* to 5*c*. It is also assumed that the second end-point device 502*b* has at least one second QD key stored thereon its secure processor/memory for QS communications with the QS network 101 as described with reference to FIGS. 5*a* to 5*c*. The QD key update process 560 includes one or more of the following steps of:

In step 561, establishing QS communication channel 504 with the first device 502*a* of a first user 105*a*. The first end-point device 502*a* and the QS network 101 may establish a first QS communication channel 504 using a first QD key securely stored on the end-point device 502*a* and the corresponding identical first QD key identified, once the user 105*a* has signed in using their user credentials, i.e. after authentication of the first user 105*a*, by the QS network 101 stored in the DLT 167 and HSM 106*a*-106*c*.

In step 562, receiving, from the first device 502*a*, a QREF access token associated with a further QD key selected from the set of QD keys and registered for QS communications between the first user 105*a* and second user 105*b* as a communication pair. The further QD key for use in QS communications with the second device 502*a* of the second user 105*b*.

In step 563, retrieving, by a QS server 103*a* of the QS network 101, the QD key selected from the set of QD keys from the repository based on the received QREF access token and at least the credentials of the first user 105*a*. This involves identifying the QREF locator associated with the received QREF access token and may be based, without limitation, for example on the processes for identifying a QREF locator using an QREF access token as described with reference to FIGS. 1*a* to 4*b* and/or has herein described. In any event, it is assumed that the QREF locator is identified, which is used to access the QD key in the HSM 106*a* used to encrypt the QD key data item that the QREF locator indexes in the DLT 167. Thus, the encrypted QD key data item is retrieved from the DLT 167 using the identified QREF locator in which the HSM 106*a* may decrypt the retrieved encrypted QD key data item to extract the further QD key for use in QS communications between the first and second devices 502*a* and 502*b*.

In step 564, providing access to the further QD key retrieved from the DLT 167 by sending the retrieved further QD key to the first and second devices 502*a* and 502*b* over a first and second QS communication channel 504 and 506 for use by the first and second devices 502*a* and 502*b* in forming a third QS communication channel based on the further QD key. Sending the retrieved further QD key to the second device 502*b* may involve establishing the second QS communication channel 506 with the second end-point device 502*b* using a second QD key already stored on the second device 502*b*. The second end-point device 502*b* and the QS network 101 may establish a second QS communication channel 506 using a second QD key securely stored on the second end-point device 502*b* and the corresponding identical second QD key identified, once the second user 105*b* has signed in using their user credentials, i.e. after authentication of the second user 105*b*, by the QS network 101 stored in the DLT 167 and HSM 106*a*-106*c*.

As described in step 546 of process 540, on receipt of the further QD key, each of the first and second end-point devices 502*a* and 502*b* may use the further QD key to establish a third QS channel 508 directly between the first and second end-point devices 502*a* and 502*b*. Given the first and second end-point devices 502*a* and 502*b* now have the same further QD key, which has been distributed to them in a QS manner, i.e. over the first and second QS channels 504 and 506, the first and second end-point devices 502*a* and 502*b* may be configured to establish the third QS communication channel 508 directly with each other using the public telecommunication infrastructure 102 or public Internet 102 or a telecommunications network and the like. For example, each device 502*a* and 502*b* may establish a communications path and connect with each other over a telecommunications network and turn the communications path into the third QS communication channel by encrypting communications therebetween using the third QD key. Establishing the third QS communication channel 508 may further involve using the further QD key at each of the first and second devices 502*a* and 502*b* to generate a further cryptographic key that is used to establish the third QS communication channel 508. This may involve injecting a form of entropy using an agreed seed or another QS key exchange mechanism for generating the common cryptographic key based on the further QD key in a QS manner. This provides the advantage that the QS network 101 also does not know the generated cryptographic key that is used to establish the third QS communication channel 508, which provides a fully quantum-safe communications channel that prevents malicious actors, interceptors or eavesdroppers from listening in or being able to decrypt the communications session over the third QS communication channel 508 between the users 105*a* and 105*b* of the first and second devices 502*a* and 502*b*. Alternatively, the further QD key may simply be used by the first and second devices 502*a* and 502*b* to establish a direct QS communication channel 508 over public networks and the like, which may bypass QS network 101. However, the QS network 101 knows the further QD key.

Figure 5I:
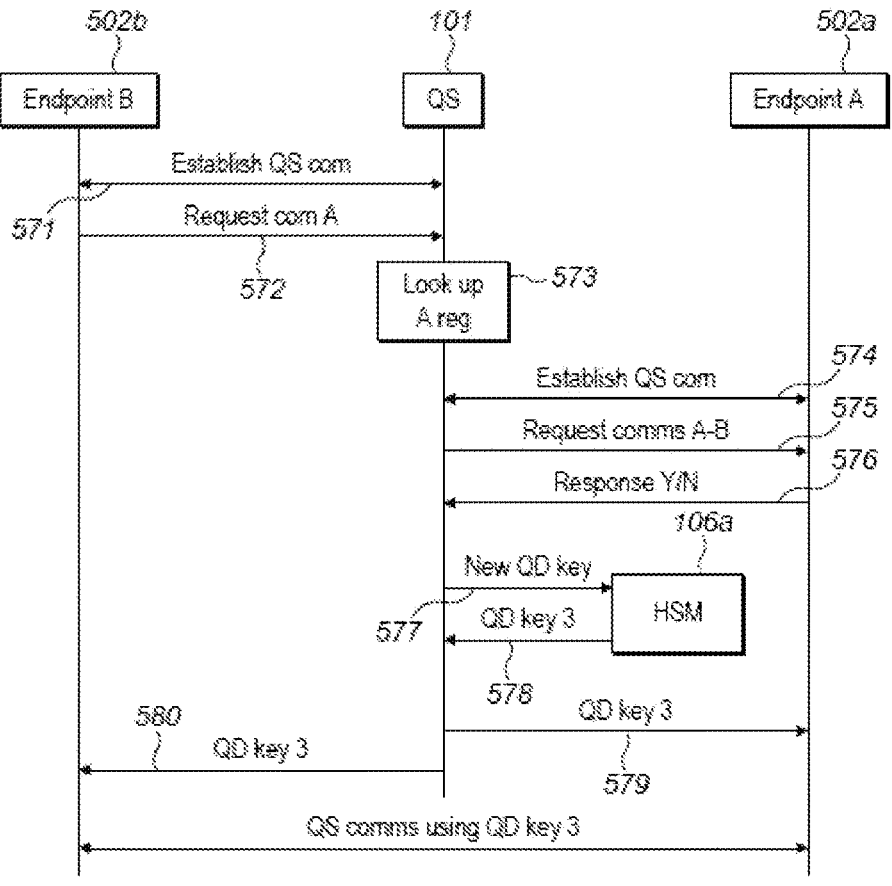
FIG. 5i is a signal flow diagram illustrating an example QS communications establishment process.

FIG. 5*i* is a signal flow diagram illustrating an example QS communications establishment process 570 between at least two devices 502*a* and 502*b* that have been registered in the QS network 101 of QS system 500 according to the invention. The reference numerals of corresponding features and/or devices, servers, components/elements, networks of FIG. 5*a* will be referred to when describing QS communications establishment process 570. In this example, each user 105*a* (e.g. Alice or 'A') and 105*b* (e.g. Bob or 'B') has stored on their end-point devices 502*a* and 502*b* a first end-point QD Key and a second end-point QD key for use in QS communications with the QS network 101. For example, the end-point devices 502a or 502b may be, without limitation, for example, mobile devices, smart phones, laptop or other computer devices, portable communications devices that do not have the capability of a QS server 103c, which are hosted at a location with an OGR 172c for receiving one or more sets of QD keys using SQKD over one or more satellites 171a-171b. Rather, as described with reference to FIGS. 1i-1j and/or FIGS. 5a-5d, the end-point devices 502a and 502b can be made quantum safe through a registration process.

Briefly, the registration process may be carried out, without limitation, for example either at the point of shipment (e.g. a manufacturer, a factory depot or a retail shop) or at a post-sale retail location or registration node/QS server and the like, which may be referred to as "Registration Locations". Essentially, a Registration Location should host at least a so-called QREF Node or registration node with a set of QD keys stored thereon in an HSM. The QREF Node may be connected to the QS network 101 via QS communication channels and may receive from the HSMs 106a-106c one or more QD Keys from the identical set of QD keys stored on the HSMs 106a-106c, where the one or more QD keys are distributed by the QREF node to one or more end-point devices 502a-502b. For example, either at shipment, or as an after sales process, an end-point device 502a or 502b is connected to the QREF Node via a physical connection (e.g. USB port/connection or other wired connection). The QREF Node deposits a QD key from the set of QD keys available at the QREF Node into the secure processor/memory unit 503d of the end-point device 502a (e.g. a Secure Enclave, TrustZone, and the like). The QREF Node may also preload a QREF application onto the end-point device 502a or 502b. The QREF application may be stored in the secure processor/memory of the end-point device 502a or 502b. The QREF application may be used by a user of the device 502a or 502b to, without limitation, register the user 105a or 105b with the QS Network 101 and/or establish QS communications channel with the QS network 101 and the like.

The QREF application may also, without limitation, for example enable a user 105a of the end-point device 502a to register with the QS network 101, establish QS communication channels and store, access data items, and/or provide services/use cases in relation to the QS system 500 and the like and, the QREF application may include the functionality or one or more features of the QREF application described with reference to FIGS. 1i to 1k and/or 5a to 7b, and/or corresponding end-point functionality to implement the use cases as described with reference to FIG. 1a to 7b, combinations thereto, modifications thereof, and/or as described herein and/or as the application demands.

Once an endpoint device 502a or 502b is received by a user 105a or 105b, the user 105a or 105b can register with the QS network 101 to establish a QREF user account for the user 105a or 105b and associate the loaded QREF application with the QREF account of the user 105a or 105b. The QREF application may be configured to thereafter retrieve the end-point QD key from the secure processor/memory and establish a QS communication channel (e.g. step 571) with the QS network 101 of the QS system. For example, the QREF application may execute within the secure processor/memory of the endpoint device 502a or 502b and use the retrieved QD Key along with a symmetrical cryptography algorithm hosted within the QREF Application or within the secure processor/memory of the device 502a or 502b to establish a QS communication channel (e.g. step 571) with the QS network 101 of QS system 500. Once established, the QS communication channel (e.g. step 571) can be used to engage in any application or use case in relation to the QS network 101 and/or QS system 500 and/or as described herein with reference to FIG. 1a to 7b.

Assuming that both the first and second users 105a and 105b of first and second devices 502a and 502b have registered with the QS network 101 and QS system 500 as described herein, the QS network 101 and QS system 500 are configured to assist an end point device 502b (e.g. Bob) to establish a QS communications channel with any other endpoint device 502a (e.g. Alice) anywhere in the world that is registered with the QS network 101 of QS system 500. The QS communications establishment process 570 may include the following steps of:

In step 571, the QREF application of the second end-point device 502b (e.g. Bob) uses a second endpoint QD Key stored thereon (e.g. previously provided for from the registration process or a QREF key update process and the like) to establish a second end-point QS communication channel 506 with the QS network 101.

In step 572, if user 105b (e.g. Bob) wishes to establish a third QS communication channel with user 105a (e.g. Alice), then the user 105b (e.g. Bob) needs to initially determine whether the user 105a (e.g. Alice) is registered with the QS network 101.

For example, user 105b may send a connection request to the QS network over the second endpoint QS channel 506. Alternatively or additionally, the user 105b may be able to query a directory of users on the QS network 101. For example, if user 105b (e.g. Bob) has a phone number or other identifying details associated with user 105a (e.g. Alice) such as, without limitation, a phone number, an email address or other identifier associated with user 105a (e.g. Alice), then the second endpoint device 502b may send a request to connect with user 105a of the first end-point device 502b to the QS network 101.

In step 573, a QS server of the QS network 101 on receipt of the request and any identifying details of the first user 105a (e.g. Alice) may determine whether this user 105a is registered with the QS system 500. If the user 105a (e.g. Alice) is registered with the QS system 500, the QS server of the QS network 101 may retrieve the appropriate first end-point QD Key associated with the first device 502a, which is also stored on the first device 502a (e.g. provided previously in the registration process or a Key update process etc.), for establishing, in step 574, a first endpoint QS communication channel 504 with the first user 105a (e.g. Alice). The first device 502a of the first user 105a (e.g. Alice) uses the first end-point QD key to communicate over the first endpoint QS communication channel 504 with QS network 101.

In step 575, the QS network 101 may send a connection query to determine whether the user 105a (e.g. Alice) of the first endpoint device 502a wishes to connect with user 105b of the second endpoint device 502b. In step 576, the first endpoint device 502a of the first user 105a (e.g. Alice) sends a response message to the QS network over the first endpoint QS channel 504 indicating whether the user 105a wishes to connect with user 105b. If the first user 105a (e.g. Alice) agrees to the contact with the first user 105b (e.g. Bob), the first and second user 105a and 105b (e.g. Alice and Bob) have effectively agreed to a key exchange.

In step 577, the QS network 101 requests a new QD key from an HSM 103a of the QS network 101, which selects an available new QD key for use by the first and second devices 502a and 502b to establish a QS communication channel 508. In step 578, the HSM 103a delivers a QD Key ID of the new QD Key or the new QD Key to a QS server of the QS network 101. In step 579, the new QD Key is sent over the first endpoint QS channel 504 to the first device 502a of the first user 105a (e.g. Alice) and stored in the secure processor/memory 503d of the first device 502a. In step 580, the new QD Key is also sent over the second endpoint QS channel 506 to the first device 502a of the second user 105b (e.g. Bob). Thus, inside their bilateral QS channels with the QS network 101, the second user 105b (e.g. Bob) and the first user 105a (e.g. Alice) receive a new QD Key, which is the same. The QD Key or QD Key ID number they now associate with the communication pair channel between them for all future use. That is, secure processor/memory of the first endpoint device 205a of the first user 105a and the second endpoint device of the second user 105b may record an association with the new QD Key and the communication pair of the first and second users 105a and 105b for use in future communications between the first and second users 105a and 105b. In step 570, the first device 502a and the second device 502b now establish an IP connection directly between them and the third QS communication channel 508 is formed when the IP connection is encrypted using the new QD key that is associated with their communication pair.

Figure 5J:
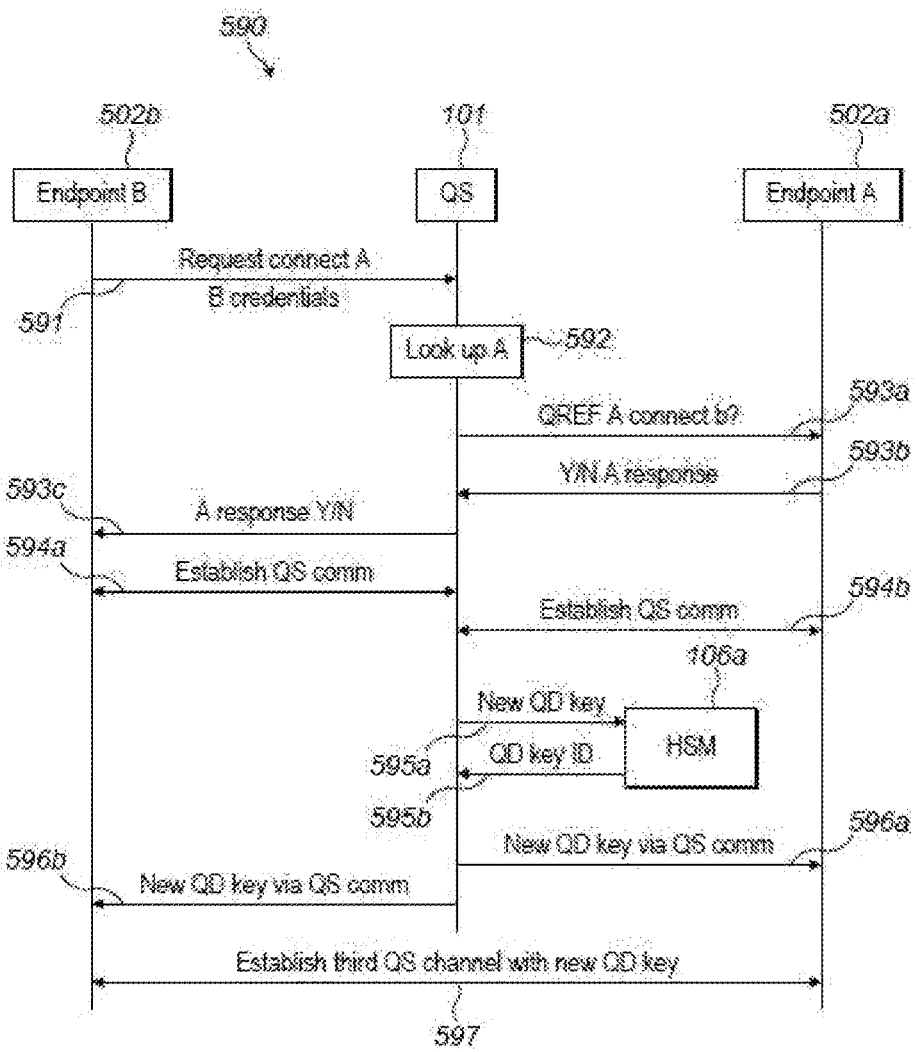
FIG. 5j is a signal flow diagram illustrating another example QS communications establishment process.

FIG. 5j is another signal flow diagram illustrating another example QS communications establishment process 590 between at least two devices 502a and 502b that have been registered in the QS network 101 of QS system 500 according to the invention. The reference numerals of corresponding features and/or devices, servers, components/elements, networks of FIG. 5a will be referred to when describing QS communications establishment process 590. In this example, the QS communications establishment process 570 of FIG. 5i has been modified in which the initial communications with the QS network 101 are over standard communications channels. Each user 105a (e.g. Alice or 'A') and 105b (e.g. Bob or 'B') has stored on their end-point devices 502a and 502b a first end-point QD Key and a second end-point QD key for use in QS communications with the QS network 101. For example, the end-point devices 502a or 502b may be, without limitation, for example, mobile devices, smart phones, laptop or other computer devices, portable communications devices that do not have the capability of a QS server 103c, which are hosted at a location with an OGR 172c for receiving one or more sets of QD keys using SQKD over one or more satellites 171a-171b. Rather, as described with reference to FIGS. 1i-1j and/or FIGS. 5a-5i, the end-point devices 502a and 502b can be made quantum safe through a registration process.

Assuming that both the first and second users 105a and 105b of first and second devices 502a and 502b have registered with the QS network 101 and QS system 500 as described herein, the QS network 101 and QS system 500 are configured to assist an end point device 502b (e.g. Bob) to establish a QS communications channel with any other endpoint device 502a (e.g. Alice) anywhere in the world that is registered with the QS network 101 of QS system 500. The QS communications establishment process 590 may include the following steps of:

In step 591, the second endpoint device 502b (e.g. Bob) sends a request to connect with user 105a (e.g. Alice) of the first end-point device 502b to the QS network 101. This may involve, when user 105b (e.g. Bob) wishes to establish a third QS communication channel 508 with user 105a (e.g. Alice), the user 105b (e.g. Bob) initially determining whether the user 105a (e.g. Alice) is registered with the QS network 101. For example, user 105b may send a connection request to the QS network over the second endpoint QS channel 506. Alternatively or additionally, the user 105b may be able to query a directory of users on the QS network 101. For example, if user 105b (e.g. Bob) has a phone number or other identifying details associated with user 105a (e.g. Alice) such as, without limitation, a phone number, an email address or other identifier associated with user 105a (e.g. Alice), then the second endpoint device 502b (e.g. Bob) sends a request to connect with user 105a (e.g. Alice) of the first end-point device 502b to the QS network 101.

In step 592, a QS server of the QS network 101 on receipt of the request and any identifying details of the first user 105a (e.g. Alice) may determine whether this user 105a is registered with the QS system 500. If the user 105a (e.g. Alice) is registered with the QS system 500.

In step 593a, when the first user 105a is registered with the QS network 101, the QS network 101 may send a connection query to determine whether the user 105a (e.g. Alice) of the first endpoint device 502a wishes to connect with user 105b of the second endpoint device 502b.

In step 593b, the first endpoint device 502a of the first user 105a (e.g. Alice) sends a response message to the QS network over the first endpoint QS channel 504 indicating whether the user 105a wishes to connect with user 105b.

In step 593c, the QS network 101 may send a confirmation response query the second user 105b (e.g. Bob) confirming whether the first user 105a (e.g. Alice) wishes to connect. If the first user 105a (e.g. Alice) agrees to the contact with the second user 105b (e.g. Bob), the first and second user 105a and 105b (e.g. Alice and Bob) have effectively agreed to a key exchange.

In step 594a, the second device 502b of the second user 105b (e.g. Bob) establishes a second endpoint QS channel 506 with the QS network 101. For example, the QREF application of the second end-point device 502b (e.g. Bob) uses a second endpoint QD Key stored thereon (e.g. previously provided for from the registration process or a QREF key update process and the like) to establish the second end-point QS communication channel 506 with the QS network 101. This is a bilateral channel.

In step 594b, the first device 502a of the first user 105a (e.g. Alice) establishes a first endpoint QS channel 504 with the QS network 101. For example, the QREF application of the first end-point device 502a (e.g. Alice) uses a first endpoint QD Key stored thereon (e.g. previously provided for from the registration process or a QREF key update process and the like) to establish the first end-point QS communication channel 504 with the QS network 101. This is also a bilateral channel.

In step 595a, the QS network 101 requests a new QD key from an HSM 103a of the QS network 101, which selects an available new QD key for use by the first and second devices 502a and 502b to establish a third QS communication channel 508. In step 595b, the HSM 106a delivers a QD Key ID of the new QD Key or the new QD Key to a QS server of the QS network 101.

In step 596a, the new QD Key is sent over the first endpoint QS channel 504 to the first device 502a of the first user 105a (e.g. Alice) and stored in the secure processor/memory 503d of the first device 502a.

In step 596b, the new QD Key is also sent over the second endpoint QS channel 506 to the first device 502a of the second user 105b (e.g. Bob).

Thus, inside their bilateral QS channels with the QS network 101, the second user 105b (e.g. Bob) and the first user 105a (e.g. Alice) receive a new QD Key, which is the same. The QD Key or QD Key ID number they now associate with the communication pair channel between them for all future use. That is, secure processor/memory of the first endpoint device 205*a* of the first user 105*a* and the second endpoint device of the second user 105*b* may record an association with the new QD Key and the communication pair of the first and second users 105*a* and 105*b* for use in future communications between the first and second users 105*a* and 105*b*.

In step 597, the first device 502*a* and the second device 502*b* now establish an IP connection directly between them and the third QS communication channel 508 is formed when the IP connection is encrypted using the new QD key that is associated with their communication pair.

FIG. 6*a* is a flow diagram illustrating an example QS key sharing/transaction signing process 600 using a QS system as described with reference to any of FIG. 1*a* to 5*i*, combinations thereof, modifications thereto and/or as described herein. Although external DLT solutions may provide many advantages from major cost savings in back office operations by corporations/companies (e.g. financial services companies) through to significant advances in quality through the generation of immutable proof of transaction details and the like, the DLT market has not been able to establish a sufficient level of trust by corporations/companies and end-users in adopting or using the technology. For example, there has been a lot of bad publicity in recent years in relation to malicious users/agents or hackers taking advantage of various DLT signature schemes by stealing a user's signature signing credentials and thus being able to masquerade as the user and steal and/or access that user's DLT assets using the signing credentials. For example, a malicious actor may steal a user's DLT/Blockchain assets (e.g. Bitcoin and the like) by gaining access to a user's private cryptographic keys (e.g. signing credentials) that are used for signing DLT/Blockchain transactions. This has led to user's keeping their signing credentials (e.g. private keys) offline, which is recommended best practice, and/or using secure wallet facilities and the like. However, such systems are either inconvenient to use (e.g. offline requires the user keeps a copy of the credentials on their person should they wish to sign a DLT transaction at any time) and/or still capable of being attacked by malicious actors/hackers and the like (e.g. the user has to trust the security measures a secure wallet facility had built in). Thus, there is a need for a more secure system/mechanism that enables secure signature schemes to be used to confirm a transaction by a user or between user(s)/parties into a ledger.

The QS system as described with reference to FIG. 1*a*-5*i* uses a repository that may be based on distributed ledger technologies (DLT) network. A repository that is based on DLT, i.e. a DLT repository is leveraged by the QS system and the QREF locator and QREF access token process(es), engine(s), mechanisms and apparatus for enabling access to the data items stored in the DLT repository from any geographic location with a QS server, QS Registration server, and/or RS nodes and the like that are connected to the QS network of the QS system according to the invention. The QS system can be leveraged to create an alternative signature scheme that would deliver a high level of trust for users of the DLT within QS system and/or users of external DLT systems when using a QS key sharing/signature scheme as described herein.

In essence, a DLT system can make use of the QS system and the QS network to enable secure signing of transactions into a ledger of the DLT system using, without limitation, for example a "numbered" key stored in the meshed network of QS servers, each server including an HSM, (e.g. meshed HSMs) in a manner that every QS server and/or node of a QS server in the QS network can recognise. This enables the QS system to receive a request for signing a transaction from a user, retrieve the corresponding signing key (or "numbered" key) and sign the transaction using the signing key on behalf of the user, without the signing key leaving the QS network, where the signed transaction is delivered to the user and/or DLT system for insertion onto the ledger and the like. Furthermore, if in future the transaction needs to be re-opened, or referred to by a third party such as a regulator, the signing key can be shared, with permission of the user, by adding that third party to have permissions to use the associated key to access the transaction and the like. The permissions granted may only enable the third party to see and/or review the transaction.

Accordingly, the QS key sharing/signature process 600 may provide the following enhancements to DLT/Blockchain technologies and the like including, without limitation, for example: Shared signing keys between load balanced QS servers and/or HSMs across geographical regions; encryption of data backups; sharing of secrets for ledger interop; sharing of keys; sharing of master HD keys; improvements to the signing security of all DLT technology platforms and/or networks allowing them to be 'Quantum enabled'.

The QS key sharing/transaction signing process 600 may be performed on a QS system including a QS network, the QS network comprising a plurality of QS servers, each QS server including an HSM with a set of QD Keys stored thereon, which are identical or substantially the same as described with reference to FIG. 1*a* to 5*i* and/or as described herein. One or more QS server(s) of the QS system may include a QS DLT signing/verification mechanism/application that performs the example QS key sharing/transaction signing process 600. The process 600 may use QD keys from the identical set of QD keys distributed using QKD (e.g. SQKD or terrestrial QKD) and stored in a QS manner by the QS server(s) (e.g. unbreakable QD keys) such that, without limitation, for example QREF locators and access tokens as described herein may be leveraged for storing a set of one or more signing keys or credentials of a user for use in signing transactions for submission to a DLT system. For example, a transaction along with an indication of the signing key (e.g. an QREF access token associated with a signing key) may be submitted by a registered user to the QS system for QS DLT signing prior to submission of the signed transaction to the counterparty to the transaction and/or prior to submission of the signed transaction into, for example, an external DLT and/or blockchain system and the like.

The QS key sharing/signing process 600 eliminates the need or requirement for users to have, without limitation, for example their private/public keys and/or other user credentials required for signing/verifying blockchain/DLT transactions to be stored on their end-point device, or even stored offline. The QS key sharing/signing process 600 enables a registered user of the QS system to have, without limitation, for example their private/public keys, master keys and the like, or user credentials and the like, and/or even a set of QD keys and/or private/public QD keys assigned from the set of QD keys on an HSM of a QS server to be securely stored and accessible in a QS manner for signing transactions and the like. For example, the QS key sharing/signing process 600 enables QS signing/verification of blockchain/DLT transactions, which substantially mitigates malevolent actors or hackers misuse/stealing transactions or digital assets or submitting false transactions from private/public keys stolen from a user's end-point device or conventional digital wallet and the like.

The QS key sharing/transaction signing process 600 may be performed on a QS system including a QS network, the QS network comprising a plurality of QS servers, each QS server including an HSM with a set of QD Keys stored thereon, which are identical or substantially the same. The QS key sharing/transaction signing process 600 may include the following steps of: In step 602a receiving a set of keys from a registered user. For example, registered user may have registered an end-point device and set-up a quantum-safe channel between the end-point device and the QS system, where the user then submits or sends, over the QS channel, the set of keys for storing in the repository (e.g. QS DLT) of the QS system. Alternatively or additionally, Step 602b may be performed in which a registered user and/or a DLT system may request on behalf of the registered user a set of keys be generated or assigned using any unassigned QD keys from the set of QD key of the HSM mesh of the QS system (e.g. the network of QS servers including an HSM with an identical set of QD keys stored thereon). Either way, the QS key sharing/transaction signing process 600 receives a set of keys associated with the registered user for use in signing/verifying transactions and the like.

In step 604, each of the keys may be stored as a data item in the QS repository of the QS system (e.g. QS DLT). This includes generating a QREF locator for each key in the received set of keys based on the registered user and/or a QD key from the set of QD keys that is assigned for encrypting said each key for storage in the QS repository. For example, for each key in the received set of keys, a QREF locator is generated (e.g. using a QREF engine or QREF locator generation process/algorithm as herein described) for use in storing said each key as a key data item in the QS repository, where the QREF locator is a unique value that is sued to address the key data item in the QS repository. The key data item is also assigned a QD key for generating the QREF locator and for encrypting the key data item when storing in the QS repository. As the QREF locator is used to refer to the location/address of the key data item in the QS repository, the assigned QD key is linked to the QREF locator in the meshed HSM of the QS server(s), and also the encrypted key data item is stored with the QREF locator in the QS repository. Thus a set of one or more QREF locators is generated, each QREF locator corresponding to a key of the received set of keys. In order to access the key data item when it is stored in encrypted form in the QS repository, a QREF access token for each key in the received set of keys is required.

In step 606, a QREF access token is generated for each key in the received set of keys based on the corresponding QREF locator generated for each said key in the received set of keys. Although the QREF access token is based on the QREF locator, the QREF access token is generated in a fashion that the QREF locator cannot be derived from the access token. For example, the QREF access token may be generated using a one-way function with at least the QREF locator as input (e.g. a one-way hash function). The QREF access token is also configured to be unique. For example, an QREF access token for each key in the received set of keys is generated (e.g. using an QREF access token engine and/or QREF access token generation process/algorithm as herein described) based on the QREF locator, user input data and the like, and/or the QD key assigned for encrypting the data item. Preferably, the QREF access token is generated based on at least the QREF locator corresponding to the data item that the QREF access token enables a user to access or use. Thus, a set of one or more access tokens is generated, each QREF access token corresponding to a key of the received set of keys.

In step 608, each key of the received set of keys is stored as an encrypted data item in the QS repository based on the QREF locator and the QD key assigned for encrypting the data item. For example, the encrypted data item representing each key is stored in the QS repository using the QREF locator as the address for storing the encrypted data item in the QS repository. For example, the QS repository may have a logical address to physical address mapping or table, where the QREF locator is a logical address, which is mapped to a physical address and the like of the QS repository.

In step 609, each QREF locator is mapped or linked to the corresponding QD key used to encrypt each data item in the corresponding HSMs of each QS server.

In step 610, each QREF access token corresponding to each key of the received set of keys, or a set of access tokens corresponding to the received set of keys are stored and/or sent to the registered user and/or parties that have permissions to access one or more keys from the received set of keys.

Thus, a registered user may submit a transaction and an QREF access token associated with a key of the received set of keys, along with their user credentials (e.g. using two-factor authentication or any other secure authentication process) to prove they are who they say they are, to the QS system for having the QS system sign the transaction with the key associated with the access token.

It is noted that a malevolent actor or hacker must not only have access to the QREF access token of a registered user, but has to also be able to impersonate the registered user by having their user credentials for signing into the QS system and also overcome any secure authentication procedure (e.g. two-factor authentication and the like) that the registered user is required to go through in order to have a chance at submitting a "bogus" transaction for signing with the access token. Furthermore, the malevolent actor or hacker also has to defeat any consensus mechanism, algorithm, and/or rules associated with the DLT and/or shared ledger. Thus the QS system has a number of failsafe measures that enhances the security and integrity of data items stored thereon and providing access only to authorized users and the like.

FIG. 6b is another flow diagram illustrating another example QS transaction signing process 620 for use with the process 600 of FIG. 6a using a QS system according to the invention. The QS transaction signing process 620 assumes one or more credentials, one or more keys of a set of keys, a set of master keys, a set of signing keys or user credentials and the like are stored in the QS repository based on one or more QREF locators, and each key of the set of keys and/or each set of keys is associated with an QREF access token as generated, without limitation, for example in relation to QS process 600 of FIG. 6a. The QS transaction signing process 620 includes the following steps of: In step 622, a data item, a message and/or transaction associated with a registered user and an QREF access token is received for signing the data item, the message and/or the transaction, respectfully.

The data item, message and/or transaction may be received in a user request for signing the data item, message and/or transaction. Alternatively, or additionally, the user may submit a request, message, and/or transaction in a particular format that is recognized by the QS system as a message and/or transaction requiring signing by a key stored in the QS repository and associated with the registered user.

The QREF access token may be included within the message and/or transaction and/or the QREF access token may be received alongside the message and/or transaction requiring signing. In this case, it is assumed that the QREF access token is associated with at least one key from a set of keys associated with the registered user for signing transactions. The QS system may be identify that the QREF access token and/or transaction is requiring signing based on, without limitation, for example the type or format of the access token, and/or the type or format of the request from the registered user and the like. In any event, the QS server/system that is processing the QREF access token and the request, message and/or transaction identifies that the request, message and/or transaction requires signing by a key from a set of keys associated with the registered user. However, given that each key in the set of keys or each set of keys are stored as an encrypted data item in the QS repository with a corresponding QREF locator as the address, the QREF locator associated with the signing key is required to be determined from the QREF access token and/or the user credentials of the registered user and the like.

In step 624, the QREF access token is analyzed (e.g. the QREF access token and any required user data/input data from the user is input to a QREF locator engine as described herein) to identify the QREF locator associated with the access token.

For example, the QREF locator may be identified based on generating a temporary QREF access token for each of the QREF locators determined to be associated with the registered user, where each temporary QREF access token is compared with the received access token. The QREF locator corresponding to the temporary QREF access token that matches the received QREF access token is identified as the QREF locator that is associated with the received access token. This process may use the user credentials input by the registered user to determine the QREF locators associated with the registered user. The user may be required to use two factor authentication or other authentication methods or processes during the identification process to ensure the QREF access token that is submitted is actually submitted by a registered user that is allowed to access the data item associated with the identified QREF locator.

In any event, the QS signing process 620, in step 626 retrieves the encrypted data item corresponding to a key from the QS repository based on the identified QREF locator. The identified QREF locator is also used to identify the QD key used to encrypt the encrypted data item, thus the key may be retrieved by decrypting the encrypted data item using the identified QD key associated with the identified QREF locator. For example, in this case the data item may correspond to a key from a set of keys used for signing transactions, messages, requests and the like. In retrieving the key, In step 628, the request, data item, transaction and/or message is digitally signed using the retrieved key.

In step 630, the signed request, data item, transaction and/or message is provided to the registered user, and/or sent on behalf of the registered user to, without limitation, for example a DLT system for submitting the signed transaction, a counter party to the transaction, and/or any other party or system requiring receipt of the signed transaction and the like.

It is noted that the QS signing process 620 may be performed by a QS server of the QS system. In particular, the QS signing process 620 may be performed by the HSM, or a component and/or module thereof, of a QS server of the QS system. An HSM provides a secure environment for storing and performing cryptographic operations and the like. In particular, the HSM provides a secure processing environment for processing the access token, identifying the QREF locator, retrieving the encrypted data item and decrypting the data item to reveal the corresponding key, and for digitally signing the transaction/message and/or request using the corresponding key, where the signed transaction/message or request may be sent to the registered user without revealing, without limitation, for example the QREF locator, the QD key used to encrypt the data item, and the key used to sign the transaction, message and/or request.

FIG. 6c is a further flow diagram illustrating an example end-point QS key sharing/transaction signing process 640 performed by an end-point device of a registered user for use with the QS signing process(es) 600 and 620 of FIG. 6a or 6b according to the invention. It is assumed that the registered user of the end-point device already has a set of access tokens for use in signing one or more transactions, messages and/or requests. This means each QREF access token of the set of access tokens corresponds to a key of a set of keys stored within the QS system in a QS repository according to the invention. However, the QREF locator corresponding to the logical address of the encrypted data item corresponding to the key is unknown to the registered user or any other process or system outside the QS system. Thus, the registered user or any other party that has the QREF access token cannot derive the QREF locator and hence cannot find or access the corresponding data item. The endpoint QS key sharing/transaction signing process 640 includes the following steps of:

In step 654, receiving a transaction, request or message for signing.

In step 644, sending a signing request to a QS system (e.g. QS server and/or Registration server or node of the QS system), the signing request including data representative of a transaction, message or request requiring signing, and an QREF access token associated with a key to be used for digitally signing the transaction, message and/or request. On receipt of the signing request, the QS system may request user credentials associated with the QREF access token and/or the signing request to identify whether the user is a registered user, and to also verify that the registered user has permissions to use the QREF access token and the like. This may include two factor authentication or any other secure authentication process to ensure the user is a registered user and are who they say they are. The QS system may then perform QS key sharing/transaction signing process 620 as described with reference to FIG. 6b in relation to the signing request and/or the transaction, message and/or request requiring signing and the received QREF access token from the registered user.

In step 646, receiving, from the QS system, a signed transaction.

In step 648, sending the signed transaction to a DLT system, other system, and/or counterparty and the like for processing and using the signed transaction.

In step 650, optionally indicating that the QREF access token from the set of access tokens used to sign the transaction, request, or message has been used. That is, each QREF access token may only allow a one-off signing of a transaction, thus, the end-point device indicates that this QREF access token has been used for signing a transaction, and so may not be used again. Nevertheless, this may depend on the application and/or system requiring the signed transaction. For example, a system may be designed that allows multiple uses of an QREF access token for signing transactions, in which case there may not need to be a limit on how many times the QREF access token is used. Nevertheless, from a security stand-point, it is preferred that each QREF access token is a one-time use access token, and so step 650 may be required at the end-point to prevent the registered user from attempting to use the same QREF access token twice when signing transactions/messages and/or requests.

Alternatively, or additionally, steps 646 and 648 may be dispensed with as the QS system may instead be configured to send and/or forward the signed transaction onwards to a DLT system, any other system and/or counterparty and the like requiring the signed transaction. Such forwarding information may be included in the signing request or submitted by the registered user of the end-point device during the credential check and/or when logging into the QS system and the like.

FIG. 6d is a flow diagram illustrating an example QS cryptographic process 650 for performing QS cryptographic processing of a data item, transaction or message using a QS network. The QS network may be based on any of the QS networks of the QS systems described with reference to FIG. 1a to 5j, combinations thereof, modifications thereof and/or as described herein. In essence, the QS network includes at least two QS servers and a repository for storing and accessing data items associated with users of one or more end-point devices. Each QS server includes a HSM with an identical set of quantum distributed (QD) keys stored thereon and the QS servers communicate securely with each other and the repository, which may be a DLT, using quantum encryption based on one or more available QD keys from the set of QD keys. QS cryptographic process 650 for performing QS cryptographic processing of a data item includes the following steps of:

In step 651, receiving data representative of a dataset, transaction or message requiring a cryptographic processing associated with a user or system.

In step 652, receiving a QREF access token associated with a data item stored in the repository. The data item is associated with a cryptographic key for use in cryptographically processing the received data representative of a data item, transaction or message.

For example, the data item may be a cryptographic key from a set of cryptographic keys for use with cryptographic processing based on one or more cryptographic operations. The cryptographic operations may include one or more cryptographic operations based on the group of: encryption, digital signing, decryption, authentication, hashing, authenticated encryption. The data item was stored in the QS repository prior to receiving the QREF access token in relation to the data item.

For example, the QS network 101 may have received a set of cryptographic keys associated with the system or the user of an end-point device from the system or end-point device. Alternatively the QS network may have received a request to generate a set of cryptographic keys from a system or end-point device of a user. This may involve generating a set of cryptographic keys associated with the system or the user based on one or more available QD keys from the set of QD keys in the HSM. Either way, a set of cryptographic keys is received by the QS network 101.

Once received, a QS server may be configured for generating, for each key in the received set of signing keys, a QREF locator based on system data of the system or user data of the user and an available QD key from the set of QD keys, where a set of QREF locators is generated corresponding to the set of cryptographic keys. Each QREF locator in the set of QREF locators is linked to the corresponding available QD key of the set of QD keys. The QS server is further configured to send, for each QREF locator in the set of QREF locators, each QREF locator and an encrypted data item (e.g. a cryptographic key) to the repository for storage, where the encrypted data item is linked to the QREF locator when stored. The encrypted data item includes a data item representative of a key from the set of cryptographic keys corresponding to each QREF locator and encrypted with a QD key corresponding to said each QREF locator.

The QS server may then be configured for generating, for each QREF locator in the set of QREF locators, a QREF access token based on each QREF locator, where a set of QREF access tokens are generated corresponding to the set of cryptographic keys. Thus, the set of QREF access tokens are sent to the system or a device of the user associated with the set of cryptographic keys, which can be used for accessing the a cryptographic key for use in cryptographically processing (e.g. in the HSM of a QS server) data received from a system or user.

In step 653, identifying a QREF locator based on the QREF access token and input data from the user or system.

In step 654, in response to identifying the QREF locator, retrieving the data item from the repository. The retrieved data item is decrypted using the QD key corresponding to the QREF locator.

In step 655, processing the received data representative of a dataset, transaction or message using one or more cryptographic operations based on the retrieved decrypted data item.

In step 656, sending the cryptographically processed data representative of a dataset item, transaction or message. For example, the cryptographically processed data representative of a data item, transaction or message may be sent to another system (e.g. an external DLT system/blockchain system/distributed ledger system/shared ledger system and the like) for storage and/or processing. Alternatively or additionally, a cryptographically processed data representative of a transaction may be sent to another device of another user that is a counter-party to the transaction. Alternatively or additionally, a cryptographically processed data representative of a message (e.g. email), which may be addressed for sending to another device, apparatus or server and the like, may be sent to the address for receiving the cryptographically processed message.

When the other system is an external DLT system, blockchain system, distributed ledger system, or a shared ledger system, the system may be configured to use a consensus method or process for verifying whether one or more cryptographically processed data item(s), cryptographically processed transaction(s) or cryptographically processed message(s) should be stored in the distributed ledger, shared ledger and/or blockchain associated with said other system.

As an example, the above QS cryptographic process 650 may be used for signing transactions for submission to a DLT system, blockchain system and the like. The set of cryptographic keys may be a set of cryptographic signing keys associated with a user of a DLT/blockchain system. The cryptographic operations including one or more digital signature cryptographic operation(s) or algorithm(s) associated with digitally signing one or more data item(s), transaction(s), or message(s) using a signing key. The user may be required to use the set of cryptographic signing keys for digitally signing DLT/blockchain transactions. As described, the set of cryptographic signing keys may be sent to the QS network for storage as data items in the repository or DLT of the QS network. The user may have received a set of QREF access tokens associated with the set of signing keys, where each QREF access token corresponds to accessing a particular cryptographic signing key of the set of signing keys. The signing keys may be shared with one or more users by registering permissions for the one or more users to use one or more QREF access tokens associated with the set of signing keys. Thus, the signing keys are shared with multiple users enabling each user to request that the QS network uses a signing key for digitally signing a data item, transaction and/or message. The one or more QREF access token(s) may be sent to the one or more systems, or one or more devices associated with the one or more users that have permissions to use the QREF access token(s).

Furthermore, to ensure geographically located HSMs may access the set of signing keys, the set of signing keys may be transmitted over the QS network to one or more load-balanced geographically located HSMs. The set of signing keys are stored in the repository accessible by the HSMs via the QS network. Thus, the corresponding QREF access tokens associated with the set of signing keys may be sent to one or more systems, or one or more devices of users located in relation to the geographically located HSMs. These systems, or one or more devices of users located in relation to the geographically located HSMs are registered with the QS system and configured to have permissions to use the QREF access tokens.

Similarly, the sharing of master keys or secrets may be performed for ledger interoperability. For example, the above QS cryptographic process 650 may be modified such that the set of cryptographic keys may be a set of master keys or secrets associated with two or more systems (e.g. different DLT/Blockchain systems) requiring interoperability. In this case, registering permissions for the two or more systems to have access to the data items (e.g. master keys/secrets) based on one or more QREF access token(s) may be performed. The one or more data item(s) representing said one or more master key(s) or secrets stored in the repository/DLT of the QS network. These are used in cryptographic operations on one or more received data items, received transactions or messages from each of the two or more systems and enable interoperability between these two or more systems. The one or more QREF access token(s) may be sent to the two or more systems and/or devices of users associated with the two or more systems.

Similarly, the sharing of master HD keys may be performed by QS cryptographic process 650, where the set of cryptographic keys are a set of master keys. The set of master keys may be a set of master hierarchical deterministic (HD) keys. Thus, once the set of master HD keys are stored in the repository of the QS network, one or more users or systems may be given permissions to access the data items corresponding to one or more of the master HD keys. For example, permissions for one or more users to access data items based on one or more QREF access token(s) may be registered with the QS network, where each user may require registration. The data items correspond to one or more data item(s) representing one or more master key(s) stored in the repository for use in cryptographic operations on data representative of the one or more received data items, received transactions or messages using one or more master HD keys corresponding to the one or more QREF access token(s). Those devices or systems associated with the one or more users with permissions to use one or more master HD keys are sent the corresponding one or more QREF access token(s).

In another example, similarly, QS cryptographic process 650 may be used for encrypting data backups. For example, in the QS cryptographic process 650, the set of crypto-graphic keys may include a set of cryptographic encryption keys associated with the system or the user for use with one or more encryption cryptographic operation(s) or algorithm(s) associated with encrypting data. This may include encrypting data representative of one or more data item(s), transaction(s), or message(s) using a cryptographic encryption key corresponding to a QREF access token. The received one or more data items may include data representative of a dataset requiring to be backed-up and/or archived. In another example, in the QS cryptographic process 650, the set of cryptographic keys may include a set of cryptographic decryption keys associated with the system or the user for use with one or more decryption cryptographic operation(s) or algorithm(s) associated with encrypting data. This may include decrypting any encrypted data representative of one or more encrypted data item(s), encrypted transaction(s), or encrypted message(s) using a cryptographic decryption key corresponding to a QREF access token. The received data representative of one or more data items may include encrypted data representative of an encrypted dataset that has been backed-up and/or archived and requires decryption with the corresponding decryption key.

Some of the examples described above use hardware security modules (HSM). In some examples such an HSM may be a Mesh HSM or HSM Mesh (Clustered multiple Hardware Security Modules with embedded Quantum Random Number Generator). In other examples such HSMs may be replaced by other types of secure memory or secure storage, such as a secure processor enclave.

Digital Financial Services are rapidly extending across both the developed and developing world as a day-to-day alternative to the physical cash economy. The current money market distributed financial system typically consists of the following components, without limitation, for example: 1) Core Mobile/Service/Business Network Operator/Telecom infrastructure and/or Payments Network Operators, which use RSA Encrypted cryptography that is vulnerable to attack from Quantum Computers; 2) User devices with Apps or more usually USSD menu interfaces; 3) Exchanges & Agents (e.g. human ATMs) that provide cash-in/cash-out services, to turn physical cash into electronic cash (e.g. ECash); 3) Banks, which are normally integrated at a data layer via application programming interface(s) (API(s)) across systems (e.g. OpenBanking and the like); and/or 4) third party technology/financial service providers that offer, without limitation, for example Payment services, peer-to-peer (P2P), money transfer and remittance, loans/savings etc and the like.

However, the promised power of QCs could result in a systemic failure of the current financial services approach to security and privacy. For example, the recent spate of security breaches and data leaks emphasise just how vulnerable businesses and individuals are if they are unable to maintain the trust of their customers/vendors and the market. Current QC techniques are particularly good at solving certain types of mathematical problems—these typically involve searching for prime factors and unstructured data searching. Although it may be a while before QC can be applied to more general problems, it is still very important to focus on areas where it is likely to demonstrate material benefit compared to classical computing techniques. The simple hard fact that RSA/PKI/Diffie-Helman ciphers are compromised by QCs (NIST 2016), requires the financial services industry to replace these with new QS cryptography solutions. QKD is currently the only provably safe quantum solution that financial services may use to solve this challenge.

A significant threat to the integrity of financial data in the cloud is the technique of harvest and decrypt, which is already being deployed by cybercriminals. This technique sees sensitive files, which could include information such as account holders' addresses and names, scraped and stored by malicious parties until they have the capability in the future to decipher the contents with quantum computers (the power of which will vastly outstrip that of classical computers). Even currently secure data is, therefore, already vulnerable to the hackers of the future.

Furthermore, leaked data does not only cost in terms of the danger of personal and business critical data being readily obtainable online. Reputations can also be damaged, possibly irreparably, and the monetary cost may be high. For example, the financial industry has been found as having amongst the highest per-record costs in data breaches out of 17 sectors surveyed in a recent IBM report, at $245 (£191) per record, and second only to healthcare at $318 (£249) per record.

Quantum cryptography has the ability to usher in a new age of 'unhackable' online communication, as long as there is uptake by the finance industry and its customers. For example, QKD seeks to provide a method to generate and exchange a key while communicating over a public or conventional communication channel. Rather than relying on computational difficulty, QKD uses the properties of quantum physics to ensure its security. Specifically, it takes advantage of the fact that the very act of measuring a quantum system changes it and so any interception of the transmission can be detected. QKD distribution is particularly useful for securing a specific communication channel for a specific session. If interception is detected or suspected at any time, the encryption key can be changed ensuring that secure data transmission is restored.

The QS system(s) 100, 165, 170, 175, 180 and/or 190 (also referred to herein as a QS cloud platform) and applications thereof as described with reference to any of FIG. 1a to 6d, combinations thereof, modifications thereto, and/or as described may be used and adapted to provide an solution to the above-mentioned problems for the financial services industry. For example, application of the QS network and/or QKD network of the QS system/QS cloud platform may be effective for CHAPS, SWIFT, BACS, RTGS payments, transfers and settlement systems. Another application, as described herein, may be two-factor transaction authentication. In the QS system, QKD may be configured to create multiple one-time 'passwords' (OTP) also referred to herein as QD keys/QS keys, which could be dispensed contactlessly to a mobile device via a "quantum ATM". These can verify in-person or online transactions, and are safer than passwords or PIN numbers which are frequently copied or stolen. The QS system may be configured to secure networks for Banks for securely, in a quantum safe manner, sending sensitive data from, without limitation, for example a Bank's headquarters to a datacentre or disaster recovery site and the like, where any transmission of data can be secured using, without limitation, for example satellite-QKD of the QS system(s) and/or QS cloud platforms 100, 165, 170, 175, 180 and/or 190 and applications thereof as described with reference to any of FIG. 1a to 6d, combinations thereof, modifications thereto and/or as described herein. Furthermore, new blockchain banking topologies, which are progressively being adopted, show multiple vulnerabilities in their storage of private-public key pairs. The QS system/QS cloud platform digital signature solution as described with reference to FIGS. 6a to 6d and/or as described herein, which includes QKD, may assist in solving this challenge for this and any solution requiring private keys and the need to secure digital assets.

Indeed, there are many use cases and applications for the QS cloud platforms 100, 165, 170, 175, 180 and/or 190 and applications thereof as described with reference to any of FIG. 1a to 6d, combinations thereof, modifications thereto, and/or as described herein such as, without limitation, for example quantum safe electronic/digital payments. The QS system or QS cloud platform 100, 165, 170, 175, 180 and/or 190 may be configured or adapted to be used as a quantum safe electronic/digital payment system, referred to as QS payment system, in which registered end-point devices of users may securely make payments and transfer value, such as, for example fiat currency, or digital currency, having a cash value. The digital currency may be a central bank digital currency corresponding to a fiat currency, but in digital form. Such a central bank digital currency may include future central bank digital currencies which have not yet been issued. The digital currency may be regarded as having an electronic cash value. The QS payment system may make use of digital assets called Quantum Money (QM) that enable users of registered end point devices to securely transfer value and/or securely make payments to other users of the QS cloud platform and the like. For example, an end point device of a user may be registered with QD keys that enable a QM client application on the device to perform QS communications with the QS Cloud Platform and perform a digital payment methodology that makes use of the resources of the QS cloud platform. For example, the digital payment/transfer methodology makes use of QKD, QD keys, QS key, and DLT/blockchain technologies of the QS network in the QS cloud platform 100, 165, 170, 175, 180 and/or 190 for storing and/or transferring digital assets/QM money for use, without limitation, corporate customers, private customers, users, consumers, and the like with endpoint devices registered with the QS cloud platform. The digital payment/transfer methodology as described herein provides the advantages of enabling secure payments/transfers, trust between parties, generating efficiencies and negligible transaction costs that currently plague crypto currencies whilst simultaneously removing exchange rate risk (e.g. this is very high in crypto currencies such as, for example, Bitcoin and other crypto currencies) and also creating customer, consumer, and/or corporate trust by representing QM money value in their native fiat currency.

Figure 7:
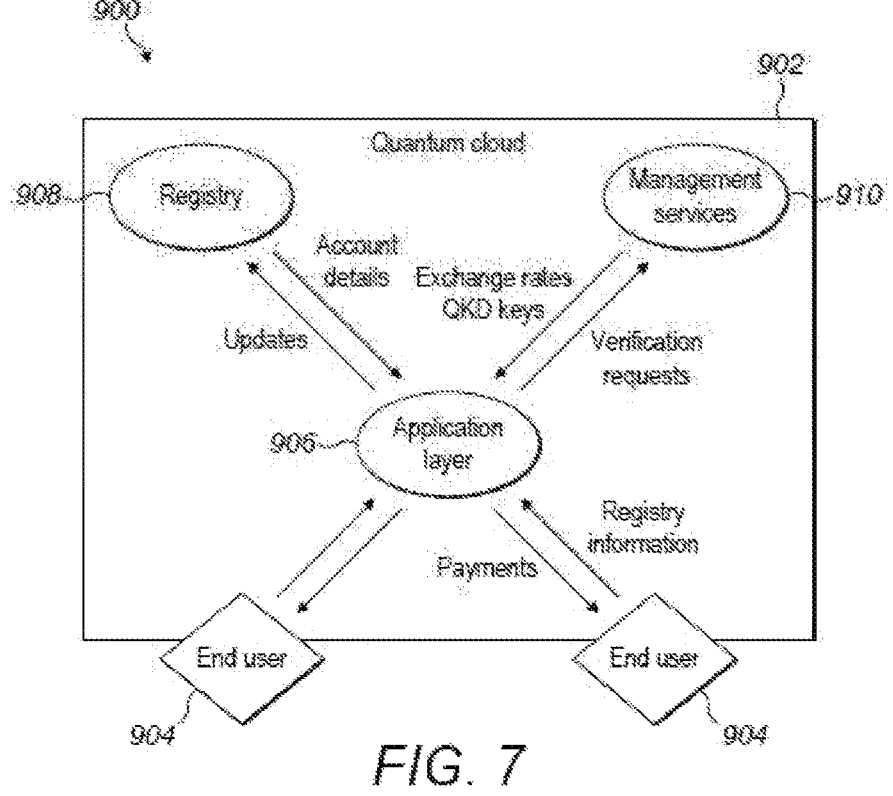
FIG. 7 is a schematic diagram showing an overview of an example quantum safe payment system.

FIG. 7 is a schematic diagram showing an overview of an example Quantum Money (QM) system 900. The QM system 900 provides a quantum safe alternative to digital wallet systems. The QM system 900 can provide a platform on which users, such as individuals and corporate entities, can maintain accounts that correspond to an amount of fiat currency stored in a central database. The QM system 900 enables users to trade money with other users, and with external conventional bank accounts, in a quantum secure manner.

The QM system 900 is provided and supported by a Quantum Safe (QS) cloud platform/system 902 based on the QS system(s) 100, 165, 170, 175, 180 and/or 190 as described with reference to any of FIG. 1a to 6d, combinations thereof, modifications thereto and/or as described herein.

An overview of the operation of the QM system 900 is that the QM system 900 operates via an app loaded onto each of a plurality of user devices 904 operated by the users of the QM system 900. An application layer 906 of the QM system 900 cooperates with the apps to allow each user to use their user device 904 to send money to and from a respective centralised user bank account, details of which are stored and protected in a central registry 908. Money held on behalf of each user, which is regarded as being in the respective user bank accounts, is converted to a token system to allow for ease of dealing with exchange rate fluctuations, for example when payments to or from a user are in a different currency from the currency of the user account. The QM system 902 is arranged to operate so that the users will not see the value expressed in terms of tokens, but will instead see the value in the currency that they initially provided to their account. This currency may be a fiat currency, or digital currency, having a cash value. The digital currency may be a central bank digital currency corresponding to a fiat currency, but in digital form. Such a central bank digital currency may include future central bank digital currencies which have not yet been issued. The digital currency may be regarded as having an electronic cash value. For payments into the account, this value will be fixed when the payment is made into the account, regardless of subsequent changes in the relative values of the tokens and different currencies.

The QM system 900 is provided with QD keys as necessary by a management system 910, which manages QD keys provided via QKD (e.g. satellite QKD and/or any other type of suitable QKD system the like) and carries out any necessary QD key verification. The management system 910 also provides any information required by the QM system 900, including, for example, current exchange rate information. In some examples the management system 910 may be provided by an Arqit service.

In operation, the QM system 900 makes use of QD keys at three points in the system architecture. QD keys are "baked in" to user devices, either at point of first contact with the QM system 900, or on manufacture, QD keys are provided to the network providers, and QD keys are managed by the management system 910. All three of these QD keys are required for verification. Accordingly, the management system 910 is able to demand that any desired Know Your Client or Know Your Customer (KYC) and/or Anti-money laundering (AML) checks and/or controls are performed before providing their portion of the key, so that compliance with these checks and controls cannot be evaded by users.

The QM system 900 provides a permissioned, global ledger system that can serve as a global payment rail and global deposit account ledger, enabling clients to transfer currency held on deposit with the QM system 900. Based on the principles of a Bank Issued Digital Currency or tokens, but using the QM system 900 as a vehicle, the QM system 900 may facilitate real-time value movement, helping to solve common hurdles of traditional cross-border payments.

The QM system 900 may allow banks to lower costs and increase shareholder return. The QM system 900 may provide a digital platform for internal use by the bank and for the use of its customers. The QM system 900 can integrate into the core book of record systems already in use and be implemented as a new payment rail alongside existing payments systems.

The QM system 900 may provide a solution to the complex challenges of cross border payments and help simplify its users money moving needs through next generation corporate treasury services with an elevated level of Quantum Security over existing treasury services. The QM system 900 may provide advantages such as a single global bank account providing 24/7 always on money, immediate settlement, immediate local currency settlement, 24/7 follow the sun capital, digital representation of conventional 'paper' money, improved risk, reduced operating costs, reduced equipment costs, and quantum safe security.

By having a single global bank account the current financial position of an account holder/system user can be more easily and clearly understood, risk can be calculated centrally, and the ability to provide agile capital for opportunities is maximised. This may be particularly advantageous for corporate users, such as companies, having relatively complex financial affairs, particularly if these are spread across multiple fiat currency zones. Most companies must produce an annual report to bring their financial position into alignment with their various IT systems. The QM system 900 may enable a single P&L number to be provided which is always accurate at that point in time so that the company always knows its exact financial position.

Currently, companies face significant expenditure and use complex systems architectures to operate a global businesses treasury service, calculate risk, and ensure alignment of general ledger systems. The QM system 900 may enable significantly lower operating and system costs and so provide the opportunity to allow the capital tied up in funding this expenditure and providing these complex systems to revenue making activities. Further, the QM system 900 may allow operations to be centralised, being closer to management command & control, so that management information is more accurate and real time allowing executives to make more informed decisions. Settlement and Netting may be improved, and risk calculations become much simpler.

Advantages provided by the QM system 900 to user companies may include the single Global Bank account principle. Companies have an annual report which shows the financial results for global operations. This principle may also be applied for the Global Bank account supported by the QM system 900 and comprising one decentralised general ledger. Today firms hold accounts in many countries which ties up money, they must also pay to move money to meet their business needs between global locations. The ability to have an immediate company P&L position understood in real-time 24/7 is a powerful capability for an organisation.

Advantages provided by the QM system 900 to operator banks may comprise a reduction in cost. The QM system 900 solution reduces the infrastructure cost for the movement of money and the need to have start of day and end of day processing in international locations. The bank account is open 24/7 allowing for follow the sun treasury operations. Advantages provided by the QM system 900 to operator banks may comprise a reduction in operating cost. Typically, in conventional banks, there are numerous people and systems, employed regionally to keep local currency general ledger and accounting systems aligned. These may not be required with the global treasury solution provided by the QM system 900, as all postings and settlement are done centrally on the company operating accounts.

As discussed above, with the advances in Cybersecurity hacking techniques and the invention of more powerful Classical and Quantum computers, existing Treasury solutions are at risk from the threat of their security being compromised. Quantum Money has been designed to power services beyond the Fourth Industrial Revolution, enabling users and operators to deploy a solution that has security longevity beyond the other platforms available today. Treasury Services that use Quantum Money and its Quantum secured architecture may gain protection from fraud, failure, and accusations of lack of verifiable transparency, improved Transaction management, reconciliation, and speed of fulfilment, and improved data management providing permissioned, limited proportional access e.g. bank checks KYC is valid but does not require customer records so no risk of poaching SERVICE OPERATOR customer.

The QM system 900 can provide a number of benefits. Reliability, banks need a reliable source of shared data; they need to know that the data they are looking at is consistent with what their counterparts are seeing and is the same as that which other parties in the banks are using. This will reduce costs in the pre and post-trade interaction of the banks. Reliable, trusted data can lead to improvements in compliance, trade reporting, credit allocation, risk and other audit processes. Mutualisation, banks recognise that large portions of their system infrastructure and business processes are non-differentiating. Mutualisation of business logic will allow firms to decommission expensive elements of their infrastructure, break down silos, and thus reduce IT and staff costs. Just as the emergence of industry utilities enabled this transformation for naturally-centralised business processes, DLT is facilitating the same transformation in domains where counterparts must, or desire to, retain responsibility for their processing. As a result, banks will be able to push highly manual middle and back office processes the cloud. This will empower them to reduce costs related to inconsistency between the banks in processing the same transaction and to share the cost of implementing new functionality to help meet their regulatory challenges, particularly those related to capital charges and liquidity. Transparency, banks need to gain visibility into their transaction lifecycle in order to achieve a better understanding of their costs and operational risks, and therefore drive better investment decisions. The ability to show this picture that you know to be consistent with that seen by all trading counter parties to internal control functions and regulators can improve regulatory compliance and reduce associated costs. Risk Reduction, risk is reduced from having shared, trustworthy data between counterparties, and also between different functions within the same bank. Immutable data would also be a huge benefit to internal and external control/audit functions. Flexibility, financial market infrastructures have driven consistency, higher volume and lower costs in many areas of financial markets. Banks need a platform that achieves similar goals in business segments that require greater flexibility or deal with lower volumes. The ability to deploy new and improved business logic without major integration work gives banks an opportunity to provide clients with new products cost effectively and respond more rapidly to regulatory change. Regulatory Compliance, banks spend an increasing amount of time and resource attempting to adhere to ever-more burdensome regulatory requirements. A cloud base, easily auditable platform with organised shared data could provide significant relief by ensuring transparency, consistency and accuracy.

The QM system 900 can provide a "Trusted Digital Backbone", a single platform where counterparties can share trusted, secure, immutable data and collaborate on its processing, which may unlock enormous efficiencies as well as further opportunities to unleash the benefits of the mutualisation of business logic. The QM system 900 can support future Central Bank Digital Currency (CBDC) and other E-Money (Non Crypto Currency) currencies and/or loyalty schemes. The QM system 900 allows any combination of counterparties to join together to adopt consistent, verified, shared business logic.

As discussed above, the QM system 900 may be configurable to support Central Bank Digital Currencies (CBDC), or any other digital currencies (DC) or loyalty schemes in a quantum-secure fashion. In other words, the QM system 900 is configurable to support the minting, issuance, transfer and recording of transfer of digital currencies. In such implementations, the QM token may be referred to interchangeably as a 'coin' or a 'digital coin'.

In the examples described with reference to FIGS. 12a to 12d below, the QS cloud platform/system 902 is configured to operate as an Issuing Authority 1003. Users 904 of the QM system 900 include a Central Bank 1002 (for example, the Bank of England) and may further include individual and/or commercial entities, i.e. natural persons and/or companies. The Central Bank 1002 may be a central bank that is responsible for the issuance, minting, and/or regulation of a national currency, for example a fiat currency such as pound sterling or the US dollar. Alternatively, the Central Bank 1002 may be an entity responsible for the issuance and/or regulation of an alternative form of currency. For example the entity may be a shop or other retailer that issues and/or regulates a currency such as loyalty 'point's, e.g. frequent flyer miles. Both national currencies and other types of currency may be provided by QM tokens which are referred to as coins or digital coins herein.

The users 904 of the QM system 900 may include any entity in possession of, or entitled to, an account with the Central Bank 1002. Said account may preferably (but not necessarily) be one that operates using the currency (or QM tokens) supported by the Central Bank 1002—e.g., pound sterling if the Central bank 1002 is the Bank of England. In some examples, the Issuing Authority 1003 may be directly administered by the Central Bank 1002. In other examples, the Issuing Authority 1003 may be administered by a third party on behalf of the Central Bank 1002. In other implementations, the Central Bank 1002 may be replaced with a corporate entity that authorises bank-issued digital currency.

Figure 12A:
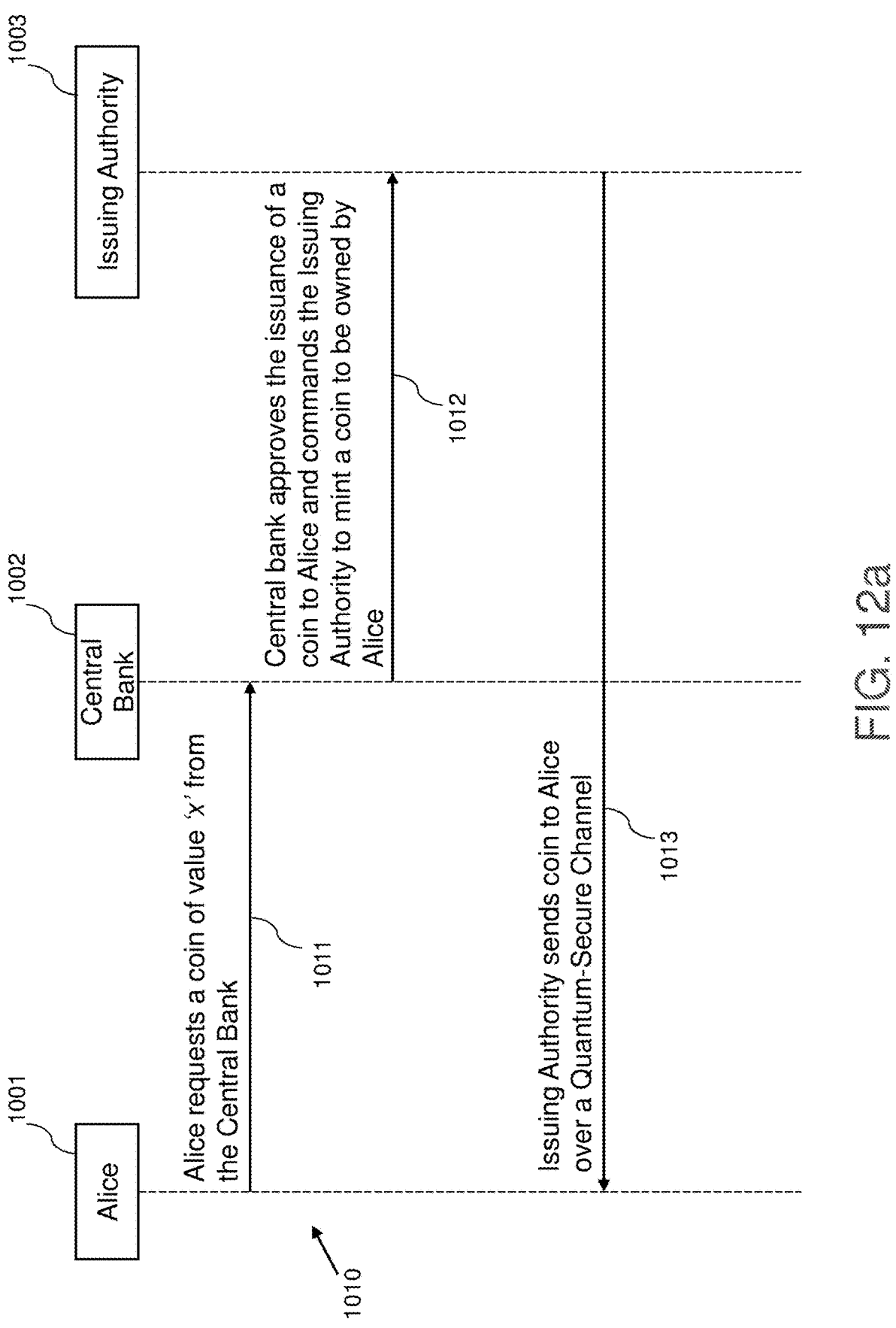
FIG. 12a is a sequence diagram of a method for requesting the minting and issuance of a digital coin.

FIG. 12a shows a sequence diagram 1010 of a method for requesting the minting and issuance of a digital coin from a Central Bank 1002 to a first endpoint user Alice 1001. Alice 1001 is a user 904 of the QM system 900. In a first operation 1011, Alice 1001 requests a coin of a given value from the central bank 1002. For the avoidance of doubt, the request for a coin may be a request for one or more coins whose total value is equivalent to a single coin of the given value. In examples where the currency is a national currency, such as a fiat currency, Alice 1001 may be a clearing bank, or the like (e.g., a loyalty points issuer or loyalty points scheme owner).

If the Central Bank 1002 decides to approve Alice's 1001 request, the Central Bank 1002—in operation 1012—issues a command to an Issuing Authority 1003 to mint a coin to be owned by Alice 1001. The minting of the coin will be discussed in more detail below in relation to FIG. 12b. As discussed above, the Issuing Authority 1003 either is the QS cloud platform/system 902 or is facilitated or supported by the QS cloud platform/system 902.

Subsequent to the successful minting of a coin in Alice's 1001 name, the Issuing Authority 1003 issues—in operation 1013—the minted coin to Alice 1001 over a Quantum Safe Channel.

Figure 12B:
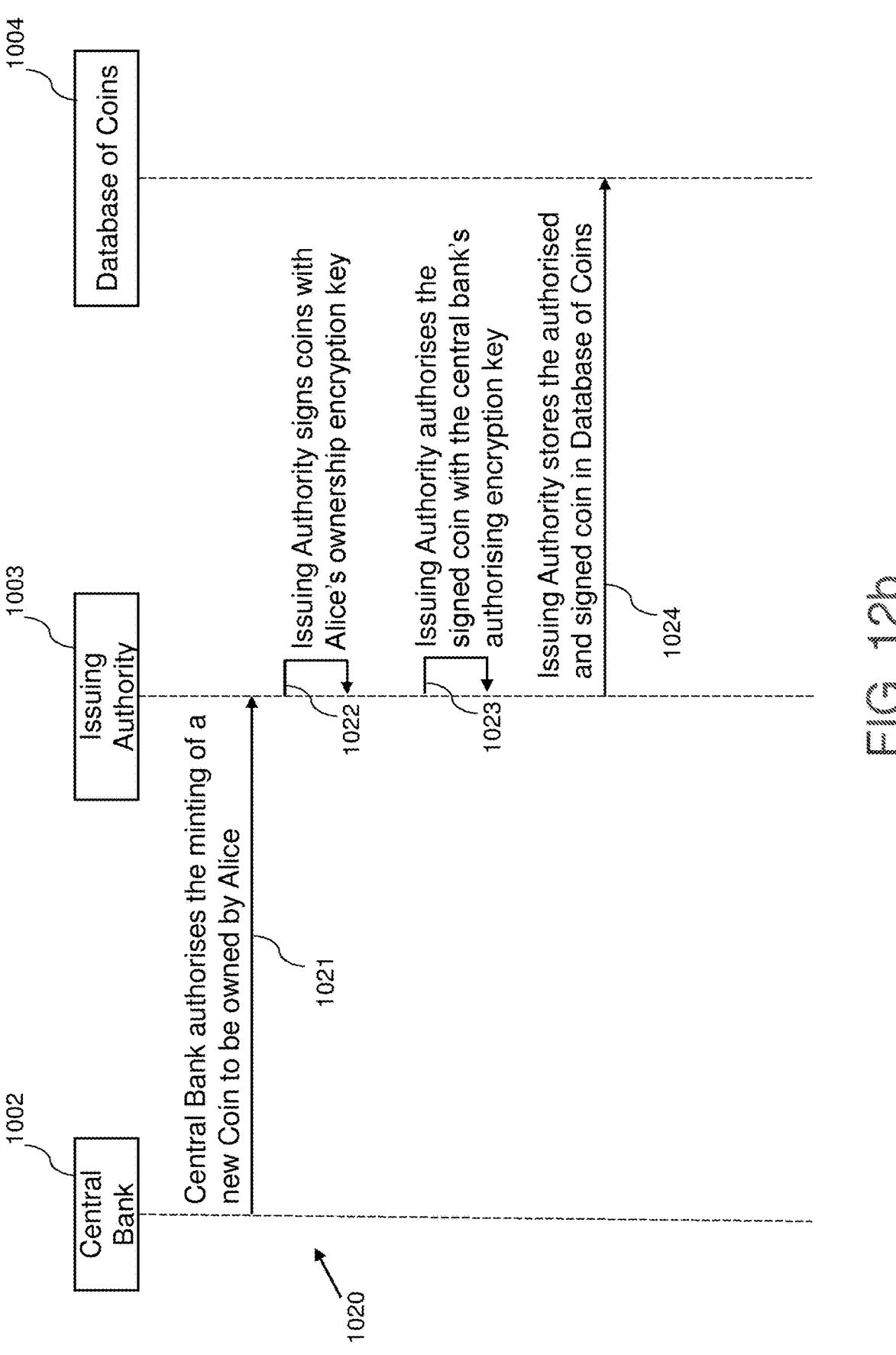
FIG. 12b is a sequence diagram of a method for minting and issuing a digital coin from a central bank.

FIG. 12b shows a sequence diagram 1020 of a method for minting and issuing a digital coin from a Central Bank 1002. The sequence diagram 1020 is a more detailed representation of operation 1012 shown in FIG. 12a.

In a first operation 1021, the Central Bank 1002 issues a command to the Issuing Authority 1003 to mint a coin to be owned by an endpoint user, for example, the first endpoint user Alice 1001. In response to receiving the command from the Central Bank 1002, the Issuing Authority 1003—in operation 1022—signs a digital coin with an ownership signature associated with Alice, i.e., Alice's ownership signature. The signed digital coin may be referred to as a pair. The pair may be represented as (Coin, owner_sig). An ownership signature may be an encryption key, known as an ownership encryption key, known only to the QS cloud platform/system 902 and the user 904 with whom the ownership signature is associated. Each user 904 of the system may have one or more ownership encryption keys associated therewith. Each ownership encryption key may be a quantum-secure key distribute to the respective user 904 by the QS cloud platform/system 902 according to the methods described herein.

After signing the digital coin with Alice's ownership signature, the Issuing Authority 1003—in operation 1023—signs the pair (Coin, owner_sig) with an authorising signature of the Central Bank 1002, using a Central Bank ownership encryption key. The resulting signed and authorised coin may be represented as ((Coin, owner_sig), auth_sig). The Issuing Authority 1003 may generate the Central Bank ownership key(s) on behalf of the Central Bank 1002 as necessary After the pair has been signed with the authorising signature, the Issuing Authority 1003—in operation 1024—stores data regarding the signed and authorised coin ((Coin, owner_sig), auth_sig) in a Database of Coins 1004, and sends the signed and authorised coin to the owner, in this example, Alice 1001, as shown in operation 1013 of FIG. 12*a*. The Database of Coins 1004 is held by the Issuing Authority 1003. In some implementations the Database of Coins 1004 is a ledger but this is not necessary in all implementations. In implementations where temporal dependencies of the coin do not need to be maintained, the Database of Coins 1004 may simply provide a record of all of the coins in circulation, and may not be a ledger.

Each coin minted and issued by the Issuing Authority 1003 on behalf of the Central Bank 1002 may be (before signing) be stored as a data item, for example a triple in the form of: [serial number, value, expiry date].

The serial number of the coin triple may be a Globally Unique Identifier (GUID). The GUID may take the form of an encryption key issued by the Issuing Authority 1003 (i.e., the QS cloud platform/system 902). The encryption key may take the form of an AES256 symmetric key, and/or may be obtained/issued via QKD protocols such as those described above. By providing each coin with a globally unique ID, the Central Bank 1002 (via the Database of coins 1004) may monitor the transactions associated with each coin to maintain a ledger, or other record, of validly authorised and issued coins.

The value of the coin triple may be indicative of the value of coin requested by Alice 1001 in operation 1011, as shown in and discussed with reference to FIG. 12*a*.

The expiry date of the coin triple may be useable to ensure that coins are periodically refreshed by the Central Bank 1002. As in conventional 'paper money' practice, expired coins may remain as legal tender but may need to be redeemed by transfer to an approved banking institution.

In some examples, the data item representing the coin 1004 may further comprise an indication of the transaction count associated with the coin 1004, i.e., how many (inter-party) transactions the coin has undergone.

Signing the coin, either with an ownership key or an authorising key, may involve stamping the coin with an encryption key issued by the Issuing Authority 1003 (i.e., the QS cloud platform/system 902) to the respective user 904 of the QM system 900, or otherwise applying such an encryption key to the coin. By way of example, stamping the coin with the encryption key—i.e, the signature—may comprise concatenating the encryption key with the coin triple. Each user 904 of the QM system 900 has its own unique signature(s). In some examples, each user 904 of the QM system 900 has a single unique signature that is used to sign all digital coins owned by the respective user 904. In other examples, each user 904 of the QM system 900 has multiple signatures unique to the respective user 904 wherein different signatures may be used by the user 904 to sign different coins. Each signature may take the form of a symmetric key issued by the QS cloud platform/system 902; for example, each signature may be an AES256 encryption key. All coins will be owned by a respective owner and signed by with said owner's ownership signature to record this ownership. The signed coin may be referred to as a pair, as discussed above. Any signed coin pair validly minted and issued by the Issuing Authority 1003 on behalf of the Central Bank 1002 will be further signed with an authorising signature associated with the Central Bank 1002 to confirm the validity of the signed coin.

Figure 12C:
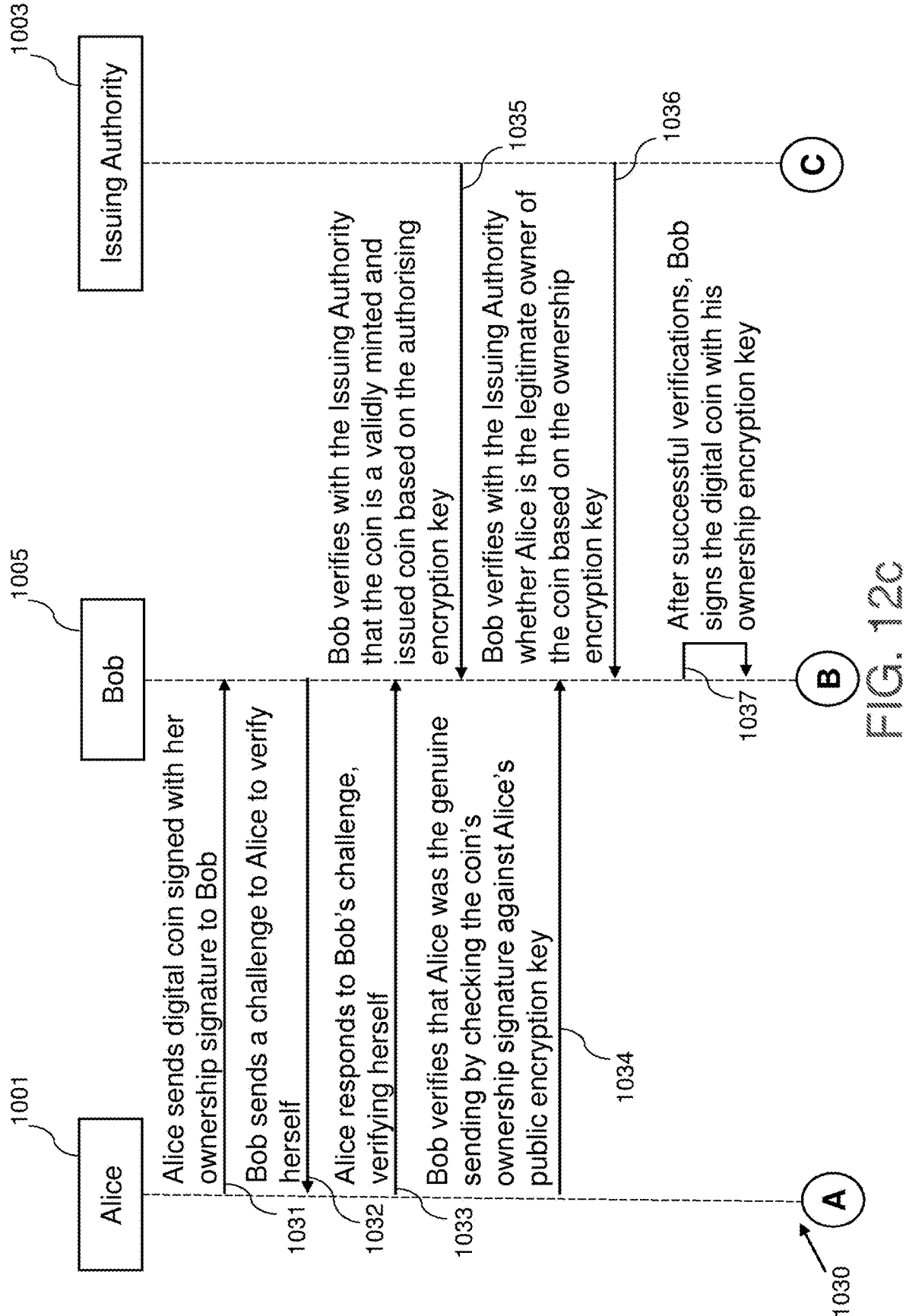
FIG. 12c is a first part of a sequence diagram of a method for carrying out a transaction with a digital coin and registering the transaction with a central bank or issuing authority.

FIG. 12*c* shows a first part of a sequence diagram 1030 of a method for carrying out a transaction with a digital coin and registering the transaction with a central bank or issuing authority. For the purposes of the following example, a first endpoint user, Alice 1001, is considered to be transferring ownership of a coin to a second endpoint user, labelled Bob 1005.

In a first operation 1031 of the transaction, Alice 1001 transmits a signed and authorised coin that has been signed with Alice's ownership signature, ((Coin, Alice_sig), auth_sig), to Bob 1004. As discussed above, the signed coin has been signed using an 'ownership signature' encryption key issued to Alice by the Issuing Authority 1003 (the QS cloud platform/system 902) and known only to the QS cloud platform/system 902 and Alice 1001.

Optionally, in response to receiving the signed coin from Alice 1001, Bob 1005 may request that Alice 1001 verifies herself via a challenge-response mechanism. In the first portion of the challenge-response mechanism, in operation 1032, Bob 1005 challenges Alice 1001 to verify herself.

In response to Bob's 1005 challenge, Alice 1001—in operation 1033—signs Bob's challenge using a private key to verify herself. Each user 904 of the QM system 900 may be issued an asymmetric key pair comprising a respectively unique public encryption key and private encryption key by the QS cloud platform/system 902.

In response to receiving Alice's 1001 signed encrypted coin pair, or if the optional verification 1032 and 1033 is carried out, in response to Alice's 1001 successful verification, Bob 1005—in operation 1034—verifies, with Alice 1001, that the Alice was the genuine sender of the signed coin pair by checking the ownership signature of the signed coin against Alice's 1001 public key. If Alice's 1001 public key is found to match the signature on the signed coin, Bob 1005 can be confident that the coin genuinely originated from Alice 1001 and not a (malicious) third party claiming to be Alice.

Additionally, in operation 1035, Bob 1005 further verifies, with the Issuing Authority 1003, that the coin is a validly minted and issued coin by checking the authorising signature against the public encryption key belonging to the Central Bank 1002. If the Central Bank's 1002 public key is found to match the authorising signature on the signed coin, Bob 1005 can be confident that the coin is a validly issued and minted coin.

Additionally, in operation 1036, Bob verifies, with the Issuing Authority 1003, that Alice's ownership signature on the transferred digital coin corresponds to the ownership signature recorded in the Database of Coins 1004. In other words, Bob verifies, with the Issuing Authority 1003, that Alice 1001 (who is claiming to be the owner of the digital coin) is recorded as the owner of the digital coin in the Database of Coins 1004 held by the Central Bank 1002. In this way, Bob can be assured that the digital coin being transferred to them has not been stolen from its true owner.

In response to the successful verification of the coin, Bob 1005—in operation 1037—signs the coin with an ownership key associated with Bob 1005, thereby adding his signature onto the coin.

Figure 12D:
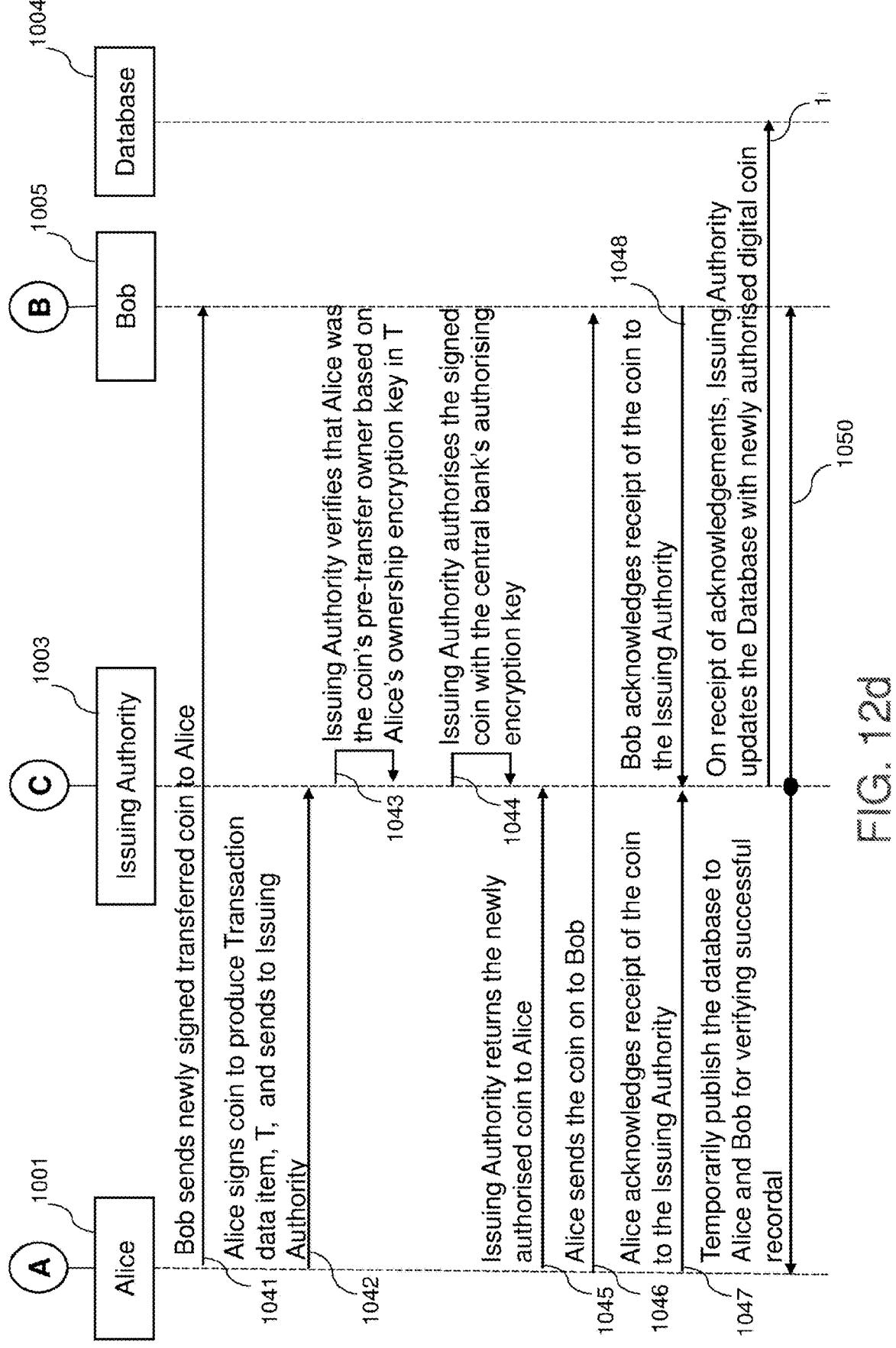
FIG. 12d is a second part of a sequence diagram of the method for carrying out a transaction with a digital coin and registering the transaction with a central bank or issuing authority.

FIG. 12*d* shows a second part of a sequence diagram of a method for registering a transaction using a minted digital coin, with a Central Bank 1002 and/or Issuing Authority 1003. This transaction may, for example, be the transaction between Alice 1001 and Bob 1005 described above with reference to FIG. 12*c*.

In a first operation 1041, Bob 1005 sends the newly signed coin to Alice 1001.

Subsequent to receiving the signed coin pair from Bob 1005, Alice 1001—in operation 1042—signs the coin pair to generate a Transaction data item. The Transaction data item therefore comprises the original digital coin (signed with Alice's ownership signature and the authorising signature) with Bob's ownership signature added, and with Alice's ownership signature added after Bob's. Alice 1001 sends the Transaction data item to the Issuing Authority 1003.

In response to receiving the Transaction data item from Alice 1001, the Issuing Authority 1003—in operation 1043—verifies that the current version of the coin stored in the Database of Coins 1004 and the received Transaction data item are both signed using Alice's 1001 public key. In this way, the Issuing Authority 1003 is able to verify that the transaction of the coin from Alice 1001 to Bob 1005 was made from an endpoint user (Alice 1001) who is recorded as the valid owner of the coin. In other words, the Issuing Authority 1003 verifies that Alice 1001 is the registered pre-transaction owner of the coin.

Subsequent to the successful validation of the Transaction data item in operation 1043, the Issuing Authority 1003—in operation 1044—signs the 'Bob-signed' coin (Coin, Bob_sig) with the authorising signature of the Central Bank 1002 to produce an authorised and signed coin: ((Coin, Bob_sig), Auth_sig). In this way, the Issuing Authority 1003 initiates the ownership of the coin from Alice 1001 to Bob 1005. This produced authorised and signed coin is returned to Alice 1001 in operation 1045.

In response to receiving the authorised and signed coin, Alice 1001—in operation 1046—sends Bob 1005 his newly owned coin. In response, both Alice 1001 and Bob 1005 acknowledge the transfer of the ownership of the coin by transmitting their respective acknowledgements to the Issuing Authority 1003 in operations 1047 and 1048 respectively.

In an alternative arrangement, the Issuing Authority 1003 could send the authorised and signed coin directly to Bob 1005, instead of sending this coin to Alice 1001 for Alice 1001 to forward the coin to Bob 1005. In such an arrangement, the Issuing Authority 1003 can send Alice 1001*a* notification of the sending of the coin to Bob 1005. Alice 1001 and Bob 1005 can then acknowledge the transfer of the ownership of the coin by transmitting respective acknowledgements to the Issuing Authority 1003 of receipt of the notification and the coin.

In response to receiving both acknowledgements, the Issuing Authority 1003—in operation 1049—completes the transfer by updating the Database of Coins 1004 with the modified coin, thereby recording Bob's 1005 new ownership of the digital coin.

Alternatively, instead of Alice's 1001 coin being transferred to Bob 1005, instead, Alice's 1001 coin may be destroyed or deleted and Bob 1005 issued with a new coin of the same value. The only difference would be that a new coin serial number is assigned instead if the coin serial number being retained.

The Issuing Authority 1003, having registered the transaction, makes—in operation 1050—the Database of Coins 1005 publicly available on a narrowband API so that the coin owners Alice 1001 and Bob 1005 can check their holdings to verify successful registration of the transaction. In the context of this application, making the Database of Coins 1005 publicly available may mean making the Database of Coins 1005 available only to those users 904 (e.g. Alice 1001 and Bob 1005) who have participated in the transaction.

The methods and systems described above in relation to FIGS. 12*a* to 12*d* offer several benefits for the implementation of CBDCs. For example, the personal information associated with a user's finances can be protected because the amount of money in each transaction is classified. This secrecy is obtained because the amount of money associated with each transaction is never (or need never) be made publicly available outside of the two parties involved in the transaction. Additionally or alternatively, transactions carried out according to the methods and systems described above in relation to FIGS. 12*a* to 12*d* may be fungible. For example, if Alice 1001 owns a coin worth £10 and intends to transfer £6 to Bob 1005 then Alice's coin 1001 may have its value changed from £10 to £6 and be transferred to Bob by the Issuing Authority 1003. Simultaneously, a new coin with a value of £4 is issued to Alice 1001 by the Issuing Authority 1003. This method of fungible transfer aligns with UTXO philosophy. Alternatively, Alice's 1001 £10 coin may be destroyed or deleted and Alice may be issued with a new coin with a value of £4 while Bob 1005 is issued with a different new coin with a value of £6.

Further, if a user 904 of the QM system 900 loses their wallet, it may be possible for said user 904 to retrieve their money because the Database of Coins 1008 stores a record of who owns each Coin 1004. Such a system may run at varying levels of anonymity. Total anonymity may be achieved because only public keys are revealed and the public keys do not need to be signed. In practical terms, partially anonymised transfers may be implemented where the receiver's (Bob 1104 in the example of FIGS. 12*c* and 12*d*) public key is certificated. In this way, it is possible for Alice 1102 to verify that Bob 1104 is the genuinely intended recipient of the Coin 1004. In such a system, the Issuing Authority 1006 may have a complete view of the amount of money in circulation, without knowing who owns any particular coin unless they disclose their public key to the Issuing Authority. This ensures a high level of personal data security in the system 900.

In instances where the coin further comprises a transaction count, the Issuing Authority 1003 may be further configured to increment the transaction count by 1 each time it performs operation 1049. In other words, each time the digital coin is replaced in the database with a matching digital coin indicating that the owner of the coin has changed, the Issuing Authority increments the transaction count of the Coin by 1 to reflect the completion of the transaction.

Figure 8:
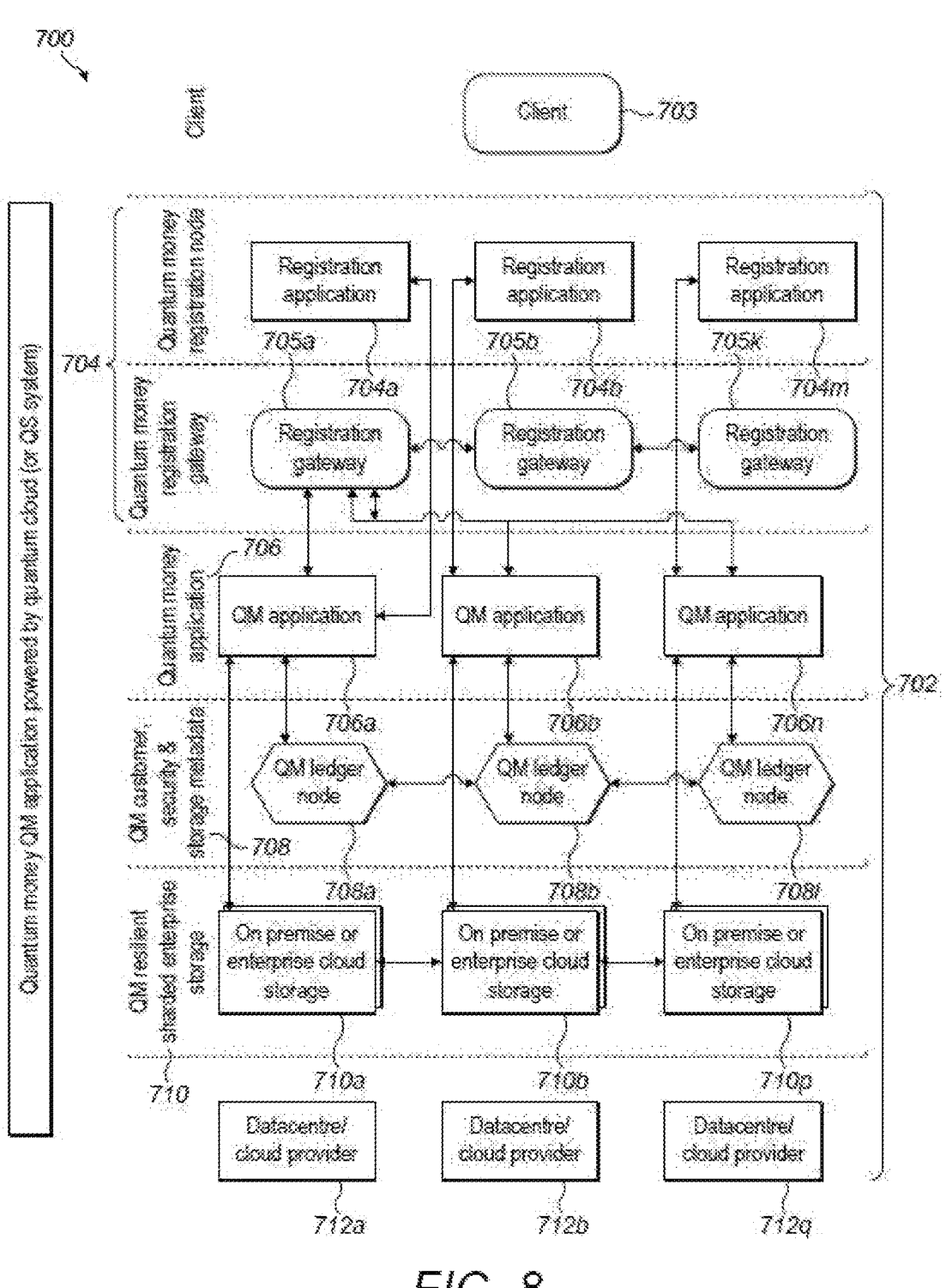
FIG. 8 is a schematic diagram of an example quantum safe payment system.

FIG. 8 is a more detailed schematic diagram illustrating an example QS payment system 700 that is based on and leverages the use of a QS cloud platform/system 702 based on the QS system(s) 100, 165, 170, 175, 180 and/or 190 as described with reference to any of FIG. 1a to 6d, combinations thereof, modifications thereto and/or as described herein. The QS payment system 700 is a more detailed diagram of a QM money system 900 according to the schematic diagram of FIG. 7. The QS payment system 700 uses the concept of Quantum Money (QM) and uses DLT/blockchain and storage technologies/layers within the QS cloud platform 702 to store and transfer money for registered end point devices of end users such as, without limitation, for example customers, consumers, corporates, users and the like. This generates improved efficiencies and negligible transaction costs compared with crypto currencies whilst removing exchange rate risk and creating consumer trust by representing value in their native currency. For example, consumers struggle to use crypto currencies for ordinary transactions (as opposed to speculation) because of wild exchange rate fluctuations, which means they cannot trust that their assets (e.g. money) will have the same value from day to day. This is problematic when cryptocurrency transactions take a long to process, e.g. in Bitcoin this may be due to Bitcoin mining and the like. Although cryptocurrencies have tried to address this issue by creating stable coins which are purportedly 100% cash collateralised, the resulting system and use of the system is unwieldy and implies heavy trust in the collateralisation. The customer, consumer, end user and the like are also required to think in terms of a new currency rather than the typical national/country/native currencies they are used to. Further, cryptocurrency systems suffer from manipulation and distrust, which has harmed their uptake by the general global population. Rather, the QS payment system 700 is a QM solution that allows consumers, customers, end users and the like to benefit from the transactional efficiencies of blockchain/DLT, whilst presenting the consumer with a permanent store of value quoted in their native currency and protects the consumer from currency fluctuations in their native currency, although consumers that chose to have QM accounts in multiple different currencies may still be subject to exchange rate fluctuations. Although the QS payment system 700 protects users from changes in the value of funds in the user accounts due to currency value fluctuations, currency exchange rates will be taken into account when processing payments to and from user accounts in different currencies.

In this example, the QS systems/cloud platforms QS system(s) 100, 165, 170, 175, 180 and/or 190 may further be adapted to form part of the QS payment system 700, which includes the QS cloud platform 702 and QM client application 703, which operates on an end user device of a user (not shown) for communicating and performing QM transactions within the QS payment system 700. The QS cloud platform 702 of the QS payment system 700 includes a registration layer 704, an QM application layer 706, a QM security layer 708 and QM storage layer 710. The QM security layer 708 and QM storage layer 710 may include the functionality of a QS repository/DLT/shared ledger as described herein. The QS cloud platform 702 is configured to form a quantum-safe (QS) network based on at least the QM application layer 706 (e.g. QM money application), a QM security layer 708 (e.g. QM DLT/shared ledger), and a storage layer 710 (e.g. QM resilient sharded enterprise storage). The QM application layer 706 includes one or more QM application 706a-706n each of which performs the QS cloud platform side of the QS payment system 700. The QS cloud platform 702 may be implemented on one or more datacentres and/or cloud providers 712a-712q and the like.

The QS network may be implemented, as described with respect to FIG. 1a to 6d, to include at least one or more QS server(s) and a distributed ledger technology (DLT) repository, which are configured or adapted to form the QM application layer 706, QM security layer 708 and QM storage layer 710. In the QS payment system 700, the registration layer 704, QM application layer 706, QM security layer 708 and QM storage layer 710 of the QS cloud platform 702 are adapted for, without limitation, for example registering, recording and tracking a plurality of QS payment transactions between, without limitation, for example an endpoint device and the QS payment system, two or more endpoint devices and the like and/or any other type of digital asset transfer and/or payment and the like. Each QS server of the QS cloud platform 702 includes a hardware security module (HSM), or other secure memory, such as a secure processor enclave such as Intel Software Guard Extensions on Intel x86 Processors and the like, for storing an identical set of quantum distributed (QD) keys or quantum safe keys. The identical set of QD keys having been distributed to each of said QS server(s) in a quantum-safe manner as described with respect to FIG. 1a to 6d and/or as described herein. The QS server(s) are configured to communicate securely with each other and the DLT repository using one or more available QD keys from the identical set of QD keys. Furthermore, one or more further available QD keys from the set of QD keys are distributed, as described with reference to FIG. 1a to 1k and/or as herein described, as further QD keys/quantum safe keys to each of the endpoint devices that are registered with the quantum cloud platform 702 and QS payment platform 700. Each of the users of the endpoint devices may be registered with a QM account in the QS payment platform 700.

The QS cloud platform 702 of the QS payment system 700 includes a registration layer 704, an QM application layer 706, a QM security layer 708 and QM storage layer 710, which includes a QS repository/DLT/shared ledger as described herein. The QM client application 703 performs the end device portion of the QS payment system 700. This may be used, without limitation, for example for registering the user or endpoint device with the QS payment system 700 via registration application(s) of registration nodes 704a-704m through registration gateways 705a-705k. These communicate in a quantum-safe (QS) manner via the QS network with one or more of the QM applications 706a-706n of the QM application layer 706 for registering a QM account and the like in relation to a user and/or an end point device of the user and the like. The QM account of a user being stored and managed via one of the QM applications 706a-706n within the security and storage layers 708 and 710 of the QS network. Each QM application 706a-706n operates across or over the QS cloud platform 702 using the QS network.

As is explained above, the QS network is formed by a plurality of QS servers that communicate over quantum-safe channels using available QD keys that have been distributed to each QS server via QKD (e.g. satellite QKD and/or any other type of suitable QKD system the like). The QS servers may form, or operate to form, the QS DLT repository and QS Cloud application servers of the QS network, which includes the QM security layer 708 and the QM storage layer 710. In this example of the QS payment system 700, the QM security layer 708 includes a plurality of QM ledger nodes 708a-7081 and the QM storage layer 710 includes a plurality of on premise or cloud storage 710a-710p, all of which communicate with each other over quantum-safe channels formed via the QS server(s) of the QS network using corresponding QD keys and the like. The QS distributed ledger technology (DLT) repository formed by the QM security and storage layers 708 and 710 is a private and/or permissioned distributed ledger repository operated within the QS network of the QS cloud platform 702. The QM security layer 708 operates the QS DLT repository via a network of a plurality of QM ledger nodes 708a-7081, which are all inside the QS network of the QS cloud platform 702 and operated/implemented via data centres 712a-712q and the like (e.g. around the world). The QS cloud platform 702 may be an aggregation of local metropolitan QS cloud platform clusters that may operate using pre-shared QD keys to connect each cluster internationally. As an option, the QD keys for the metropolitan QS cloud platform clusters may be distributed to each metropolitan QS cloud platform using one or more forms of QKD such as, without limitation, for example satellite QKD, optical fibre QKD, optical QKD, and/or any other suitable method of QKD the like. Alternatively or additionally, the QS cloud platform 702 may be implemented as a global QS cloud platform via a plurality of satellites in which QD keys are distributed using satellite QKD via one or more of the satellite(s). The QM nodes 708a-7081 of the QM security layer collectively authorise and record transactions and manage the on-off ramp of different currencies, all collected by currency accounts administrated by QS payment system 700.

Underlying the quantum money (QM) electronic money (QM e-Money) solution of the QS payment system 700, which includes QM Application(s) 706 and the QM Application client 703 and the QS cloud platform 702, is: a private distributed ledger technology (DLT) repository formed by the QM security and storage layers 708 and 710 of the QS cloud platform 702 featuring QKD quantum-safe algorithms, ensuring that all value represented and stored on the DLT is quantum-safe; the customer QM App 703, which allows transfer of money into and out of the system 700, along with transfers between participants of the QS payment system 700; a QM token which features a floating exchange rate against the fiat currency(ies)/crypotocurrencies/gaming tokens and the like and/or as the application demands; know your own client or know your client or know your customer (KYC)/Anti-money laundering (AML) checks and/or controls for users, consumers, and/or individuals that will need to register with the QS payment system 700 via the QS cloud platform 702; KYC/AML checks and/or controls for other users such as corporates/companies/organisations and the like; a centrally-operated 'treasury'; at least one QM pooled bank account, operated by a regular, or conventional, licensed bank, which holds the pooled deposits of users; a QM registry/ledger stored within the DLT layers 708/710, accompanying the QM pooled bank account, recording the amount of fiat currency belonging to each user; a set of QM tokens which have both a nominal value and a 'last transaction' value, the nominal value being a fixed value in QM units and the 'last transaction' value being the value at which the token(s) were last exchanged, the 'last transaction' value for tokens is maintained while they are in a user account, to protect users from exchange rate fluctuations; regulator notary nodes for signing transactions and providing regulatory enforcement and regulatory reporting and transparent transaction access or authenticated recipient and sender; an ORACLE service for live Market Data prices; reporting and administration functions; network ISOC and Operations centre.

Figure 9A:
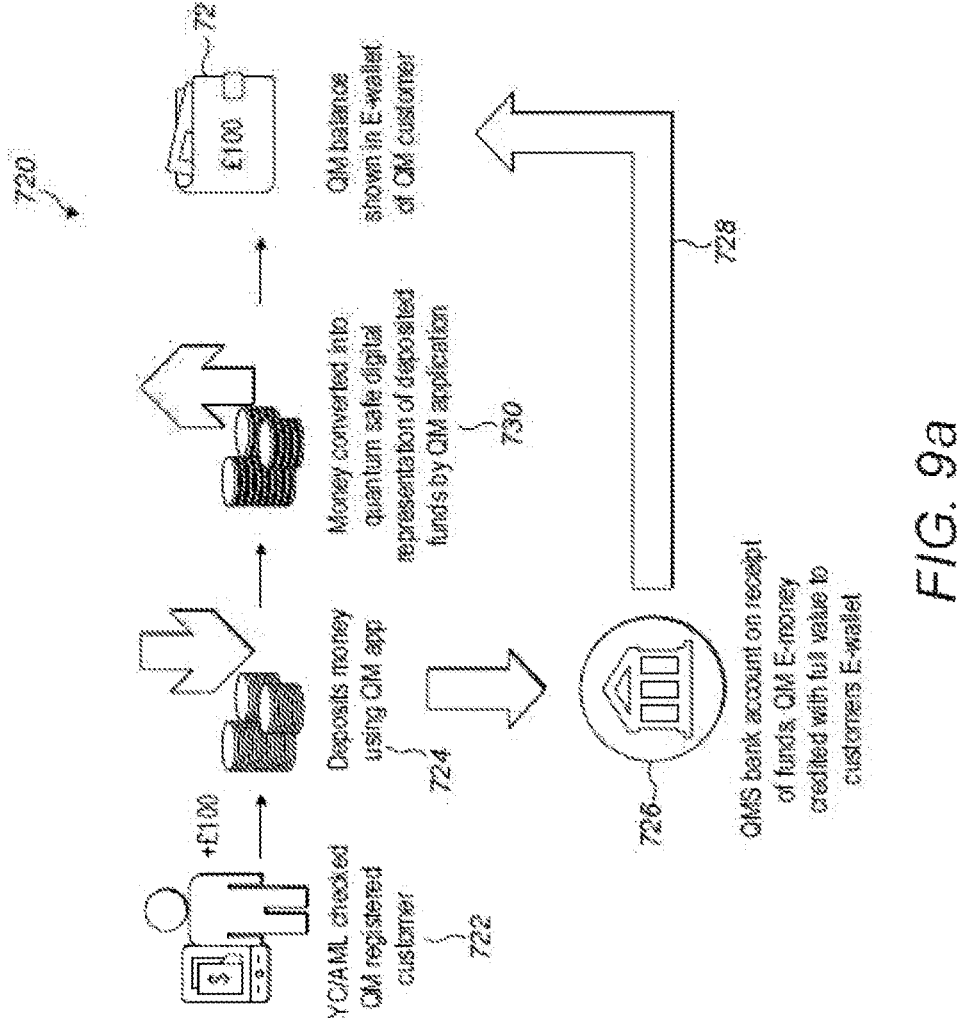
FIG. 9a is a flow diagram of an example quantum safe deposit method.

FIG. 9a is a flow diagram illustrating an example QS payment deposit process 720 of the QS payment system 700. The QS payment deposit process 720 of the QS payment system provides several advantages such as, without limitation, for example, users of endpoint devices and/or customers, corporate users, consumers registered with the QS payment system 700 do not experience currency fluctuations in their native currency after depositing funds within the QS payment system 700. That is, once deposited, the value of the amount in a user account in the QS payment system 700 in the currency of the account (usually the native currency of the user) is constant regardless of fluctuations in the relative values of different currencies. The currency of the account is typically a fiat currency, or digital currency, having a cash value. The digital currency may be a central bank digital currency corresponding to a fiat currency, but in digital form. Such a central bank digital currency may include future central bank digital currencies which have not yet been issued. The digital currency may be regarded as having an electronic cash value. Furthermore, the use of the QS cloud platform and the configuration of the QM registration layer 704, QM application layer 706, QM security layer 708 and QM storage layer 710 means that the end users and their data, transactions, details and the like stored during operation of the QS payment system 700 are protected by quantum safe keys and hence is quantum safe, which means that customer/corporate/end user data is protected with a prolonged shelf life due to the unique QKD cryptography and digital signing technologies implemented as described herein that are implemented by the QS payment system 700 when using the QS cloud platform 702. The use of a QS cloud platform 702 infrastructure to support the QS payment system provides QS keys which are formed from quantum random number generated entropy, for example, entropy provided by a Quantum Random Number Generator (QRNG). Further, the use of a QS cloud platform 702 infrastructure to support the QS payment system 700 allows the QS payment system 700 to be easily operated at scale. The QS payment system 700 includes QM application layer 706 with one or more QM applications 706a to 706n, each of which operates on or over the QS cloud platform 702 and within the QS network of the QS cloud platform, which includes QS DLT functionality combined with quantum encryption using QD key(s)/quantum safe keys and data storage techniques. This means that all value represented and stored on the QS DLT of the QS cloud platform 702 is quantum safe (e.g. secure from cyber attack, even from a quantum computer). The QM applications 706a to 706n operate the QS cloud platform 702 side or server-side part of QS payment process 720 of the QS payment system 700, whereas the QM client application 703 operates the client-side of the QS payment process 720 on the endpoint device of the user/customer and/or corporate user and the like registered with the QS cloud platform 702. The QS payment system 700 enables efficient transactions between traditional fiat currencies, such as national currencies, and non-traditional currencies, such as cryptocurrencies. Further, where cryptocurrencies are involved in the transaction, the absence of algorithmics in decrypting the keys in the QS payment system 700 may enable more efficient processing of payments and transfers than blockchain based approaches. The QS payment system 700 is flexible, and can be easily be integrated with, or into, existing payment processing and banking platforms.

The QS payment deposit process 720 includes the following steps of:

In step 722, for a user not already having a QM account, a QM account is created by the user (e.g. a consumer, end point user, end user, corporate, corporate user and the like) of an endpoint device by executing/operating the QM client-side application 703 (e.g. QM App) that is installed on the endpoint device. It is assumed that the user has already registered with the QS cloud platform 702 as described herein and is communicating over a QS channel, via the QM App 703, using a QD key or QS key stored in a secure enclave on the endpoint device. The QM application 706a is configured, once the authentication, (know your client or know your customer) (KYC) and/or Anti money laundering (AML) checks have been performed in relation to the user, such as a consumer, to create an QM account for the user, which QM account is stored in the QM security and storage layers 708 and 710 of the QS cloud platform 702. Alternatively, for a user already having a QM account, in step 722, the user account corresponding to the user stored in the QM security and storage layers 708 and 710 of the QS cloud platform 702 is identified, and is checked that the user account is in good order.

The QM App 703 includes an electronic wallet (e-wallet) or digital wallet 721 that stores, on the client-side, the total amount of fiat currency that the user has in the QM account. This total amount, or balance, will generally start at zero until money is deposited in the account by the user of the account, or some other user of the QS payment system 700. In the illustrated example of FIG. 9a, an initial balance of zero is assumed for the e-wallet 721, for simplicity and clarity.

The electronic wallet (e-wallet) or digital wallet 721 may optionally include a long-term quantum secure custody storage option and virtual quantum wallet supported by the quantum money application and/or the QS payment system. Such long-term quantum secure custody may involve the use of an offline/standalone quantum entropy store and offline/standalone quantum entropy usage.

In step 724, the user instructs the QM App 703 to deposit a value, such as a fiat currency value or digital currency value (e.g. £100) into the QM account of the user. The digital currency may be a central bank digital currency corresponding to a fiat currency, but in digital form. Such a central bank digital currency may include future central bank digital currencies which have not yet been issued. The digital currency may be regarded as having an electronic cash value. This may be regarded by the user as depositing the fiat or digital currency into the e-wallet 721 of the QM account of the user. This deposit may be made from any source. For example, the deposit may be made from a traditional bank account of the user, or may be made through a payment service, such as ApplePay or PayPal. The QM App 703 sends a deposit transaction request to the QM application 706a of the QS cloud platform 702 via the corresponding QS channel(s). The QM App 703 may also send data representative of bank account details of the user, or other payment details, to enable the QM application 706a to transfer the fiat currency value or digital currency value (e.g. £100) from the bank account of the user, which bank account is not a part of the QS payment system 700 and is typically a traditional bank account, into a QM bank account pool operated by the QS payment system 700. In some examples, the payment may be taken from a bank account of a payment service, rather than from a bank account of the user. The QM bank account pool is a traditional bank account that is configured to pool all deposits requested via corresponding plurality of QM Apps of a plurality of users registered with the QS cloud platform 702 and/or QS payment system 700. The traditional bank account holding the QM bank account pool will typically be operated by a licensed bank.

In step 726, the QM application 706a receives the deposit transaction request from the user via the corresponding QS channel, along with the required data representative of bank account details, and transfers the fiat value or digital value of the fiat currency or digital currency (e.g. £100) to the QM bank account pool.

In step 728, once the funds or fiat value or digital value of currency (e.g. £100) have been cleared and are in the QM bank account pool, the QM application 706a sends via the QS channel data representative of the total amount and/or transactions performed and the like in the QM account of the user. For example, the QM application 706a sends data representative of QM e-money/digital money that is credited with full value of the deposit (e.g. £100) to the e-wallet/digital wallet 721 of the QM App of the user. Although data representative of QM e-money is sent back to the user, the QM App 703 may display to the user the deposited fiat currency value or digital currency value (e.g. £100 of value) represented by the QM e-money. As an option, the user only sees the amount of currency deposited in the QM account as the deposited fiat currency or digital currency value. Typically, this fiat currency or digital currency is the native currency of the user account. However, the QM application 706a and QS payment system 700 uses a quantum safe digital representation of the deposit/e-Money safe that is stored in a QM digital ledger and linked to the QM account of the user. For example, the fiat currency or digital currency value is converted into QM e-Money, which may be represented by one or more QM tokens, which are stored in a QS manner within the QS cloud platform 702 of QS payment system 700. That is, the fiat currency or digital currency value of the deposit is converted into one or more QM tokens at a current exchange rate, and the QM tokens are time stamped. The fiat currency value or digital currency value of the fiat currency or digital currency that the user deposited (e.g. £100) is represented in his QM App by QM tokens (or QM e-Money) which are time stamped and at the moment of transaction were worth precisely £100. The value of the time stamped QM tokens relative to the fiat currency or digital currency of the deposit (that is, the fiat currency or digital currency of the user account) at the time of their time stamp is maintained by the QS payment system 700, regardless of subsequent changes in the exchange rate between the fiat currency or digital currency of the deposit and the tokens. Accordingly, it will be understood that although the value of the QM tokens relative to any specific fiat currency or digital currency will likely fluctuate over time due to changes in currency exchange rates, the customer will not see, or be affected by, such fluctuations, and will retain the full fixed value of the specific fiat currency or digital currency amount deposited by the user into their e-wallet.

In step 730, data representative of the QM bank account pool, which is a pooled bank account holding the fiat currency or digital currency or cash value of all QM consumers, is linked to a QM registry or ledger denoting which user is entitled to which fiat or digital currency amount and the corresponding QM time stamped tokens. For example, the QM registry or ledger may include data representative of a plurality of users in which each user is mapped to the corresponding fiat or digital currency amounts that that user has deposited along with the corresponding data representative of the corresponding QM tokens, which have been timestamped. This enables the QM application to manage the accounting of the QM registry/ledger to prevent double spend, where the QM registry/ledger is stored within the QM security and storage layers 708 and 710 of the QS cloud platform 702 of the QS payment system 700. The QS payment system 700 may check that the data QM value or balance for a user account indicated in steps 728 and 730 correspond.

It will be understood that if further payments are made by a user the payment deposit process 720 is repeated for each payment, and the fiat currency or digital currency value displayed to the user updated as appropriate.

Each QM token is a unit of currency with a QM value whose value in different fiat currencies or digital currencies fluctuates, due to changes in exchange rates related to the QM bank account pool, but which the user never sees the QM value. Rather, the user sees the value of the fiat currency or digital currency deposited by the user. The QM token and/or QM application is configured or adapted to ensure or guarantee that the user always receives the benefit for the full value of the fiat currency or digital currency they have deposited into their QM account, thus any currency fluctuations occurring with the fiat currency or digital currency are not passed on to the user.

Figure 9B:
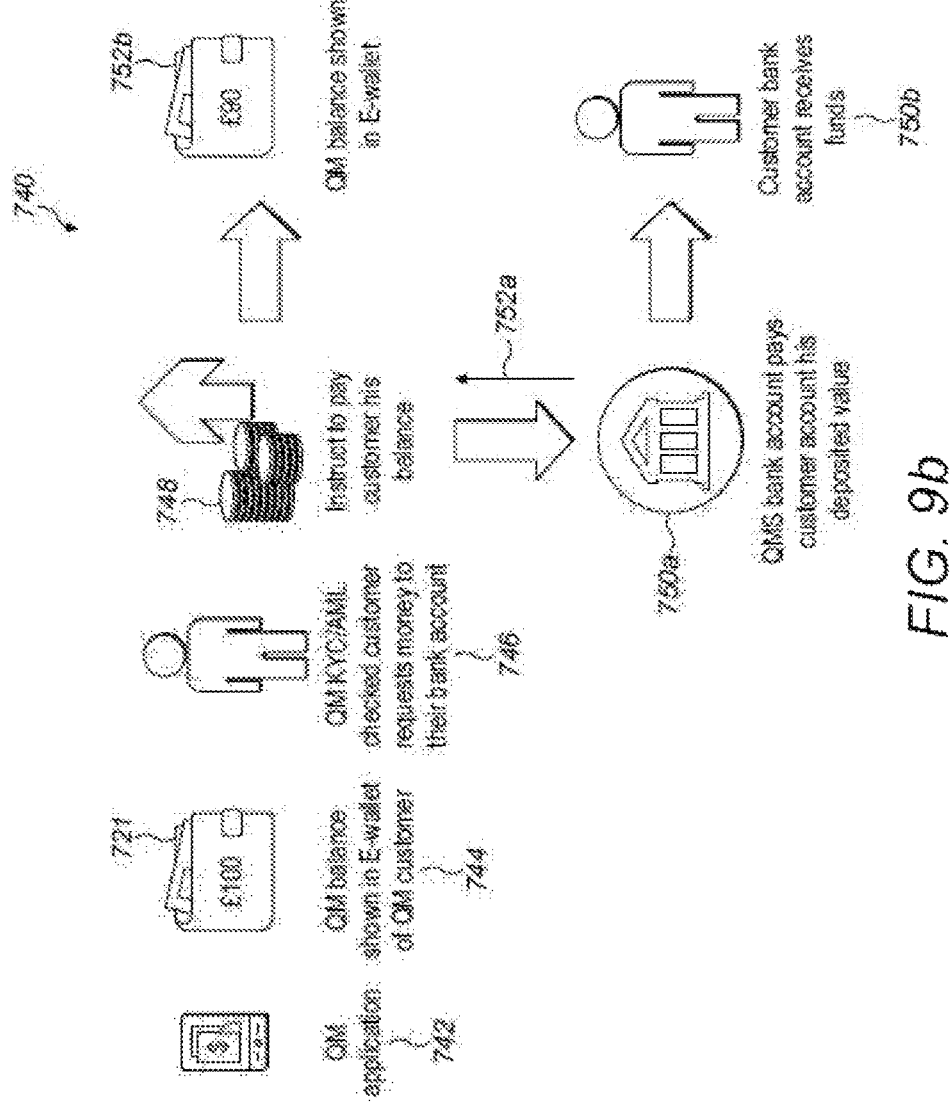
FIG. 9b is a flow diagram of an example quantum safe withdrawal method.

For simplicity, and to avoid tedious repetition, the examples below refer to a fiat currency or currencies. However, similarly to the example set out above, the fiat currency ir currencies alternatively be replaced by a digital currency or currencies. As discussed above, the, or each, digital currency may be a central bank digital currency corresponding to a fiat currency, but in digital form. Such a central bank digital currency may include future central bank digital currencies which have not yet been issued. The digital currency may be regarded as having an electronic cash value FIG. 9*b* is a flow diagram illustrating an example QS payment withdrawal process 740 of the QS payment system 700. The QS payment withdrawal process 740 of the QS payment system 700 provides corresponding advantages to those explained above with reference to the QS payment deposit process 720.

The QS payment withdrawal process 740 includes the following steps of:

In step 742, an endpoint device of the user executes the QM client-side application 703 (e.g. QM App) that is installed on the endpoint device. It is assumed that the user has already created a QM account and has previously deposited fiat currency into the QM account as described in relation to QS payment process 720 of FIG. 9*a*, or has received a payment into the QM account in some other manner, such as one of the further QS payment processes discussed below. It will be understood that the user must have an account in order to make a withdrawal from the account.

In step 744, the QM App 703 displays the QM balance (e.g. £100) of the e-wallet/digital wallet 721 of the user's QM account.

In step 746, in response to the user requesting withdrawal of a fiat currency value (e.g. £10) from the QM account, the QM App 703 of the user may communicate via a QS channel to the QS payment system 700 of the QS cloud platform 702. This may be performed by the endpoint device setting up a QS channel, via the QM App 703, using a QD key or QS key stored in a secure enclave on the endpoint device, and/or as described with reference to FIG. 1*a* to 6*d*. The QM App 703 and/or the QM application 706*a* of the QS payment system 700 are configured to perform authentication, (know your client) (KYC) and/or Anti-money laundering (AML) checks in relation to the user.

In step 748, in response to the authentication being successfully performed, KYC and/or AML checks confirming that the user is who they say they are etc., the QM App 703 sends a QM withdrawal transaction request to instruct the QM application 706*a* to transfer and/or pay the user the requested withdrawal amount (e.g. £10) into their bank account. The QM App 703 may also send data representative of bank account details of the user to enable the QM application 706*a* to transfer the fiat currency value (e.g. £10) from the QM bank account pool operated by the QS payment system 700 into the bank account of the user, if the user has enough QM funds to do so.

In steps 750*a* and 750*b*, the QM application 706*a* retrieves the user account information from the QM registry/ledger in relation to the requested fiat withdrawal amount, the corresponding QM tokens and the like and, after checking the user has the appropriate (i.e., sufficient) amount of fiat currency represented by the timestamped QM tokens in their QM account (e.g. the £100 deposited during QS payment deposit process 720), transfers the fiat value of currency requested to be withdrawn (e.g. £10) from the QM bank account pool into the bank account of the user.

Once the funds or fiat value of currency (e.g. £10) transferred in step 750*b* have been cleared and are in the bank account of the user, in step 752*a* the QM application 706*a* sends via the QS channel data representative of the total amount and/or transactions performed and the like in the QM account of the user. The QM application 706*a* may update the QM registry/ledger to remove the QM tokens that correspond to the fiat currency value withdrawn. The amount of tokens corresponding to the fiat currency value withdrawn will be calculated based on the value of the tokens in the fiat currency of the user account at the time of the timestamp indicating when the tokens were originally deposited into the user account. It will be understood that calculations based on current currency exchange rates may be required if the withdrawn currency is not the fiat currency of the user account. In step 752*b*, the QM application 706*a* may also sends data representative of QM e-money/digital money (or QM tokens) that were withdrawn with full value of the withdrawal (e.g. £10) to the e-wallet/digital wallet of the QM App of the user. The QM App may update this accordingly. Although QM e-money is "removed" from the e-wallet/digital wallet of the user, the QM App 703 may display to the user the withdrawn fiat currency value of £10 of value and/or the total value of the QM account (e.g. £90—i.e. £100-£10) of the user represented by the QM e-money left in the e-wallet and the QM tokens that are linked to the user. As an option, the user only sees the amount of currency deposited in the QM account as a fiat currency value. However, the QM application 706*a* and QS payment system 700 uses a quantum safe digital representation of the deposit/e-Money safe that is stored in the QM digital ledger and linked to the QM account of the user. For example, the fiat currency value is converted into QM e-Money, which may be represented by one or more QM tokens, which are stored in a QS manner within the QS cloud platform 702 of QS payment system 700. That is the fiat currency value of the deposit is converted into one or more QM tokens, which are time stamped. As explained above, the QM token and/or QM application is configured or adapted to ensure or guarantee that the user always receives the benefit for the full value of the fiat currency they have deposited into their QM account, thus any currency fluctuations occurring with the fiat currency are not passed on to the user.

Figure 9C:
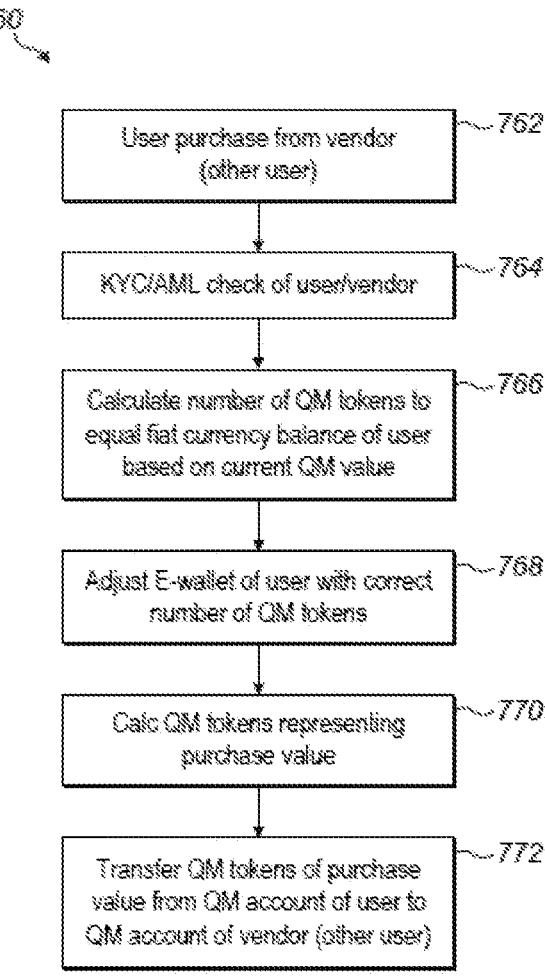
FIG. 9c is a flow diagram of an example quantum safe payment method.

FIG. 9c is a flow diagram illustrating an example QS payment process 760 of the QS payment system 700 for making payments between users of endpoint devices registered with the QS cloud system 702 and QS payment system 700. In this example, the user may have a fiat value of currency in their QM account (e.g. £90). The QS payment process 760 of the QS payment system 700 includes the following steps of:

In step 762, when the user of an endpoint device wants to make a purchase (e.g. £10) from or payment to a vendor (or other user) that also has a QM account with the QS payment system, the QM App 703 of the user sends a payment transaction request, via the QS channel between endpoint device of the user and the QS cloud platform, including data representative of the vendor identity and the payment amount to the QM application 706a of the QS payment system 700 in the QS cloud platform 702. Although this example is described with reference to a vendor, for clarity, it will be understood that the vendor may instead be any other user of the QS payment system.

In step 764, the QS payment system 700 may perform authentication, KYC and/or AML checks on at least the user of the endpoint device, or both the user of the endpoint device and also the vendor (or other user of another endpoint device).

In step 766, if the authentication, KYC, and/or AML checks are confirmed or positive, and confirm that the user and the vendor (or other user) are who they say they are, the QM application 706a of the QS payment system calculates the number of QM tokens required to equal the current fiat balance shown in the QM account of the user and the user e-wallet. This calculation is required because the QM value of QM tokens may fluctuate due to exchange rate fluctuations occurring in relation to the funds of the QM bank account pool, which fluctuations are hidden from the users and/or vendors and the like.

In step 768, the QM application 706a adjusts the user e-wallet accordingly (addition or subtraction) in relation to the QM value with a time stamped transaction showing that at that moment, the user has the required fiat amount. In this example the payment is from the user to the vendor, so the user e-wallet is adjusted by subtracting the fiat amount.

In step 770, the QM application 706a calculates the appropriate QM tokens equally in relation to the purchase/payment value (e.g. £10) at the prevailing exchange rate in that moment, it is also determined that the user has enough QM tokens to complete the purchase/payment, and if not, the purchase/payment is terminated and at least the user notified. If the user has enough QM tokens in the QM account/e-wallet, then the QM tokens to the value of the purchase/payment value (e.g. £10) are then taken from the user's e-wallet and also their QM account recorded on the QM registry/ledger, where the e-wallet and QM registry/ledger are adjusted to reflect the change.

In step 772, the QM application 706a transfers these QM tokens to the QM account of the intended counterparty (e.g. vendor or other user of another endpoint device and the like) who is owed the fiat currency amount (e.g. £10). At that moment, the QM tokens transferred are reflected in via the QM App in the counterparty's e-wallet as the fiat currency value of the purchase (e.g. £10), time stamped and guaranteed to equal the fiat currency value of the purchase (e.g. £10).

Thus, QM tokens used in conjunction with the security process(es) of the QS cloud platform 702 can be used to transfer value between counterparties who wish to transact in the same fiat currency, without fiat currency actually being exchanged between the parties. That is, only QM tokens representative of the fiat currency purchase value at that moment are taken from one QM account and the corresponding number of QM tokens representative of the fiat currency purchase value at that moment are deposited in the other party's QM account. Even though this example is for an exchange of value (e.g. purchase) between parties using the same fiat currency, this is by way of example only and the invention is not so limited, the skilled person in the art would fully appreciate that this process 760 can be adapted for transferring value between counterparties using different fiat currencies which could be fiat currencies, or they could be crypto currencies, or the gaming tokens of different gaming platforms like Xbox or Playstation. In such a case, an exchange rate associated with the fiat currency/cryptocurrency/gaming tokens and the other fiat currency/cryptocurrency/gaming tokens may be taken into account when converting the number QM tokens associated with a particular value in one fiat currency/cryptocurrency/gaming tokens to be removed from the purchasing party's QM account and converting the required number of QM tokens associated with the particular value in the other fiat currency/cryptocurrency/gaming tokens for depositing in the QM account of the other party.

Figure 9D:
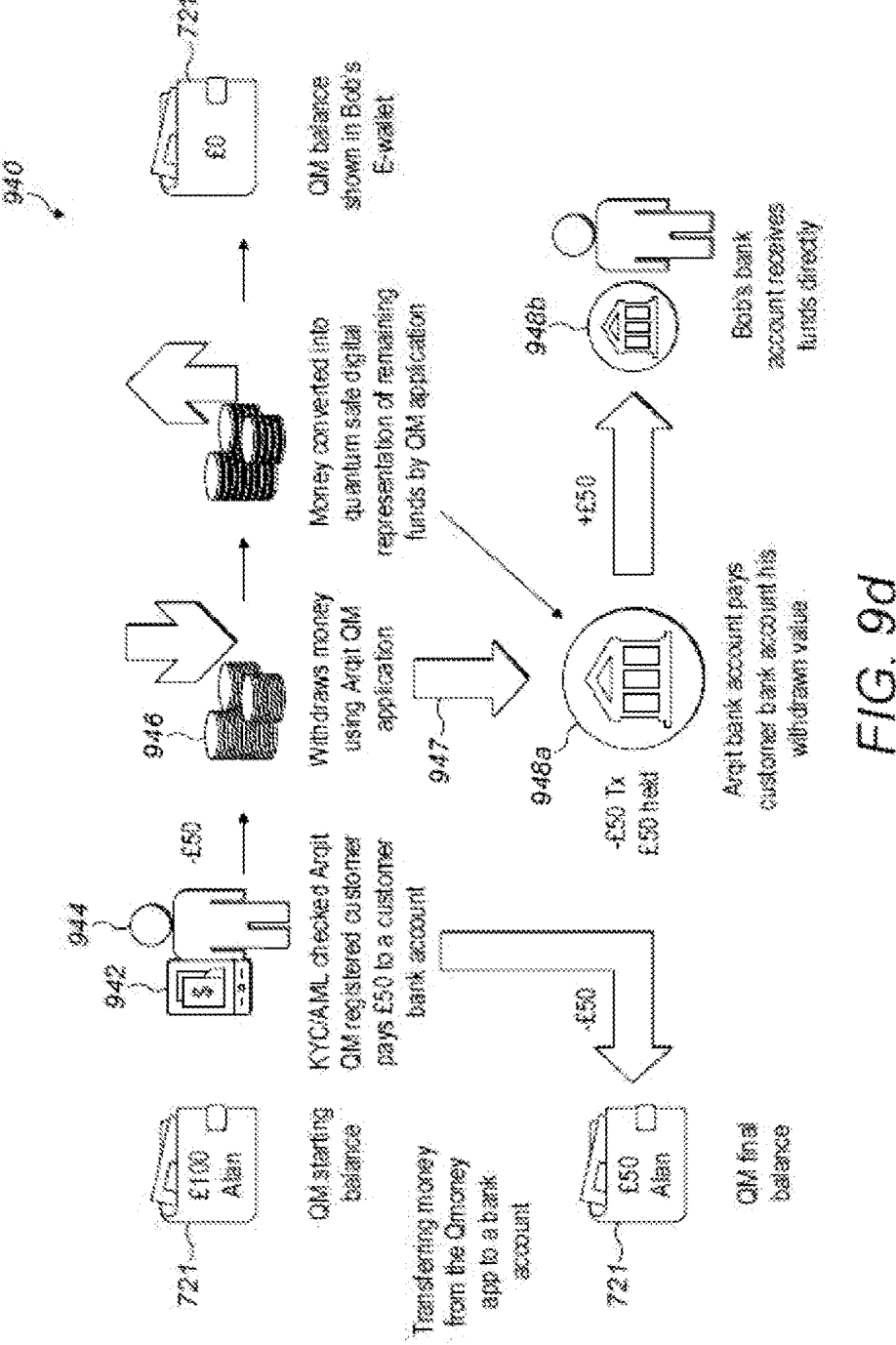
FIG. 9d is a flow diagram of an example quantum safe payment method.

FIG. 9d is a flow diagram illustrating a further example QS payment process 940 of the QS payment system 700. In the further QS payment process 940, a user (Alan) wishes to make a payment (e.g. £50) into an external bank account of another user (Bob). The QS payment process 940 of the QS payment system 700 provides corresponding advantages to those explained above with reference to the QS payment deposit process 720, QS payment withdrawal process 740, and QS payment process 760.

The QS payment process 940 includes the following steps of:

In step 942, an endpoint device of the user (Alan) executes the QM client-side application 703 (e.g. QM App) that is installed on the endpoint device. It is assumed that the user has already created a QM account and has previously deposited fiat currency into the QM account as described in relation to QS payment process 720 of FIG. 9a, or has received a payment into the QM account in some other manner, such as one of the further QS payment processes discussed herein. It will be understood that the user must have an account in order to make a payment from the account. In this example it is assumed that the user (Alan) has a QM balance of £100 in the e-wallet/digital wallet 721 of the user's QM account.

In step 944, in response to the user (Alan) requesting transfer of a fiat currency value (e.g. £50) from their QM account to the bank account of another user (Bob), the QM App 703 of the user may communicate via a QS channel to the QS payment system 700 of the QS cloud platform 702. This may be performed by the endpoint device setting up a QS channel, via the QM App 703, using a QD key or QS key stored in a secure enclave on the endpoint device, and/or as described with reference to FIG. 1a to 6d. The QM App 703 and/or the QM application 706a of the QS payment system 700 are configured to perform authentication, (know your client) (KYC) and/or Anti-money laundering (AML) checks in relation to the user.

In step 946, in response to the authentication being successfully performed, KYC and/or AML checks confirming that the user (Alan) is who they say they are etc., the QM application 706*a* calculates the appropriate QM tokens in relation to the requested transfer value (e.g. £50) at the prevailing exchange rate in that moment, it is also determined that the user has enough QM tokens to complete the transfer, and if not, the requested transfer is terminated and at least the user (Alan) notified. If the user has enough QM tokens in the QM account/e-wallet, then the QM tokens to the value of the transfer value (e.g. £50) are then taken from the user's e-wallet 721 and also their QM account recorded on the QM registry/ledger, where the e-wallet 721 and QM registry/ledger adjusted to reflect the change to the new e-wallet 721 balance (e.g. £50).

The GM application 706*a* then sends a QM withdrawal transaction request 947 to instruct the QM application 706*a* to transfer the requested withdrawal amount (e.g. £50) into the bank account of the other user (Bob), as listed and authorised within the QM App 703.

In steps 948*a* and 948*b*, the QM application 706*a* retrieves the other user (Bob) bank account information from the QM registry/ledger in relation to the requested fiat withdrawal amount, the corresponding QM tokens and the like and transfers the fiat value of currency requested to be withdrawn (e.g. £50) from the QM bank account pool into the bank account of the other user (Bob).

It should be noted that this transfer is directly to the external bank account of the other user (Bob), so any e-wallet 721 of the other user does not show any change in balance value. Although the destination of the transfer is an external bank account, the transaction is fully secured and logged by the quantum safe ledger technology of the QM application 706*a*.

Figure 9E:
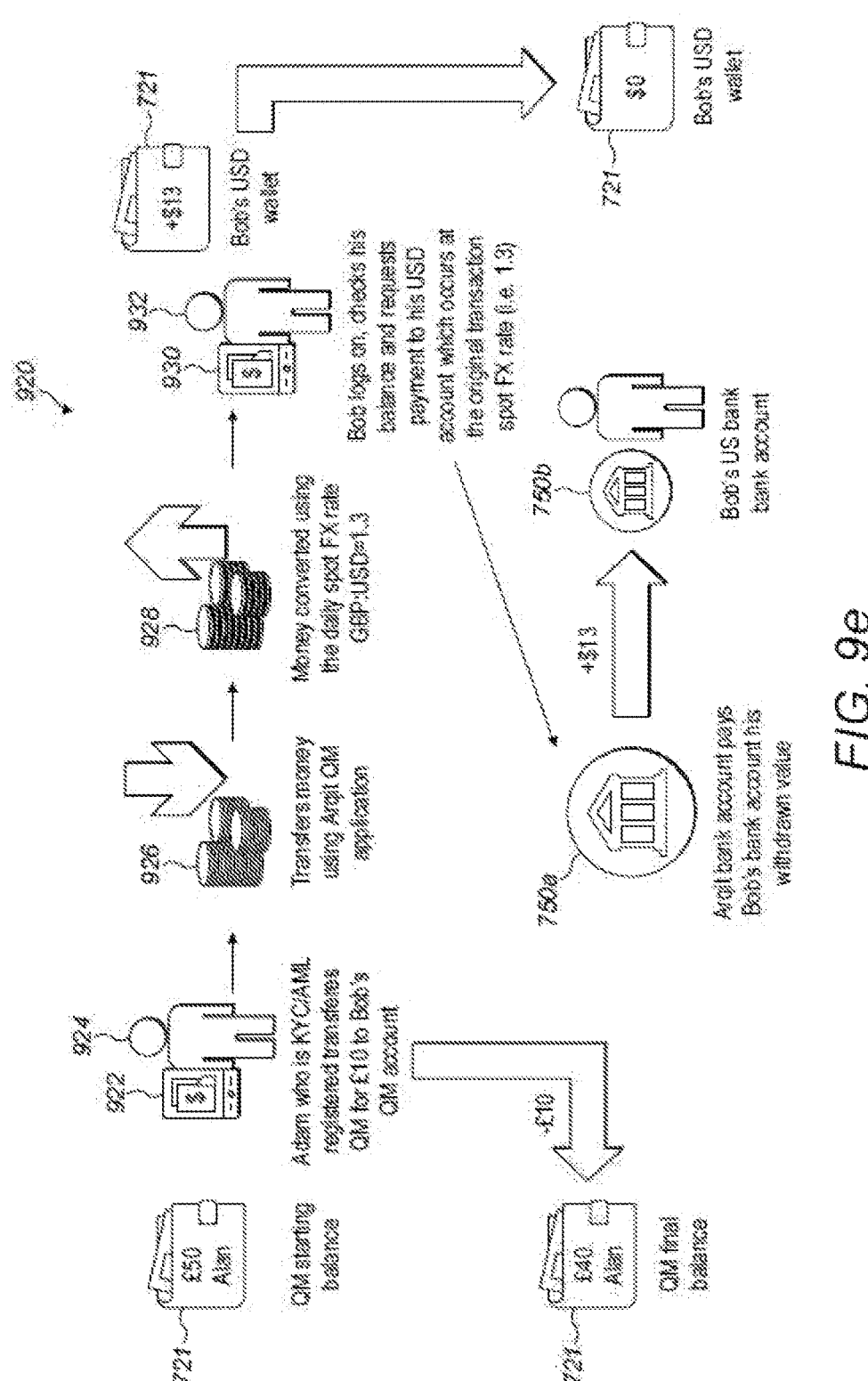
FIG. 9e is a flow diagram of an example quantum safe payment method.

FIG. 9*e* is a flow diagram illustrating a further example QS payment transfer process 920 of the QS payment system 700. In this further QS payment transfer process 920, a user (Alan) having an account in one currency (e.g. GBP) wishes to make a payment (e.g. £10) into an account of another user (Bob) in another currency (e.g. USD). The QS payment and/or transfer process 920 of the QS payment system 700 provides corresponding advantages to those explained above with reference to the QS payment deposit process 720, QS payment withdrawal process 740, QS payment process 760, and QS payment withdrawal process 780.

In step 922, an endpoint device of the user (Alan) executes the QM client-side application 703 (e.g. QM App) that is installed on the endpoint device. It is assumed that the user has already created a QM account and has previously deposited fiat currency into the QM account as described in relation to QS payment process 720 of FIG. 9*a*, or has received a payment into the QM account in some other manner, such as one of the further QS payment processes discussed herein. It will be understood that the user must have an account in order to make a payment from the account. In this example it is assumed that the user (Alan) has a QM balance of £50 in the e-wallet/digital wallet 721 of the user's QM account.

In step 924, in response to the user (Alan) requesting transfer of a fiat currency value (e.g. £10) from their QM account to the QM account of another user (Bob), the QM App 703 of the user may communicate via a QS channel to the QS payment system 700 of the QS cloud platform 702. This may be performed by the endpoint device setting up a QS channel, via the QM App 703, using a QD key or QS key stored in a secure enclave on the endpoint device, and/or as described with reference to FIG. 1*a* to 6*d*. The QM App 703 and/or the QM application 706*a* of the QS payment system

700 are configured to perform authentication, (know your client) (KYC) and/or Anti-money laundering (AML) checks in relation to the user.

In step 926, in response to the authentication being successfully performed, KYC and/or AML checks confirming that the user (Alan) is who they say they are etc., the QM application 706*a* calculates the appropriate QM tokens in relation to the requested transfer value (e.g. £10) at the prevailing exchange rate in that moment, it is also determined that the user has enough QM tokens to complete the transfer, and if not, the requested transfer is terminated and at least the user (Alan) notified. If the user has enough QM tokens in the QM account/e-wallet, then the QM tokens to the value of the transfer value (e.g. £10) are then taken from the user's e-wallet 721 and also their QM account recorded on the QM registry/ledger, where the e-wallet 721 and QM registry/ledger adjusted to reflect the change to the new e-wallet 721 balance (e.g. £40).

Then, in step 928, the QM application 706*a* determines the current spot exchange rate between the currency of the user account and the other user account (e.g. GBP to USD spot rate of 1.3) and transfers across the QM tokens from the user (Alan) account to the other user (Bob) account with an indicated value in the fiat currency (USD) of the other user account based on this spot exchange rate, increasing the balance in the other user (Bob) e-wallet 721 by $13.

Subsequently, in step 930, when the other user (Bob) logs onto QM client-side application 703 (e.g. QM App) that is installed on the other user endpoint device, the other user will see that the balance of their e-wallet has increased by the transferred amount at the current spot exchange rate (e.g. by $13).

In the illustrated example of FIG. 9*e*, when the other user (Bob) logs onto the QM client-side application 703 (e.g. QM App) that is installed on their endpoint device, in a step 932, the other user requests a withdrawal of a fiat currency value (e.g. $13) from their QM account. The QM App 703 of the user may communicate via a QS channel to the QS payment system 700 of the QS cloud platform 702 and follow a similar withdrawal process to that described above with reference to FIG. 9*b*.

In this withdrawal process, in steps 750*a* and 750*b*, the QM application 706*a* retrieves the other user (Bob) account information from the QM registry/ledger in relation to the requested fiat withdrawal amount, the corresponding QM tokens and the like and, after checking the other user has the appropriate (i.e., sufficient) amount of fiat currency represented by the timestamped QM tokens in their QM account (e.g. the $13 deposited previously during QS payment withdrawal process 920), transfers the fiat value of currency requested to be withdrawn (e.g. %13) from the QM bank account pool into the external bank account of the other user. Other parts of this withdrawal process will correspond to the QS payment withdrawal process 740 described with reference to FIG. 9*b*, which is not repeated in full in FIG. 9*e* to improve clarity.

Figure 10:
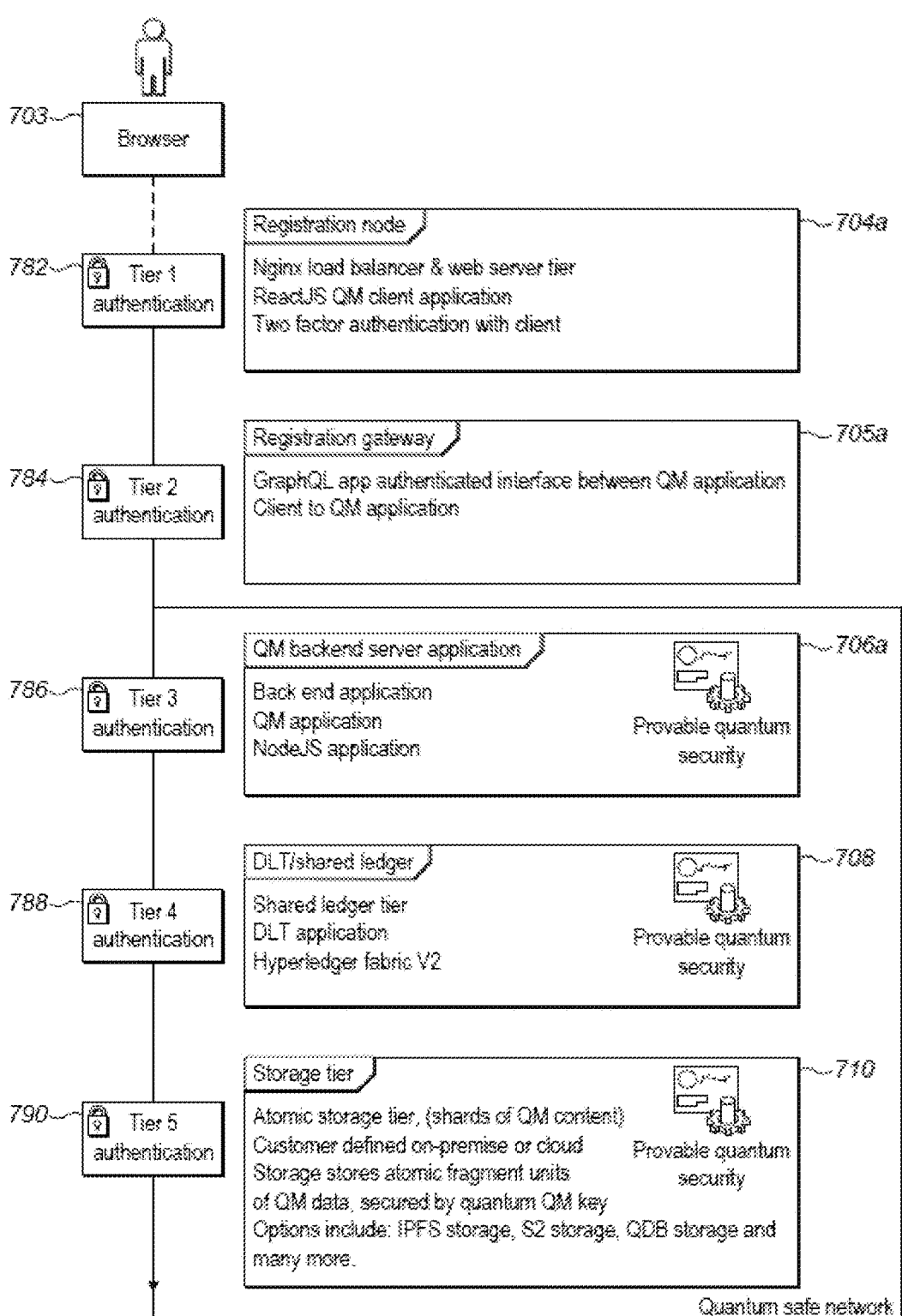
FIG. 10 is a schematic diagram of another example quantum safe payment system.

FIG. 10 is a schematic diagram illustrating another example of a QS payment system 780 based on the QS payment system 700 of FIG. 7*a* showing further details in relation to each of the QM registration layer 704 and also the QM Application layer 706, QM security layer 708 and QM storage layer 710 of the quantum-safe (QS) network of the QS cloud platform. Each of these aspects of the QS cloud platform 702 are described below in further detail as further modifications that may be made to the QS payment system 700 and/or QS cloud platform 702, and/or implemented as part of the process steps of the QS payment deposit process

720, QS payment withdrawal process 740, the QS payment process 760, the QS payment transfer process 940, and the QS payment transfer process 920 of FIGS. 9a to 9e.

The QM Application client 703 of the customer/user may be implemented, without limitation, for example on their web browser on their endpoint device or as a quantum cloud mobile or quantum money application on their endpoint device. The QM app 703 may include, without limitation, for example interfaces: Inbound: HTTPS: via Quantum Cloud Service URL; and Outbound: HTTPS: via Quantum Cloud Service URL In the registration layer 704, a registration node 704a and/or registration application may be implemented or powered using, without limitation, for example a Nginx (RTM) Load Balancer, Nginx load balancer, reverse proxy, content cache, and web server. It may host a QS cloud platform ReactJS Front End Application, enabling homepage, registration and portal services to end users. It may implement front end client security to authenticate clients, including Biometrics, Directory Services, Enterprise Authenticator integrations and Two Factor Authentication options. The registration node 704a or registration application may include, without limitation, for example interfaces: Inbound: HTTPS; Outbound: WebSocket and GraphQL API (Unique QKD Encrypted Channel—an Encrypted end-end channel with QM application secured by a unique to this link— preloaded QKD sourced shared QUANTUM MONEY (QM) 256 Encryption key)

In the registration layer 704, a registration security gateway 705a may be implemented, without limitation, for example by an Nginx powered Load Balanced Security gateway, routes data from the registration nodes to the QS cloud platform Back End Application 706a, uses WebSocket's and a GraphQL API authenticated interface between QM Application Client 703 to QM application 706a. The registration security gateway 705a may include, without limitation, for example interfaces: Inbound: WebSocket & GraphQL API—(Unique QKD Encrypted Channel); Outbound: WebSocket & GraphQL API—(Unique QKD Encrypted Channel).

The QM application 706a or QM Backend server application (a.k.a Quantum QM E-Money Application) may include, without limitation, for example an administration console for customers; administration console for operators; pools of value interface to Banks/Accounts; Server side QS cloud platform core application, written in NodeJS and manages general ledger for each customer with wallet balance, transactions, activity reporting. The QM application may include, without limitation, for example interfaces: Inbound: WebSocket & GraphQL API—(Unique QKD Encrypted Channel); Outbound: Hyperledger DLT QS cloud platform 702, QM Application 706a via API—(Unique QKD Encrypted Channel).

The DLT/shared ledger layer 708 (a.k.a DLT Server— Shared Ledger DLT Platform) may include, without limitation, a DLT application, QS cloud platform decentralized application (Dapp), Shared Ledger Tier, Hyperledger Fabric V1.2 Platform, a custom Dapp is a computer application that runs on a distributed ledger or shared Ledger computing platform. The DLT/shared ledger layer 708 may include, without limitation, for example interfaces such as: Inbound: Hyperledger DLT QS cloud platform Dapp Application via API—(Unique QKD Encrypted Channel); Outbound: Supported Storage API—(Unique QKD Encrypted Channel).

The storage layer 710 (or Storage Tier) may include, without limitation, for example customer defined on-premise or cloud enterprise storage, shards of authenticated customer uploaded content. Further options include: IPFS Storage, S3 Storage, elastic storage, QDB Storage and the like. The storage layer 710 may include, without limitation, for example interfaces such as: Inbound: Storage API— (Unique QKD Encrypted Channel); Outbound: Storage API—(Unique QKD Encrypted Channel).

Some or all components, modules, elements, or functional parts of the systems described above may be provided in the form of a System on Chip (SOC). A system-on-chip (SOC) is an integrated circuit that combines all of the functions of a computer or other electronic system onto one microchip. Commonly found in smartphones, wireless routers, tablets, and wearable tech, system-on-chips process the increasingly complex computing needs of many small devices.

The following modifications, features, process(es) and/or steps may be made to the QS systems, QS cloud platforms, method(s) and process(es), QS payment system(s) 700 or 780, QS payment process(es) 720, 740, 760 and the like as described with respect to FIG. 1a to 7d, where applicable and/or as the application demands. As described with reference to FIG. 1a to 1k, in satellite QKD, an on ground receiver (OGR) and QS cloud platform HSM or HSM, may be, without limitation, for example the device or hardware that receives the random quantum bits from the satellite, which is installed at the customers premises. A 'Document/ Asset' may be, without limitation, for example a document or asset being stored on the QS cloud platform or application/service thereof, supported formats include: Microsoft Office formats, PDF formats, .JPG, BMP, IMG and other picture formats etc. An 'Access Token' or QS Access token, or QREF access token may be, without limitation, for example an access token or pointer which is an access claim to open a 'Document/Asset' if the appropriate authentication is passed. A 'Legal Asset/Document Secure Distribution Service' may be, without limitation, for example an example application of the many that can be hosted on the QS system or QS cloud platform.

When a customer or user has an OGR, for example, customers with OGR's onsite, a set of pre stored QKDSAT delivered QD, quantum safe, or Quantum Money (QM) 256 keys for QS cloud platform is available for download by KMIP request to their Corporate HSM. This example process describes the journey for this Quantum Safe solution based on the following steps of:

1) Customers with an OGR will automatically have a series of QS cloud platform (e.g. Quantum Cloud) pre stored keys available to be loaded from there On Ground Receiver (OGR) to their corporate HSM.
2) The User would receive a key (QKDSAT Key) from the Corporate HSM and an installation program (QS Initialisation App).
3) The user starts the (QS Initialisation App) decrypts the installation key held on the local device. 4) The (QKD-SAT Key) is used to initiate a TLS connection on a specific HTTP port (e.g TCP Port:8000) to generate a handshake with the QS Registration Node.
5) The QS Registration Node listens on (TCP Port:8000) receives the handshake data request and makes an GraphQL API call to the DLT Server to match the handshake data received—(Registration Node, Registration Security Gateway, Backend Server, DLT Server).
6) The DLT searches the 'Quantum Cloud QKDSAT device inventory' for the pre-stored unique key details using the TLS handshake data to match that devices key.

7) Once the TLS handshake shared key is found, trigger a DLT Smart Contract which audits the connection with the QKDSAT Quantum Safe Key (QKDSAT Key).

8) display homepage ready for user to begin First Time Customer/User Registration An endpoint device of a user for use with the QS cloud platform (or Quantum Cloud) may have pre-loaded key process. There are two example methods whereby an end user may gain authenticated access onto the Quantum Cloud (e.g. QS cloud platform/QS system): 1) an QS cloud platform customer with an appropriate OGR, which may be the strongest level of security; or 2) a preloaded manufacturer bootstrap key in a secure enclave on the device and QS network bootstrap installation software. Registration of the device by the Telco onto the QS cloud platform (or Quantum cloud).

The preloading method 2) in which a preloaded QKD shared secret is placed on the end user's device is described. QS cloud platform partners (e.g. Service Providers, Vendors, Resellers), may pre-load an encrypted hidden Initialisation key (One Time Device Initialisation Key), which is encrypted using an QS cloud platform secret, plus installation software (QS Initialisation App) on a device (End User Device), during manufacture. The process for gaining access is based on the following steps of:

1. The Customer/User follows the QS cloud platform authorised partner's instructions to begin the commissioning sequence of the QS or QS cloud platform service. Examples include a first-time powering of the device, Network OTP boot and key update via the Quantum Cloud listener, manually executing an QS cloud platform-provided setup.exe pre-installed installation application, inserting a USB key or SD card, Sim card or similar and initiating the install application software.

2. Once started, the (QS Initialisation App) decrypts the installation key held on the local device using the QS cloud platform secret key known by the installer application.

3. The decrypted (One Time Device Initialisation Key) is used to initiate a TLS connection on a specific HTTP port (e.g TCP Port:8000) to generate a handshake with the QS cloud platform Registration Node.

4. The QS cloud platform Registration Node listener on (TCP Port:8000) receives the handshake data request and makes an GraphQL API call to the DLT Server to match the handshake data received—(Registration Node, Registration Security Gateway, Backend Server, DLT Server).

5. The DLT searches the 'Quantum Cloud/QS cloud platform device inventory' for the pre-stored unique key details using the TLS handshake data to match that devices key.

6. Once the TLS handshake shared key is found, trigger a DLT Smart Contract which audits and initiates the following:

7. The required TLS Handshake Data response is returned to the (Registration Node) to enable the TLS handshake to be completed.

8. The (Registration Node) completes TLS handshake and establishes a QD, QS, QUANTUM MONEY (QM) 256 encrypted digital channel with the end user device.

9. The (Registration Node) now initiates a refresh of the QD, QS and/or QUANTUM MONEY (QM) 256 Shared Keys for the device, with a new shared secret key delivered over the encrypted QD, QS, and/or QUANTUM MONEY (QM) 256 link to the (End User Device), which is sourced from the QKD infrastructure (DLT Server).

10. The Secured Digital link from the (Registration Node) to the (End User Device) is now using the new QD, QS, and/or QUANTUM MONEY (QM) 256 QKD sourced shared secret keys and the installation process is completed. This is recorded on the (DLT Server's) ledger.

11. (Browser) Display the QS cloud platform (Quantum Cloud) homepage ready for user to begin (see: process associated with First Time Customer/User Registration below)

Regarding the Pre Installed Key option, the TLS data handshake is being used in this example, however QS cloud platform may have the option to use a one-time pad handshake on a dedicated listener port for which we have our own unique design. QS cloud platform has focused on using QD, QS and/or QUANTUM MONEY (QM)256 ciphers in this example, but a mix of ciphers is possible, including a proprietary QS cloud platform protocols and algorithms. Entropy injection and synchronised CSRNG devices could also be deployed as well as other on device software enclave solutions.

The QS Setup.exe Install program may contain a unique set of code and key known only to QS cloud platform/QS system. This key may be configured to unlock the secure enclave on the device giving the application access to the key stored there by the hardware manufacturer. The combination of these two keys when joined create the One Time Pad that is used to authenticate the device on the network, where the details are checked on the QS cloud platform Supply Chain ledger and once verified as an authentic and authorised device a new key is shipped replacing the bootstrap key combination on the device.

The first time customer/user registration process is based on the following steps of:

1. (Browser) A new user types in the URL of the QS cloud platform homepage into their web browser; A front-end authorisation node (Registration Node) notices the attempt and presents the welcome screen. On the (Browser) the User reads of the details of the service and decides to use the service, they begin the New User Registration process by hitting the "New Customer" button.

2. The (Registration Node) presents the New User Registration web form on the Customer/Users (Browser) screen, with instructions about the New Customer onboarding process.

Note: If the New Customer/User has been provided a QS Access Token by someone sharing a document with them, this can be scanned, uploaded as part of the registration process. In this instance we will assume they do not have a QS access token.

3. The Customer/User completes the New User Registration Web form shown on their (Browser) by typing in their Name and Email address and pressing the 'submit; button which sends this data to the (Registration Node).

4. The (Registration Node) uses these initial details make a basic 2FA authentication via email to the Customer/User, the QS cloud platform Registration node creates and sends an authorisation email to the Customer/Users provided email, with a Quantum Random Number generated (QRNG) code, e.g. "601453". The DLT ledger gets the attempt details for audit reference.

5. The (Registration Node) presents a code challenge screen to the Customer/Users (Browser) asking for the code to be entered by the Customer/User contained in the email.

6. The users enter the code from the email into the code challenge screen on their (Browser). In this example "601453".

7. If authentication of the 2FA QRNG code fails, after three invalid attempts the connection and process is terminated.

8. If the 2FA QRNG is correctly authenticated on the (Browser) code challenge screen; The (Registration Node) displays to the Customer/Users (Browser), the 'New Authenticated Customer/User' web form. This includes a New Customer/User Number 'CUSTNUM' that was generated by the Registration Node, that uniquely identifies the Customer/User for the lifetime of their use of the service.

10. (Browser) The Customer completes 'New Authenticated Customer/User' web form, here they complete a number of service options for the item being stored, such as in the cloud, on-premise, a number of atomic unit's data is held in, and other QS cloud platform quality of service selections, plus access criteria and rights to the data object are stored. They also register and authenticate payment information as appropriate. They also select the format choices for receiving QS cloud platform access tokens. Once completed they hit Submit to send the data to the (Registration Node).

11. The (Registration Node) receives the data. It sends the data to the Registration Security Gateway.

12. The (Registration Security Gateway) routes the data to the QS cloud platform (BackEnd Server) application.

13. The (Backend Server) application registers the Customers/Users details on the DLT ledger and returns to the (BackEnd Server) a unique QS cloud platform Access Token (or QS cloud platform token) for the Customer/User.

14. The (Backend Server) sends the QS cloud platform Access Token to the (Registration Node) via the (Registration Security Gateway)

15. The (Registration Node) sends QS cloud platform Access Token to the Customer/User in the format selected (Browser, Email, RFcode, Certificate, Wallet/Coin etc).

16. (Browser) The Customer/User is now presented by the (Registration Node) QS cloud platform Main Menu', showing their Service Options, their current transactions, the ability to interrogate the platform for information on their stored documents/assets and the ability to update their information held by the QS cloud platform system. This screen also provides the ability to view a document sent to them by someone else as shown in their inbox or by scanning in a QR code from the QS cloud platform service.

(Note: There are many multi-factor authentication methods which are pluggable into our application, including Biometrics and support for various authentication applications and solutions. This simple 2FA is an example of the many options available for QS cloud platform to identify a user signing up for the service.

The existing customer sign on process is based on the following steps of:

1. (Browser) The Customer/User types in the URL of the QS cloud platform homepage into their web browser; A front-end authorisation node (Registration Node) notices the attempt and presents the welcome screen.

2. (Browser) The user signs onto the Registration Node using their pre-established credentials, authentication method and QS cloud platform Access Token via their (Browser)—(See process for First Time Customer/User Registration above).

3. Upon successful authentication, they are shown the 'QS cloud platform Main Menu', showing their Service Options available, their current transactions, the ability to interrogate the platform for information on their stored documents/assets and the ability to update their information held by the QS cloud platform/QS system. This screen also provides the ability to view a document sent to them by someone else as shown in their inbox or by scanning in a QR code from the QS cloud platform service. This screen also provides the ability to view a document sent to them by someone else as shown in their inbox or by scanning in a QR code from the QS cloud platform service. This screen also provides the ability to view a document sent to them by someone else as shown in their inbox or by scanning in a QR code from the QS cloud platform service.

New Document/Asset Upload process (e.g. Quantum Storage) Work is based on the following steps of:

1. (Browser) From the 'QS cloud platform Main Menu', showing their Service Options available, their current transactions, the ability to interrogate the platform for information on their stored documents/assets and the ability to update their information held by the QS cloud platform system. This screen also provides the ability to view a document sent to them by someone else as shown in their inbox or by scanning in a QR code from the QS cloud platform service.

2. (Browser) The Customer/User selects the Service Option of their choosing, for example 'Legal Asset/Document Secure Distribution Service', the appropriate web form is displayed on this browser by the (Registration Node).

3. (Browser) The Customer/User enters the names of the Document/Asset, A Description or Recipient instructions field about the Document/Asset to guide the recipient.

4. (Browser) The Customer/User drags the document into the container shown on the Browser or uses the file navigator to select the file to upload.

5. (Browser) The Customer/User hits the 'Submit' button to send the Transaction to the QS cloud platform (Registration Node).

6. The (Registration Node) receives the 'Legal Asset/Document Secure Distribution Service' transaction data. It sends the data to the Registration Security Gateway.

7. The (Registration Security Gateway) routes the data to the QS cloud platform (BackEnd Server) application.

8. The (Backend Server) application registers the 'Legal Asset/Document Secure Distribution Service' transaction on the DLT ledger via the DLT applications API.

9. The (DLT Server) upon registering 'Legal Asset/Document Secure Distribution Service' transaction, now passes the Uploaded data to the Storage Algorithm within its Dapp application.

10. The (DLT Server) applications Storage Algorithm, now slices the Data Object into a minimum of six or more parts based on the service option selected by the Customer/User. We call these (QS cloud platform Sharded Units). Each (QS cloud platform Sharded Unit) is allocated a unique QKD Key from by the QKD infrastructure to encrypt the data stored in each (QS cloud platform Sharded Atomic Unit).

11. The Storage Algorithm now calculates the best way to store the data and where based on the quality of service information defined by the User and the application parameters and any Geolocation requirements. Data is always stored fully redundant with the minimum service tier mandating storage of at least three copies of each Atomic Data Unit stored on disparately located storage.

12. The Storage Algorithm confirms the data has been written to the storage and writes to the DLT Server record of the Customer/User the pointers and key references for the 'Legal Asset/Document Secure Distribution Service' transaction.

13. The (DLT Server) confirm to the (Backend Server) successful storage of the 'Legal Asset/Document Secure Distribution Service' transaction detail on the DLT Ledger and that the Uploaded Asset/Document has been stored successfully on the (Storage Tier).

14. The (Backend Server) now creates the QS cloud platform Access Token for the Data Item and routes this via the (Registration Security Gateway) to the (Registration Node).

15. The (Registration Node) sends QS cloud platform Access Token for the 'Legal Asset/Document Secure Distribution Service' transaction to the Customer/User in the format selected (Browser, Email, RFcode, Certificate, Wallet/Coin etc) by the Customer/User.

The process for retrieving or viewing a Document/Asset by the owner is based on the following steps of:

1. (Browser) The Customer/User types in the URL of the QS cloud platform homepage into their web browser; A front-end authorisation node (Registration Node) notices the attempt and presents the welcome screen.

2. (Browser) The user signs into the Registration Node using their pre-established credentials, authentication method and QS cloud platform Access Token via their (Browser)—(As established by the Customer/User upon First Time Customer/User Registration, see above).

3. Upon successful authentication (Registration Node, Registration Security Gateway, Backend Server, DLT Server), they are shown the 'QS cloud platform Main Menu', showing their Service Options available, their current transactions, the ability to interrogate the platform for information on their stored documents/assets and the ability to update their information held by the QS cloud platform system. This screen also provides the ability to view a document sent to them by someone else as shown in their inbox or by scanning in a QR code from the QS cloud platform service.

4. They select the item stored from their Assets Repository (e.g. a Legal Asset/Document Secure Distribution Service Asset/Document).

5. The Document/Asset is retrieved from the QS cloud platform infrastructure and displayed on the browser via a GraphQL API call (Registration Node, Registration Security Gateway, Backend Server) and then a access request by the (Backend Server) to the (DLT Server) which in turn requests the data from the (Storage Tier), utilising the encrypted keys for the Customer/User and the encrypted keys for the Document/Asset details held within the Backend of the QKD Infrastructure.

6. The Document is displayed on the Customer/Users (Browser) with a series of editing and updating options as the owner of the Document/Asset. Any updates are versioned and the Owner has the option to control the current or restore an older version of the document as the most recent version of the document.

The process for retrieving or viewing a Document/Asset by somebody else using a QS cloud platform Token is based on the following steps of:

1. (Browser) The Customer/User types in the URL of the QS cloud platform homepage into their web browser; A front-end authorisation node (Registration Node) notices the attempt and presents the welcome screen.

2a. (Browser) If an QS cloud platform existing user, they sign into the Registration Node using their pre-established credentials, authentication method and QS cloud platform Access Token via their (Browser). As established by the Customer/User upon First Time Customer/User Registration (see above).

2b. (Browser) If they are a new user to the QS cloud platform, they have the option to undertake 'First Time Registration' as per screen to establish their credentials and log onto the service.

2c. The Customer/User chooses to not register for the service, but use the 'Quantum Access Token' (or QS cloud platform Access token) to purely access the Document/Asset they have been sent. In this case c1. The Customer/User is presented by the (Registration Node), the 'View QS cloud platform Document/Asset' Web form on their (Browser).

c2. They now scan the 'Quantum Access Token' QR Code or enter the documents unique token number into the 'View QS cloud platform Document/Asset' Web form on their (Browser) and press submit to send the code to the (Registration Node).

c3 The (Registration Node) queries the supplied 'Quantum Access Token' information with the QS cloud platform infrastructure via a API call (Registration Node, Registration Security Gateway, Backend Server, DLT Server) to create a basic 2FA authentication challenge email to the recorded tokens stored email recipient, as recorded on the DLT ledger (DLT Server) for this QS cloud platform Document/Asset token, by the Document/Asset owner. The email is sent to the recorded recipients email address.

c4. The (Registration Node) presents a 2FA QRNG code challenge screen to the Customer/Users (Browser) asking for the code contained in the email.

c4. The Customer/User enters the 2FA QRNG code from the email into the code challenge screen on their (Browser). For example "601999".

c5. If authentication of the 2FA QRNG code fails, after three invalid attempts the connection and process is terminated. An audit log is written advising the Document/Asset owner.

c6. If authentication is successful, continue to step 3 Below.

3. Once the 2FA QRNG is correctly authenticated on the (Browser) code challenge screen; The Registration Node); The Document/Asset is retrieved from the QS cloud platform infrastructure and displayed on the browser via a GraphQL API call (Registration Node, Registration Security Gateway, Backend Server) and then a access request by the (Backend Server) to the (DLT Server) which in turn requests the data from the (Storage Tier), utilising the encrypted keys for the Customer/User and the encrypted keys for the Document/Asset details held within the Backend of the QKD Infrastructure.

4. The 'Document/Asset' is displayed on the (Browser) with the 'Document/Asset' access rights for the presented 'QS cloud platform Access Token' with screen and access controls/options as dictated by the 'Documents/Assets' owner, for example (Create, Read, Update, Download) etc.

Figures 11A, 11B:
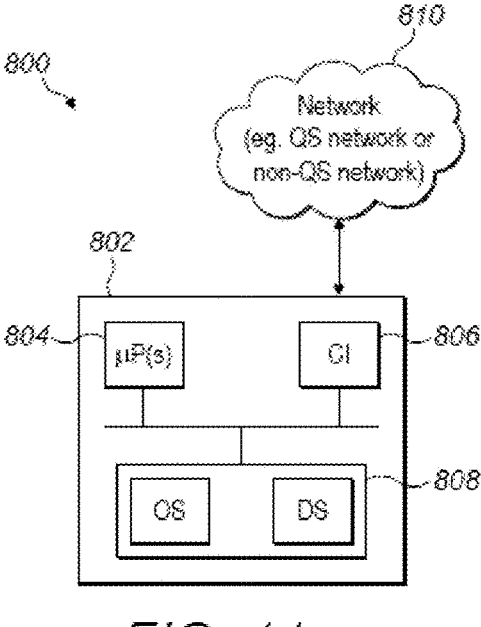
FIG. 11a is a schematic diagram of a computing device.
FIG. 11b is a schematic diagram of another example QS system.

FIG. 11a is a schematic diagram of an example computing system 800 for quantum safe storing and access according to aspects of the invention. Computing system 800 may be used to implement one or more aspects of the systems, QREF locator and/or QREF access token engines, QS storage process(es), QS access process(es), QS application(s) and/or use cases as described with reference to FIG. 1a-7d. Computing system 800 includes a computing device 802 that includes one or more processor unit(s) 804, memory unit 806 and communication interface 808 in which the one or more processor unit(s) 804 are connected to the memory unit 806 and the communication interface 808. The communications interface 808 may connect the computing device 802 with one or more other computing devices (not shown) to form a QS network and/or QS DLT and/or both and the like for implementing one or more aspects, features of the QS systems 100, 130, 140 according to the invention as described herein. The memory unit 806 may store one or more program instructions, code or components such as, by way of example only but not limited to, an operating system 806a for operating computing device 802, DLT node functionality, QS server functionality as described herein, and a data store 806b for storing DLT records, user registration records, and/or any additional data and the like and/or further program instructions, code and/or components associated with implementing the functionality and/or one or more function(s) or functionality associated with one or more QS systems, one or more QS servers, one or more QS DLTs, one or more method(s) and/or process(es) of storing and/or accessing data items using a QS system/QS network and/or QS DLT and the like, system(s)/platforms, combinations thereof, modifications there to, and/or as described herein with reference to at least any one of figure(s) 1a to 7d.

FIG. 8b is a schematic diagram of another example QS system 820 for storing and/or accessing data items in a quantum safe manner according to a third embodiment. The system 820 for storing and/or accessing data items in a quantum safe manner includes a SQKD component(s) 822 for receiving sets of QD keys from a plurality of satellites; QS network component(s) 824 for using the QD keys for establishing quantum safe communications channels between QS server(s) and/or QS DLT node(s) and the like; QS DLT 826 configured for storing and/or accessing data items in a quantum safe manner using DLT network set-up by the QS network component(s) 824; QREF locator component(s) 828 for generation of QREF locators for each data item stored in the QS DLT 826; access tokens component(s) 830 for generation of access tokens corresponding to QREF locators of data items stored in the QS DLT 826. The SQKD component(s) 822, QS network component(s) 824, QS DLT 828, QREF locator component(s) 828, and QREF access token components 830 may further include functionality associated with the QS system(s), QS network(s), QS server(s), apparatus, one or more method(s), process(es), combinations thereof, modifications thereto and/or as herein described with reference to any one of FIG. 1a to 8a.

Further modifications to some embodiments of the invention may include one or more of the following examples and/or features:

In a first example, the present disclosure provides a computer-implemented method of storing one or more data item(s) in a quantum-safe (QS) network, the QS network comprising one or more QS server(s) and a repository for storing and accessing said data item(s), each QS server comprising a hardware security module (HSM) for storing an identical set of quantum distributed (QD) keys, said identical set of QD keys having been distributed to each of said QS server(s) in a quantum-safe manner, and said QS server(s) configured to communicate securely with each other and the repository using one or more available QD keys from the identical set of QD keys, the method performed by a QS server comprising: generating a quantum reference "QREF" locator based on input data associated with a data item for storage and an available QD key selected from the set of QD keys; and sending the QREF locator along with the data item encrypted with the available QD key to the repository.

As an option, the method further comprising: selecting an available QD key from the set of QD keys for encrypting a data item; generating the QREF locator for storing and accessing the data item based on input data associated with the data item and the selected available QD key, wherein the generated QREF locator is unique; linking the QREF locator to the available QD key of the set of QD keys; and sending the QREF locator and encrypted data item to the repository for storage, wherein the encrypted data item is linked to the QREF locator when stored.

As an option, the method further comprising receiving a set of QD keys using quantum safe key distribution from a quantum key distributor or source.

As an option, the input data associated with the data item further comprises one or more input data from the group of: a device identifier; a manufacturer identifier; a user identifier; a user secret; a customer number; and an access control list of users for accessing said data item.

As an option, the method further comprising: generating a QREF access token associated with the data item based on the QREF locator; and sending the QREF access token to a device of a user associated with the data item.

As an option, the method further comprising: generating a QREF access token for accessing the data item based on the QREF locator using an irreversible function, process or operation, wherein the QREF access token is unique; and sending the QREF access token to a device of a user for enabling the user to access said data item.

As an option, the method further comprising: receiving, from a device of a user, a QREF access token requesting access to a data item stored in the repository; identifying a QREF locator based on the QREF access token and input data from the user; and in response to identifying the QREF locator, performing the steps of: retrieving the data item from the repository, wherein the data item is decrypted using the QD key corresponding to the QREF locator; and providing access operations to the user in relation to the decrypted data item.

In a second example, the present disclosure provides a computer-implemented method of quantum safe (QS) storage in a QS network, the QS network comprising at least two QS servers and a repository for storing and accessing data items in relation to a plurality of users, wherein each QS server comprises a hardware security module "HSM" with an identical set of quantum distributed (QD) keys stored thereon and the QS servers communicate securely with each other and the repository using quantum encryption based on one or more available QD keys from the set of QD keys, the method comprising: generating a quantum reference (QREF) locator associated with a data item based on input data associated with a first user of the plurality of users and an available QD key selected from the set of QD keys; and storing the data item encrypted with the available QD key in the repository indexed with the QREF locator.

As an option, further comprising: generating an QREF access token based on the QREF locator, wherein the QREF access token enables access operations to be performed on the data item stored in the repository; sending the QREF access token to at least said first user of the plurality of users; and in response to receiving an QREF access token from a second user of the plurality of users in relation to a data item stored in the repository performing the steps of: identifying a QREF locator in relation to the access token, and said second user; and providing access operations in relation to the encrypted data item in the repository based on the identified QREF locator and the identified said second user.

In a third example, the present disclosure provides a computer-implemented method of quantum safe (QS) storage and retrieval in a QS network, the QS network comprising one or more QS server(s) and a repository for storing and retrieving one or more data item(s) by a plurality of users, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method performed by a QS server comprising: in response to receiving a data item for storage: generating a quantum reference "QREF" locator based on a user secret of the first user and an available QD key selected from the set of QD keys, wherein the QREF locator indicates the location for storing the data item encrypted with the selected QD key in the repository and an identity of the first user; generating an QREF access token based on the QREF locator, wherein the QREF access token enables access operations to be performed on the data item when stored in the repository; storing the data item in the repository indexed by the QREF locator; and sending the QREF access token to the first user; and in response to receiving an QREF access token for a data item stored in the repository: identifying a QREF locator based on the QREF access token and the identity of the second user; and providing access operations to the second user in relation to the encrypted data item in the repository based on the identified QREF locator.

As an option, the first, second and third examples further comprising receiving a request for storing the data item by a first user.

As an option, the first user and the second user are the same.

As an option, the first user and the second user are different.

As an option, the first, second and third examples, wherein the QS network further comprises one or more user devices, each user device comprising a hardware security module for storing a set of QD keys, wherein the one or more user devices and one or more of the QS servers communicate using quantum key encryption based on the set(s) of QD keys.

As an option, the first, second and third examples, wherein the repository comprises a repository or storage system based on at least one from the group of: distributed ledger technology or network; shared ledger technology or network; blockchain technology or network; publish/subscribe, response/request and/or real-time based digital storage cloud/repository technology; any other secure cloud storage system or platform; any other secure storage system or platform; and any other secure database management system.

As an option, each set of QD keys are distributed to each of the QS devices based on at least one from the group of: satellite quantum key distribution; fibre optic quantum key distribution; terrestrial quantum key distribution; optical quantum key distribution; and any other quantum key distribution system capable of distributing an identical set of QD keys to each of the QS server(s) of the QS network.

As an option, generating the QREF locator further comprising: receiving a user secret from a device of a first user; receiving an available QD key selected from the set of QD keys from one of the QS server(s); and generating the QREF locator based on a first set of cryptographic or mathematical operations in relation to data representative of the user secret and the received QD key, wherein the QREF locator is unique.

As an option, generating the QREF access token further comprising generating the QREF access token based on a second set of cryptographic or mathematical operations in relation to data representative of the QREF locator, wherein the QREF access token is unique.

As an option, generating the QREF locator based on the first set of cryptographic or mathematical operations further comprises generating the QREF locator from data representative of the user secret and the received QD key based on any one or more cryptographic or mathematical operations from the group of: one or more one-way functions; one or more hash functions; one or more hash-based message authentication code functions; one or more key derivation functions; one or more of multiplication, subtraction, addition, division, factorisation and/or any other mathematical operation; any other combination of one or more cryptographic functions, mathematical operations, operable to generate data representative of a QREF locator that is unique, obfuscates the received QD key and user secret and capable of providing an address for locating the associated data item for storing in a repository.

As an option, generating the QREF access token based on the second set of cryptographic or mathematical operations further comprises generating the QREF access token from data representative of the QREF locator based on any one or more cryptographic or mathematical operations from the group of: one or more one-way functions; one or more hash functions; one or more hash-based message authentication code functions; one or more key derivation functions; one or more of multiplication, subtraction, addition, division, factorisation and/or any other mathematical operation; any other combination of one or more cryptographic functions, mathematical operations, operable to generate data representative of an QREF access token that is unique, obfuscates the data representative of the QREF locator, and capable of being used by a QS server to identify the QREF locator for providing an address for locating the associated data item stored in a repository.

As an option, the method(s) further comprising: receiving an QREF access token from a user; identifying the QREF locator associated with the QREF access token; and in response to identifying the QREF locator, performing one or more access operations in relation to the data item corresponding to the QREF locator stored in the repository and the QREF access token.

As an option, the method(s) further comprising: storing a registration record of each user storing a data item in the repository, wherein each registration record includes data representative of: a user identity of said each user; a user secret of said each user; authentication challenges and responses; the QREF locator associated with the data item; a data item reference identifier associated with the data item; a quantum key identifier associated with the QD key used to encrypt the data item; and an access control list associated with the data item; receiving an QREF access token associated with a data item from a second user; retrieving one or more registration records associated with the second user; identifying the QREF locator associated with the QREF access token by: generating, for each retrieved registration record, an QREF access token based on said each retrieved registration record; and matching the generated QREF access token with the received QREF access token; and identifying the QREF locator from the registration record associated with the generated QREF access token matching the received QREF access token; in response to identifying the QREF locator, performing one or more access operations in relation to the data item corresponding to the QREF locator stored in the repository and the QREF access token.

As an option, the first, second and third examples, the QS network comprising one or more QS registration server(s) and a plurality of registration nodes, wherein a QS registration server connects to a set of registration nodes of the plurality of registration nodes, and one or more QS server(s) distribute one or more groups of QD keys from the set of QD keys to the QS registration servers, each QS registration server distributing one or more QD keys from a group of QD keys to the corresponding set of registration nodes, the method(s) further comprising: receiving, from a QS registration server generating a registration record associated with a user, the registration record of the user, wherein a device of the user is in communication with a registration node coupled to the QS registration server, the registration record including one or more user data representative of: a user identity of said each user; one or more device identifiers associated with the user; user credentials associated with logging into the QS system; a user secret of said each user; authentication challenges and responses; a QREF locator associated with a data item in relation to the user; a data item reference identifier associated with the data item; a QD key identifier associated with the QD key used to encrypt the data item; and an access control list associated with the data item; and storing the registration record of said user in the repository.

As an option, the method(s) further comprising: receiving user credentials from a QS registration server associated with a user, wherein a device of the user is in communication with a registration node coupled to the QS registration server; retrieving the registration record associated with the user based on the user credentials; receiving a QREF access token associated with a data item from the user; identifying the QREF locator associated with the QREF access token by: generating, for each retrieved registration record, an QREF access token based on said each retrieved registration record; and matching the generated QREF access token with the received QREF access token; and identifying the QREF locator from the retrieved registration record associated with the generated QREF access token matching the received QREF access token; in response to identifying the QREF locator, performing one or more access operations in relation to the data item corresponding to the QREF locator stored in the repository and the QREF access token.

As an option, the repository further comprises a distributed ledger; the QS network further comprising a plurality of QS servers, each QS server comprises a HSM with an identical set of QD keys stored thereon and each QS server of the plurality of QS servers comprising a node for oper-ating the distributed ledger, wherein the nodes of the plurality of QS servers form a QS distributed ledger network configured for providing storage and access to one or more data item(s) stored on the distributed ledger, wherein the method further comprising: receiving a QREF locator for storing an encrypted data item in the distributed ledger; and storing the encrypted data item in the distributed ledger using the QREF locator as an address for the location of the encrypted data item in the distributed ledger.

As an option, wherein: the repository further comprises a shared ledger; the QS network further comprising a plurality of QS servers, each QS server comprises a HSM with an identical set of QD keys stored thereon and each QS server of the plurality of QS servers comprising a node for oper-ating the shared ledger between corresponding nodes, wherein the nodes of the plurality of QS servers form a QS shared ledger network configured for providing storage and access to one or more data item(s) stored on the shared ledger, wherein the method(s) further comprising: receiving a QREF locator for storing the encrypted data item in the shared ledger; and storing the encrypted data item in the shared ledger using the QREF locator as an address for the location of the encrypted data item in the shared ledger.

As an option, the method(s) further comprising: receiving an QREF access token from the second user for accessing an encrypted data item stored in the distributed or shared ledger; identifying a QREF locator corresponding to the QREF access token and second user; and accessing the encrypted data item in the distributed or shared ledger using the identified QREF locator based on the access token.

As an option, the repository further comprises a digital storage platform using publish/subscribe, request/response and/or real-time based messaging for storing and accessing data items, the QS network further comprising a plurality of QS servers, each QS server comprises a HSM with an identical set of QD keys stored thereon and each QS server of the plurality of QS servers comprising a node for oper-ating digital storage platform messaging between corre-sponding nodes, wherein the nodes of the plurality of QS servers form the digital storage platform as a QS distributed storage network configured for providing storage and access to one or more data item(s) based on the digital storage platform messaging, wherein the method(s) further compris-ing: receiving a QREF locator for storing the encrypted data item in the distributed storage platform; and storing the encrypted data item in the shared ledger using the QREF locator as an address for the location of the encrypted data item in the distributed storage platform.

As an option, the method(s) further comprising: receiving an QREF access token from the second user for accessing an encrypted data item stored in the distributed storage plat-form, identifying a QREF locator corresponding to the QREF access token and second user; and accessing the encrypted data item in the distributed storage platform using the identified QREF locator based on the access token.

As an option, each QS server comprises a satellite receiver, the method(s) further comprising: receiving, at each of the one or more QS servers of the QS network, one or more sets of QD keys from a satellite quantum key distribution system, the satellite quantum key distribution system comprising at least one satellite configured for generating and distributing a set of QD keys; and storing, on each of the one or more QS servers of the QS network, the received set(s) of QD keys on the corresponding hardware security module, wherein after distribution of a set of QD keys to each of the QS servers, each of the QS servers has stored thereon an identical set of QD keys.

As an option, the QS network further comprises one or more user devices, each user device comprising a HSM for storing a set of QD keys, wherein the one or more user devices and one or more of the QS servers communicate using quantum key encryption based on the set(s) of QD keys, wherein each QS user device comprises a satellite receiver, the method further comprising: receiving, at one or more of the user devices, one or more sets of QD keys from the satellite quantum key distribution system, the satellite quantum key distribution system comprising at least one satellite configured for generating and distributing the one or more sets of QD keys; and storing, on each of the one or more QS user devices of the QS network, the received set(s) of QD keys on the corresponding HSM, wherein after distribution of said one or more sets of QD keys to each of the QS user devices, each of the QS user devices has stored thereon an identical set of QD keys.

As an option, each QS server of the QS network includes a hardware security module (HSM) for storing a set of QD keys, wherein each of the QD keys in the set of QD keys is mapped to a corresponding QD key identifier and stored in the HSM based on data representative of: the QD key identifier for identifying said each QD key; and said each QD key; wherein each set of QD keys stored on each of the QS servers of the QS network have identical mappings between the QD key identifier and each said QD key from the set of QD keys, the method further comprising: receiving a set of QD keys from a quantum key distribution system, each QD key of the set of QD keys mapped to a corresponding QD key identifier; and storing data representative of the set of QD keys and corresponding QD key identifiers.

As an option, data representative of a mapping of a QREF locator associated with a QD key is stored in the HSM, based on data representative of: the QREF locator; the QD key associated with the QREF locator; and the QD key identifier identifying said selected QD key; wherein each set of QD keys stored on an HSM of each of the QS servers of the QS network are updated based on the data representative of the mapping between the QD key identifier, the QREF locator and corresponding QD key, the method further comprising: receiving a QREF locator and a QD key identifier associated with a QD key, the QD key selected from the set of QD keys for use in generating the QREF locator and encrypting an associated data item; and storing data representative of the mapping between the QREF locator, QD key identifier and QD key in the HSM of a QS server.

As an option, the repository further comprises a plurality of records for storing one or more encrypted data item(s), each record comprising data representative of: a QREF locator associated with an encrypted data item; and the encrypted data item, wherein the data item is encrypted with a QD key associated with the QREF locator.

As an option, each record further comprising data representative of: one or more user identities allowed to access the encrypted data item of said each record; and one or more permissions or operations associated with each of the one or more user identities in relation to accessing said encrypted data item.

As an option, each record further comprising data representative of an access control list indicating one or more user identities allowed to access the encrypted data item and corresponding permissions and/or operations in relation to each user identity accessing said encrypted data item.

As an option, the QREF locator further comprises data representative of: the user secret; a customer number allocated to the user; a data item reference identifier allocated to the data item; and a QD key identifier of the available QD key of the set of QD keys used to encrypt the data item.

As an option, the QREF locator further comprises data representative of: a user identifier; and an access control list to the data item.

As an option, the method(s) comprising: receiving a request to register a user; authenticating the user; receiving user details for registering the user with the QS network in response to positive authentication of the user; receiving a data item from the user for storing in a QS repository of the QS network; generating a unique QREF locator based data representative of the received user details and the data item; associating the generated QREF locator with the registered user details and also the data item; generating a unique QREF access token based on data representative of the QREF locator associated with the data item; storing the QREF locator and the data item in the QS repository of the QS network; and sending the unique QREF access token to the user for use in accessing, in some manner, the data item.

As an option, the method(s) further comprising: receiving an QREF access token associated with a data item from a user; authenticating the user; identifying the QREF locator based on the user registration details and the access token in relation to the user; retrieving the data item associated with the QREF locator from the QS repository; checking the user has permissions to access the data item based on an access control list associated with the data item; and enabling the user access operations to the data item in response to determining the user has permissions to access the data item.

As an option, the method(s) comprising: receiving a request to register a user; authenticating the user; receiving user details for registering the user with the QS network in response to positive authentication of the user; receiving a know your own client "KYC" data item from the user for storing in a QS repository of the QS network, the KYC data item including data representative of know your own client details of the user; generating a unique QREF locator based data representative of the received user details and the KYC data item; associating the generated QREF locator with the registered user details and also the KYC data item; generating a unique QREF access token based on data representative of the QREF locator corresponding to the KYC data item and the KYC data item; storing the QREF locator and the KYC data item in the QS repository of the QS network; and sending the unique KYC QREF access token to the user for use in providing KYC data of the user to one or more service providers.

As an option, the method(s) further comprising: receiving an QREF access token associated with a data item from a user; authenticating the user; identifying the QREF locator based on the user registration details and the access token; retrieving the data item associated with the QREF locator from the QS repository; checking the user has permissions to access the data item based on an access control list associated with the data item; and enabling the user access to the data item in response to determining the user has permissions to access the data item.

As an option, the method(s) comprising: receiving a request to register a user; authenticating the user; receiving user details for registering the user with the QS network in response to positive authentication of the user; receiving a certificate data item from the user for storing in a QS repository of the QS network, the certificate data item including data representative of a web certificate for certifying the trustworthiness of a website operated by the user; generating a unique QREF locator based data representative of the received user details and the certificate data item;

associating the generated QREF locator with the registered user details and also the certificate data item; generating a unique QREF access token based on data representative of the QREF locator corresponding to the certificate data item and the certificate data item; storing the QREF locator and the certificate data item in the QS repository of the QS network; and sending the unique certificate QREF access token to the user for use by the website in providing the certificate QREF access token to web browsers of users visiting the website.

As an option, the method(s) further comprising: receiving an certificate QREF access token associated with a certificate data item from a web browser of a user; identifying the QREF locator associated with the certificate data item based on certificate data within the certificate QREF access token and the user registration data associated with the certificate access token; retrieving the certificate data item associated with the QREF locator from the QS repository; checking the certificate data item matches the received certificate details of the received certificate access token; and confirming to the web browser of the user that the certificate QREF access token is valid in response to the received certificate details matching the corresponding details of the certificate data item.

As an option, the certificate data item is based on data representative of the ITU-X509 standard (ASN.1), and beyond. In addition to current standards, future certificate standards may be supported including IETF's PKIX certificate and CRL X.509v3 certificate standard. With the invent of Quantum Computers additional standards from ETSI, NIST as well as ITU & IETF may be adopted and will be supported by the Quantum Money application. It should be understood that the identified certificate standards are examples only, and that other certificate standards may be supported if desired.

As an option, the method(s) comprising: establishing QS communication channel with a first device of a first user; receiving, from the first device, a QREF access token associated with a QD key selected from the set of QD keys, the QD key for use in QS communications with a second device of a second user; retrieving the QD key selected from the set of QD keys from the repository based on the received QREF access token; sending the retrieved QD key to the first device and a second device for use in QS communications there between.

As an option, the method(s) comprising: establishing a first communication channel with a first device of a first user; receiving, from the first device, a request for communicating with a second device of a second user via the QS network; establishing a second communication channel with the second device of the second user; receiving a response from the second device of the second user to connect with the first device of the first user; establishing a QS communication channel through the QS network based on an available QD Key selected from the set of QD keys; connecting the first device of the first user with the second device of the second user via a communication path comprising the first communication channel, the QS communication channel and the second communication channel.

As an option, the first device has a first QD key from the set of QD keys stored thereon for QS communications with the QS network, and the second device has a second QD key stored thereon for QS communications with the QS network, and wherein: the first communication channel is a first QS communication channel connecting the QS network with the first device using the first QD key; the second communication channel is a second QS communication channel connecting the QS network with the second device using the second QD key.

As an option, a first device has a first QD key from the set of QD keys stored thereon for QS communications with the QS network, and a second device has a second QD key stored thereon for QS communications with the QS network, the method(s) further comprising: establishing a first QS communication channel with the first device using the first QD key; receiving, from the first device, the request for QS communications with the second device; establishing a second QS communication channel with the second device using the second QD key; receiving, from the second device, a response to establish QS communications with the first device; allocating a QD key from the set of QD keys for QS communications between the first and second device; and sending via the established first and second QS channels the third QD key to the first and second device, respectively, for use in QS communications therebetween.

As an option, the method(s) further comprising registering a device for use with the QS network, wherein registering the device further comprising: connecting with the device over a direct wired connection with a QS server of the QS network; selecting an available QD key from the set of QD keys for use by the device; uploading the selected QD key to secure storage of the device via the direct wired connection; and storing and registering an association between the device and the available QD key in the repository of the QS network.

As an option, the method(s) further comprising registering a user with the QS network, wherein registering the user further comprising: associating the user with a device registered for use with the QS network; and storing and registering the association between the user and the registered device in the repository of the QS network.

As an option, the method(s) further comprising: registering the first user with the QS network and associating the first user with the first device; and registering the second user with the QS network and associating the second user with the second device.

As an option, the method(s) further comprising: assigning a further QD key from the set of QD keys for use in QS communications between the first device and the second device, wherein the further QD key is to be stored as a QD key data item in the QS repository; generating a QREF locator associated with the QD key data item and an available QD key for encrypting the QD key data item; generating a QREF access token associated with the QD key data item based on the QREF locator; linking the QREF locator with the available QD key; associating the QREF locator with the registrations of the first user and the second user to form a communication pair; storing the QD key data item encrypted with the available QD key in the QS repository with the QREF locator; and sending the QREF access token to the first device and the second device for use in QS communications there between.

As an option, the method(s) further comprising: selecting an available QD key for forming a communication pair between the first and second device; and storing the available QD key as a QD key data item for use when the first and second device request QS communication there between.

As an option, the method(s) further comprising: in response to storing a QK key data item associated with a communication pair between a first device and a second device: generating a quantum reference "QREF" locator based on a user secret of the first and second users and an available QD key selected from the set of QD keys for encrypting the QD key data item, wherein the QREF locator indicates the location of the QD Key data item encrypted with the selected QD key in the repository; generating an QREF access token based on the QREF locator, wherein the QREF access token enables access operations to be performed on the QD key data item stored in the repository; providing the QREF locator to the repository for storing the encrypted QD key data item in the repository; and sending the QREF access token to the first device of the first user and the second device of the second user; and in response to receiving a request for accessing the QD Key data item from the repository by the first or the second user: receiving an QREF access token from the first user or the second user; identifying a QREF locator based on the QREF access token and the identity of the first user or the second user; and providing access to the encrypted QD key data item in the repository to the first user or the second user in response to identifying the QREF locator.

As an option, the method(s) further comprising: establishing a first QS communication channel with the first device using the first QD key; receiving, from the first device, a QREF access token corresponding to a QD key data item associated with a communication pair between the first user and the second user; identifying the QREF locator associated with the QREF access token based on the communication pair between the first and second users; providing access to a decrypted QD key data item in the repository via the first QS communication channel with the first device of the first user in response to identifying the QREF locator; establishing a second QS communication channel with the second device of the second user using the second QD key; receiving, from the second device, a QREF access token corresponding to a QD key data item associated with a communication pair between the first user and the second user; identifying the QREF locator associated with the QREF access token based on the communication pair between the first and second users; and providing access to a decrypted QD key data item in the repository via the second QS communication channel with the second device of the second user in response to identifying the QREF locator.

In a fourth example, the present disclosure provides a computer-implemented method of quantum safe (QS) storage and retrieval in a QS network, the QS network comprising one or more QS server(s) and a repository for storing and retrieving one or more data item(s) by a plurality of users, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method performed by an end-point device of a user comprising: sending a data item for storage in a repository of the QS network, wherein a QS server is configured, in response to receiving the data item, to: generate a quantum reference "QREF" locator based on a user secret of the user and an available QD key selected from the set of QD keys, wherein the QREF locator indicates the location for storing the data item encrypted with the selected QD key in the repository and an identity of the user; generate a QREF access token based on the QREF locator, wherein the QREF access token enables access operations to be performed on the data item when stored in the repository; store the data item in the repository indexed by the QREF locator; and send the QREF access token to the end-point device of the user; and receiving a QREF access token corresponding to the data item stored in the repository;

storing the QREF access token for use in accessing the data item stored in the QS system.

In a fifth example, the present disclosure provides a computer-implemented method of quantum safe (QS) storage and retrieval in a QS network, the QS network comprising one or more QS server(s) and a repository for storing and retrieving one or more data item(s) by a plurality of users, wherein each QS server comprises a hardware security module (HSM), such as a mesh HSM, with an identical set of quantum distributed (QD) keys stored thereon and the QS servers communicate securely with each other and the repository using quantum encryption based on one or more available QD keys from the set of QD keys, the method performed by an end-point device of a user comprising: receiving a QREF access token corresponding to a data item stored in the repository of the QS system, wherein a QS server is configured, in response to receiving the data item, to: generate a quantum reference (QREF) locator based on a user secret of a user submitting the data item and an available QD key selected from the set of QD keys, wherein the QREF locator indicates the location for storing the data item encrypted with the selected QD key in the repository and an identity of the user submitting the data item; generate a QREF access token based on the QREF locator, wherein the QREF access token enables access operations to be performed on the data item when stored in the repository; sending the QREF access token corresponding to the data item stored in the repository and user credentials to the QS system, wherein a QS server is configured, in response to receiving the QREF access token, to: identify a QREF locator based on the QREF access token and the identity of the user; and receiving access in relation to the data item stored in the QS system when the QS server identifies the QREF locator.

In a sixth example, the present disclosure provides an apparatus comprising a processor unit, a memory unit and a communication interface, the processor unit connected to the memory unit and the communication unit, wherein the apparatus is configured to implement the computer-implemented method according to any of the first, second, third, fourth and/or fifth examples, one or more features thereof, one or more features herein, combinations thereof, modifications thereto and/or as described herein.

In a seventh example, the present disclosure provides a computer-readable medium comprising code or computer instructions stored thereon, which when executed by a processor unit, causes the processor unit to perform the computer-implemented method according to any of the first, second, third, fourth and/or fifth examples, one or more features thereof, one or more features herein, combinations thereof, modifications thereto and/or as described herein.

In an eighth example, the present disclosure provides an end-point device comprising a processor unit, a memory unit and a communication interface, the processor unit connected to the memory unit and the communication unit, wherein the apparatus is configured to implement the computer-implemented method according to any of the fourth and/or fifth examples, one or more features thereof, one or more features herein, combinations thereof, modifications thereto and/or as described herein.

In a ninth example, the present disclosure provides a computer-readable medium comprising code or computer instructions stored thereon, which when executed by a processor unit, causes the processor unit to perform the computer-implemented method according to any of the fourth and/or fifth examples, one or more features thereof, one or more features herein, combinations thereof, modifications thereto and/or as described herein.

In a tenth example, the present disclosure provides a QS system comprising: a QS network comprising at least two QS servers according to the sixth example, each of the QS servers comprising a hardware security module (HSM), or a mesh HSM and embedded Quantum Random Number Generator (QRNG), with an identical set of quantum distributed (QD) keys stored thereon; a plurality of users with end-point devices according to eighth example; and a repository for storing and accessing data items associated with users of the end-point devices; wherein the QS servers communicate securely with each other and the repository using quantum encryption based on one or more available QD keys from the set of QD keys.

In a eleventh example, the present disclosure provides a computer-implemented method of quantum safe (QS) communication between a first device and a second device using a QS network, the QS network comprising at least two QS servers and a repository for storing and accessing data items associated with users of the first and second devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method comprising: establishing QS communication channel with the first device of a first user; receiving, from the first device, a QREF access token associated with a QD key selected from the set of QD keys, the QD key for use in QS communications with a second device of a second user; retrieving the QD key selected from the set of QD keys from the repository based on the received QREF access token; sending the retrieved QD key to the first and second devices for use in QS communications therebetween.

In a twelfth example, the present disclosure provides a computer-implemented method of quantum safe (QS) communication between a first device and a second device using a QS network, the QS network comprising at least two QS servers and a repository for storing and accessing data items associated with users of the first and second devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method comprising: establishing a first communication channel with a first device of a first user; receiving, from the first device, a request for communicating with a second device of a second user via the QS network; establishing a second communication channel with the second device of the second user; receiving a response from the second device of the second user to connect with the first device of the first user; establishing a QS communication channel through the QS network based on an available QD Key selected from the set of QD keys; connecting the first device of the first user with the second device of the second user via a communication path comprising the first communication channel, the QS communication channel and the second communication channel.

As an option, the first device has a first QD key from the set of QD keys stored thereon for QS communications with the QS network, and the second device has a second QD key stored thereon for QS communications with the QS network, and wherein: the first communication channel is a first QS communication channel connecting the QS network with the first device using the first QD key; the second communication channel is a second QS communication channel connecting the QS network with the second device using the second QD key.

As an option, the first device has a first QD key from the set of QD keys stored thereon for QS communications with the QS network, and the second device has a second QD key stored thereon for QS communications with the QS network, the method further comprising: establishing a first QS communication channel with the first device using the first QD key; receiving, from the first device, the request for QS communications with the second device; establishing a second QS communication channel with the second device using the second QD key; receiving, from the second device, a response to establish QS communications with the first device; allocating a QD key from the set of QD keys for QS communications between the first and second device; and sending via the established first and second QS channels the third QD key to the first and second device, respectively, for use in QS communications therebetween.

As an option, the method further comprising registering a device for use with the QS network, wherein registering the device further comprising: connecting with the device over a direct wired connection with a QS server of the QS network; selecting an available QD key from the set of QD keys for use by the device; uploading the selected QD key to secure storage of the device via the direct wired connection; and storing and registering an association between the device and the available QD key in the repository of the QS network.

As an option, method further comprising registering a user with the QS network, wherein registering the user further comprising: associating the user with a device registered for use with the QS network; and storing and registering the association between the user and the registered device in the repository of the QS network.

As an option, the method further comprising: registering the first user with the QS network and associating the first user with the first device; and registering the second user with the QS network and associating the second user with the second device.

As an option, the method further comprising: assigning a further QD key from the set of QD keys for use in QS communications between the first device and the second device, wherein the further QD key is to be stored as a QD key data item in the QS repository; generating a QREF locator associated with the QD key data item and an available QD key for encrypting the QD key data item; generating a QREF access token associated with the QD key data item based on the QREF locator; linking the QREF locator with the available QD key; associating the QREF locator with the registrations of the first user and the second user to form a communication pair; storing the QD key data item encrypted with the available QD key in the QS repository with the QREF locator; and sending the QREF access token to the first device and the second device for use in QS communications therebetween.

As an option, the method further comprising: selecting an available QD key for forming a communication pair between the first and second device; and storing the available QD key as a QD key data item for use when the first and second device request QS communication therebetween.

As an option, the method further comprising: in response to storing a QK key data item associated with a communication pair between a first device and a second device; generating a quantum reference (QREF) locator based on a user secret of the first and second users and an available QD key selected from the set of QD keys for encrypting the QD key data item, wherein the QREF locator indicates the location of the QD Key data item encrypted with the selected QD key in the repository; generating an QREF access token based on the QREF locator, wherein the QREF access token enables access operations to be performed on the QD key data item stored in the repository; providing the QREF locator to the repository for storing the encrypted QD key data item in the repository; and sending the QREF access token to the first device of the first user and the second device of the second user; and in response to receiving a request for accessing the QD Key data item from the repository by the first or the second user: receiving an QREF access token from the first user or the second user; identifying a QREF locator based on the QREF access token and the identity of the first user or the second user; and providing access to the encrypted QD key data item in the repository to the first user or the second user in response to identifying the QREF locator.

As an option, the method further comprising: establishing a first QS communication channel with the first device using the first QD key; receiving, from the first device, a QREF access token corresponding to a QD key data item associated with a communication pair between the first user and the second user; identifying the QREF locator associated with the QREF access token based on the communication pair between the first and second users; providing access to a decrypted QD key data item in the repository via the first QS communication channel with the first device of the first user in response to identifying the QREF locator; establishing a second QS communication channel with the second device of the second user using the second QD key; receiving, from the second device, a QREF access token corresponding to a QD key data item associated with a communication pair between the first user and the second user; identifying the QREF locator associated with the QREF access token based on the communication pair between the first and second users; and providing access to a decrypted QD key data item in the repository via the second QS communication channel with the second device of the second user in response to identifying the QREF locator.

In a thirteenth example, the present disclosure provides a computer-implemented method of quantum safe (QS) communication between a first device and a second device using a QS network, the QS network comprising at least two QS servers and a repository for storing and accessing data items associated with users of the first and second devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method performed by the first device comprising: establishing a first QS communication channel with a first QS server of the QS network; transmitting a QREF access token associated with a QD key selected from the set of QD keys for use in QS communications with a second device of a second user; receiving the retrieved QD key from the QS server for use in QS communications with the second device therebetween; establishing a third QS communication channel with the second device of the second user based on the received QD key, wherein, prior to establishing the third QS communication channel, the second device receives the retrieved QD key by establishing a second QS communication channel with a second QS server of the QS network and transmitting the QREF access token corresponding to the QD key.

In fourteenth example, the present disclosure provides a computer-implemented method of quantum safe (QS) communication between a first device and a second device using a QS network, the QS network comprising at least two QS servers and a repository for storing and accessing data items associated with users of the first and second devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method performed by the first device comprising: establishing a first communication channel with a first QS server of the QS network; transmitting, to the first QS server, a request for communicating with a second device of a second user; establishing a second communication channel with the second device of the second user; receiving a response from the second device of the second user to connect with the first device of the first user; establishing a QS communication channel through the QS network based on an available QD Key selected from the set of QD keys; communicating with the second device of the second user based on a communication path comprising the first communication channel, a QS communication channel through the QS network and a second communication channel between the second device and the QS network.

In a fifteenth example, the present disclosure provides a computer-implemented method of quantum safe (QS) communication between a first device and a second device using a QS network, the QS network comprising at least two QS servers and a repository for storing and accessing data items associated with users of the first and second devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method performed by the first device comprising: establishing a first communication channel with the first QS server of the QS network; receiving, from the first QS server, a connection request from the second device of the second user; in response to accepting the connection request, communicating with the second device of the second user based on a communication path comprising the first communication channel, a QS communication channel through the QS network and a second communication channel between the second device and the QS network.

As an option, the thirteenth, fourteenth, and/or fifteenth examples, where the first device has a first QD key from the set of QD keys stored thereon for QS communications with the QS network, and the second device has a second QD key stored thereon for QS communications with the QS network, and wherein: the first communication channel is a first QS communication channel connecting the QS network with the first device using the first QD key; the second communication channel is a second QS communication channel connecting the QS network with the second device using the second QD key.

As an option, wherein the first device has a first QD key from the set of QD keys stored thereon for QS communications with the QS network, and the second device has a second QD key stored thereon for QS communications with the QS network, the method further comprising: establishing a first QS communication channel with the first QS server using the first QD key; transmitting, to the first QS server, a request for QS communications with the second device; receiving via the established first QS channel the third QD key from the first QS server for use in QS communications with the second device, wherein the second device receives via an established second QS channel the third QD key from a second QS server in response to the request.

As an option, the method(s) further comprising registering a device of a user for use with the QS network, wherein registering the device further comprising: connecting the device over a direct wired connection with a QS server of the QS network; downloading an available QD key from the set of QD keys to secure storage on the device for use by the device in QS communications with the QS network; registering the association between the device and the user for storage in the repository of the QS network.

As an option, registering the user with the QS network, wherein registering the user further comprising providing user credentials and the device identifier of the device for registering the user and associated device for use with the QS network.

As an option, the method further comprising: receiving a QREF access token corresponding to a further QD key for use in QS communications between the first device and the second device, wherein the QS server is configured to perform the steps of: assigning a further QD key from the set of QD keys for use in QS communications between the first device and the second device, wherein the further QD key is to be stored as a QD key data item in the QS repository; generating a QREF locator associated with the QD key data item and an available QD key for encrypting the QD key data item; generating a QREF access token associated with the QD key data item based on the QREF locator; linking the QREF locator with the available QD key; associating the QREF locator with the registrations of the first user and the second user to form a communication pair; storing the QD key data item encrypted with the available QD key in the QS repository with the QREF locator; and sending the QREF access token to the first device and the second device for use in QS communications therebetween.

As an option, the QS network is configured to select an available QD key for forming a communication pair between the first and second device, and store the available QD key as a QD key data item for use when the first and second device request QS communication therebetween, the method(s) further comprising: sending a request for QS communications with a second device of a second user; receiving a QD key for use in QS communications with the second device; and establishing QS communications with the second device based on the received QD key.

As an option, the method(s) further comprising: transmitting a QREF access token for accessing a QD Key data item from the repository for use in QS communications between the first device of the first user and second device of a second user; receiving access to the QD Key data item, wherein the QD Key data item comprises data representative of a QD Key selected from a set of QD Keys for use by the first and second devices in QS communications therebetween; establishing QS communications with the second device using the QD Key, wherein the second device receives access to the QD Key data item by transmitting the QREF access token for accessing the QD Key data item.

As an option, the method(s) further comprising: establishing a first QS communication channel with the first QS server using the first QD key; transmitting, to the first QS server, a QREF access token corresponding to a QD key data item associated with a communication pair between the first user and the second user; receiving access to a decrypted QD key data item in the repository via the first QS communication channel with the first QS server in response to the first QS server identifying the QREF locator associated with the QREF access token; establishing a QS communication channel with the second device of the second user using the decrypted QD key, wherein the second device of the second user receives receiving access to a decrypted QD key data item in the repository via a second QS communication channel with a second QS server in response to the first QS server identifying the QREF locator associated with the QREF access token.

In a sixteenth example, the present disclosure provides an apparatus comprising a processor unit, a memory unit and a communication interface, the processor unit connected to the memory unit and the communication unit, wherein the apparatus is configured to implement the computer-implemented method according to any of the eleventh and/or twelfth example(s), one or more features thereof, one or more features herein, combinations thereof, modifications thereto and/or as described herein.

In a seventeenth example, the present disclosure provides a computer-readable medium comprising code or computer instructions stored thereon, which when executed by a processor unit, causes the processor unit to perform the computer-implemented method according to any of the eleventh and/or twelfth example(s), one or more features thereof, one or more features herein, combinations thereof, modifications thereto and/or as described herein.

In a eighteenth example, the present disclosure provides an end-point device comprising a processor unit, a memory unit and a communication interface, the processor unit connected to the memory unit and the communication unit, wherein the apparatus is configured to implement the computer-implemented method according to any of the thirteenth, fourteenth, and/or fifteenth example(s), one or more features thereof, one or more features herein, combinations thereof, modifications thereto and/or as described herein.

In a nineteenth example, the present disclosure provides a computer-readable medium comprising code or computer instructions stored thereon, which when executed by a processor unit, causes the processor unit to perform the computer-implemented method according to any of the eleventh, twelfth, thirteenth, fourteenth, and/or fifteenth example(s), one or more features thereof, one or more features herein, combinations thereof, modifications thereto and/or as described herein.

In a twentieth example, the present disclosure provides a QS system comprising: a QS network comprising at least two QS servers according to the apparatus of the sixteenth example, one or more features thereof, one or more features herein, combinations thereof, modifications thereto and/or as described herein, each of the QS servers comprising a hardware security module (HSM) with an identical set of quantum distributed (QD) keys stored thereon; a plurality of end-point devices according to the eighteenth example, one or more features thereof, one or more features herein, combinations thereof, modifications thereto and/or as described herein; a repository for storing and accessing data items associated with users of the end-point devices; wherein the QS servers communicate securely with each other and the repository using quantum encryption based on one or more available QD keys from the set of QD keys.

In a twenty first example, the present disclosure provides a computer-implemented method of quantum safe (QS) communication between a first device and a second device using a QS network, the QS network comprising at least two QS servers and a repository for storing and accessing data items associated with users of the first and second devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, wherein the first device has a first QD key 5 from the set of QD keys stored thereon and the second device has a second QD key from the set of QD keys stored thereon, the method comprising: establishing a first QS communication channel with the first device using the first QD key; receiving, from the first device, a request for QS 10 communications with the second device; establishing a second QS communication channel with the second device using the second QD key; receiving, from the second device, a response to establish QS communications with the first device; allocating a third QD key from the set of QD keys 15 for QS communications between the first and second device; and sending via the established first and second QS channels the third QD key to the first and second device, respectively, for use in QS communications therebetween.

As an option, the method further comprising registering a 20 device for use with the QS network, wherein registering the device further comprising: connecting with the device over a direct wired connection with a QS server of the QS network; selecting an available QD key from the set of QD keys for use by the device; uploading the selected QD key 25 to secure storage of the device via the direct wired connection; and storing and registering an association between the device and the selected available QD key in the repository of the QS network.

As an option, the method further comprising registering a 30 user with the QS network, wherein registering the user further comprising: associating the user with a device registered for use with the QS network; and storing and registering the association between the user and the registered device in the repository of the QS network. 35

As an option, the method further comprising: registering the first user with the QS network and associating the first user with the first device; and registering the second user with the QS network and associating the second user with the second device. 40

In a twenty second example, the present disclosure provides a computer-implemented method of quantum-safe (QS) transaction or message signing using a QS network, the QS network comprising at least two QS servers and a repository for storing and accessing data items associated 45 with users of one or more end-point devices, wherein each QS server comprises a hardware security module (HSM) with an identical set of quantum distributed (QD) keys stored thereon and the QS servers communicate securely with each other and the repository using quantum encryption 50 based on one or more available QD keys from the set of QD keys, the method comprising: receiving, from a device of a user, a transaction or message requiring a digital signature associated with the user to be applied thereto; receiving, from a device of a user, a QREF access token associated 55 with a data item stored in the repository, the data item is associated with a signing key for use in digitally signing the received transaction or message; identifying a QREF locator based on the QREF access token and input data from the user; and in response to identifying the QREF locator, 60 performing the steps of: retrieving the data item from the repository, wherein the data item is decrypted using the QD key corresponding to the QREF locator; and digitally signing the received transaction or message using a digital signature algorithm based on the retrieved data item; and 65 sending the digitally signed transaction or digitally signed message.

As an option, the method further comprising: generating a quantum reference "QREF" locator based on input data associated with a data item for storage and an available QD key selected from the set of QD keys, wherein the data item is associated with a signing key from a set of signing keys and the generated QREF locator is unique; and sending the QREF locator along with the data item encrypted with the available QD key to the repository.

As an option, the method further comprising: generating a QREF access token for accessing the data item based on the QREF locator using an irreversible function, process or operation, wherein the QREF access token is unique; and sending the QREF access token to a device of a user.

As an option, the method further comprising: receiving a set of signing keys associated with a user of an end-point device; generating, for each key in the set of signing keys, a QREF locator based on user data of the user and an available QD key from the set of QD keys, wherein a set of QREF locators is generated corresponding to the set of signing keys; linking each QREF locator in the set of QREF locators to the corresponding available QD key of the set of QD keys; generating, for each QREF locator in the set of QREF locators, a QREF access token based on said each QREF locator, wherein a set of QREF access tokens are generated corresponding to the set of signing keys; sending, for each QREF locator in the set of QREF locators, said each QREF locator and an encrypted data item, the encrypted data item comprising a data item representative of a key from the set of signing keys corresponding to said each QREF locator and encrypted with a QD key corresponding to said each QREF locator, to the repository for storage, wherein the encrypted data item is linked to the QREF locator when stored; sending the set of QREF access tokens to a device of the user associated with the set of signing keys.

As an option, wherein receiving a set of signing keys associated with a user of an end-point device further comprises generating a set of signing keys associated with a user based on one or more available QD keys from the set of QD keys.

As an option, the method further comprising sending the digitally signed transaction or digitally signed message to the device of the user.

As an option, the method further comprising sending the digitally signed transaction or digitally signed message to another device of another user that is a counter-party to the transaction or is addressed for receiving the digitally signed message, wherein the request for signing the transaction.

As an option, the method further comprising sending the digitally signed transaction or digitally signed message to a system configured for processing and/or storing the digitally signed transaction or digitally signed message on behalf of the device of the user.

As an option, the method further comprising sending the digitally signed transaction or digitally signed message to a DLT system configured for processing and/or storing the digitally signed transaction or digitally signed message on behalf of the device of the user.

As an option, the system comprises a system or service based on at least one from the group of: distributed ledger technology; shared ledger technology; and blockchain technology.

As an option, the system comprises a system or service using a consensus method or process for verifying whether one or more digitally signed transactions are stored in the distributed ledger, shared ledger and/or blockchain associated with said system or service.

As an option, the method performed by a QS server of the QS network further comprising performing the QS storage and/or access of data items based on the computer-implemented method according to any of first, second, third, fourth, and/or fifth example(s), one or more features thereof, one or more features herein, combinations thereof, modifications thereto and/or as described herein, wherein the data items corresponding to one or more signing keys.

As an option, further comprising registering permissions for one or more users to access data items based on one or more QREF access token(s) corresponding to one or more data item(s) representing one or more signing key(s) stored in the repository.

As an option, further comprising sending the one or more QREF access token(s) to the devices associated with the one or more users.

As an option, further comprising: transmitting the set of signing keys over the QS network to one or more load-balanced geographically located HSMs, wherein the set of signing keys are stored in the repository accessible by the HSMs via the QS network; sending the corresponding QREF access tokens associated with the set of signing keys to one or more devices of users with permissions to use the QREF access tokens.

As an option, the set of signing keys are a set of master keys or secrets associated with two or more systems requiring interoperability, further comprising registering permissions for one or more devices or apparatus of the two or more systems to access data items based on one or more QREF access token(s) corresponding to one or more data item(s) representing said one or more master key(s) or secrets stored in the repository.

As an option, further comprising sending the one or more QREF access token(s) to the devices.

As an option, the set of signing keys are a set of master keys, the method further comprising registering permissions for one or more users to access data items based on one or more QREF access token(s) corresponding to one or more data item(s) representing one or more signing key(s) stored in the repository.

As an option, further comprising sending the one or more QREF access token(s) to the devices associated with the one or more users.

As an option, further comprising: transmitting the set of master keys over the QS network to one or more load-balanced geographically located HSMs, wherein the set of master keys are stored in the repository accessible by the HSMs via the QS network; sending the corresponding QREF access tokens associated with the set of master keys to one or more devices of users with permissions to use the QREF access tokens.

In a twenty third example, the present disclosure provides a computer-implemented method of quantum-safe (QS) transaction or message signing using a QS network, the QS network comprising at least two QS servers and a repository for storing and accessing data items associated with users of one or more end-point devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method performed by a device of a user comprising: receiving a transaction or message requiring a digital signature associated with the user to be applied thereto; sending data representative of the received transaction or message and a QREF access token associated with a data item stored in the repository, the data item comprising a signing key for use in digitally signing the transaction or message; receiving a digitally signed transaction or digitally signed message comprising the transaction or message digitally signed using a digital signature algorithm based on the data item; sending the digitally signed transaction for further processing or storage; and indicating to the user of the device that the QREF access token has been used.

As an option, wherein the digitally signed transaction or digitally signed message corresponds to the transaction or message having been processed by a QS server of the QS network configured to: identify a QREF locator based on the QREF access token and input data from the user; and in response to identifying the QREF locator, the QS server is configured to: retrieve the data item from the repository, wherein the data item is decrypted using the QD key corresponding to the QREF locator; and digitally sign the received transaction or message using a digital signature algorithm based on the retrieved data item; and send the digitally signed transaction or digitally signed message.

As an option, the method further comprising: transmitting a set of signing keys associated with the user of the end-point device; and receiving a set of QREF access tokens associated with the set of signing keys.

As an option, the method further comprising: transmitting a request for a set of signing keys associated with the user of the end-point device; and receiving a set of QREF access tokens associated with a generated set of signing keys, wherein the generated set of signing keys are stored in encrypted form in the repository and each key in the set of signing keys is linked to a QREF locator corresponding to a QREF access token of the set of QREF access tokens, wherein a QREF access token is generated by an irreversible operation or function based on the QREF locator.

As an option, the generated set of signing keys are generated by an HSM based on one or more available QD keys from the set of QD keys.

As an option, a QS server is configured to generate the set of QREF access tokens, the QS server configured to: generate, for each key in the set of signing keys, a QREF locator based on user data of the user and an available QD key from the set of QD keys, wherein a set of QREF locators is generated corresponding to the set of signing keys; link each QREF locator in the set of QREF locators to the corresponding available QD key of the set of QD keys; generate, for each QREF locator in the set of QREF locators, a QREF access token based on said each QREF locator, wherein a set of QREF access tokens are generated corresponding to the set of signing keys; send, for each QREF locator in the set of QREF locators, said each QREF locator and an encrypted data item, the encrypted data item comprising a data item representative of a key from the set of signing keys corresponding to said each QREF locator and encrypted with a QD key corresponding to said each QREF locator, to the repository for storage, wherein the encrypted data item is linked to the QREF locator when stored; and send the set of QREF access tokens associated with the set of signing keys to a device associated with the user.

As an option, the method further comprising receiving the digitally signed transaction or digitally signed message at the device of the user.

As an option, the method further comprising sending the digitally signed transaction or digitally signed message to another device of another user that is a counter-party to the transaction or is addressed for receiving the digitally signed message, wherein the request for signing the transaction.

As an option, the method further comprising sending the digitally signed transaction or digitally signed message to a system configured for processing and/or storing the digitally signed transaction or digitally signed message on behalf of the device of the user.

As an option, the method further comprising sending the digitally signed transaction or digitally signed message to a DLT system configured for processing and/or storing the digitally signed transaction or digitally signed message on behalf of the device of the user.

As an option, the system comprises a system or service based on at least one from the group of: distributed ledger technology; shared ledger technology; and blockchain technology.

As an option, the method comprising performing the quantum-safe communications with a QS server or another device or system based on the computer-implemented method according to any of eleventh, twelfth, thirteenth, fourteenth, and/or fifteenth example(s), one or more features thereof, one or more features herein, combinations thereof, modifications thereto and/or as described herein.

As an option, the method performed by a client DLT application executing on the device of the user, the client application configured for signing DLT transactions and sending signed DLT to a DLT system.

As an option, a transaction receipt can be issued to any user by the DLT using a Non Fungible Token (NFT) to verify authenticity. The NFT creation record being added to the DLT ledger for verification purposes.

In a twenty fourth example, the present disclosure provides an apparatus comprising a processor unit, a memory unit and a communication interface, the processor unit connected to the memory unit and the communication unit, wherein the apparatus is configured to implement the computer-implemented method according to any of the twenty second and/or twenty third example(s), one or more features thereof, one or more features herein, combinations thereof, modifications thereto and/or as described herein.

In a twenty fifth example, the present disclosure provides a computer-readable medium comprising code or computer instructions stored thereon, which when executed by a processor unit, causes the processor unit to perform the computer-implemented method according to any of the twenty second and/or twenty third example(s), one or more features thereof, one or more features herein, combinations thereof, modifications thereto and/or as described herein.

In a twenty sixth example, the present disclosure provides an end-point device comprising a processor unit, a memory unit and a communication interface, the processor unit connected to the memory unit and the communication unit, wherein the end-point device or apparatus is configured to implement the computer-implemented method according to any of the twenty third example(s), one or more features thereof, one or more features herein, combinations thereof, modifications thereto and/or as described herein.

As an option, the end-point device further comprising a secure enclave for implementing the computer-implemented method according to any of the twenty second and/or twenty third example(s), one or more features thereof, one or more features herein, combinations thereof, modifications thereto and/or as described herein.

In a twenty seventh example, the present disclosure provides an computer-readable medium comprising code or computer instructions stored thereon, which when executed by a processor unit, causes the processor unit to perform the computer-implemented method according to any of the twenty second and/or twenty third example(s), one or more features thereof, one or more features herein, combinations thereof, modifications thereto and/or as described herein.

In a twenty eighth example, the present disclosure provides a QS system comprising: a QS network comprising at least two QS servers according to the apparatus of the twenty fourth example, one or more features herein, combinations thereof, modifications thereto and/or as described herein, each of the QS servers comprising a hardware security module (HSM) with an identical set of quantum distributed (QD) keys stored thereon; a plurality of end-point devices according to any of the twenty sixth example, one or more features herein, combinations thereof, modifications thereto and/or as described herein; a repository for storing and accessing data items associated with users of the end-point devices; wherein the QS servers communicate securely with each other and the repository using quantum encryption based on one or more available QD keys from the set of QD keys.

In a twenty ninth example, the present disclosure provides a computer-implemented method of quantum-safe (QS) cryptographic processing of a data item, transaction or message using a QS network, the QS network comprising at least two QS servers and a repository for storing and accessing data items associated with users of one or more end-point devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method comprising: receiving a data item, transaction or message requiring a cryptographic processing associated with a user or system; receiving a QREF access token associated with a data item stored in the repository, the data item is associated with a cryptographic key for use in cryptographically processing the received data item, transaction or message; identifying a QREF locator based on the QREF access token and input data from the user or system; and in response to identifying the QREF locator, performing the steps of: retrieving the data item from the repository, wherein the data item is decrypted using the QD key corresponding to the QREF locator; and processing the received data item, transaction or message using one or more cryptographic operations based on the retrieved data item; and sending the cryptographically processed data item, cryptographically processed transaction or cryptographically processed message.

As an option, the method further comprising: generating a quantum reference (QREF) locator based on input data associated with a data item for storage and an available QD key selected from the set of QD keys, wherein the data item is associated with a cryptographic key from a set of cryptographic keys and the generated QREF locator is unique; and sending the QREF locator along with the data item encrypted with the available QD key to the repository.

As an option, the method further comprising: generating a QREF access token for accessing the data item based on the QREF locator using an irreversible function, process or operation, wherein the QREF access token is unique; and sending the QREF access token to a device of a user.

As an option, the method further comprising: receiving a set of cryptographic keys associated with the system or the user of an end-point device; generating, for each key in the set of signing keys, a QREF locator based on system data of the system or user data of the user and an available QD key from the set of QD keys, wherein a set of QREF locators is generated corresponding to the set of cryptographic keys;

linking each QREF locator in the set of QREF locators to the corresponding available QD key of the set of QD keys; generating, for each QREF locator in the set of QREF locators, a QREF access token based on said each QREF locator, wherein a set of QREF access tokens are generated corresponding to the set of cryptographic keys; sending, for each QREF locator in the set of QREF locators, said each QREF locator and an encrypted data item, the encrypted data item comprising a data item representative of a key from the set of cryptographic keys corresponding to said each QREF locator and encrypted with a QD key corresponding to said each QREF locator, to the repository for storage, wherein the encrypted data item is linked to the QREF locator when stored; sending the set of QREF access tokens to the system or a device of the user associated with the set of cryptographic keys.

As an option, receiving a set of cryptographic keys associated with a system or a user of an end-point device further comprises generating a set of cryptographic keys associated with the system or the user based on one or more available QD keys from the set of QD keys.

As an option, the method further comprising sending the cryptographically processed transaction or cryptographically processed signed message to the system or a device of the user.

As an option, the method further comprising sending the cryptographically processed data item, cryptographically processed transaction or cryptographically processed message to another system or another device of another user that is a counter-party to the transaction or is addressed for receiving the cryptographically processed message.

As an option, the method further comprising sending the cryptographically processed data item, cryptographically processed transaction, or cryptographically processed message to the system or another system configured for using, processing and/or storing the cryptographically processed data item, cryptographically processed transaction or cryptographically processed message.

As an option, the method further comprising sending the cryptographically processed data item, cryptographically processed transaction or cryptographically processed message to a DLT system configured for using, processing and/or storing the cryptographically processed data item, cryptographically processed transaction or cryptographically processed message on behalf of the device of the user.

As an option, wherein the system comprises a system or service based on at least one from the group of: distributed ledger technology; shared ledger technology; and blockchain technology.

As an option, wherein the system or said another system is configured to use a consensus method or process for verifying whether one or more cryptographically processed data item(s), cryptographically processed transaction(s) or cryptographically processed message(s) are stored in a distributed ledger, shared ledger and/or blockchain associated with said system or said another system.

As an option, the method performed by a QS server of the QS network further comprising performing the QS storage and/or access of data items based on the computer-implemented method according to any of first, second third, fourth and/or fifth examples one or more features thereof, one or more features herein, combinations thereof, modifications thereto and/or as described herein, wherein the data items corresponding to one or more cryptographic keys.

As an option, wherein the cryptographic operations comprise one or more cryptographic operations based on the group of: encryption, digital signing, decryption, authentication, hashing, authenticated encryption.

As an option, wherein the cryptographic keys comprise one or more cryptographic keys for use with said one or more cryptographic operations.

As an option, wherein the set of cryptographic keys are a set of cryptographic signing keys associated with the system or the user for use with said one or more cryptographic operations, said one or more cryptographic operations corresponding to one or more digital signature cryptographic operation(s) or algorithm(s) associated with digitally signing one or more data item(s), transaction(s), or message(s) using a signing key associated with a QREF access token, and the set of cryptographic key(s) are a set of signing key(s).

As an option, further comprising registering permissions for one or more systems or one or more users to access data items based on one or more QREF access token(s) corresponding to one or more data item(s) representing one or more signing key(s) of the set of signing key(s) stored in the repository.

As an option, further comprising sending the one or more QREF access token(s) to the one or more systems, or one or more devices associated with the one or more users.

As an option, further comprising: transmitting the set of signing keys over the QS network to one or more load-balanced geographically located HSMs, wherein the set of signing keys are stored in the repository accessible by the HSMs via the QS network; sending the corresponding QREF access tokens associated with the set of signing keys to one or more systems, or one or more devices of users located in relation to the geographically located HSMs, with permissions to use the QREF access tokens.

As an option, the set of cryptographic keys are a set of master keys or secrets associated with two or more systems requiring interoperability, further comprising registering permissions for the two or more systems to access data items based on one or more QREF access token(s) corresponding to one or more data item(s) representing said one or more master key(s) or secrets stored in the repository for use in cryptographic operations on one or more received data items, received transactions or messages that enable interoperability between the two or more systems.

As an option, further comprising sending the one or more QREF access token(s) to the two or more system and/or devices of users associated with the two or more systems.

As an option, wherein the set of cryptographic keys are a set of master keys, the method further comprising registering permissions for one or more users to access data items based on one or more QREF access token(s) corresponding to one or more data item(s) representing one or more master key(s) stored in the repository for use in cryptographic operations on one or more received data items, received transactions or messages using one or more master keys corresponding to the one or more QREF access token(s).

As an option, further comprising sending the one or more QREF access token(s) to the devices or systems associated with the one or more users.

As an option, the set of master keys are a set of master hierarchical deterministic (HD) keys further comprising sending the one or more QREF access token(s) to the devices or systems associated with the one or more users.

As an option, the set of cryptographic keys comprise a set of cryptographic encryption keys associated with the system or the user for use with said one or more cryptographic operations, said one or more cryptographic operations corresponding to one or more encryption cryptographic operation(s) or algorithm(s) associated with encrypting one or more data item(s), transaction(s), or message(s) using the cryptographic encryption key corresponding to a QREF access token.

As an option, wherein the set of cryptographic keys comprise a set of cryptographic decryption keys associated with the system or the user for use with said one or more cryptographic operations, said one or more cryptographic operations corresponding to one or more decryption cryptographic operation(s) or algorithm(s) associated with decrypting one or more encrypted data item(s), encrypted transaction(s), or encrypted message(s) using the cryptographic decryption key corresponding to a QREF access token.

As an option, wherein the one or more data items comprise data representative of a set of data required to be backed-up and/or archived, and the set of cryptographic keys comprise a set of cryptographic encryption keys associated with the system or the user for use with said one or more cryptographic operations for encrypting the one or more data items.

In a thirtieth example, the present disclosure provides a computer-implemented method of quantum-safe (QS) cryptographic processing of a data item, transaction or message using a QS network, the QS network comprising at least two QS servers and a repository for storing and accessing data items associated with users of one or more end-point devices, wherein each QS server comprises a hardware security module (HSM) with an identical set of quantum distributed (QD) keys stored thereon and the QS servers communicate securely with each other and the repository using quantum encryption based on one or more available QD keys from the set of QD keys, the method comprising: receiving a data item, transaction or message requiring cryptographic processing associated with a user or system; sending data representative of the received data item, transaction or message and a QREF access token associated with another data item stored in the repository, the other data item comprising a cryptographic key for use in cryptographically processing the received data item, transaction or message; and receiving a cryptographically processed data item, transaction or message comprising the received data item, transaction or message cryptographically processed using one or more cryptographic operations based on the other data item.

As an option, further comprising sending the cryptographically processed data item, transaction or message to a system or user with a device for further processing or storage.

As an option, wherein the cryptographically processed data item, transaction or message corresponds to the transaction or message having been cryptographically processed by a QS server of the QS network, the QS server configured to: identify a QREF locator based on the QREF access token and input data from the user; and in response to identifying the QREF locator, the QS server is configured to: retrieve the other data item from the repository, wherein the retrieved data item is decrypted using the QD key corresponding to the QREF locator; and process the received data item, transaction or message using one or more cryptographic operations based on the retrieved data item; and send the cryptographically processed data item, cryptographically processed transaction or cryptographically processed message.

As an option, the method further comprising: transmitting a set of cryptographic keys associated with the system or user of the end-point device; and receiving a set of QREF access tokens associated with the set of cryptographic keys.

As an option, the method further comprising: transmitting a request for a set of cryptographic keys associated with the system or user of the end-point device; and receiving a set of QREF access tokens associated with a generated set of cryptographic keys, wherein the generated set of cryptographic keys are stored in encrypted form in the repository and each key in the set of cryptographic keys is linked to a QREF locator corresponding to a QREF access token of the set of QREF access tokens, wherein a QREF access token is generated by an irreversible operation or function based on the QREF locator.

As an option, the generated set of cryptographic keys are generated by an HSM based on one or more available QD keys from the set of QD keys.

As an option, wherein a QS server is configured to generate the set of QREF access tokens, the QS server configured to: generate, for each key in the set of cryptographic keys, a QREF locator based on user data of the user and an available QD key from the set of QD keys, wherein a set of QREF locators is generated corresponding to the set of cryptographic keys; link each QREF locator in the set of QREF locators to the corresponding available QD key of the set of QD keys; generate, for each QREF locator in the set of QREF locators, a QREF access token based on said each QREF locator, wherein a set of QREF access tokens are generated corresponding to the set of cryptographic keys; send, for each QREF locator in the set of QREF locators, said each QREF locator and an encrypted data item, the encrypted data item comprising a data item representative of a key from the set of cryptographic keys corresponding to said each QREF locator and encrypted with a QD key corresponding to said each QREF locator, to the repository for storage, wherein the encrypted data item is linked to the QREF locator when stored; and send the set of QREF access tokens associated with the set of cryptographic keys to the system, or device associated with the user.

As an option, the method further comprising receiving the cryptographically processed data item, transaction or message at the device of the user.

As an option, the method further comprising sending the cryptographically processed data item, transaction or message to one or more from the group of: another system for processing or storage; a device of another user that is a counter-party to the transaction; a device of another user or system addressed for receiving the cryptographically processed data item, transaction or message.

As an option, the method further comprising sending the cryptographically processed data item, transaction or message to a system configured for processing and/or storing the cryptographically processed data item, transaction or message.

As an option, the method further comprising sending the cryptographically processed data item, transaction or message to a DLT system configured for processing and/or storing the cryptographically processed data item, transaction or message.

As an option, wherein the system or the another system comprises a system or service based on at least one from the group of: distributed ledger technology; shared ledger technology; and blockchain technology.

As an option, the method comprising performing the quantum-safe communications with a QS server or another device or system based on the computer-implemented method according to any of claims eleventh, twelfth, thirteenth, fourteenth, and/or fifteenth examples, one or more features thereof, one or more features herein, combinations thereof, modifications thereto and/or as described herein.

As an option, the method performed by a client DLT application executing on the device of the user, the client application configured for signing DLT transactions and sending signed DLT to a DLT system.

As an option, wherein the set of cryptographic keys are a set of cryptographic signing keys associated with the system or the user for use with said one or more cryptographic operations, said one or more cryptographic operations corresponding to one or more digital signature cryptographic operation(s) or algorithm(s) associated with digitally signing one or more data item(s), transaction(s), or message(s) using a signing key associated with a QREF access token.

As an option, further comprising registering permissions for one or more systems or one or more users to access data items based on one or more QREF access token(s) corresponding to one or more data item(s) representing one or more signing key(s) of the set of signing key(s) stored in the repository.

As an option, further comprising sending the one or more QREF access token(s) to the one or more systems, or one or more devices associated with the one or more users.

As an option, wherein the QS server is configured to transmit the set of signing keys over the QS network to one or more load-balanced geographically located HSMs, wherein the set of signing keys are stored in the repository accessible by the HSMs via the QS network, the method comprising receiving the corresponding QREF access tokens associated with the set of signing keys of one or more systems, or one or more devices of users located in relation to the geographically located HSMs, with permissions to use the QREF access tokens.

As an option, wherein the set of cryptographic keys are a set of master keys or secrets associated with two or more systems requiring interoperability, further comprising registering permissions for the two or more systems to access data items based on one or more QREF access token(s) corresponding to one or more data item(s) representing said one or more master key(s) or secrets stored in the repository for use in cryptographic operations on one or more received data items, received transactions or messages that enable interoperability between the two or more systems.

As an option, further comprising receiving the one or more QREF access token(s) at the two or more system and/or devices of users associated with the two or more systems.

As an option, wherein the set of cryptographic keys are a set of master keys, the method further comprising registering permissions for a system or one or more users to access data items based on one or more QREF access token(s) corresponding to one or more data item(s) representing one or more master key(s) stored in the repository for use in cryptographic operations on one or more received data items, received transactions or messages using one or more master keys corresponding to the one or more QREF access token(s).

As an option, further comprising receiving the one or more QREF access token(s) at the systems, or devices or systems associated with the one or more users.

As an option, wherein the set of master keys are a set of master hierarchical deterministic (HD) keys further comprising sending the one or more QREF access token(s) to the devices or systems associated with the one or more users.

As an option, wherein the set of cryptographic keys comprise a set of cryptographic encryption keys associated with the system or the user for use with said one or more cryptographic operations, said one or more cryptographic operations corresponding to one or more encryption cryptographic operation(s) or algorithm(s) associated with encrypting one or more data item(s), transaction(s), or message(s) using the cryptographic encryption key corresponding to a QREF access token.

As an option, wherein the set of cryptographic keys comprise a set of cryptographic decryption keys associated with the system or the user for use with said one or more cryptographic operations, said one or more cryptographic operations corresponding to one or more decryption cryptographic operation(s) or algorithm(s) associated with decrypting one or more encrypted data item(s), encrypted transaction(s), or encrypted message(s) using the cryptographic decryption key corresponding to a QREF access token.

As an option, further comprising sending one or more data items comprising data representative of a set of data required to be backed-up and/or archived, wherein the set of cryptographic keys comprise a set of cryptographic encryption keys associated with the system or the user for use with said one or more cryptographic operations for encrypting said one or more data items.

In a thirty first example, the present disclosure provides an apparatus comprising a processor unit, a memory unit and a communication interface, the processor unit connected to the memory unit and the communication unit, wherein the apparatus is configured to implement the computer-implemented method according to twenty ninth example, one or more features thereof, one or more features herein, combinations thereof, modifications thereto and/or as described herein.

In a thirty second example, the present disclosure provides a computer-readable medium comprising code or computer instructions stored thereon, which when executed by a processor unit, causes the processor unit to perform the computer-implemented method according to twenty ninth example, one or more features thereof, one or more features herein, combinations thereof, modifications thereto and/or as described herein.

In a thirty third example, the present disclosure provides an end-point device comprising a processor unit, a memory unit and a communication interface, the processor unit connected to the memory unit and the communication unit, wherein the apparatus is configured to implement the computer-implemented method according to thirtieth example, one or more features thereof, one or more features herein, combinations thereof, modifications thereto and/or as described herein.

As an option, the end-point device further comprising a secure enclave for implementing the computer-implemented method according to the thirtieth example, one or more features thereof, one or more features herein, combinations thereof, modifications thereto and/or as described herein.

In a thirty fourth example, the present disclosure provides a computer-readable medium comprising code or computer instructions stored thereon, which when executed by a processor unit, causes the processor unit to perform the computer-implemented method according to thirtieth example, one or more features thereof, one or more features herein, combinations thereof, modifications thereto and/or as described herein.

In a thirty fifth example, the present disclosure provides a QS system comprising: a QS network comprising at least two QS servers according to the apparatus of the thirty first example, one or more features thereof, one or more features herein, combinations thereof, modifications thereto and/or as described herein, each of the QS servers comprising a hardware security module (HSM) with an identical set of quantum distributed (QD) keys stored thereon; a plurality of end-point devices according to according to thirty third aspect, one or more features thereof, one or more features herein, combinations thereof, modifications thereto and/or as described herein; a repository for storing and accessing data items associated with users of the end-point devices; wherein the QS servers communicate securely with each other and the repository using quantum encryption based on one or more available QD keys from the set of QD keys.

In the embodiment(s) and example(s) described above and/or herein the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiment(s) and/or example(s) described above and/or herein are fully automatic. In some examples a user or operator of the system may manually instruct some steps of the method to be carried out.

In the described embodiments and/or examples of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media.

The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention may be further defined with reference to the clauses below:

1. A computer-implemented method of secure quantum safe (QS) payments using a quantum cloud payment platform and two or more endpoint devices, the method, performed by the quantum cloud payment platform, comprising:

receiving one or more quantum safe deposit payment transactions from one or more endpoint devices of one or more registered users, each QS deposit payment transaction of a user comprising data representative of a deposit value which is a fiat cash value or digital currency cash value;

transferring each of the deposit values from a bank account associated with a user and linked to the QS payment account of the user to a quantum cloud account for pooling each of the deposit values;

for each deposit value transferred in relation to a user of an endpoint device, performing:

converting said each deposit fiat cash value to a corresponding number of quantum money tokens;

linking said number of quantum money tokens to the QS payment account of the user; and sending said number of quantum money tokens to the endpoint device of the user for updating an electronic wallet of said user.

2. A computer-implemented method of secure quantum safe (QS) payments using a quantum cloud platform and two or more endpoint devices, the method, performed by the quantum cloud payment platform, comprising:

receiving one or more quantum safe withdrawal payment transactions from one or more endpoint devices of one or more registered users, each QS withdrawal payment transaction of a user comprising data representative of a withdrawal value which is a fiat cash value or digital currency cash value;

transferring each of the withdrawal values from a quantum cloud account for pooling each of the withdrawal values to a bank account associated with a user and linked to the QS payment account of the user, wherein for each withdrawal value transferred in relation to a user of an endpoint device, performing:

converting said each withdrawal value to a corresponding number of quantum money tokens;

determining whether QS payment account of said user has enough quantum money tokens in relation to the number of quantum money tokens of said each withdrawal value;

removing said number of quantum money tokens to the QS payment account of the user, when said QS payment account has enough quantum money tokens; and sending an indication of the number of quantum money tokens withdrawn from the QS payment account of the user to the endpoint device of the user for updating an electronic wallet of said user.

3. A computer-implemented method of secure quantum safe (QS) payments using a quantum cloud platform and two or more endpoint devices, the method, performed by the quantum cloud payment platform, comprising:

receiving one or more quantum safe payment transactions from one or more endpoint devices of one or more registered users, each QS payment transaction of a user comprising data representative of a payment value which is a fiat cash value or digital currency cash value for transferring to another user of an endpoint device;

converting each of the payment values into a corresponding number of quantum money tokens;

transferring each of the number of quantum money tokens corresponding to a payment value from the QS payment account of the user to the QS payment account of the other user, wherein for each of the number of quantum money tokens corresponding to the payment value transferred in relation to a user of an endpoint device, performing:

determining whether the QS payment account of said user has enough quantum money tokens in relation to the number of quantum money tokens of said each payment value;

removing said number of quantum money tokens from the QS payment account of the user, when said QS payment account has enough quantum money tokens;

transferring said number of quantum money tokens from the QS payment account of the user to the QS payment account of the other user; and sending an indication of the number of quantum money tokens withdrawn from the QS payment account of the user to the endpoint device of the user for updating an electronic wallet of said user.

4. The computer-implemented method of any one of clauses 1 to 3, wherein the quantum cloud payment platform comprises:

a quantum-safe network, the QS network comprising one or more QS server(s) and a distributed ledger technology (DLT) repository for registering, recording and tracking a plurality of QS payment transactions between two or more endpoint devices, each QS server comprising a secure memory for storing an identical set of quantum distributed (QD) keys or quantum safe keys, said identical set of QD keys having been distributed to each of said QS server(s) in a quantum-safe manner, and said QS server(s) configured to communicate securely with each other and the repository using one or more available QD keys from the identical set of QD keys, and one or more further available QD keys from the set of QD keys being distributed as quantum safe keys to each of the endpoint devices registered with the quantum cloud payment platform, wherein each of the users of the endpoint devices are registered with a QS payment account in the quantum cloud payment platform.

5. The computer-implemented method of any preceding clause, further comprising:

receiving a request from an endpoint device for creating a QS payment account;

performing know your client and anti-money laundering checks on the user of the endpoint device;

in response to a positive KYC and AML checks, creating a QS payment account for the user and associating the QS payment account with the endpoint device of the user.

6. The computer-implemented method of any preceding clause, wherein the secure memory comprises a hardware security module (HSM).

7. The computer-implemented method of any preceding clause, wherein the quantum money tokens in a QS payment account have a value in the currency of the QS payment account, which currency is a fiat currency or a digital currency, which is fixed at the value used when the quantum money tokens were paid into the QS payment account.

8. A computer-implemented method of secure quantum safe (QS) payments using a quantum cloud payment platform and two or more endpoint devices, the method, performed by one of the endpoint devices, comprising:

in response to a deposit instruction from the user of the endpoint device:

transmitting a quantum safe deposit payment transaction to the quantum cloud payment platform, the QS deposit payment transaction comprising data representative of a deposit value which is a fiat cash value or digital currency cash value;

receiving data representative of said number of quantum money tokens corresponding to the deposit value;

updating an electronic wallet of said user based on the received number of quantum money tokens.

9. A computer-implemented method of secure quantum safe (QS) payments using a quantum cloud payment platform and two or more endpoint devices, the method, performed by one of the endpoint devices, comprising:

in response to a withdrawal instruction from the user of the endpoint device:

transmitting a quantum safe withdrawal payment transaction to the quantum cloud payment platform, the QS withdrawal payment transaction comprising data representative of a withdrawal value which is a fiat cash value or a digital currency cash value;

receiving an indication of the number of quantum money tokens withdrawn from the QS payment account of the user; and updating an electronic wallet of said user based on said indication.

10. A computer-implemented method of secure quantum safe (QS) payments using a quantum cloud payment platform and two or more endpoint devices, the method, performed by one of the endpoint devices, comprising:

in response to a payment instruction from the user of the endpoint device:

transmitting a quantum safe payment transaction to the quantum cloud platform, the QS payment transaction of a user comprising data representative of a payment value which is a fiat cash value or a digital currency cash value for transferring to another user of an endpoint device;

receiving an indication of the number of quantum money tokens withdrawn from the QS payment account of the user of the endpoint device; and updating an electronic wallet of said user based on the indication.

11. The computer-implemented method of any one of clauses 8 to 10, wherein the quantum cloud payment platform comprises:

a quantum-safe network, the QS network comprising one or more QS server(s) and a distributed ledger technology (DLT) repository for registering, recording and tracking a plurality of QS payment transactions between two or more endpoint devices, each QS server comprising a secure memory for storing an identical set of quantum distributed (QD) keys or quantum safe keys, said identical set of QD keys having been distributed to each of said QS server(s) in a quantum-safe manner, and said QS server(s) configured to communicate securely with each other and the repository using one or more available QD keys from the identical set of QD keys, and one or more further available QD keys from the set of QD keys being distributed as quantum safe keys to each of the endpoint devices registered with the quantum cloud payment platform, wherein each of the users of the endpoint devices are registered with a QS payment account in the quantum cloud payment platform.

12. The computer-implemented method of any one of clauses 8 to 11, further comprising: receiving a request from an endpoint device for creating a QS payment account;

performing know your client and anti-money laundering checks on the user of the endpoint device;

in response to a positive KYC and AML checks, creating a QS payment account for the user and associating the QS payment account with the endpoint device of the user.

13. The computer-implemented method of any one of clauses 8 to 12, wherein the secure memory comprises a hardware security module (HSM).

14. The computer-implemented method of any one of clauses 8 to 12, wherein the quantum money tokens in a QS payment account have a value in the currency of the QS payment account, which currency is a fiat currency or a digital currency, which is fixed at the value used when the quantum money tokens were paid into the QS payment account.

15. An apparatus comprising a processor unit, a memory unit, and a communication interface, the processor unit connected to the memory unit and the communication interface, wherein the processor unit, memory unit and communication interface are adapted to implement the computer-implemented method as claimed in any of clauses 1 to 7.

16. An apparatus comprising a processor unit, a memory unit, and a communication interface, the processor unit connected to the memory unit and the communication interface, wherein the processor unit, memory unit and communication interface are adapted to implement the computer-implemented method as claimed in any of clauses 8 to 14.

17. A system comprising:
  an quantum cloud platform including an apparatus according to clause 15;
  a plurality of endpoint devices comprising an apparatus according to clause 16;
  wherein the quantum cloud computing platform uses quantum safe communications with each of the plurality of endpoint devices.

18. A computer-readable medium comprising computer code or instructions stored thereon, which when executed on a processor, causes the processor to perform the computer implemented method according to any of clauses 1 to 7.

19. A computer-readable medium comprising computer code or instructions stored thereon, which when executed on a processor, causes the processor to perform the computer implemented method according to any of clauses 8 to 14.

20. A computer-implemented method of secure quantum safe (QS) payments using a quantum cloud platform, the quantum cloud platform comprising a quantum-safe network, the QS network comprising one or more QS server(s) and a distributed ledger technology (DLT) repository for registering, recording and tracking a plurality of QS payment transactions between two or more endpoint devices, each QS server comprising a hardware security module (HSM) for storing an identical set of quantum distributed (QD) keys or quantum safe keys, said identical set of QD keys having been distributed to each of said QS server(s) in a quantum-safe manner, and said QS server(s) configured to communicate securely with each other and the repository using one or more available QD keys from the identical set of QD keys, and one or more further available QD keys from the set of QD keys being distributed as quantum safe keys to each of the endpoint devices registered with the quantum cloud payment platform, wherein each of the users of the endpoint devices are registered with a QS payment account in the quantum cloud payment platform, the method, performed by the quantum cloud payment platform, comprising:
  receiving one or more quantum safe deposit payment transactions from one or more endpoint devices of one or more registered users, each QS deposit payment transaction of a user comprising data representative of a deposit fiat cash value;

transferring each of the deposit fiat cash values from a bank account associated with a user and linked to the QS payment account of the user to a quantum cloud account for pooling each of the deposit fiat cash values;
  for each deposit fiat cash value transferred in relation to a user of an endpoint device, performing:
    converting said each deposit fiat cash value to a corresponding number of quantum money tokens;
    linking said number of quantum money tokens to the QS payment account of the user; and
    sending said number of quantum money tokens to the endpoint device of the user for updating an electronic wallet of said user;
  receiving one or more quantum safe withdrawal payment transactions from one or more endpoint devices of one or more registered users, each QS withdrawal payment transaction of a user comprising data representative of a withdrawal fiat cash value;
  transferring each of the withdrawal fiat cash values from the quantum cloud account for pooling each of the withdrawal fiat cash values to a bank account associated with a user and linked to the QS payment account of the user, wherein for each withdrawal fiat cash value transferred in relation to a user of an endpoint device, performing:
    converting said each withdrawal fiat cash value to a corresponding number of quantum money tokens;
    determining whether QS payment account of said user has enough quantum money tokens in relation to the number of quantum money tokens of said each withdrawal fiat cash value;
    removing said number of quantum money tokens to the QS payment account of the user, when said QS payment account has enough quantum money tokens; and
    sending an indication of the number of quantum money tokens withdrawn from the QS payment account of the user to the endpoint device of the user for updating an electronic wallet of said user;
  receiving one or more quantum safe payment transactions from one or more endpoint devices of one or more registered users, each QS payment transaction of a user comprising data representative of a payment fiat cash value for transferring to another user of an endpoint device;
  converting each of the payment fiat cash values into a corresponding number of quantum money tokens;
  transferring each of the number of quantum money tokens corresponding to a payment fiat cash values from the QS payment account of the user to the QS payment account of the other user, wherein for each of the number of quantum money tokens corresponding to the payment fiat cash value transferred in relation to a user of an endpoint device, performing:
    determining whether the QS payment account of said user has enough quantum money tokens in relation to the number of quantum money tokens of said each payment fiat cash value;
    removing said number of quantum money tokens from the QS payment account of the user, when said QS payment account has enough quantum money tokens;
    transferring said number of quantum money tokens from the QS payment account of the user to the QS payment account of the other user; and
    sending an indication of the number of quantum money tokens withdrawn from the QS payment account of the user to the endpoint device of the user for updating an electronic wallet of said user.

21. The computer-implemented method of clause 20, further comprising:

receiving a request from an endpoint device for creating a QS payment account;

performing know your own client and anti-money laundering checks on the user of the endpoint device;

in response to a positive KYC and AML checks, creating a QS payment account for the user and associating the QS payment account with the endpoint device of the user.

22. A computer-implemented method of secure quantum safe (QS) payments using a quantum cloud platform, the quantum cloud platform comprising a quantum-safe network, the QS network comprising one or more QS server(s) and a distributed ledger technology (DLT) repository for registering, recording and tracking a plurality of QS payment transactions between two or more endpoint devices, each QS server comprising a hardware security module (HSM) for storing an identical set of quantum distributed (QD) keys or quantum safe keys, said identical set of QD keys having been distributed to each of said QS server(s) in a quantum-safe manner, and said QS server(s) configured to communicate securely with each other and the repository using one or more available QD keys from the identical set of QD keys, and one or more further available QD keys from the set of QD keys being distributed as quantum safe keys to each of the endpoint devices registered with the quantum cloud payment platform, wherein each of the users of the endpoint devices are registered with a QS payment account in the quantum cloud payment platform, the method, performed by one of the endpoint devices, comprising:

in response to a deposit instruction from the user of the endpoint device, transmitting a quantum safe deposit payment transaction to the quantum cloud platform, the QS deposit payment transaction comprising data representative of a deposit fiat cash value;

receiving data representative of said number of quantum money tokens corresponding to the deposit fiat cash value;

updating an electronic wallet of said user based on the received number of quantum money tokens;

in response to a withdrawal instruction from the user of the endpoint device, transmitting a quantum safe withdrawal payment transaction to the quantum cloud platform, the QS withdrawal payment transaction comprising data representative of a withdrawal fiat cash value;

receiving an indication of the number of quantum money tokens withdrawn from the QS payment account of the user; and updating an electronic wallet of said user based on said indication;

in response to a payment instruction from the user of the endpoint device, transmitting a quantum safe payment transaction to the quantum cloud platform, the QS payment transaction of a user comprising data representative of a payment fiat cash value for transferring to another user of an endpoint device;

receiving an indication of the number of quantum money tokens withdrawn from the QS payment account of the user of the endpoint device; and updating an electronic wallet of said user based on the indication.

23. The computer-implemented method of clause 22, further comprising:

transmitting a request to the quantum cloud platform a request for creating a QS payment account;

transmitting data representative of know your own client and anti-money laundering data in relation to the user of the endpoint device to the quantum cloud platform;

receiving confirmation of the QS payment account created for the user; and updating an electronic wallet on the endpoint device associated with the QS payment account.

24. An apparatus comprising a processor unit, a memory unit, and a communication interface, the processor unit connected to the memory unit and the communication interface, wherein the processor unit, memory unit and communication interface are adapted to implement the computer-implemented method as claimed in any of clauses 20 to 21.

25. An apparatus comprising a processor unit, a memory unit, and a communication interface, the processor unit connected to the memory unit and the communication interface, wherein the processor unit, memory unit and communication interface are adapted to implement the computer-implemented method as claimed in any of clauses 22 to 23.

26. A system comprising:

an quantum cloud platform including an apparatus according to clause 24;

a plurality of endpoint devices comprising an apparatus according to clause 25;

wherein the quantum cloud computing platform uses quantum safe communications with each of the plurality of endpoint devices.

27. A computer-readable medium comprising computer code or instructions stored thereon, which when executed on a processor, causes the processor to perform the computer implemented method according to any of clauses 20 to 21.

28. A computer-readable medium comprising computer code or instructions stored thereon, which when executed on a processor, causes the processor to perform the computer implemented method according to any of clauses 22 to 23.

The invention claimed is:

1. A computer-implemented method of quantum-secure (QS) minting and issuing of a digital coin by a central bank using a quantum cloud platform operable to facilitate an issuing authority, the method comprising:

issuing a command, from the central bank to the issuing authority, to mint a new digital coin, wherein the command comprises:

data indicative of a predetermined value of the digital coin, a unique identifier to be associated with the digital coin, and an identifier indicating which endpoint user of the quantum cloud platform, amongst a plurality of endpoint users, is to be designated as the owner of the digital coin;

in response to receiving the command, signing, by the issuing authority, the digital coin with an ownership encryption key, wherein the ownership encryption key is a private key known only to the quantum cloud platform and the owner;

subsequent to signing the digital coin with the ownership encryption key, signing, by the issuing authority, the digital coin with an authorizing encryption key, wherein the authorizing encryption key is a private key known only to the quantum cloud platform and the central bank.

2. The computer-implemented method according to claim 1, further comprising: storing, by the issuing authority, data regarding the twice signed digital coin in a database of coins, wherein the coin is identifiable by its unique identifier.

3. The computer-implemented method according to claim 1, the method further comprising: requesting, by a first endpoint user to the central bank, the issuance of a coin of the predetermined value to initiate the issuing of the command by the central bank, wherein the first endpoint user is the endpoint user of the quantum cloud platform designated in the command as the owner of the digital coin.

4. The computer-implemented method according to claim 1, the method further comprising: sending, from the issuing authority to the owner, the twice signed digital coin.

5. The computer-implemented method according to claim 1, wherein each of the ownership encryption keys is a quantum-secure key distributed to the associated endpoint user by the quantum cloud platform.

6. The computer-implemented method according to claim 5, wherein each of the ownership encryption keys is a public encryption key that is part of a quantum-secure (QS) asymmetric key pair issued by the quantum cloud platform to the owner, wherein the QS asymmetric key pair comprises the respective ownership key and a respective private owner key.

7. The computer-implemented method according to claim 1, wherein the authorizing encryption key is a private quantum-secure key stored by the issuing authority.

8. The computer-implemented method according to claim 1, wherein signing the digital coin, by any of the endpoint users or issuing authority, comprises concatenating the respective ownership encryption key to a data item defining the digital coin.

9. The computer-implemented method according to claim 1, wherein signing the signed digital coin, by the issuing authority comprises concatenating the authorizing encryption key to a data item defining the signed digital coin.

10. The computer-implemented method according to claim 1, wherein the quantum cloud platform is the issuing authority.

* * * * *